US012677055B2

(12) United States Patent
Lee et al.

(10) Patent No.: US 12,677,055 B2
(45) Date of Patent: Jul. 7, 2026

(54) CAMERA ACTUATOR, AND CAMERA MODULE AND OPTICAL DEVICE COMPRISING SAME

(71) Applicant: LG INNOTEK CO., LTD., Seoul (KR)

(72) Inventors: Seung Hak Lee, Seoul (KR); Ji Wook Moon, Seoul (KR); Yu Jeong Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 175 days.

(21) Appl. No.: 18/288,875

(22) PCT Filed: May 6, 2022

(86) PCT No.: PCT/KR2022/006487
§ 371 (c)(1),
(2) Date: Oct. 30, 2023

(87) PCT Pub. No.: WO2022/235111
PCT Pub. Date: Nov. 10, 2022

(65) Prior Publication Data
US 2024/0236457 A1 Jul. 11, 2024

(30) Foreign Application Priority Data

May 6, 2021 (KR) ........................ 10-2021-0058530
May 14, 2021 (KR) ........................ 10-2021-0062820
(Continued)

(51) Int. Cl.
*H04N 23/55* (2023.01)
*G02B 1/10* (2015.01)
(Continued)

(52) U.S. Cl.
CPC .............. *H04N 23/55* (2023.01); *G02B 1/10* (2013.01); *G02B 13/0065* (2013.01); *H04N 23/10* (2023.01); *H04N 23/685* (2023.01)

(58) Field of Classification Search
CPC ............ G02B 5/04; G02B 5/045; G02B 5/06
See application file for complete search history.

(56) References Cited

U.S. PATENT DOCUMENTS 6,213,612 B1 * 4/2001 Schnell ................... B60R 1/072
439/352
7,720,580 B2 * 5/2010 Higgins-Luthman .......................
G06V 20/58
701/28
(Continued)

FOREIGN PATENT DOCUMENTS

CN 111294484 6/2020
JP 2013-167818 8/2013
(Continued)

OTHER PUBLICATIONS

International Search Report dated Aug. 10, 2022 issued in Application No. PCT/KR2022/006487.
(Continued)

*Primary Examiner* — Noam Reisner
(74) *Attorney, Agent, or Firm* — KED & ASSOCIATES

(57) ABSTRACT

One embodiment of the present invention provides a camera actuator comprising: a housing; a mover comprising a holder disposed inside the housing and an optical member disposed
(Continued)

on the holder; a driving unit disposed inside the housing and for moving the mover; and an adhesive member disposed between the holder and the optical member. The optical member comprises a reflective surface and a coating layer disposed on the reflective surface. The coating layer comprises a first area coming into contact with the adhesion member and a second area other than the first area, the thickness in the first area being greater than the thickness in the second area.

19 Claims, 71 Drawing Sheets

(30) Foreign Application Priority Data

| | | | |
|---|---|---|---|
| May 14, 2021 | (KR) | ........................ | 10-2021-0062821 |
| May 17, 2021 | (KR) | ........................ | 10-2021-0063212 |

(51) Int. Cl.

| | |
|---|---|
| *G02B 13/00* | (2006.01) |
| *H04N 23/10* | (2023.01) |
| *H04N 23/68* | (2023.01) |

(56) References Cited

U.S. PATENT DOCUMENTS

| | | | | |
|---|---|---|---|---|
| 2015/0314732 | A1* | 11/2015 | Lynam | ..................... B60Q 1/26 |
| | | | | 340/425.5 |
| 2017/0272026 | A1* | 9/2017 | Yamato | ..................... H02P 6/16 |

FOREIGN PATENT DOCUMENTS

| | | |
|---|---|---|
| JP | 2017-198979 | 11/2017 |
| KR | 10-2003-0001072 | 1/2003 |
| KR | 10-2016-0064941 | 6/2016 |
| KR | 10-2017-0049094 | 5/2017 |
| KR | 10-2018-0094355 | 8/2018 |
| KR | 10-2020-0049731 | 5/2020 |
| KR | 10-2021-0013973 | 2/2021 |
| WO | WO 2014/021232 | 2/2014 |
| WO | WO 2020/158663 | 8/2020 |

OTHER PUBLICATIONS

Korean Office Action dated Aug. 8, 2025 issued in Application No. 10-2021-0062820.
Korean Office Action issued in Application No. 10-2021-0063212 dated Apr. 29, 2025.
Korean Office Action issued in Application No. 10-2021-0062821 dated Jun. 30, 2025.

* cited by examiner

<u>1000</u>

1100

(a)

(b)

(c)

(d)

SECOND-AXIS
TILTING

X ⊙ ↶ → Y

↓ FIRST-AXIS
Z    TILTING

1200

630 : 120, 130, 190

CAMERA ACTUATOR, AND CAMERA MODULE AND OPTICAL DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/006487, filed May 6, 2022, which claims priority to Korean Patent Application Nos. 10-2021-0058530, filed May 6, 2021, 10-2021-0062820, filed May 14, 2021, 10-2021-0062821, filed May 14, 2021 and 10-2021-0063212, filed May 17, 2021, whose entire disclosures are hereby incorporated by reference.

TECHNICAL FIELD

The present invention relates to a camera actuator, and a camera module and an optical device including the same.

BACKGROUND ART

A camera is a device for making pictures or videos by photographing subjects and is mounted on a mobile device, a drone, a vehicle, etc. In order to improve the quality of the image, a camera module may have an image stabilization (IS) function for correcting or preventing the image shake caused by the movement of a user, an auto focusing (AF) function for aligning a focal length of a lens by automatically adjusting an interval between an image sensor and the lens, and a zooming function for photographing a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to the general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, an actuator for an OIS may be disposed around the lens. In this case, the actuator for an OIS may include actuators in charge of two axes (i.e., an X-axis and a Y-axis perpendicular to a Z-axis which is an optical axis) tiling.

However, according to the needs of ultra-slim and ultra-small camera modules, there is a large space constraint for arranging the actuator for an OIS, and it may be difficult to secure a sufficient space for an OIS where the lens or the camera module including the lens and the image sensor itself may be tilted or moved. In addition, as the camera has a higher pixel density, it is preferable that a size of the lens be increased to increase the amount of received light, and there may be a limit to increasing the size of the lens due to a space occupied by the actuator for an OIS.

In addition, when a zooming function, an AF function, and an OIS function are all included in the camera module, there is also a problem that an OIS magnet and an AF or zoom magnet are disposed close to each other to cause magnetic field interference.

However, there is a problem in which resolution power is degraded due to the occurrence of warpage or distortion when an optical member is coupled.

Technical Problem

The present invention is directed to providing a camera actuator, which suppresses warpage or distortion of an optical member due to coupling of a bonding member through the optical member having a different thickness for each area.

In addition, an embodiment is directed to providing a camera actuator having increased reflection efficiency of light through an optical member having a large thickness in an edge area.

In addition, an embodiment is directed to providing a camera actuator applicable to ultra-slim, ultra-small, and high-resolution cameras.

An embodiment is directed to providing a camera device in which a flare phenomenon and a ghost phenomenon are suppressed and a degradation in resolution power is prevented, and an optical device including the same.

An embodiment is directed to providing a camera device in which the occurrence of cracks inside a board unit is prevented, the reliability of a gyro sensor is secured, and the reliability of electrical connection is secured, and an optical device including the same.

An embodiment is directed to providing a camera device and an optical device, in which a decrease in optical efficiency is minimized and high-quality image performance is obtained.

The object of embodiments is not limited thereto and may also include objects or effects that may be identified from the configurations or embodiments to be described below.

Technical Solution

A camera actuator according to an embodiment of the present invention includes a housing, a mover including a holder disposed in the housing and an optical member disposed in the holder, a driving unit disposed in the housing and configured to move the mover, and a bonding member disposed between the holder and the optical member, wherein the optical member includes a reflective surface and a coating layer disposed on the reflective surface, the coating layer includes a first area in contact with the bonding member and a second area other than the first area, and a thickness of the coating layer in the first area is larger than a thickness of the coating layer in the second area.

The holder may include a seating surface corresponding to the reflective surface of the optical member, and the seating surface may include an edge area and an internal area disposed inside the edge area.

The seating surface may include a seating protrusion disposed in the edge area.

The first area may be positioned on the edge area, and the second area may be positioned on the internal area.

The coating layer may be disposed to be spaced apart from the seating surface in the second area.

At least a portion of the bonding member may be in contact with the first area.

The bonding member may be misaligned with the second area.

The bonding member may be disposed on the seating protrusion.

A plurality of layers may be formed, and the number of the plurality of layers in the first area may be larger than the number of the plurality of layers in the second area.

The optical member may be a prism or a mirror.

The holder may include a first holder outer surface and a second holder outer surface facing each other, a third holder outer surface disposed under the first holder outer surface and the second holder outer surface, and a fourth holder outer surface disposed on the third holder outer surface between the first holder outer surface and the second holder outer surface, and the optical member may be surrounded by the first holder outer surface, the second holder outer surface, the third holder outer surface, and the fourth holder outer surface.

When a thickness of the optical member decreases, the thickness of the coating layer in the first area may increase.

At least a portion of the bonding member may be positioned under the second area.

The bonding member may be in contact with any one of the second area or the seating surface.

The bonding member may be positioned on the seating surface and disposed to be spaced apart from the second area.

A camera device includes the camera actuator according to the embodiment, and a processor connected to the camera actuator, wherein the camera actuator includes a housing, a mover including a holder disposed in the housing and an optical member disposed in the holder, a driving unit disposed in the housing and configured to move the mover, and a bonding member disposed between the holder and the optical member, wherein the optical member includes a reflective surface and a coating layer disposed on the reflective surface, the coating layer includes a first area in contact with the bonding member and a second area other than the first area, and a thickness of the first area is larger than a thickness of the second area.

A camera actuator according to an embodiment includes a housing, a mover including a holder disposed in the housing and an optical member disposed in the holder, and a driving unit disposed in the housing and configured to move the mover, wherein the optical member includes a reflective surface and a coating layer disposed on the reflective surface, the coating layer includes a first area and a second area other than the first area, and a thickness of the coating layer in the first area is larger than a thickness of the coating layer in the second area.

A camera device according to an embodiment includes a lens barrel, a lens array including a plurality of lenses disposed in the lens barrel, a spacer disposed between adjacent two lenses among the plurality of lenses, an image sensor disposed to face the lens barrel, and a first light absorption layer disposed on the spacer.

The first light absorption layer may be disposed on at least one of an upper surface, a lower surface, and side surfaces of the spacer.

The camera device may include a second light absorption layer disposed on an inner surface of the lens barrel.

The lens barrel may include an upper surface, an inner surface, and a bottom portion, and the second light absorption layer may be disposed on at least one of the upper surface, the inner surface, and the bottom portion of the lens barrel.

The lens barrel may include a first hole passing through the bottom portion to expose the lens array, and the second light absorption layer may include a portion disposed on an inner circumferential surface formed by the first hole of the bottom portion.

Each of the first and second light absorption layers may include at least one of black titanium oxide, black titanium-carbon oxide, and black carbon oxide.

Each of the first and second light absorption layers may be made of a mixture of at least one of black titanium oxide, black titanium-carbon oxide, and black carbon oxide and a resin.

A composition of each of the first and second light absorption layers may be $Ti_nO_{2n-1}$, and n may be $1.5 < n < 4.5$.

The composition of each of the first and second light absorption layers may be $Ti_xO_yC_z$, and x, y, and z may be $0.5 < x < 4.5$, $1.5 < y < 7.5$, and $0.5 < z < 4.5$.

A ratio of a weight of a resin to a weight of at least one of the black titanium oxide, the black titanium-carbon oxide, and the black carbon oxide may be in a range of 1:2 to 1:3.

A thickness of each of the first and second light absorption layers may be in a range of 0.5 micrometers or more and 10 micrometers or less.

The camera device may include a bobbin configured to accommodate the lens barrel therein, and the bobbin may include a second hole exposing a portion of the lens array disposed in the lens barrel and a third light absorption layer disposed on an inner circumferential surface formed by the second hole of the bobbin.

The camera device may include a base disposed between the bobbin and the image sensor and including a third hole corresponding to the second hole, and a fourth light absorption layer disposed on an inner circumferential surface formed by the third hole of the base. The fourth light absorption layer may include a portion disposed in a partial area of an upper surface of the base adjacent to the third hole.

The camera device may include a fifth light absorption layer disposed on an outer surface of the lens array.

The camera device may include a stopper disposed on an upper surface of a first lens among the plurality of lenses and a sixth light absorption layer disposed on the stopper.

A camera device according to another embodiment includes a circuit board, an image sensor disposed on the circuit board, a lens barrel disposed to face the image sensor, a lens array including a plurality of lenses disposed in the lens barrel, a spacer disposed between adjacent two lenses among the plurality of lenses, and a first light absorption layer disposed on an inner surface of the lens barrel and an upper surface, a lower surface, and a side surface of the spacer.

The camera device according to another embodiment may include a bobbin configured to accommodate the lens barrel therein and including a first hole exposing a portion of the lens array, a base including a second hole corresponding to the first hole and disposed between the bobbin and the circuit board, and a second light absorption layer disposed on an inner circumferential surface of the bobbin. In addition, the camera device according to another embodiment may include a third light absorption layer disposed on an inner circumferential surface of the base.

A camera device according to still another embodiment includes a first actuator including an optical member configured to change an optical path, and a second actuator including a lens module through which light of which an optical path is changed by the first actuator passes and configured to move the lens module in a first direction, and an image sensor disposed to face the lens module, wherein the lens module includes a lens barrel, a lens array including a plurality of lenses disposed in the lens barrel, a spacer disposed between adjacent two lenses among the plurality of lenses, and a light absorption layer disposed on at least one of an inner surface of the lens barrel and the spacer.

A camera device according to an embodiment includes a board unit including a first board, a second board, and a third board connecting the first board to the second board, an image sensor disposed on the first board, a first actuator including a lens module disposed to face the image sensor and configured to move the lens module, a support holder configured to accommodate the first actuator, and a fixing unit configured to fix the second board to the support holder.

The third board may be a flexible board and may include a curved portion.

The camera device may include a gyro sensor disposed on the second board, and the fixing unit may accommodate the gyro sensor therein.

The support holder may include a first side plate and a second side plate facing each other, and the fixing unit may fix the second board to the first side plate of the support holder. The fixing unit may include an upper plate facing the gyro sensor and a side plate disposed between the upper plate of the fixing unit and the second board, and the upper plate of the fixing unit may be fixed to the first side plate of the support holder. The support holder may include at least one protrusion protruding from the first side plate of the support holder, and the fixing unit may include at least one through-hole coupled to the at least one protrusion of the support holder.

The camera device may include an adhesive disposed between the first side plate of the support holder and the upper plate of the fixing unit.

The at least one through-hole may be formed in an area in which the upper plate of the fixing unit and the side plate of the fixing unit meet.

The support holder may include at least one guide unit protruding from the first side plate of the support holder and configured to support the side plate of the fixing unit.

The support holder may include four protrusions protruding from the first side plate, the guide unit may include first and second guide portions facing each other, and the fixing unit may be disposed between the first guide portion and the second guide portion.

The camera device may include a reinforcing member including a first reinforcing portion supporting the first board, a second reinforcing portion supporting the second board, and a third reinforcing portion supporting the third board and including a bent portion.

A camera device according to another embodiment includes a board unit including a first board, a second board, and a third board connecting the first board to the second board, an image sensor disposed on the first board, an electronic element disposed on the second board, a first actuator including a lens module disposed to face the image sensor and configured to move the lens module, a support holder configured to accommodate the first actuator and including a side plate including at least one protrusion, and a fixing unit coupled to the second board and including at least one hole coupled to the at least one protrusion of the support holder.

The camera device according to another embodiment may include an adhesive coupling the side plate of the support member to the fixing unit.

The fixing unit may include an upper plate facing the electronic element and a side plate disposed between the upper plate and the second board, and the support holder may include at least one guide unit configured to support the side plate of the fixing unit. The electronic element may be a gyro sensor.

Each of the first and second boards may be a rigid board, the third board may be a flexible board, and the third board may include a curved portion.

A camera device according to an embodiment includes a lens module including a plurality of lenses, an actuator configured to move the lens module in an optical axis direction, and an image sensor disposed to face the lens module, wherein the image sensor includes a light receiving unit, a micro lens disposed on the light receiving unit and including a first convexly curved surface, a cut-off filter layer disposed on the first convex curved surface, and a phosphor layer disposed on the cut-off filter layer.

The cut-off filter layer may include a second convex curved surface corresponding to the first convex curved surface, and the phosphor layer may be formed on the second convex curved surface.

The phosphor layer may include a third convex curved surface corresponding to the second convex curved surface.

The camera device may include a color filter layer including a red filter, a green filter, and a blue filter and disposed between the light receiving unit and the micro lens.

The color filter layer may include a phosphor.

The red filter may include $K_2SiF_6:Mn^{4+}$ or $(Sr,Ca)AlSiN_3:Eu^{2+}$, the green filter may include Beta-$Si_{(6-z)}Al_zO_zN_{(8-z)}:Eu^{2+}$ or $(CsRb)PbBr3$, and the blue filter may include $BaMgAl_{10}O_{17}:Eu^{2+}$.

The red filter may include a first quantum dot emitting red light, the green filter may include a second quantum dot emitting green light, and the blue filter may include a third quantum dot emitting blue light.

The first quantum dot may include at least one of InP, GaP, or ZnS, the second quantum dot may include at least one of InP, GaP, or ZnS, or include at least one of CuInGaS or ZnS, and the third quantum dot may include at least one of InP, GaP, or ZnS or include at least one of CuInGaS or ZnS.

The camera device may include an antireflective film disposed on the color filter layer.

The cut-off filter layer may include a first layer and a second layer alternately disposed two or more times, and a refractive index of the first layer and a refractive index of the second layer may be different.

The first layer may be made of titanium oxide, and the second layer may be made of silicon oxide.

A thickness of the phosphor layer may be larger than or equal to a thickness of the cut-off filter layer.

The cut-off filter layer may be an infrared cut-off filter.

The phosphor layer may be an up-conversion phosphor layer.

The camera device may include a circuit board on which the image sensor is disposed, and the actuator may include a housing, a bobbin disposed in the housing and coupled to the lens module, and a base disposed between the housing and the circuit board and attached to the circuit board.

Advantageous Effects

According to embodiments of the present invention, it is possible to implement a camera actuator, in which warpage or distortion of an optical member is suppressed even when a bonding member is coupled through the optical member having a different thickness for each area.

In addition, the embodiments can provide a camera actuator having increased reflection efficiency of light through an optical member having a large thickness in an edge area.

According to the embodiments of the present invention, it is possible to provide a camera actuator applicable to ultra-slim, ultra-small, and high-resolution cameras. In particular, it is possible to effectively arrange an OIS actuator even without increasing the overall size of a camera module.

According to the embodiments of the present invention, it is possible to implement an X-axis tilting and a Y-axis tilting with a stable structure without causing magnetic field interference between the X-axis tilting and the Y-axis tilting and implement a precise OIS function by not causing magnetic field interference with an AF actuator or a zooming actuator.

According to the embodiments of the present invention, it is possible to sufficiently secure an amount of light by resolving a size limit of a lens and implement an OIS with low power consumption.

Since light absorption layers disposed on a lens barrel and a spacer are included in the embodiments, it is possible to suppress a flare phenomenon and a ghost phenomenon and prevent degradation in resolution power.

According to the embodiments, it is possible to stably fix or attach a second board to a support holder by a fixing unit and minimize stress applied to a bent or curved portion of a flexible board, thereby preventing the occurrence of cracks inside a board unit.

In addition, according to the embodiments, it is possible to suppress the position fluctuation of a gyro sensor caused by an external impact or the like, thereby securing the reliability of the gyro sensor.

In addition, according to the embodiments, it is possible to prevent the occurrence of micro cracks in bonding portions of terminals of a second circuit board of a second board unit and second terminals of a first board of a third board unit, thereby securing the reliability of the electrical connection of the camera device.

In the embodiments, by forming a cut-off filter layer directly on a surface of a micro lens unit without using a medium such as glass, it is possible to decrease optical loss, thereby minimizing a decrease in optical efficiency and obtaining high-quality image performance.

In addition, according to the embodiments, by forming an up-conversion phosphor layer on a surface of the cut-off filter layer, it is possible to increase the light-emitting efficiency of visible light by absorbing unnecessary light having a wavelength band close to that of infrared rays.

In addition, according to the embodiments, by absorbing the unnecessary light having the wavelength band close to infrared rays remaining in the light passing through the phosphor layer by the cut-off filter layer, it is possible to secure clear images by removing noise.

In addition, according to the embodiments, by including a phosphor having a narrow full width at half maximum in a color filter layer, it is possible to improve color purity or color quality, thereby implementing high-quality images.

Various and beneficial advantages and effects of the present invention are not limited to the above-described contents and will be more readily understood in a process of describing specific embodiments of the present invention.

MODES OF THE INVENTION

Figure 1:
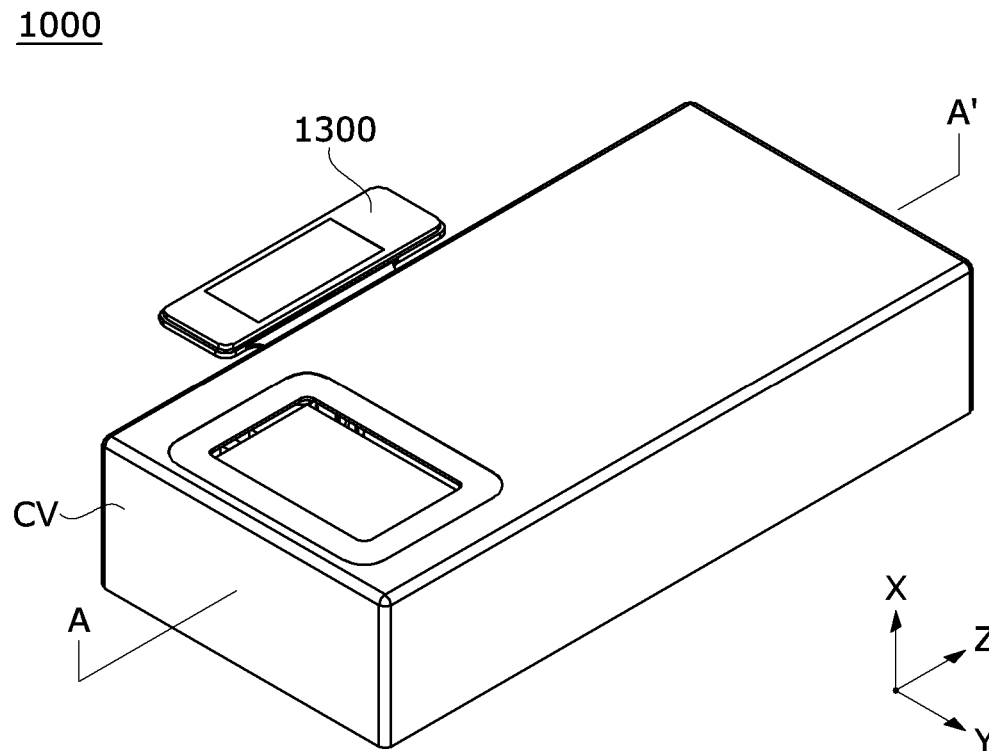
FIG. 1 is a perspective view of a camera module according to an embodiment.

Since the present invention may have various changes and various embodiments, specific embodiments are illustrated and described in the accompanying drawings. However, it should be understood that it is not intended to limit specific embodiments, and it should be understood to include all modifications, equivalents, and substitutes included in the spirit and scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

In addition, the terms "comprise," "constitute," and "have" described above mean that the corresponding component may be inherent unless otherwise stated, and thus should be construed as further including another component rather than excluding another component. In addition, the term "corresponding" described above may include at least one of the meanings of "facing" or "overlapping."

Hereinafter, a camera device and an optical device including the same according to an embodiment will be described with reference to the accompanying drawings as follows.

The camera device according to the embodiment may perform a hand shaking correction function and an auto focusing function. "Hand shaking correction function" may be a function for moving a lens in a direction perpendicular to an optical axis direction or tilting the lens with respect to an optical axis in order to cancel vibration (or movement) caused by a user's hand shaking. In addition, "auto focusing function" may be a function for automatically focusing on a subject by moving the lens in the optical axis direction according to a distance to the subject in order to obtain a clear image of the subject by an image sensor. In addition, in the embodiment, a fixed zooming function may be performed, which may be a zooming function for photographing a distant subject by increasing a magnification of the distant subject through a zoom lens.

Hereinafter, "camera device" may be interchangeably expressed as "camera," "imaging machine," "camera module," or "photographing device."

Figure 2:
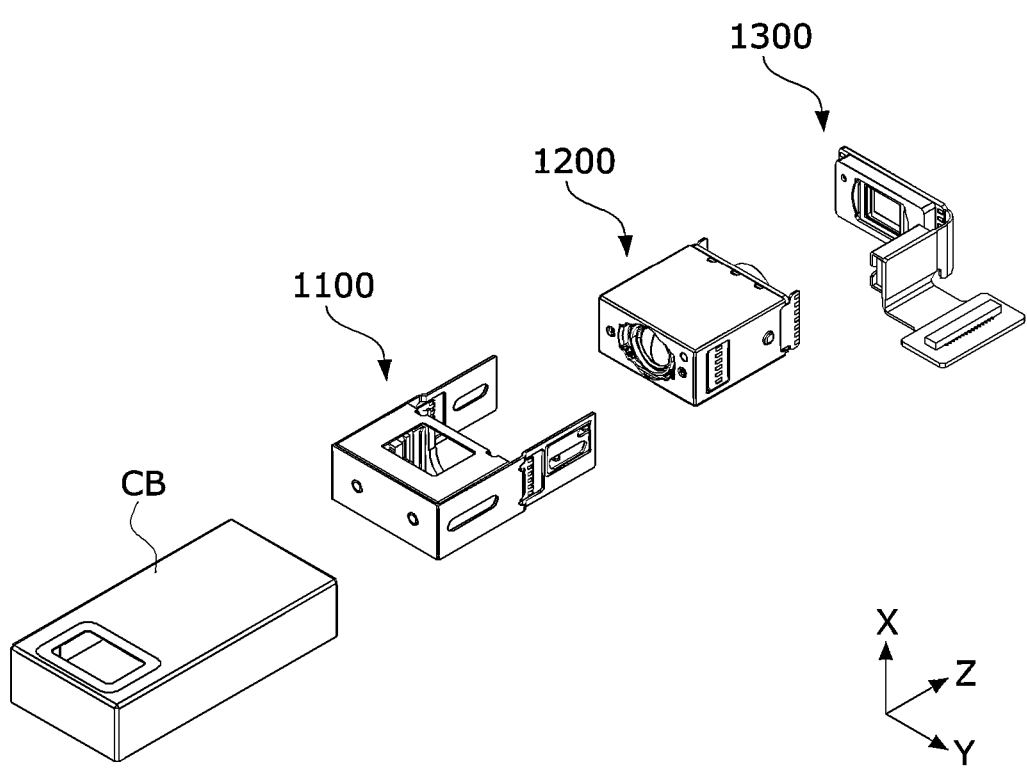
FIG. 2 is an exploded perspective view of the camera module according to the embodiment.
Figure 3:
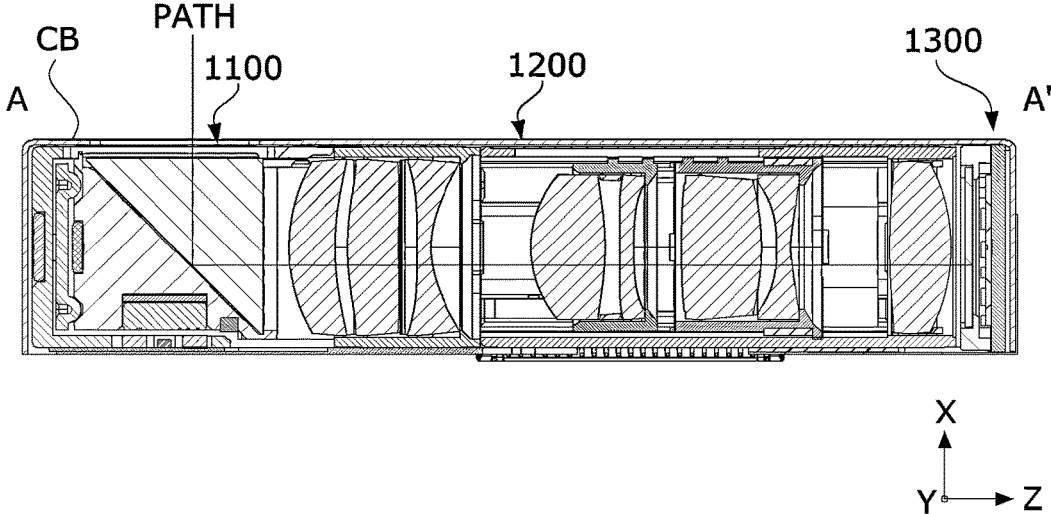
FIG. 3 is a cross-sectional view taken along line A-A' in FIG. 1.

FIG. 1 is a perspective view of a camera module according to an embodiment, FIG. 2 is an exploded perspective view of the camera module according to the embodiment, and FIG. 3 is a cross-sectional view taken along line A-A' in FIG. 1.

Referring to FIGS. 1 and 2, a camera module 1000 according to the embodiment may include a cover CB, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CB may cover the first camera actuator 1100 and the second camera actuator 1200. It is possible to increase a coupling strength between the first camera actuator 1100 and the second camera actuator 1200 by the cover CB.

Furthermore, the cover CB may be made of a material that blocks electromagnetic waves. Therefore, it is possible to easily protect the first camera actuator 1100 and the second camera actuator 1200 in the cover CB.

In addition, the first camera actuator 1100 may be an optical image stabilizer (OIS) actuator.

The first camera actuator 1100 may include a lens disposed in a lens disposed in a predetermined barrel (not illustrated). For example, the lens may include a fixed focal length lens. The fixed focal length lens may be referred to as "single focal length lens" or "single lens."

The first camera actuator 1100 may change an optical path. In the embodiment, the first camera actuator 1100 may vertically change the optical path through an internal optical member (e.g., a prism or a mirror). With this configuration, even when a thickness of a mobile terminal decreases, a configuration of a lens that is larger than the thickness of the mobile terminal is disposed in the mobile terminal so that magnification, auto focusing (AF), and OIS functions may be performed through the change in the optical path.

The second camera actuator 1200 may be disposed at a rear end of the first camera actuator 1100. The second camera actuator 1200 may be coupled to the first camera actuator 1100. In addition, the mutual coupling may be performed by various methods.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a controller.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may be provided with an image sensor. Furthermore, a base unit including a filter may be seated on the circuit board 1300. A description thereof will be made below.

A camera module according to the embodiment may be formed of one camera module or a plurality of camera modules. For example, the plurality of camera modules may include a first camera module and a second camera module.

In addition, the first camera module may include one actuator or a plurality of actuators. For example, the first camera module may include the first camera actuator 1100 and the second camera actuator 1200.

In addition, the second camera module may include an actuator (not illustrated) disposed in a predetermined housing (not illustrated) and capable of driving a lens unit. Although the actuator may be a voice coil motor, a micro actuator, a silicon actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera module formed of the plurality of camera modules may be mounted in various electronic devices such as a mobile terminal.

Referring to FIG. 3, the camera module according to the embodiment may include the first camera actuator 1100 for performing the OIS function and the second camera actuator 1200 for performing the zooming function and the AF function.

Light may enter the camera module through an opening area positioned in an upper surface of the first camera actuator 1100. In other words, the light may enter the first camera actuator 1100 in an optical axis direction (e.g., an X-axis direction), and an optical path may be changed in a vertical direction (e.g., a Z-axis direction) through an optical member. In addition, the light may pass through the second camera actuator 1200 and enter an image sensor IS positioned at one end of the second camera actuator 1200 (PATH).

In the specification, a lower surface is one side surface in a first direction. In addition, the first direction is the X-axis direction in the drawings and may be used interchangeably with a second axis direction, etc. A second direction is a Y-axis direction in the drawings and may be used interchangeably with a first axis direction, etc. The second direction is a direction perpendicular to the first direction. In addition, a third direction is the Z-axis direction in the drawings and may be used interchangeably with a third axis direction, etc. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. A detailed description thereof will be made below.

In addition, hereinafter, the optical axis direction corresponds to the optical path and is the third direction (Z-axis direction) in the description of the second camera actuator 1200, and the following description will be made based on this.

In addition, with this configuration, the camera module according to the embodiment may resolve the spatial limits of the first camera actuator and the second camera actuator by changing the optical path. In other words, the camera module according to the embodiment may extend the optical path in response to the change in the optical path while minimizing the thickness of the camera module. Furthermore, it should be understood that the second camera actuator may provide a high range of magnification by controlling a focus or the like in the extended optical path.

In addition, the camera module according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet to perform a high-magnification zooming function.

For example, although the first lens assembly and the second lens assembly may be moving lenses that move through the coil, the magnet, and the guide pin, and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, according to the embodiment of the present invention, when the OIS actuator (e.g., the first camera actuator) and the AF or zoom actuator (e.g., the second camera actuator) are disposed, it is possible to prevent magnetic field interference with an AF or zoom magnet when an OIS is driven. Since a driving magnet of the first camera actuator 1100 is disposed separately from the second camera actuator 1200, it is possible to prevent magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
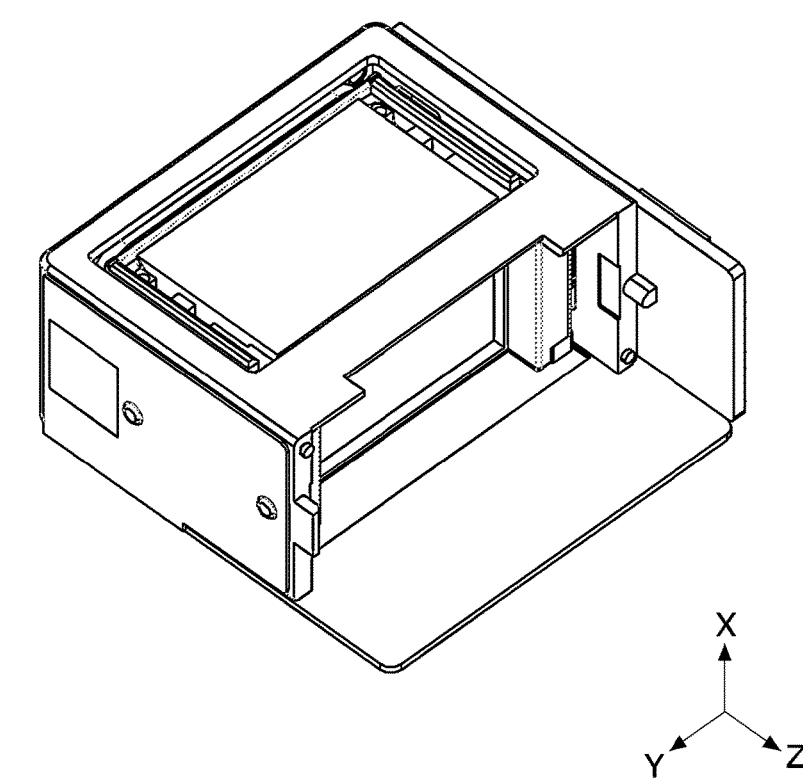
FIG. 4 is a perspective view of a first camera actuator according to the embodiment.
Figure 5:
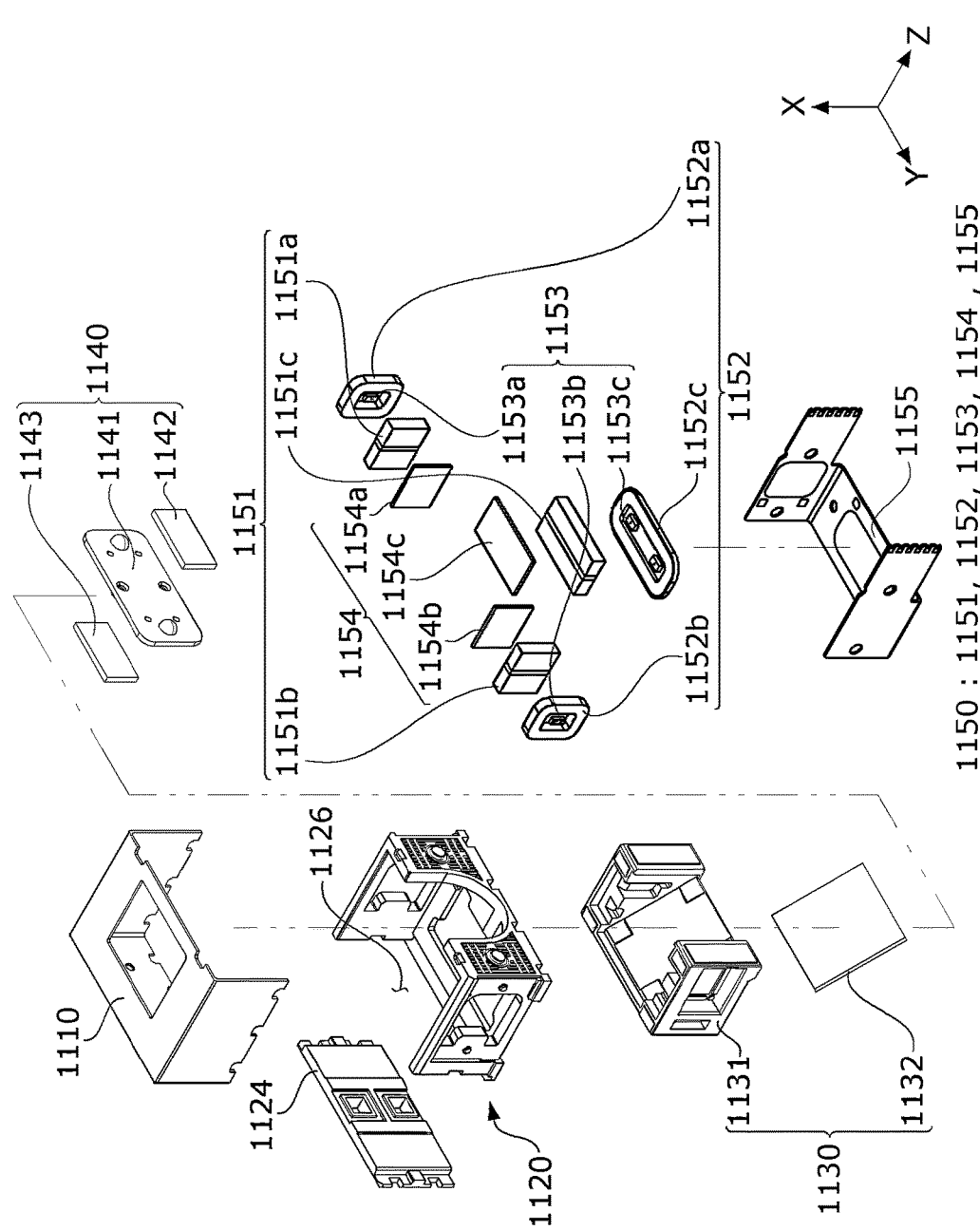
FIG. 5 is an exploded perspective view of the first camera actuator according to the embodiment.

FIG. 4 is a perspective view of a first camera actuator according to the embodiment, and FIG. 5 is an exploded perspective view of the first camera actuator according to the embodiment.

Referring to FIGS. 4 and 5, the first camera actuator 1100 according to the embodiment includes a shield can 1110, a first housing 1120, a mover 1130, a rotating unit 1140, and a first driving unit 1150.

The mover 1130 may include a holder 1131 and an optical member 1132 seated on the holder 1131. The mover 1131, the holder 1131, and the optical member 1132 may be positioned in the first housing 1120. In addition, the rotating unit 1140 includes a tilting guide unit 1141 and a first magnetic part 1142 and a second magnetic part 1143 disposed to be spaced apart from each other with a tilting guide unit 1141 interposed therebetween and having a coupling strength. In addition, the first driving unit 1150 includes a driving magnet 1151 (e.g., a first driving magnet), a driving coil 1152 (e.g., a first driving coil), a yoke unit (not illustrated), a Hall sensing unit 1153, and a first board unit 1154.

The shield can 1110 may be positioned at an outermost side of the first camera actuator 1100 and positioned to surround the rotating unit 1140 and the first driving unit 1150, which will be described below.

The shield can 1110 can block or reduce electromagnetic waves generated from the outside. Therefore, it is possible to reduce the occurrence of malfunction in the rotating unit 1140 or the first driving unit 1150.

The first housing 1120 may be positioned inside the shield can 1110. In addition, the first housing 1120 may be positioned inside the first board unit 1154 to be described below.

The first housing 1120 may be fastened by being fitted into or engaged with the shield can 1110.

In the specification, as described above, the third direction (Z-axis direction) corresponds to the optical axis direction, and the first direction (X-axis direction) and the second direction (Y-axis direction) are directions perpendicular to the optical axis and may be tilted by the first camera actuator.

The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower surface of the first housing 1120.

In addition, the first housing side portion 1121 may include a first housing hole 1121*a*. A first coil 1152*a* to be described below may be positioned in the first housing hole 1121*a*.

In addition, the second housing side portion 1122 may include a second housing hole 1122*a*. In addition, a second coil 1152*b* to be described below may be positioned in the second housing hole 1122*a*.

The first coil 1152*a* and the second coil 1152*b* may be coupled to the first board unit 1154. In the embodiment, the first coil 1152*a* and the second coil 1152*b* may be electrically connected to the first board unit 1154 so that a current may flow therebetween. The current is an element of an electromagnetic force capable of tilting the first camera actuator with respect to the X-axis.

The third housing side portion 1123 may include a third housing hole 1123*a*. A third coil 1152*c* to be described below may be positioned in the third housing hole 1123*a*. The third coil 1152*c* may be coupled to the first board unit 1154. In addition, the third coil 1152*c* may be electrically connected to the first board unit 1154 so that a current may flow therebetween. The current is an element of an electromagnetic force capable of tilting the first camera actuator with respect to the Y-axis.

The fourth housing side portion 1124 may include a housing groove 1124*a*. For example, the housing groove 1124*a* may be positioned on at least one of an outer surface or inner surface of the fourth housing side portion 1124. In addition, the second magnetic part 1143 may be disposed in the housing groove 1124*a*. In addition, the first magnetic part 1142 may be positioned to correspond to the second magnetic part 1143 with the tilting guide unit 1141 interposed therebetween. Therefore, the first housing 1120 may be coupled to the tilting guide unit 1141 and the mover 1130 by a magnetic force generated by the first magnetic part 1142 and the second magnetic part 1143.

In addition, the first housing 1120 may include an accommodating part 1126 formed by the first housing side portion 1121 to the fourth housing side portion 1124. The mover 1130 may be positioned in the accommodating part 1126.

The mover 1130 may include the holder 1131 and the optical member 1132 seated on the holder 1131.

The holder 1131 and the optical member 1132 may be seated in the accommodating part 1126 of the first housing 1120. The holder 1131 may include a first holder outer surface to a fourth holder outer surface respectively corresponding to the first housing side portion 1121, the second housing side portion 1122, the third housing side portion 1123, and the fourth housing side portion 1124. In addition, the first driving coil 1152 may be positioned in a seating groove formed in an outer surface of the holder 1131. A detailed description thereof will be made below.

The optical member 1132 may be seated on the holder 1131. To this end, the holder 1131 may have a seating surface, and the seating surface may be formed by an accommodating groove. The optical member 1132 may include a reflective unit disposed therein. However, the present invention is not limited thereto.

In addition, the optical member 1132 may reflect light reflected from the outside (e.g., an object) into the camera module. In other words, the optical member 1132 can resolve spatial limits of the first camera actuator and the second camera actuator by changing the path of the reflected light. Therefore, it should be understood that the camera module may provide a high range of magnification by extending the optical path while a thickness thereof is minimized.

The rotating unit 1140 may include the tilting guide unit 1141, the first magnetic part 1142 having a coupling strength with the tilting guide unit 1141, and the second magnetic part 1143 positioned in the tilting guide unit 1141 or the housing (in particular, the fourth housing side portion). However, the first magnetic part 1142 and the second magnetic part 1143 may be positioned in the mover 1130, the tilting guide unit 1141, and the housing 1120 and may provide a coupling strength between the housing 1120, the tilting guide unit 1141, and the mover 1130.

The tilting guide unit 1141 may be coupled to the mover 1130 and the first housing 1120. The tilting guide unit 1141 may be disposed adjacent to the optical axis. Therefore, the actuator according to the embodiment may easily change the optical path according to the tilting of the first and second axes to be described below.

The tilting guide unit 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. A detailed description thereof will be made below.

The first magnetic part 1142 may be positioned on the outer surface of the holder 1131. In the embodiment, the first magnetic part 1142 may be positioned on the fourth holder outer surface of the holder 1131. In addition, the second magnetic part 1143 may be positioned in the housing groove 1124*a* of the fourth housing side portion 1124.

With this configuration, the tilting guide unit 1141 may be pressed by the holder 1131 and the housing 1120 between the holder 1131 and the housing 1120 by a magnetic force (e.g., an attractive force) between the first magnetic part 1142 and the second magnetic part 1143. Therefore, the tilting guide unit 1141 and the holder 1131 may be spaced apart from a lower surface of the housing in the accommodating part 1126 of the housing 1120. In other words, the tilting guide unit 1141 and the holder 1131 may be coupled to the housing 1120. However, as described above, the first magnetic part 1142 and the second magnetic part 1143 may be magnets, yokes, or the like having different polarities or the same polarity and may be made of materials having an attractive force or a repulsive force therebetween.

The first driving unit 1150 includes the driving magnet 1151, the driving coil 1152, the yoke unit (not illustrated), the Hall sensing unit 1153, and the first board unit 1154. The first driving unit 1150 may move, rotate, or tilt the mover 1130.

The driving magnet 1151 may include a plurality of magnets. In the embodiment, the driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. The third magnet 1151c may be positioned on a lower surface of the holder 1131, that is, the third holder outer surface. A detailed description thereof will be made below.

The driving coil 1152 may include a plurality of coils. In the embodiment, the driving coil 1152 may include a first coil 1152a, a second coil 1152b, and a third coil 1152c.

The first coil 1152a may be positioned to correspond to the first magnet 1151a. In other words, the first coil 1152a may be disposed to face the first magnet 1151a. Therefore, as described above, the first coil 1152a may be positioned in the first housing hole 1121a of the first housing side portion 1121.

In addition, the second coil 1152b may be positioned to correspond to the second magnet 1151b. In other words, the second coil 1152b may be disposed to face the second magnet 1151b. Therefore, as described above, the second coil 1152b may be positioned in the second housing hole 1122a of the second housing side portion 1122.

In addition, the first coil 1152a may be positioned to face the second coil 1152b. In other words, the first coil 1152a may be symmetrically disposed with the second coil 1152b with respect to the first direction (X-axis direction). This may also be applied to the first magnet 1151a and the second magnet 1151b in the same manner. In other words, the first magnet 1151a and the second magnet 1151b may be symmetrically disposed with respect to the first direction (X-axis direction). In addition, the first coil 1152a, the second coil 1152b, the first magnet 1151a, and the second magnet 1151b may be disposed to at least partially overlap in the second direction (Y-axis direction). With this configuration, the X-axis tilting may be accurately performed without bias to one side by the electromagnetic force between the first coil 1152a and the first magnet 1151a and the electromagnetic force between the second coil 1152b and the second magnet 1151b.

The third coil 1152c may be positioned to correspond to the third magnet 1151c. For example, the third coil 1152c may be positioned in the third housing hole 1123a of the third housing side portion 1123. In addition, the third housing hole 1123a may have a different area from the first housing hole and the second housing hole. Therefore, it is possible to easily perform the Y-axis tilting through the third coil 1152c.

In addition, the third coil 1152c may be positioned at a bisecting point between the first coil 1152a and the second coil 1152b. With this configuration, the Y-axis tilting may be performed by the electromagnetic force generated by a current flowing in the third coil 1152c in a balanced manner without tilting to one side.

The yoke unit (not illustrated) may be positioned between the driving magnet 1151 and the holder 1131. The yoke unit (not illustrated) is positioned on the first holder outer surface and the second holder outer surface of the holder 1131 so that the driving magnet is easily coupled to the holder 1131. For example, the yoke unit (not illustrated) may be disposed in the seating groove positioned in the outer surface of the holder and may have an attractive force with the driving magnet 1151. In other words, the yoke unit (not illustrated) may increase a coupling strength between the driving magnet 1151 and the holder 1131.

The Hall sensing unit 1153 may include a plurality of Hall sensors. In the embodiment, the Hall sensing unit 1153 may include a first Hall sensor 1153a and a second Hall sensor 1153b. The first Hall sensor 1153a may be positioned inside or outside the first coil 1152a or the second coil 1152b. The first Hall sensor 1153a may detect a change in a magnetic flux inside the first coil 1152a or the second coil 1152b. Therefore, the first Hall sensor 1153a may perform the position sensing of the first and second magnets 1151a and 1151b. In addition, the second Hall sensor 1153b may be positioned inside or outside the third coil 1152c. The second Hall sensor 1153b may perform the position sensing of the third coil 1152c. Therefore, the first camera actuator according to the embodiment may control the X-axis or Y-axis tilting. The Hall sensing unit may be formed of a plurality of sensors.

The first board unit 1154 may be positioned under the first driving unit 1150. The first board unit 1154 may be electrically connected to the driving coil 1152 and the Hall sensing unit 1153. For example, a current may be applied to the driving coil 1152 through the first board unit 1154, and thus the mover 1130 may be tilted with respect to the X-axis or the Y-axis. For example, the first board unit 1154 may be coupled to the driving coil 1152 and the Hall sensing unit 1153 by a surface mount technology (SMT). However, the present invention is not limited to this method.

The first board unit 1154 may be positioned between the shield can 1110 and the first housing 1120 and coupled to the shield can and the first housing 1120. The coupling method may be variously performed as described above. In addition, through the coupling, the driving coil 1152 and the Hall sensing unit 1153 may be positioned in an outer surface of the first housing 1120.

The first board unit 1154 may include a circuit board having wiring patterns that may be electrically connected, such as a rigid printed circuit board (rigid PCB), a flexible PCB, and a rigid-flexible PCB. However, the present invention is not limited to these types.

Figure 6:
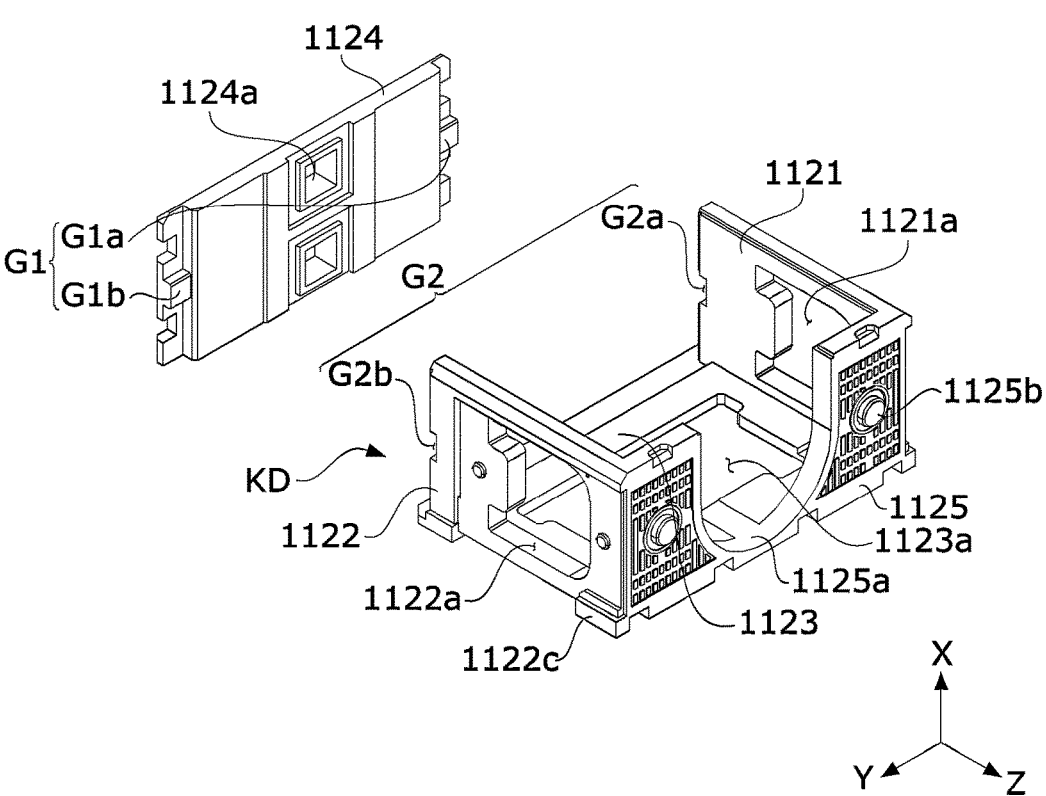
FIG. 6 is a perspective view of a first housing of the first camera actuator according to the embodiment.

FIG. 6 is a perspective view of a first housing of the first camera actuator according to the embodiment.

Referring to FIG. 6, the first housing 1120 may include the first housing side portion 1121, the second housing side portion 1122, the third housing side portion 1123, and the fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower surface of the first housing 1120.

In addition, the first housing side portion 1121 may include the first housing hole 1121a. The first coil 1152a to be described below may be positioned in the first housing hole 1121a.

In addition, the second housing side portion 1122 may include the second housing hole 1122*a*. In addition, the second coil 1152*b* to be described below may be positioned in the second housing hole 1122*a*.

Furthermore, the second housing side portion 1122 or the first housing side portion 1121 may include a control element groove 1121*b*. In the embodiment, the second housing side portion 1122 may include the control element groove 1121*b*. In addition, a driver, a control element, a processor, and the like electrically connected to the board may be positioned in the control element groove 1121*b*.

The first coil 1152*a* and the second coil 1152*b* may be coupled to the first board unit 1154. In the embodiment, the first coil 1152*a* and the second coil 1152*b* may be electrically connected to the first board unit 1154 so that a current may flow therebetween. The current is an element of an electromagnetic force capable of tilting the first camera actuator with respect to the X-axis.

In addition, the third housing side portion 1123 may be disposed between the first housing side portion 1121 and the second housing side portion 1122. The third housing side portion 1123 may be a lower surface portion of the housing 1120. The third coil 1152*c* is positioned in the third housing hole 1123*a* of the third housing side portion 1123, and a current flowing in the third coil 1152*c* is an element of an electromagnetic force capable of tilting the first camera actuator with respect to the Y-axis.

The fourth housing side portion 1124 may include the housing groove 1124*a*. The above-described second magnetic part may be seated in the housing groove 1124*a*. Therefore, the first housing 1120 may be coupled to the tilting guide unit and the holder by a magnetic force, etc.

In addition, the fourth housing side portion 1124 may include second protrusion grooves PH2 disposed to be spaced apart from each other and symmetrical to each other based on the housing groove 1124*a*. A plurality of second protrusion grooves PH2 may be formed, and the second protruding portion of the tilting guide unit may be seated thereon. In the specification, a description will be made based on the fact that a plurality of first protrusion grooves PH1 overlap in the first direction (X-axis direction), and a plurality of second protrusion grooves overlap in the second direction (Y-axis direction). However, when positions of the first protruding portion and the second protruding portion are changed, positions of the first protrusion groove and the second protrusion groove may also be changed to correspond to the positions of the first protruding portion and the second protruding portion.

The fourth housing side portion 1124 and a fifth housing side portion 1125 may be disposed to face each other and disposed between the first housing side portion 1121 and the second housing side portion 1122.

In addition, the first housing side portion 1121 and the second housing side portion 1122 may include a protrusion accommodating groove G2 formed in side surfaces thereof to be concave inward or in the third direction. The protrusion accommodating groove G2 includes a first protrusion accommodating groove G2*a* and a second protrusion accommodating groove G2*b*, and the following description will be made based on this. First, the first housing side portion 1121 may include the first protrusion accommodating groove G2*a* formed in the side surface thereof inward.

The first protrusion accommodating groove G2*a* may be disposed in a surface of the first housing side portion 1121, which is in contact with the fourth housing side portion 1124. The first protrusion accommodating groove G2*a* may be positioned to correspond to a first accommodation protrusion G1*a* of the fourth housing side portion 1124, which will be described below.

In addition, the second housing side portion 1122 may include the second protrusion accommodating groove G2*b* formed in the side surface thereof inward. The second protrusion accommodating groove G2*b* may be disposed in a surface of the second housing side portion 1122, which is in contact with the fourth housing side portion 1124. The second protrusion accommodating groove G2*b* may be positioned to correspond to a second accommodation protrusion G1*b* of the fourth housing side portion 1124.

In addition, the fourth housing side portion 1124 may include an accommodation protruding portion G1 on an inner surface thereof. The accommodation protruding portion G1 may include the first accommodation protrusion G1*a* and the second accommodation protrusion G1*b*.

The first accommodation protrusion G1*a* may be positioned on a surface in which the first housing extending portion 1124*b* and the first housing side portion 1121 are in contact with each other. In addition, the second accommodation protrusion G1*b* may be positioned on a surface in which a second housing extending part 1124*c* and the second housing side portion 1122 are in contact with each other.

The first accommodation protrusion G1*a* and the second accommodation protrusion G1*b* may be disposed parallel to each other in the second direction (Y-axis direction). In other words, the first accommodation protrusion G1*a* and the second accommodation protrusion G1*b* may overlap each other in the second direction (Y-axis direction).

As described above, the first accommodation protrusion G1*a* may be positioned to correspond to the first protrusion accommodating groove G2*a*. In addition, as described above, the second accommodation protrusion G1*b* may be positioned to correspond to the second protrusion accommodating groove G2*b*. With this configuration, the fourth housing side portion 1124 may be integrally or separately coupled to the first housing side portion 1121 and the second housing side portion 1122.

In addition, the fifth housing side portion 1125 may be disposed to face the fourth housing side portion 1124. The fifth housing side portion 1125 may include an opening 1125*a*. Therefore, the light passing through or reflected from the optical member may move through the opening 1125*a*.

In addition, the fifth housing side portion 1125 may include a housing protrusion 1125*b*. The housing protrusion 1125*b* may protrude outward. The housing 1120 may be coupled to the first camera actuator disposed externally through the housing protrusion 1125*b*. Therefore, it is possible to improve the reliability of the camera module.

In addition, the fifth housing side portion 1125 may include a pattern part (not illustrated) having a pattern with the housing protrusion 1125*b* around the housing protrusion 1125*b*. The pattern part (not illustrated) may be positioned to be stepped inward from the housing protrusion 1125*b*. In other words, the pattern part (not illustrated) may be positioned inward from the housing protrusion 1125*b*.

A bonding member may be applied to the pattern part (not illustrated). Therefore, the bonding member may cause an increase in a contact area with the fifth housing side portion 1125 on the pattern part (not illustrated). Therefore, it is possible to increase the coupling strength between the second actuator (or the housing 1120) and the first actuator.

In addition, the housing 1120 may include the accommodating part 1126 formed therein by the first to fifth housing side portions 1121 to 1125. The mover 1130 and the rotating unit 1140 may be positioned in the accommodating part 1126. The mover 1130 may be positioned in the accommodating part 1125.

Figure 7:
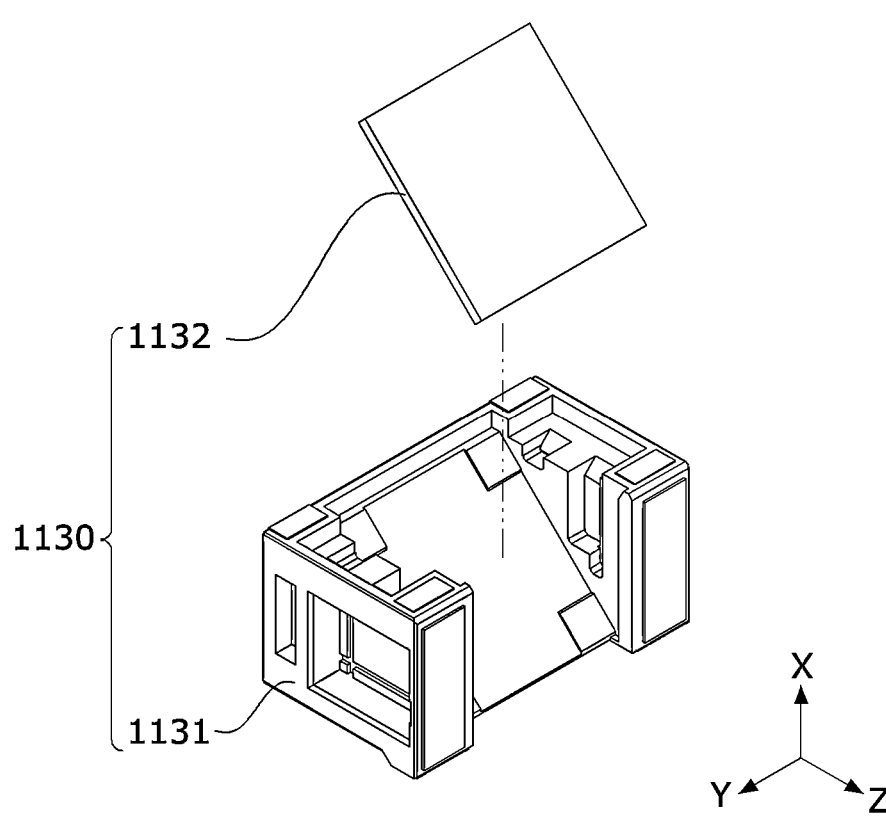
FIG. 7 is a perspective view of a holder and an optical member of the first camera actuator according to the embodiment.

FIG. 7 is a perspective view of a holder and an optical member of the first camera actuator according to the embodiment.

The optical member 1132 may be seated on the holder. The optical member 1132 may be a right angle prism as a reflector, but is not limited thereto.

In the embodiment, the optical member 1132 may have a protruding portion (not illustrated) formed on a portion of an outer surface thereof. The optical member 1132 may be easily coupled to the holder through the protruding portion (not illustrated). In addition, the holder may be coupled to the optical member 1132 with a groove or a protrusion.

In addition, a lower surface 1132*b* of the optical member 1132 may be seated on the seating surface of the holder. Therefore, the lower surface 1132*b* of the optical member 1132 may correspond to the seating surface of the holder. In the embodiment, the lower surface 1132*b* may be formed of an inclined surface in the same manner as the seating surface of the holder. Therefore, it is possible to prevent the optical member 1132 from being separated from the holder at the same time as the prism moves according to the movement of the holder.

In addition, the groove or the protrusion is formed on the lower surface 1132*b* of the optical member 1132, and the bonding member is applied thereto, and thus the optical member 1132 may be coupled to the holder. Alternatively, the holder may be coupled to the optical member 1132 by applying the bonding member to the groove or protrusion of the holder.

In addition, as described above, the optical member 1132 may have a structure capable of reflecting the light reflected from the outside (e.g., an object) into the camera module. As in the embodiment, the optical member 1132 may be formed of a single mirror. In addition, the optical member 1132 can resolve the spatial limits of the first camera actuator and the second camera actuator by changing the path of the reflected light. Therefore, it should be understood that the camera module may provide a high range of magnification by extending the optical path while minimizing a thickness thereof. In addition, it should be understood that the camera module including the camera actuator according to the embodiment may provide a high range of magnification by extending the optical path while minimizing the thickness thereof.

Figure 8:
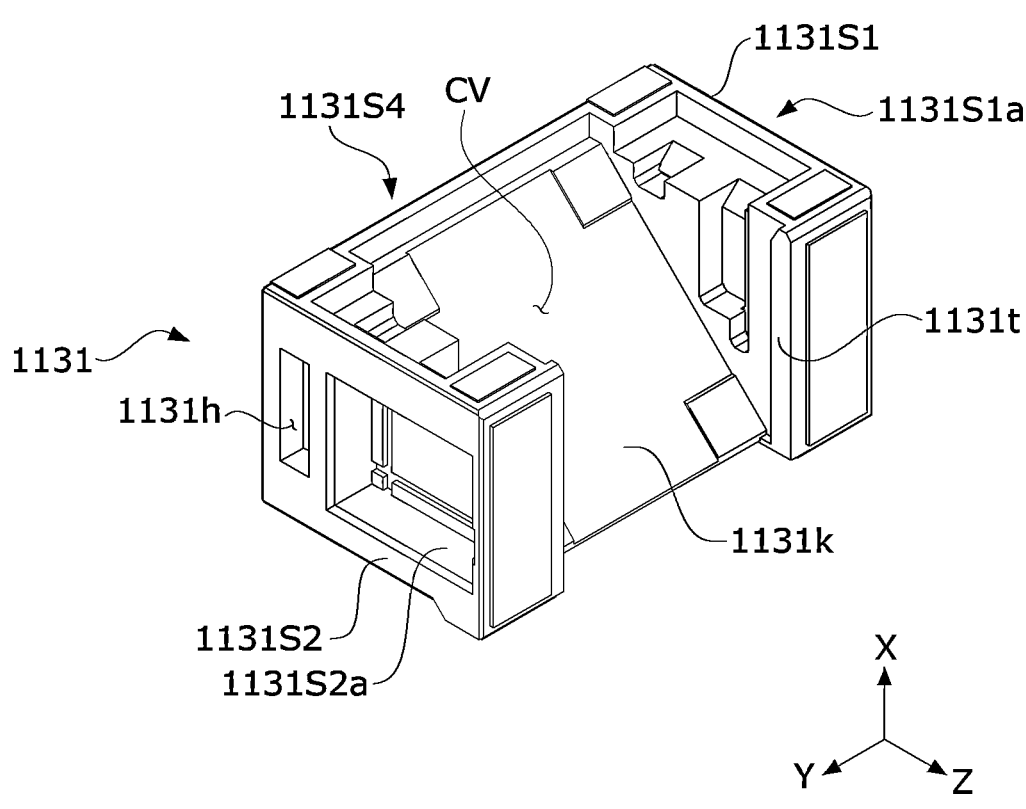
FIG. 8 is a perspective view of the holder according to the embodiment.
Figure 9:
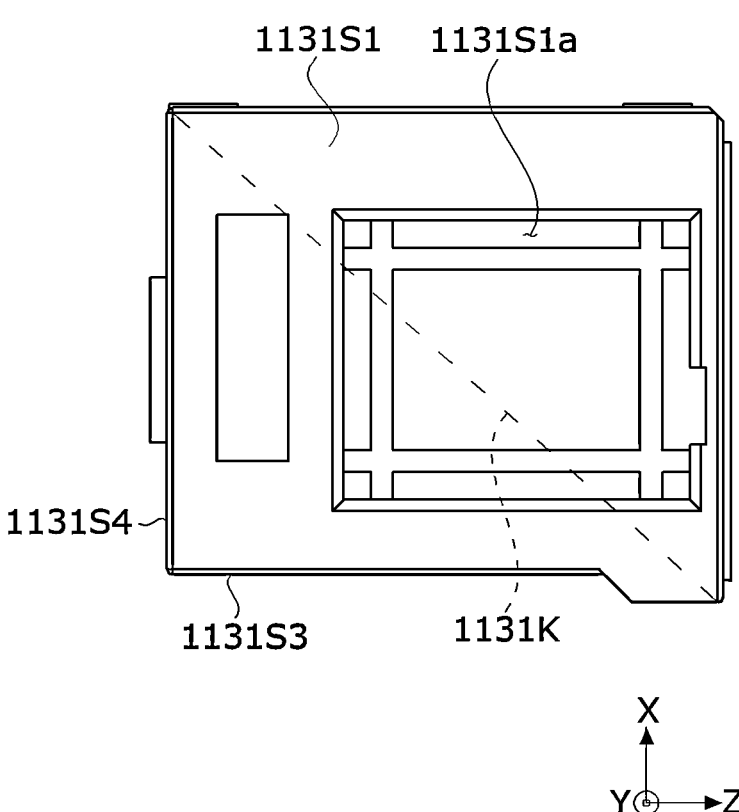
FIGS. 9 and 10 are one side views of the holder according to the embodiment.
Figure 10:
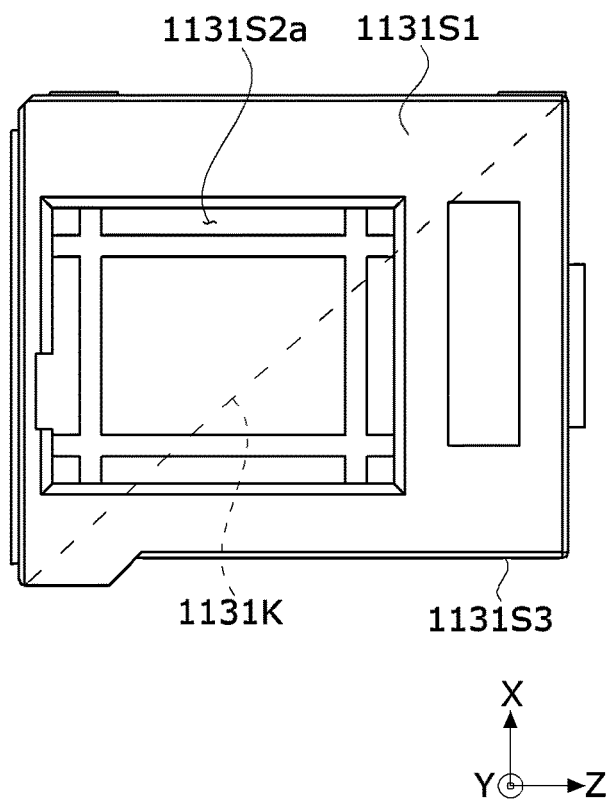
Figure 11:
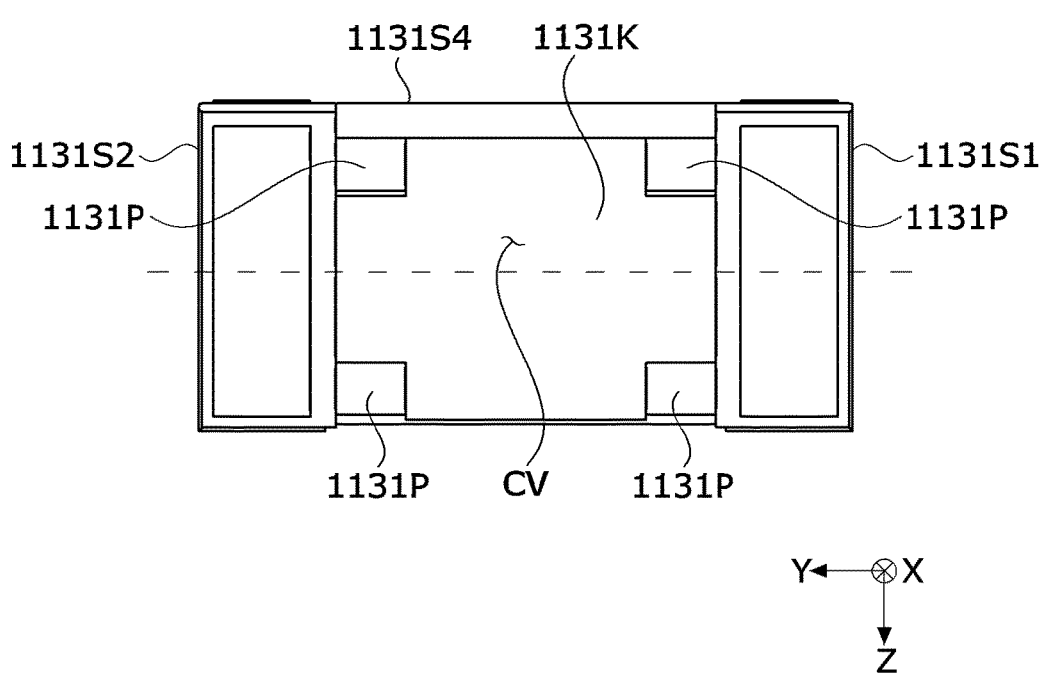
FIG. 11 is a top view of the holder according to the embodiment.
Figure 12:
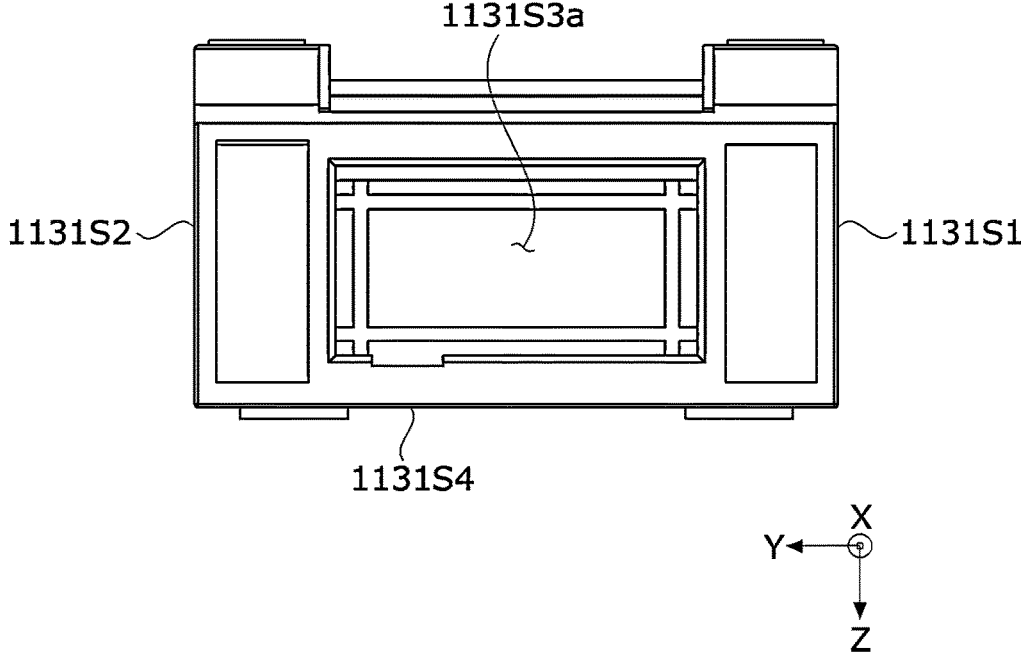
FIG. 12 is a bottom view of the holder according to the embodiment.

FIG. 8 is a perspective view of the holder according to the embodiment, FIGS. 9 and 10 are one-side views of the holder according to the embodiment, FIG. 11 is a top view of the holder according to the embodiment, and FIG. 12 is a bottom view of the holder according to the embodiment.

Referring to FIGS. 8 to 12, the holder 1131 according to the embodiment may include a seating surface 1131*k* on which the optical member is seated. The seating surface 1131*k* may be an inclined surface. In addition, the holder 1131 may include a stepped portion (not illustrated) disposed above or under the seating surface 1131*k*. The stepped portion (not illustrated) of the holder 1131 can prevent the movement of the optical member 1132, thereby increasing the coupling strength between the optical member 1132 and the holder 1131. Furthermore, a plurality of protrusions or grooves may be disposed on the seating surface 1131*k*. The bonding member may be applied to the protrusions or the grooves. Therefore, the optical member may be easily coupled to the seating surface 1131*k*.

In the embodiment, the seating surface 1131*k* may include a seating protrusion 1131*p* protruding upward or toward the optical member. For example, the seating protrusions 1131*p* may be disposed at corners of the seating surface 1131*k*. In addition, the bonding member may be disposed on the seating protrusion 1131*p*. Therefore, the seating protrusion 1131*p* of the seating surface 1131*k* and the optical member may be coupled by the bonding member.

In addition, the holder 1131 may include a holder stopper extending upward from the upper surface thereof. The holder stopper may be operated as a stopper with respect to the tilting in the first direction (X-axis direction) or the second direction (Y-axis direction).

In addition, the holder 1131 according to the embodiment may include a cavity CV. The cavity CV may be positioned between a first holder outer surface 113151 and a second holder outer surface 113152, which will be described below. In addition, the optical member may be seated in the cavity CV.

The holder 1131 may include a holder groove 1131*h* at least partially passing through or extending from the holder 1131 in the second direction (Y-axis direction). The holder groove 1131*h* may be symmetrical to the control element hole in the second direction (Y-axis direction) to increase heat-dissipation efficiency for heat generated from the control element. Furthermore, by decreasing a weight of the holder 1131 by the holder groove 1131*h*, it is possible to increase the driving efficiency for the X-axis or Y-axis tilting of the mover. As illustrated, the holder groove 1131*h* may be a groove, but may be a hole in a modified example.

In addition, the holder 1131 may include a plurality of outer surfaces. For example, the holder 1131 may include the first holder outer surface 113151, the second holder outer surface 1131S2, a third holder outer surface 1131S3, and a fourth holder outer surface 1131S4.

The first holder outer surface 1131S1 may be positioned to face the second holder outer surface 1131S2. In other words, the first holder outer surface 1131S1 may be symmetrically disposed with the second holder outer surface 1131S2 with respect to the first direction (X-axis direction).

The first holder outer surface 113151 may be positioned to face the first housing side portion 1121. In addition, the second holder outer surface 113152 may be positioned to face the second housing side portion 1122.

In addition, the first holder outer surface 113151 may include a first seating groove 1131S1*a*. In addition, the second holder outer surface 113152 may include a second seating groove 1131S2*a*. The first seating groove 1131S1*a* and the second seating groove 1131S2*a* may be symmetrically disposed with respect to the first direction (X-axis direction).

In addition, the first magnet may be disposed in the first seating groove 1131S1*a*, and the second magnet may be disposed in the second seating groove 1131S2*a*. The first magnet and the second magnet may also be symmetrically disposed with respect to the first direction (X-axis direction) in correspondence to the positions of the first seating groove 1131S1*a* and the second seating groove 1131S2*a*.

As described above, due to the positions of the first and second seating grooves and the first and second magnets, an electromagnetic force generated by the magnets may be coaxially provided to the first holder outer surface S1131S1 and the second holder outer surface 1131S2. For example, an area (e.g., a portion having the strongest electromagnetic force) applied on the first holder outer surface S1131S1 and an area (e.g., a portion having the strongest electromagnetic force) applied on the second holder outer surface S1131S2 may be positioned on an axis parallel to the second direction (Y-axis direction). Therefore, the X-axis tilting may be accurately performed.

The third holder outer surface 1131S3 may be in contact with the first holder outer surface 1131S1 and the second holder outer surface 1131S2 and may be an outer surface extending from the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2.

The third holder outer surface 1131S3 may be the lower surface of the holder 1131. The third holder outer surface 1131S3 may be positioned to face the third housing side portion.

In addition, the third holder outer surface 1131S3 may include an extending stopper (not illustrated) extending downward. Therefore, it is possible to set a limit of a range in which the holder 1131 performs the Y-axis tilting, moves in the first direction (X-axis direction), or vertically moves in the housing and at the same time, prevent damage or the like caused by the movement of the holder 1131.

In addition, the third holder outer surface 1131S3 may include a third seating groove 1131S3a. The third magnet may be positioned in the third seating groove 1131S3a. For example, an area of the third seating groove 1131S3a may be different from areas of the first seating groove 1131S1a or the second seating groove 1131i1b. The area of the third seating groove 1131S3a may be larger than the areas the first seating groove 1131S1a or the second seating groove 1131i1b. Therefore, the rotation in the first direction (X-axis direction) or the tilting in the second direction (Y-axis direction) may be easily performed through the third magnet disposed in the third seating groove 1131S3a.

The fourth holder outer surface 1131S4 may be in contact with the first holder outer surface 1131S1 and the second holder outer surface 1131S2 and may be an outer surface extending from the third holder outer surface 1131S3 in the first direction (X-axis direction). In addition, the fourth holder outer surface 1131S4 may be positioned between the first holder outer surface 1131S1 and the second holder outer surface 1131S2. The fourth holder outer surface 1131S4 may be disposed on the third holder outer surface 1131S3. Furthermore, the fourth holder outer surface 1131S4 may be adjacent to the tilting guide unit.

The fourth holder outer surface 1131S4 may include a fourth seating groove 1131S4a. The first magnetic part may be seated in the fourth seating groove 1131S4a. The fourth seating groove 1131S4a may be positioned to face a first surface of the tilting guide unit.

The fourth holder outer surface 1131S4 may include the first protrusion grooves PH1 disposed to be spaced apart each other in the first direction (X-axis direction) based on the fourth seating groove 1131S4a. The first protruding portion of the tilting guide unit may be seated in the first protrusion groove PH1. The holder 1131 may be tilted with respect to the X-axis based on the first protruding portion. Furthermore, the holder 1131 may be tilted with respect to the Y-axis based on the second protruding portion.

As described above, the plurality of first protrusion grooves PH1 may be formed and may overlap each other in the first direction (X-axis direction). Therefore, when the mover is tilted with respect to the X-axis or rotated in the second direction (Y-axis direction), the mover may be moved accurately without bias to one side. In the embodiment, the OIS function may be performed accurately.

Furthermore, in the embodiment, a lower surface of the cavity CV may correspond to the seating surface 1131k. In other words, the cavity may be surrounded by the first holder outer surface 1131S1, the second holder outer surface 1131S2, the fourth holder outer surface 1131S4, and the seating surface 1131k. Therefore, the optical member may be surrounded by the first holder outer surface 1131S1, the second holder outer surface 1131S2, the third holder outer surface 1131S3, and the fourth holder outer surface 1131S4.

Figure 13:
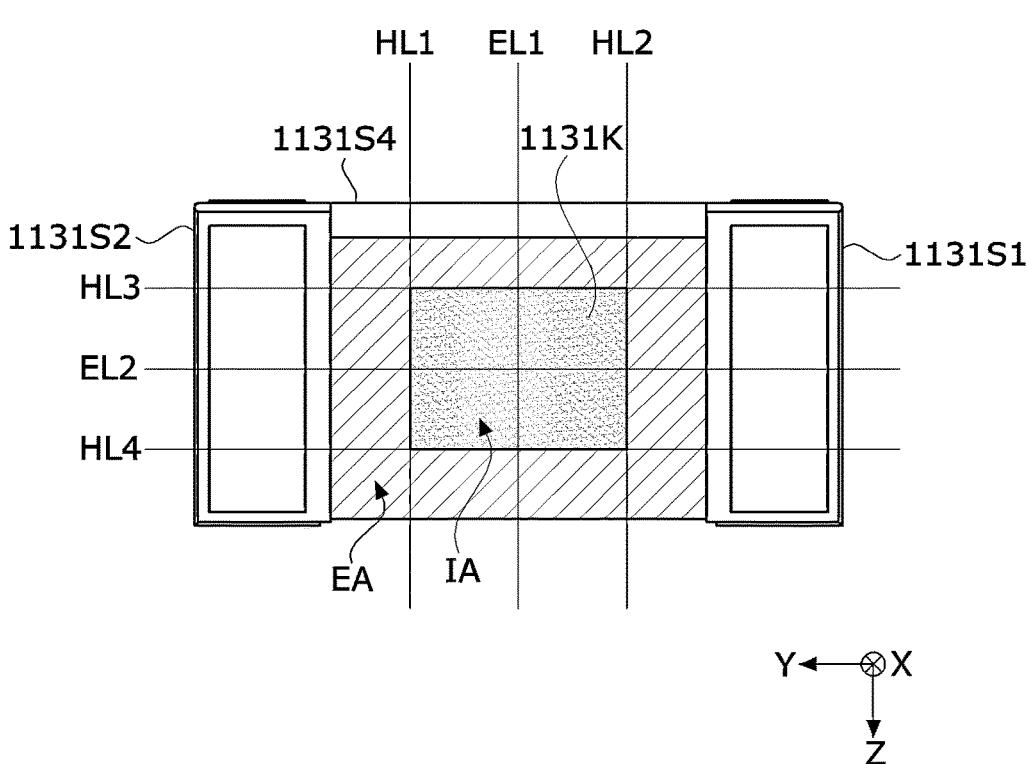
FIG. 13 is a view illustrating a seating surface of the holder according to the embodiment.
Figure 14:
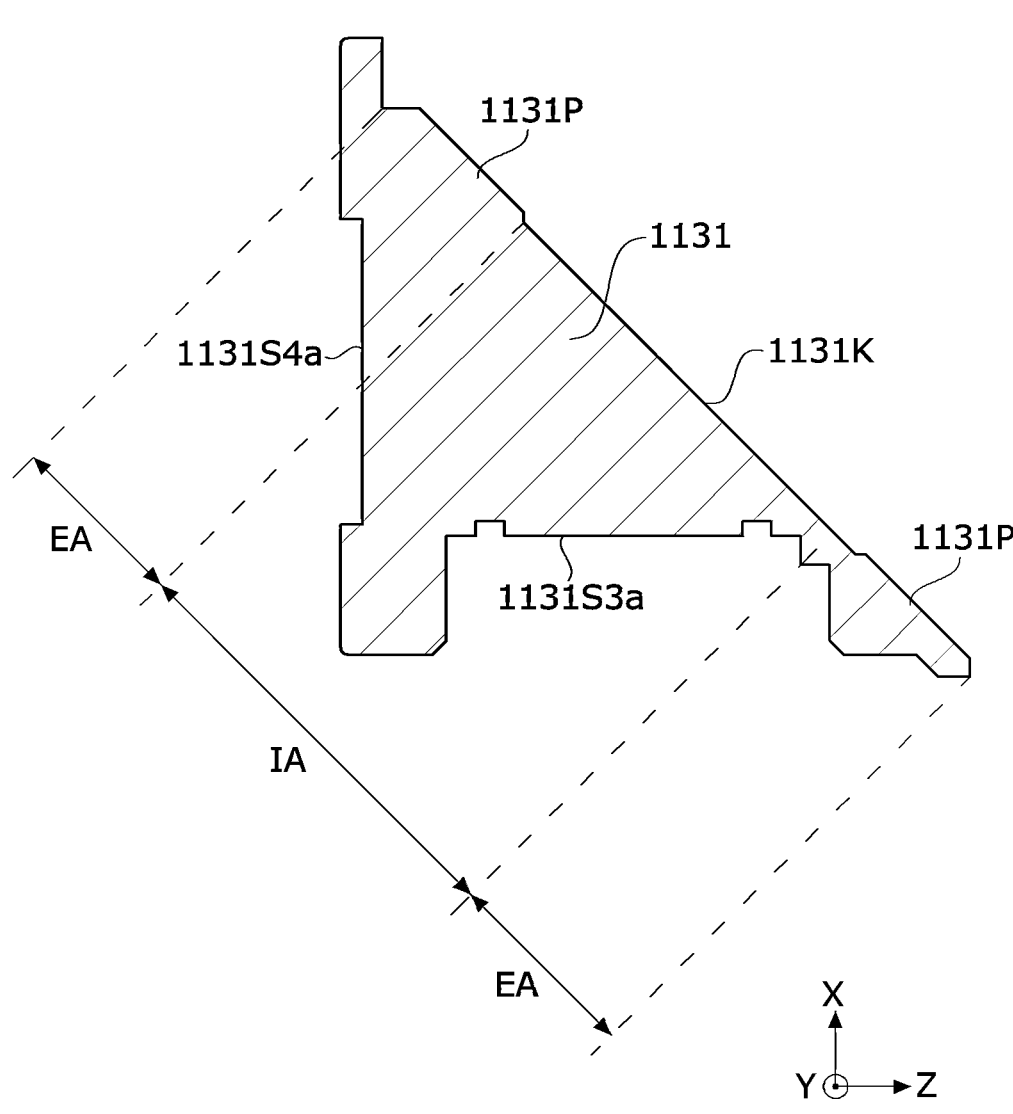
FIG. 14 is a cross-sectional view taken in FIG. 13.
Figure 15:
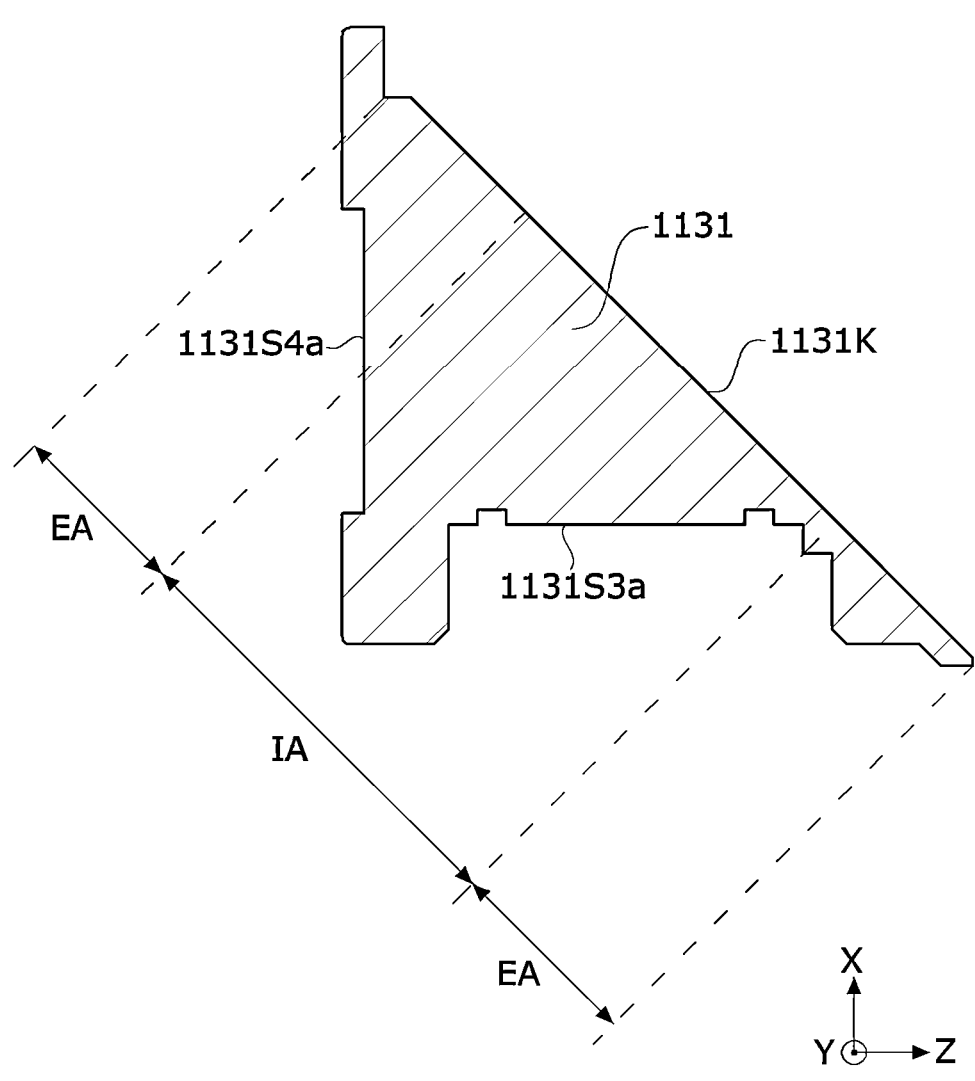
FIG. 15 is a cross-sectional view taken in FIG. 13.
Figure 16:
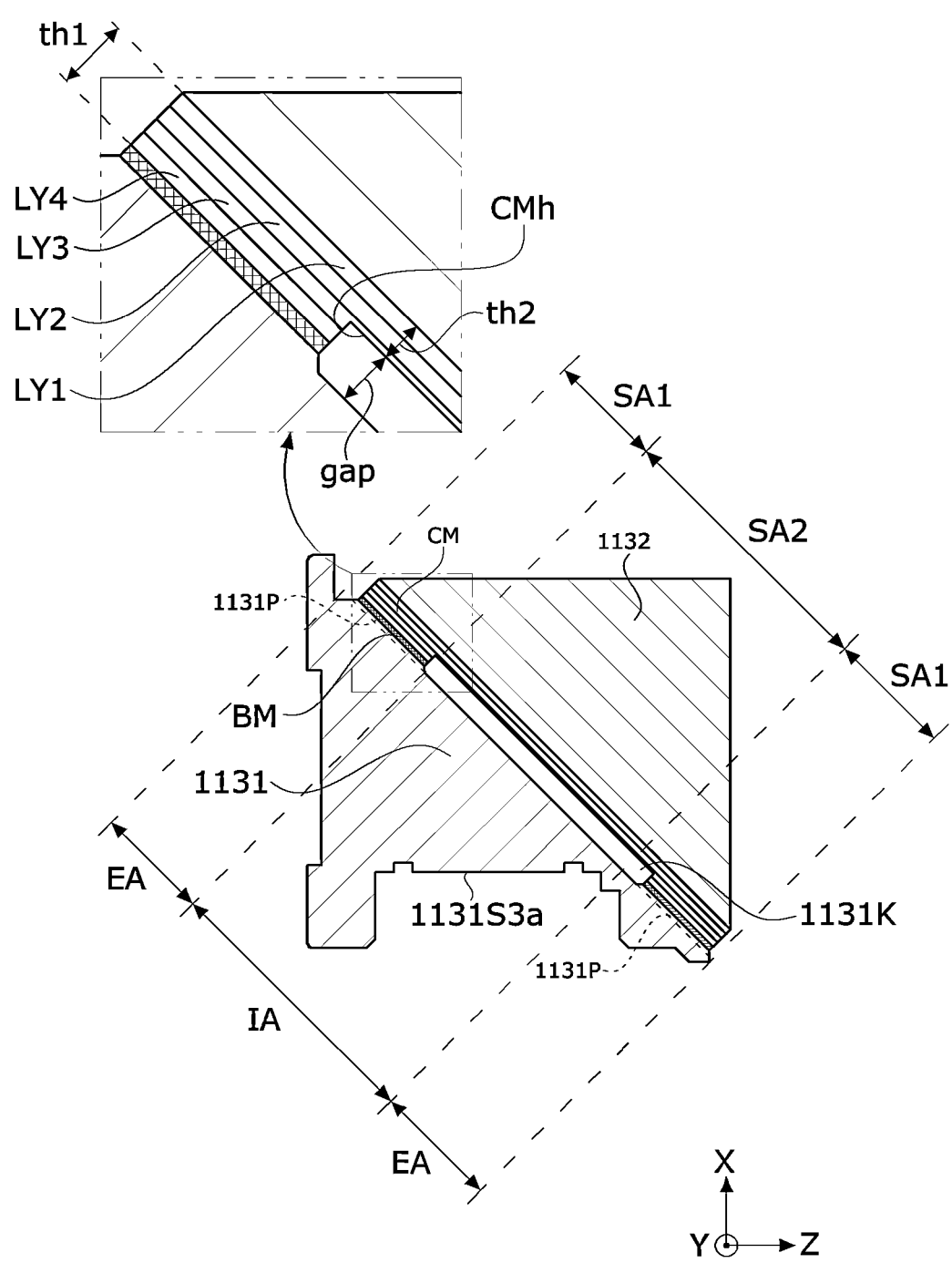
FIG. 16 is a view for describing coupling between the holder and the optical member according to the embodiment.

FIG. 13 is a view illustrating a seating surface of the holder according to the embodiment, FIG. 14 is a cross-sectional view taken in FIG. 13, FIG. 15 is a cross-sectional view taken in FIG. 13, and FIG. 16 is a view for describing coupling between the holder and the optical member according to the embodiment.

Referring to FIGS. 13 to 16, a bonding member BM according to the embodiment may be disposed between the seating surface 1131k of the holder 1131 and the optical member 1132 as described above. Therefore, the bonding member BM may couple the holder 1131 to the optical member 1132.

In addition, the optical member 1132 according to the embodiment may include a reflective surface, an incident surface, and a transmission surface. The incident surface and the transmission surface may be the same surface or different surfaces. The reflective surface may be a surface facing the seating surface 1131k.

In addition, the optical member 1132 according to the embodiment may further include a coating layer CM disposed on the reflective surface. Alternatively, the coating layer may be disposed on the reflective surface of the optical member 1132. The following description will be made based on the optical member 1132 including the coating layer CM disposed on the reflective surface. The coating layer CM may be made of various reflective materials. In addition, the coating layer CM may be formed of a plurality of layers. The coating layer CM may be positioned on a surface in contact with the reflective surface or seating surface of the optical member 1132. Therefore, the coating layer CM may be disposed between the optical member 1132 and the seating surface.

The coating layer CM may include a first layer LY1 having the largest separation distance from the bonding member, and a second layer LY2, a third layer LY3, and a fourth layer LY4 of which separation distances sequentially decrease. For example, each of the layers LY1 to LY4 of the coating layer CM may be made of a $SiO_x$ or $TiO_y$ material (here, x and y are larger than zero). With this configuration, the optical member 1132 may change the path of light entering through the coating layer CM. As described above, for example, the coating layer CM may change the incident light and reflect the light in the vertical direction.

In addition, the coating layer CM may include a first area SA1 in contact with the bonding member BM and a second area SA2 that is an area other than the first area SAL. In addition, the optical member 1132 may include the first area SA1 in contact with the bonding member BM and the second area SA2 that is an area other than the first area SAL. For example, the first layer LY1 and the second layer LY2 may be formed in both the first area SA1 and the second area SA2. In addition, the third layer LY3 and the fourth layer LY4 may be disposed in only the first area SAL.

In this case, a thickness th1 of the coating layer CM in the first area SA1 may be larger than a thickness th2 of the coating layer CM in the second area SA2. In addition, due to the above-described thickness difference, a coating groove CMh may be formed in a surface of the coating layer CM, which faces the seating surface 1131$k$. The coating groove CMh may correspond to a shape of the second area SA2, the seating protrusion 1131$p$, or an external area EA. In other words, at least a portion of the coating groove CMh may be positioned to be misaligned with the second area SA2, the seating protrusion 1131$p$, or the external area EA. With this configuration, it is possible to compensate the warpage of the optical member 1132 even when the tensile force acting on the first area SA1 of the optical member 1132 increases as the bonding member BM is reduced or shrunk by thermal curing, etc.

For example, in the first area SA1 in which the bonding member BM is positioned in the coating layer CM, the bonding member BM may have a volume decreased by thermal curing. The attractive force may act on the first area SA1 due to the decrease in the volume of the bonding member BM. Therefore, the distortion or warpage between the first area SA1 and the second area SA2 may occur in the optical member 1132. In contrast, the coating layer CM can suppress the occurrence of warpage through the thickness difference between the first area SA1, which is an area in contact with the bonding member BM, and the second area SA2, which is an area other than the first area SA1. Therefore, in the camera actuator according to the embodiment, it is possible to prevent an optical path error or degradation in resolution power due to warpage or distortion of the optical member 1132.

In addition, a portion of the bonding member BM may be positioned under the first area SA1, and the remaining portions may be positioned under the second area SA2. In addition, the bonding member BM may be in contact with any one of the second area SA2 of the coating layer CM or the seating surface 1131$k$. For example, the bonding member BM may be applied to the seating protrusion 1131$p$. Therefore, the bonding member BM may be positioned on the seating surface 1131$k$ and disposed to be spaced apart from the second area SA2. In other words, the bonding member BM may decrease the generation of the attractive force acting on the seating surface 1131$k$ and the optical member 1132 under the second area SA2. Therefore, it is possible to minimize the occurrence of warpage in an internal area IA in which light reflection occurs significantly compared to the edge area EA to be described below. With this configuration, the camera actuator according to the present invention can prevent the degradation in resolution power.

Furthermore, the seating surface 1131$k$ may correspond to the reflective surface of the optical member 1132. The reflective surface may be the lower surface of the optical member 1132. In addition, the reflective surface may be a surface of the optical member 1132, which faces the seating surface 1131$k$.

The seating surface 1131$k$ may include the edge area EA and the internal area IA disposed inside the edge area EA.

The seating surface 1131$k$ may be bisected by a first extension line (or surface) EL1. For example, the seating surface 1131$k$ may be partitioned into a left area/a right area on a plane by the first extension line EL1. In addition, the seating surface 1131$k$ may be bisected by a second extension line (or surface) EL2. The seating surface 1131$k$ may be partitioned into an upper area/a lower area on the plane by the second extension line EL2.

In addition, a first bisector line HL1 may bisect the left area in a left-right direction. In addition, a second bisector line HL2 may bisect the right area in the left-right direction. In addition, a third bisector line HL3 may bisect the upper area in a vertical direction. In addition, a fourth bisector line HL4 may bisect the lower area in the vertical direction.

In addition, the internal area IA may be a closed-loop area formed by the first bisector line HL1, the second bisector line HL2, the third bisector line HL3, and the fourth bisector line HL4. In addition, the edge area EA may be an outer area of the internal area IA.

In the embodiment, the seating protrusion 1131$p$ may be disposed on the seating surface 1131$k$. The seating protrusion 1131$p$ may protrude toward the optical member 1132. For example, the seating surface 1131$k$ may include the seating protrusion 1131$p$ disposed in the edge area EA.

Since the seating protrusion 1131$p$ is disposed in the edge area EA, the bonding member BM may be disposed on the edge area EA, thereby minimizing the occurrence of warpage of the optical member 1132 in the internal area IA. Therefore, it is possible to reduce warpage or bending of the internal area IA in which light reflection occurs significantly, thereby preventing degradation in resolution power.

In a modified example, the seating protrusion 1131$p$ may be disposed in the internal area IA. In addition, the bonding member BM may also be disposed on the seating protrusion 1131$p$. Therefore, the first area SA1 may be positioned inside the second area SA2. Therefore, the coating layer CM may also have a larger thickness inside the first area SA1 than outside the first area SAL.

In addition, the first area SA1 may be positioned on the edge area EA. In addition, the second area SA2 may be positioned on the internal area IA. Therefore, the first area SA1 may surround at least a portion of the second area SA2. In addition, the edge area EA may surround at least a portion of the internal area IA.

In addition, the coating layer CM may be disposed to be spaced apart from the seating surface 1131$k$ in the second area SA2. In other words, the coating layer CM may have a gap with the seating surface 1131$k$ in the second area SA2. With this configuration, warpage may not occur in the second area SA2 inside the optical member 1132.

In addition, at least a portion of the bonding member BM may be in contact with the first area SA1 of the coating layer CM. In addition, the bonding member BM may be disposed to be misaligned with the second area SA2 of the coating layer CM. In other words, the first area SA1 and the second area SA2 may not overlap each other in a direction toward the seating surface 1131$k$. In addition, as described above, the bonding member BM may be disposed on the seating protrusion 1131$p$ of the edge area EA. In addition, the bonding member BM may be in contact with the first area SA1 of the coating layer CM. In this case, in the coating layer CM, the number of multiple layers in the first area SA1 may be larger than the number of multiple layers in the second area SA2. For example, as described above, the first to fourth layers LY1 to LY4 may be positioned in the first area SAL. In addition, the first layer LY1 and the second layer LY2 may be positioned in the second area SA2. Therefore, the number (e.g., 4) of layers in the first area SA1 may be larger than the number (e.g., 2) of layers in the second area SA2. As described above, the first area SA1 may further include additional layers in addition to a common layer with the second area SA2. With this configuration, it is possible to suppress not only light reflection but also the occurrence of warpage caused by the bonding member BM. Furthermore, it is possible to easily secure the gap between the second area SA2 of the coating layer CM and the seating surface 1131$k$.

In addition, in the camera actuator according to the embodiment, when the thickness of the optical member 1132 decreases, the thickness of the coating layer CM in the first area SA1 may increase. With this configuration, it is possible to easily compensate an increase in warpage caused by the attractive force of the bonding member BM as the optical member 1132 has a smaller thickness.

Figure 17:
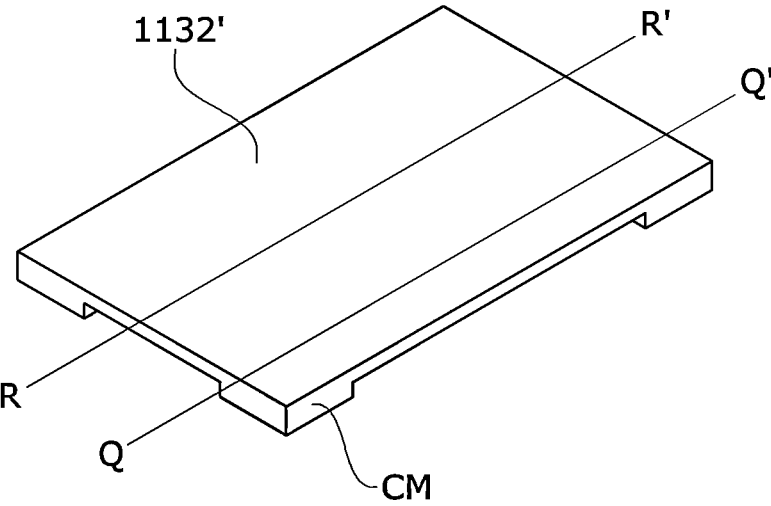
FIG. 17 is a perspective view of another example of the optical member according to the embodiment.
Figure 18A:
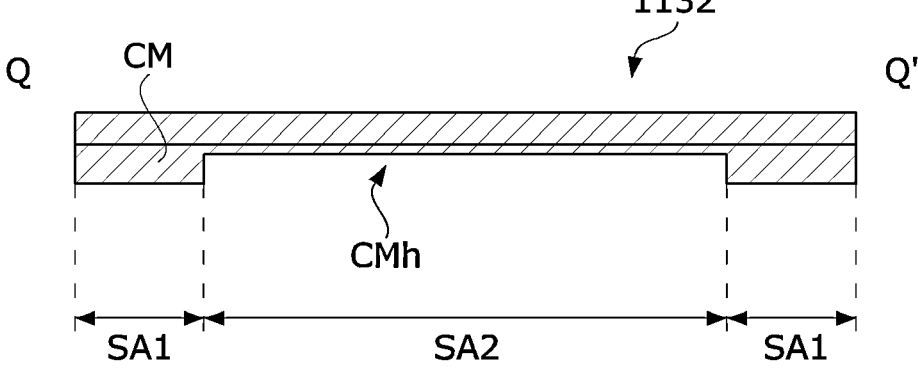
FIG. 18A is a cross-sectional view taken along line Q-Q' in FIG. 17.
Figure 18B:
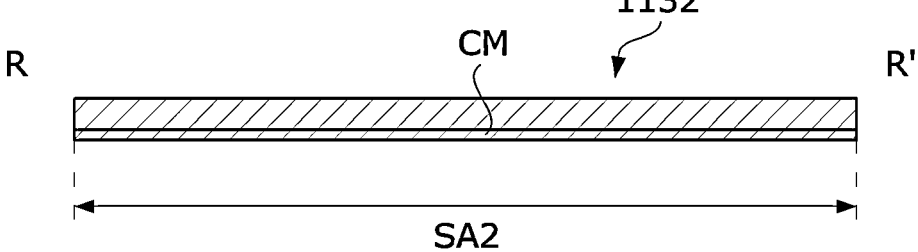
FIG. 18B is a cross-sectional view taken along line R-R' in FIG. 17.
Figure 18C:
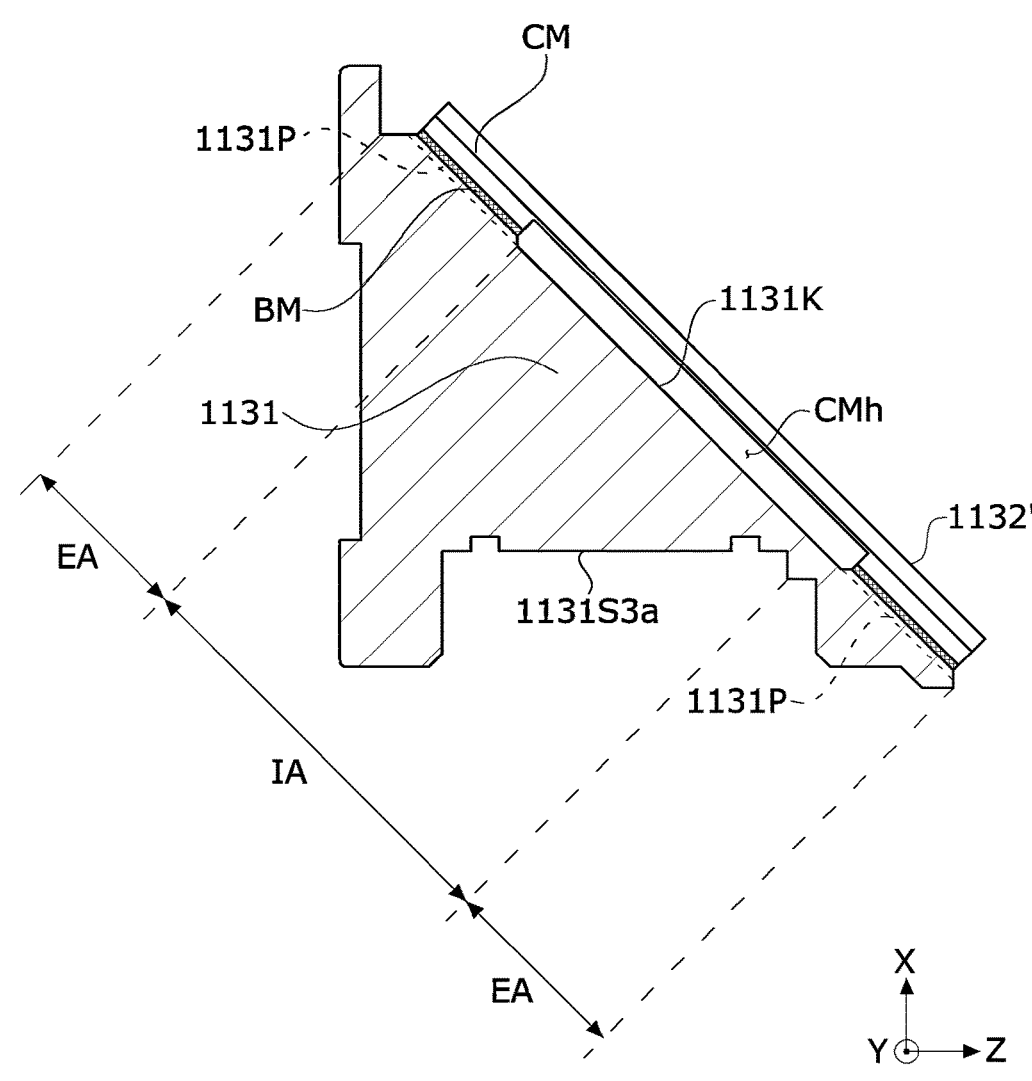
FIG. 18C is a view for describing coupling between the holder and the optical member according to the embodiment.

FIG. 17 is a perspective view of another example of the optical member according to the embodiment, FIG. 18A is a cross-sectional view taken along line Q-Q' in FIG. 17, FIG. 18B is a cross-sectional view taken along line R-R' in FIG. 17, and FIG. 18C is a view for describing coupling between the holder and the optical member according to the embodiment.

Referring to FIGS. 17 to 18C, as described above, the bonding member according to the embodiment may be disposed between the seating surface 1131$k$ of the holder 1131 and the optical member. Therefore, the bonding member may couple the holder 1131 to the optical member. Furthermore, the seating surface 1131$k$ may correspond to the reflective surface of the optical member. The reflective surface may be the lower surface of the optical member. In addition, the reflective surface may be a surface of the optical member, which faces the seating surface 1131$k$.

In addition, the optical member according to the embodiment may be a mirror. Therefore, the optical member may include a reflective surface, an incident surface, and a transmission surface. In addition, the reflective surface of the optical member may be a surface facing the seating surface 1131$k$.

In addition, the optical member according to the embodiment may further include the coating layer CM disposed on the reflective surface. The coating layer CM may be made of various reflective materials. In addition, the coating layer CM may be formed of a plurality of layers. With this configuration, the optical member may change the path of light entering through the coating layer CM. As described above, for example, the coating layer CM may change the incident light and reflect the light in the vertical direction.

In addition, the coating layer CM may include the first area SA1 in contact with the bonding member BM and the second area SA2 that is an area other than the first area SAL. In addition, the optical member may include the first area SA1 in contact with the bonding member BM and the second area SA2 that is an area other than the first area SAL. In this case, a thickness of the coating layer CM in the first area SA1 may be larger than a thickness t2 of the coating layer CM in the second area SA2. With this configuration, it is possible to compensate the warpage of the optical member 1132 even when the attractive force acting on the first area SA1 of the optical member increases as the bonding member is reduced or shrunk by thermal curing, etc.

In addition, as illustrated, when the optical member is a mirror, the thickness of the coating layer may increase compared to a case in which the optical member is a prism. In particular, the first area SA1 may have a larger thickness than the second area SA2. In addition, when the thickness of the optical member decreases, the optical member may be significantly affected by the attractive force caused by the bonding member. Therefore, in the camera actuator according to the embodiment, when the thickness of the optical member decreases, the thickness of the coating layer CM in the first area SA1 may increase. With this configuration, it is possible to easily compensate an increase in warpage caused by the attractive force of the bonding member as the optical member has a smaller thickness.

In addition, in the first area SA1 in which the bonding member is positioned in the coating layer CM, a volume of the bonding member may be decreased by thermal curing, and the decrease in volume of the bonding member may cause the attractive force acting on the first area SAL.

Therefore, the distortion or warpage between the first area SA1 and the second area SA2 may occur in the optical member. As described above, the coating layer CM can suppress the occurrence of warpage through the thickness difference between the first area SA1, which is an area in contact with the bonding member BM, and the second area SA2, which is an area other than the first area SA1. Therefore, in the camera actuator according to the embodiment, it is possible to prevent an optical path error or degradation in resolution power due to the warpage or distortion of the optical member.

In addition, a portion of the bonding member may be positioned under the first area SA1, and the remaining portions may be positioned under the second area SA2. In addition, the bonding member may be in contact with any one of the second area SA2 of the coating layer CM or the seating surface 1131$k$.

The seating surface 1131$k$ may include the edge area EA and the internal area IA disposed inside the edge area EA.

In the embodiment, the seating protrusion 1131$p$ may be disposed on the seating surface 1131$k$. The seating protrusion 1131$p$ may protrude toward the optical member. For example, the seating surface 1131$k$ may include the seating protrusion 1131$p$ disposed in the edge area EA.

Since the seating protrusion 1131$p$ is disposed in the edge area EA, the bonding member may be disposed on the edge area EA, thereby minimizing the occurrence of warpage of the optical member in the internal area IA. Therefore, it is possible to reduce the warpage or bending of the internal area IA in which light reflection occurs significantly, thereby preventing degradation in resolution power.

In addition, the first area SA1 may be positioned on the edge area EA. In addition, the second area SA2 may be positioned on the internal area IA. Therefore, the first area SA1 may surround at least a portion of the second area SA2. In addition, the edge area EA may surround at least a portion of the internal area IA. In addition, at least a portion of the bonding member may be in contact with the first area SA1 of the coating layer CM. In addition, the bonding member may be disposed to be misaligned with the second area SA2 of the coating layer CM.

In addition, the coating layer CM may be disposed to be spaced apart from the seating surface 1131$k$ in the second area SA2. In other words, the coating layer CM may have a gap with the seating surface 1131$k$ in the second area SA2. With this configuration, warpage may not occur in the second area SA2 inside the optical member.

In addition, as described above, in the coating layer CM, the number of multiple layers in the first area SA1 may be larger than the number of multiple layers in the second area SA2. With this configuration, it is possible to suppress not only light reflection but also the occurrence of warpage caused by the bonding member. Furthermore, it is possible to easily secure the gap between the second area SA2 of the coating layer CM and the seating surface 1131$k$.

Figure 19:
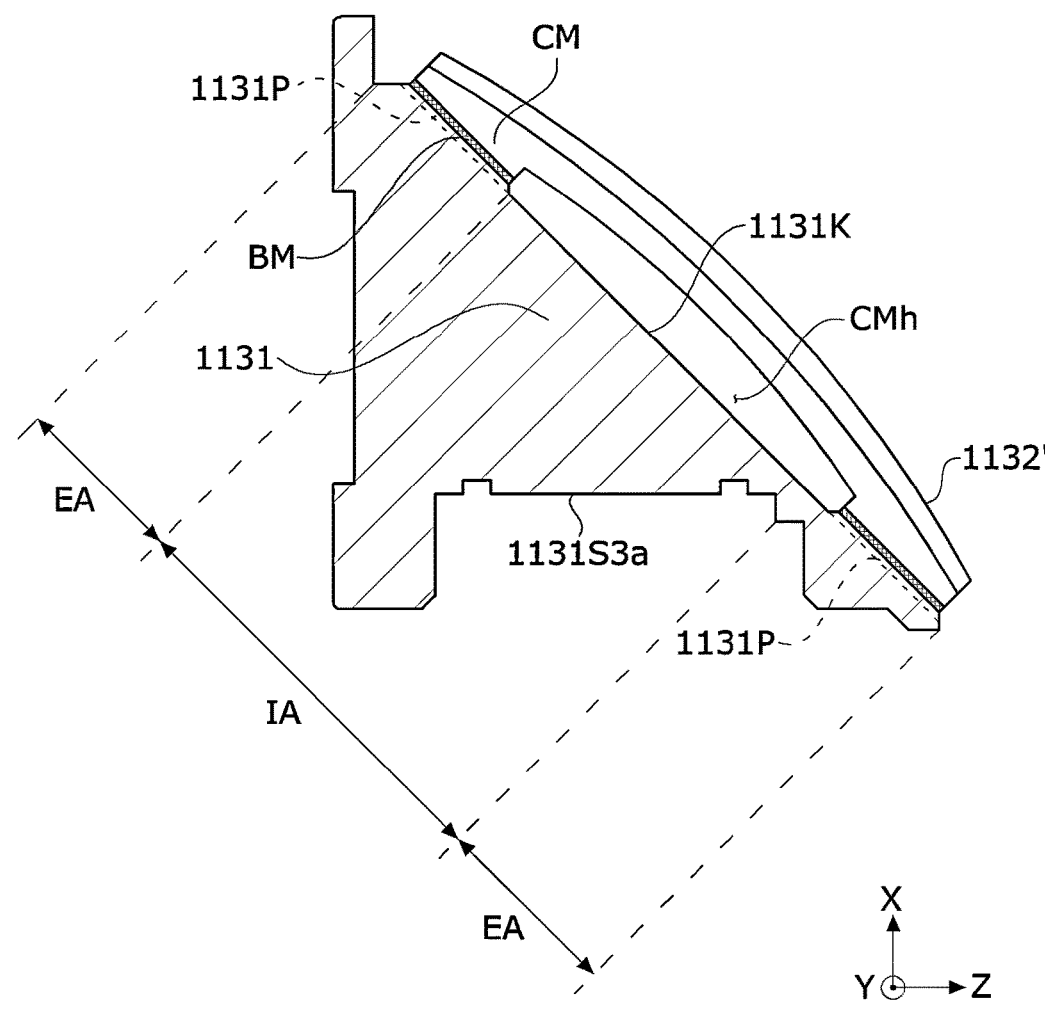
FIG. 19 is a view for describing coupling between a holder and an optical member according to a modified example.

FIG. 19 is a view for describing coupling between a holder and an optical member according to a modified example.

Referring to FIG. 19, as described above, the bonding member may be disposed between the seating surface 1131$k$ of the holder 1131 and the optical member. Therefore, the bonding member may couple the holder 1131 to the optical member. Furthermore, the seating surface 1131$k$ may correspond to the reflective surface of the optical member. The reflective surface may be the lower surface of the optical member. In addition, the reflective surface may be a surface of the optical member, which faces the seating surface 1131k.

In addition, the optical member may be a mirror. Therefore, the optical member may include the reflective surface, the incident surface, and the transmission surface. In addition, the reflective surface of the optical member may be a surface facing the seating surface 1131k.

In addition, the optical member may further include the coating layer CM disposed on the reflective surface. The coating layer CM may be made of various reflective materials. In addition, the coating layer CM may be formed of a plurality of layers. With this configuration, the optical member may change the path of light entering through the coating layer CM. As described above, for example, the coating layer CM may change the incident light and reflect the light in the vertical direction.

In addition, the coating layer CM may include the first area SA1 in contact with the bonding member BM and the second area SA2 that is an area other than the first area SAL. In addition, the optical member may include the first area SA1 in contact with the bonding member BM and the second area SA2 that is an area other than the first area SAL. In this case, the thickness of the coating layer CM in the first area SA1 may be larger than the thickness t2 of the coating layer CM in the second area SA2. With this configuration, it is possible to compensate the warpage of the optical member 1132 even when the attractive force acting on the first area SA1 of the optical member increases as the bonding member is reduced or shrunk by thermal curing, etc.

In addition, as illustrated, when the optical member is a mirror, the thickness of the coating layer may increase compared to a case in which the optical member is a prism. In particular, the first area SA1 may have a larger thickness than the second area SA2. In addition, when the thickness of the optical member decreases, the optical member may be significantly affected by the attractive force caused by the bonding member. Therefore, in the camera actuator, when the thickness of the optical member decreases, the thickness of the coating layer CM in the first area SA1 may increase. With this configuration, it is possible to easily compensate an increase in warpage caused by the attractive force of the bonding member as the optical member has a smaller thickness.

In addition, in the first area SA1 in which the bonding member is positioned in the coating layer CM, a volume of the bonding member may be decreased by thermal curing, and the decrease in volume of the bonding member may cause the attractive force acting on the first area SAL. Therefore, the distortion or warpage between the first area SA1 and the second area SA2 may occur in the optical member. As described above, the coating layer CM can suppress the occurrence of warpage through the thickness difference between the first area SA1, which is an area in contact with the bonding member BM, and the second area SA2, which is an area other than the first area SA1. Therefore, in the camera actuator according to the embodiment, it is possible to prevent an optical path error or degradation in resolution power due to the warpage or distortion of the optical member.

In a modified example, even when warpage is compensated as described above because the thickness of the coating layer CM in the first area SA1 is larger than the thickness of the coating layer CM in the second area SA2, a portion of the optical member may be curved. In other words, the area in contact with the first area SA1 in the optical member may have a height difference from the area in contact with the second area SA2. For example, the area in contact with the first area SA1 in the optical member may be positioned above the area in contact with the second area SA2. Therefore, the optical member may have a shape in which the second area SA2 protrudes upward. In other words, the optical member may have a shape that is convex upward. As described above, even in the modified example, it is possible to compensate warpage or the like and prevent degradation in resolution power.

Figure 20:
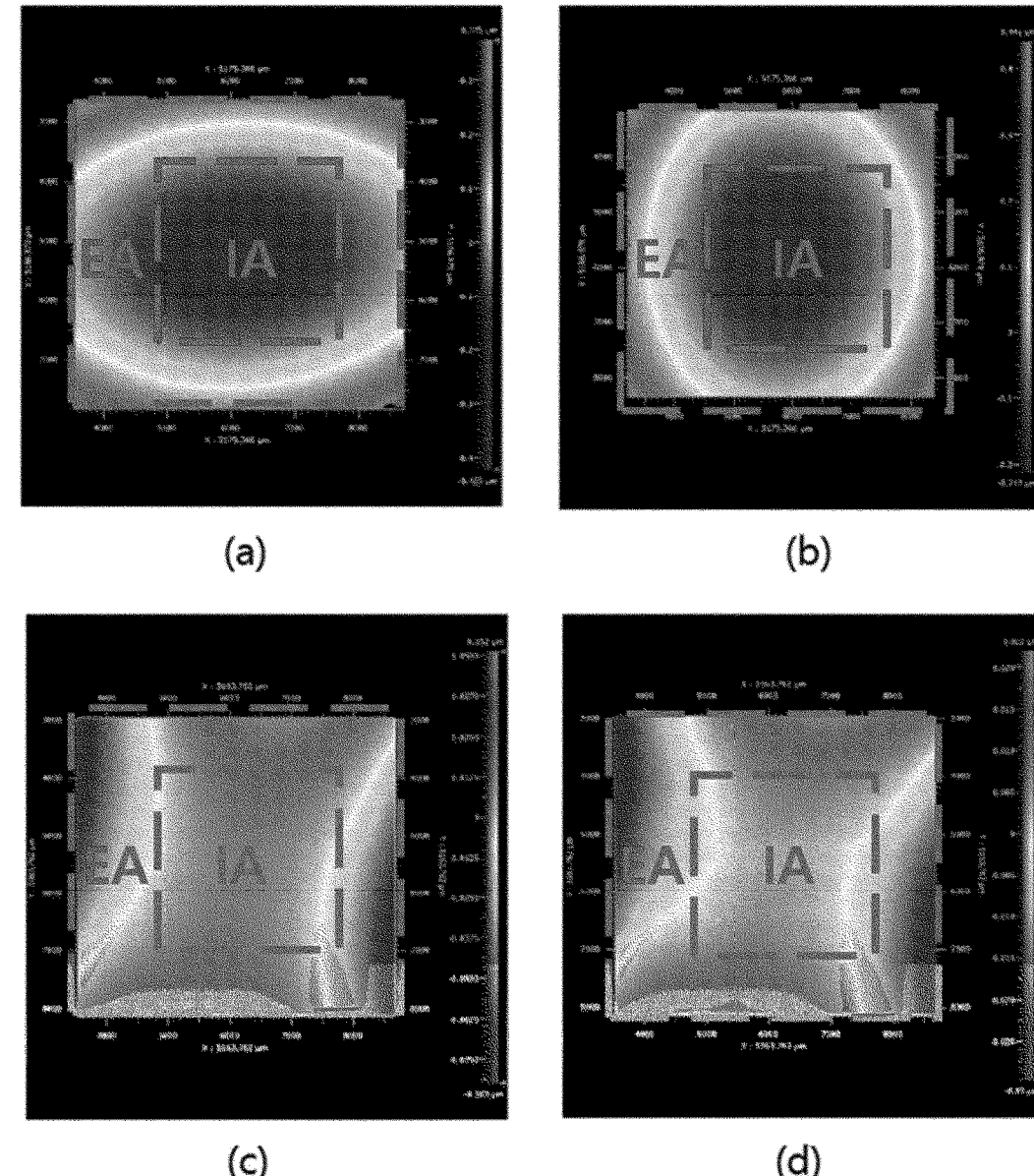
FIG. 20 (a) to (d) are views illustrating a degree of warpage for a different thickness.
Figure 21:
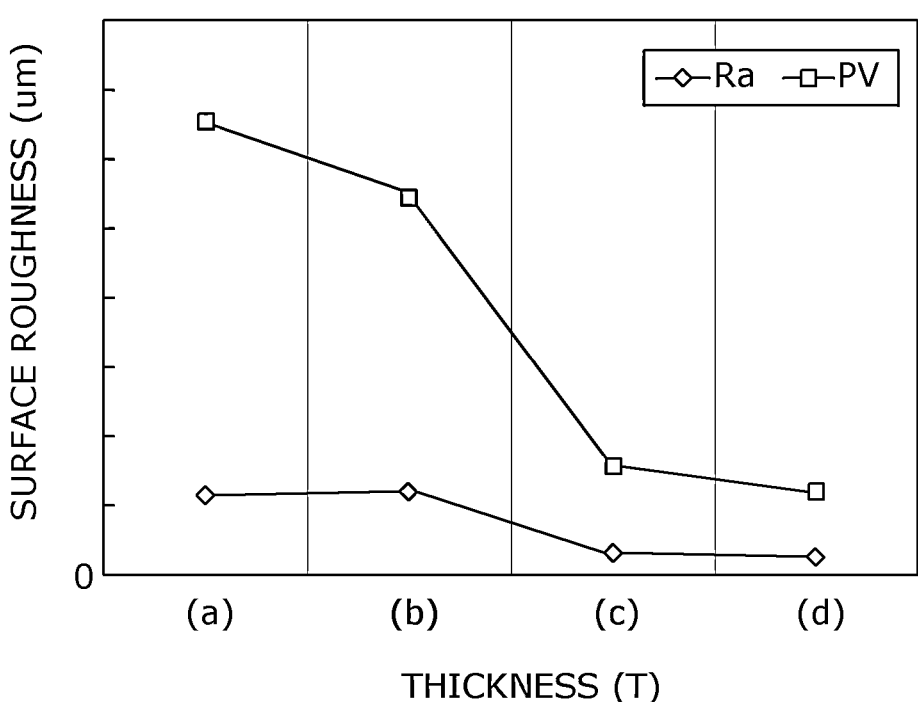
FIG. 21 (a) to (d) is a graph illustrating a result of the degree of warpage in FIG. 20.
Figure 22:
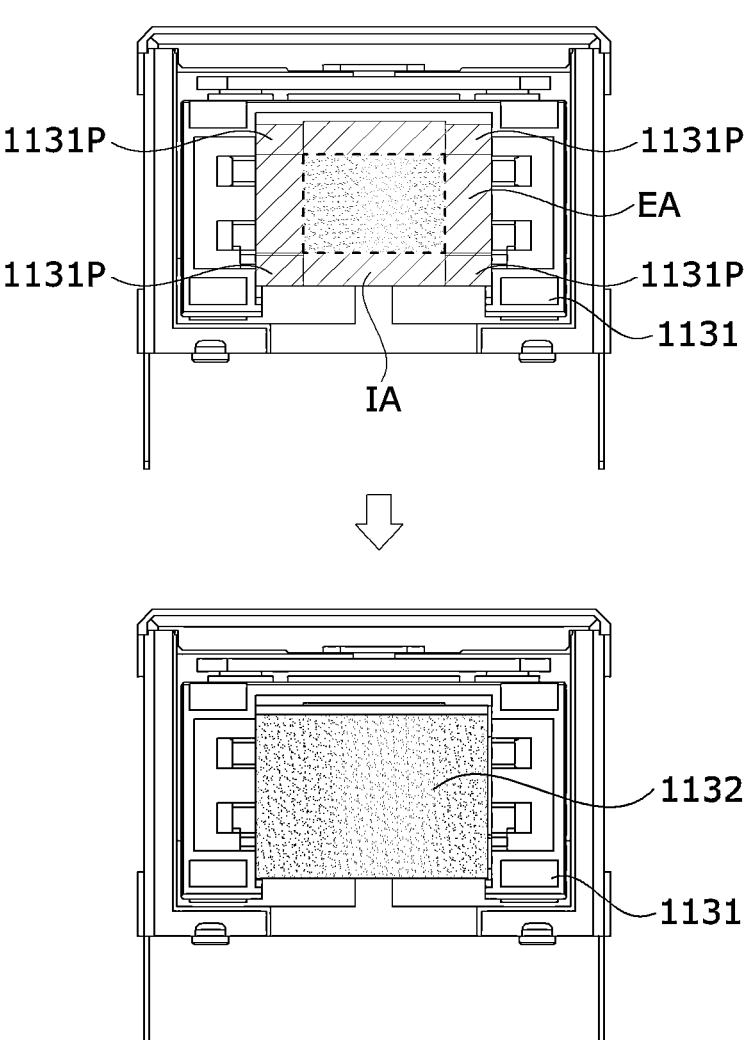
FIG. 22 is a view illustrating the coupling between the holder and the optical member according to the embodiment.
Figure 23:
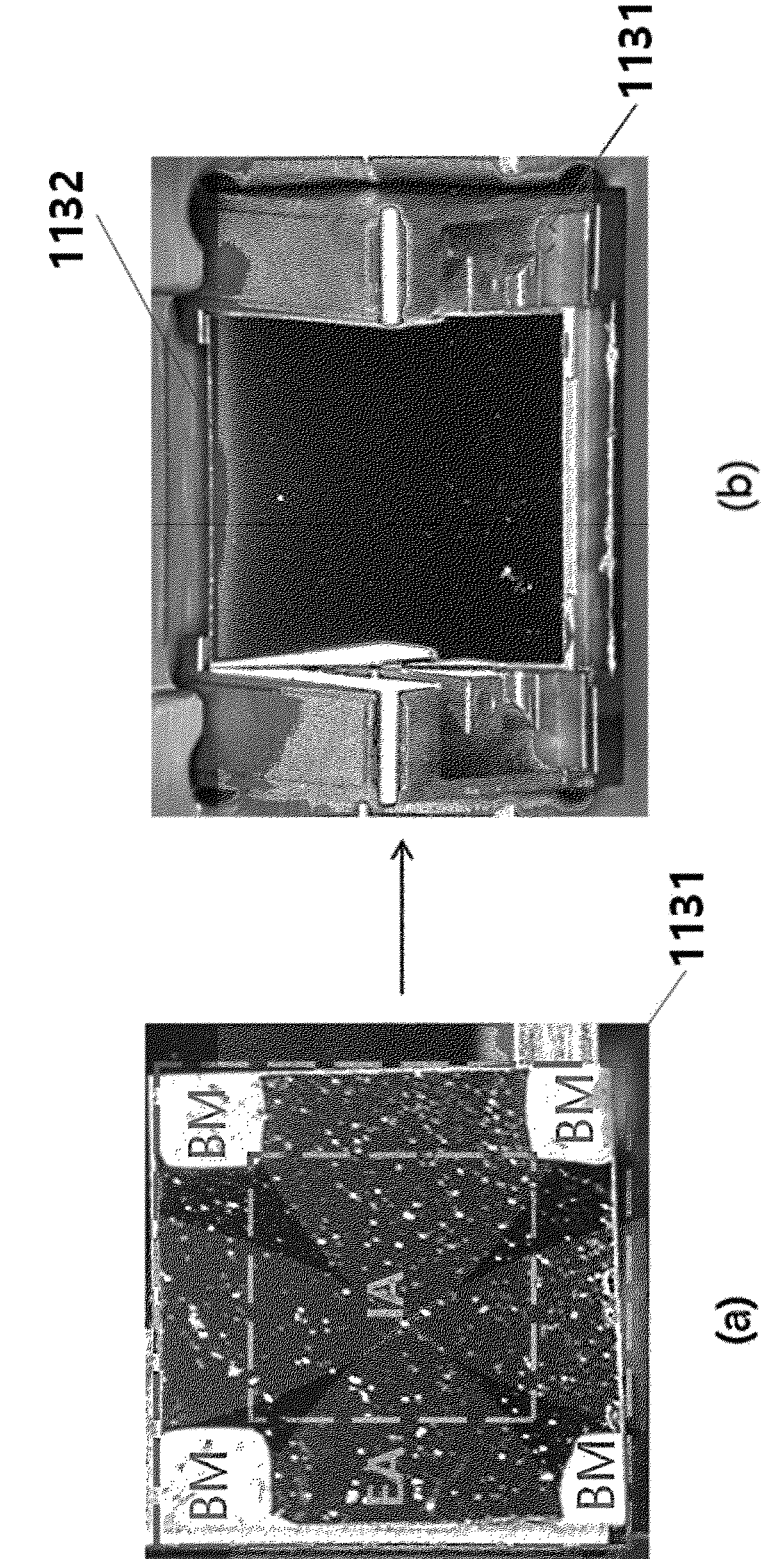
FIG. 23 (a) and (b) are views illustrating coupling between a real holder and optical member.

FIG. 20 is a view illustrating a degree of warpage for a different thickness, FIG. 21 is a graph illustrating a result of the degree of warpage in FIG. 20, FIG. 22 is a view illustrating the coupling between the holder and the optical member according to the embodiment, and FIG. 23 is a view illustrating coupling between a real holder and optical member.

Referring to FIG. 20, warpage of the optical member according to different thicknesses is illustrated. FIGS. 20A to 20D illustrate experimental results indicating the warpage caused by the bonding member when the optical member is a mirror. In this case, FIG. 20A illustrates an experimental result of warpage when the thickness of the optical member is 0.3 mm, FIG. 20B illustrates an experimental result of warpage when the thickness of the optical member is 0.5 mm, FIG. 20C illustrates an experimental result of warpage when the thickness of the optical member is 1 mm, and FIG. 20D illustrates an experimental result of warpage when the thickness of the optical member is 1.2 mm.

Referring to FIGS. 20A to 20D, it can be seen that as the thickness of the optical member increases in the internal area IA and the edge area EA, a degree of warpage decreases. In other words, it can be seen that as the thickness of the optical member decreases, the warpage caused by the bonding member increases.

Referring to FIG. 21, a graph of surface roughness Ra and a PV value for FIGS. 20A to 20D is illustrated. Here, PV denotes a height difference between a peak and a valley.

Referring to FIG. 21 and Table 1 below, it can be seen that as the thickness of the optical member increases, the surface roughness decreases and the PV value decreases. Conversely, it can be seen that as the thickness of the optical member decreases, the surface roughness increases and the PV value generally increases. As described above, it can be seen that as the thickness of the optical member decreases, the warpage or distortion of the optical member caused by the bonding member increases.

TABLE 1

| Items | 0.3T(a) | 0.5T(b) | 1.0T(c) | 1.2T(d) |
|---|---|---|---|---|
| Ra(μm) | 0.114 | 0.121 | 0.033 | 0.026 |
| PV(μm) | 0.654 | 0.545 | 0.157 | 0.121 |
| SFR (resolution power %) | 27 | 32 | 41 | 43 |

Figure 24:
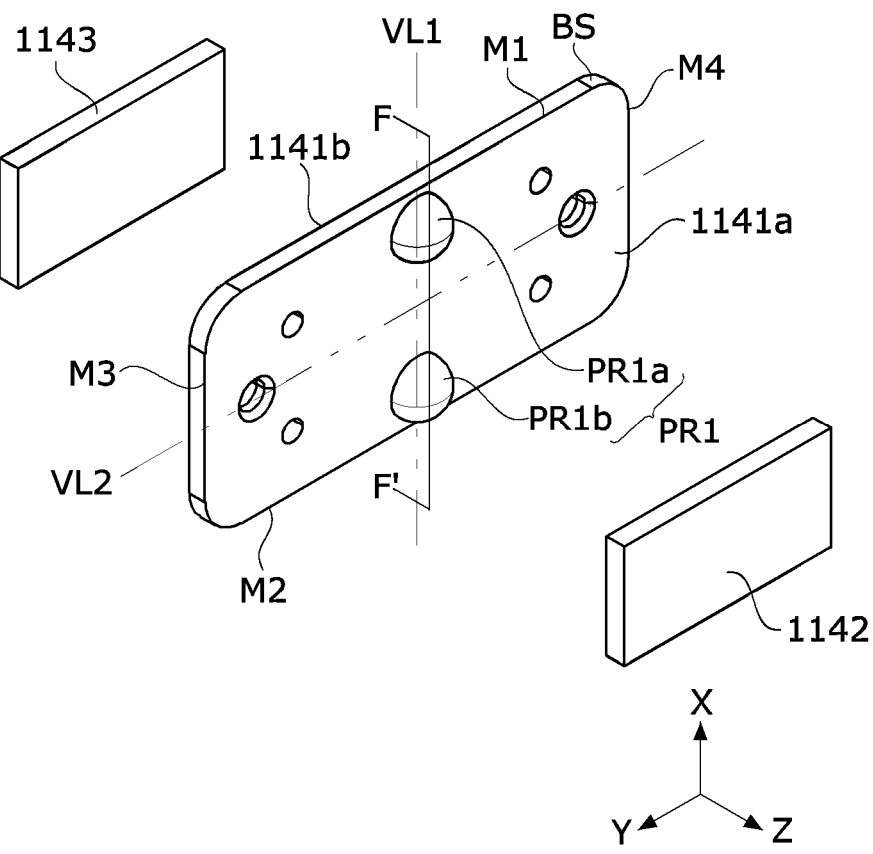
FIG. 24 is a perspective view of a tilting guide unit of the first camera actuator according to the embodiment.
Figure 25:
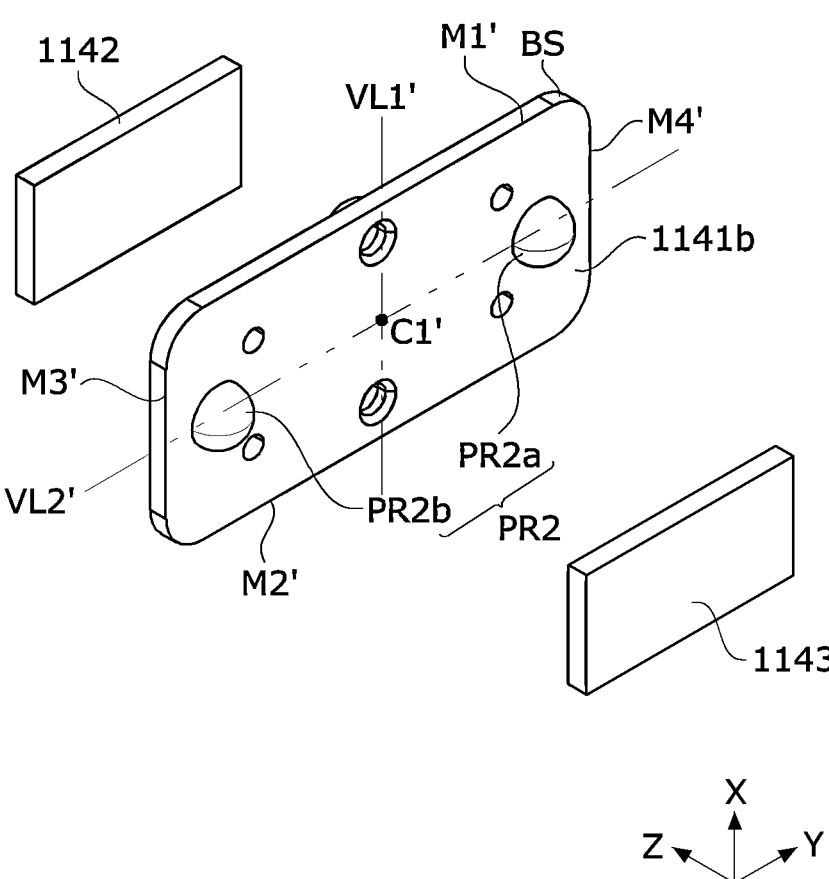
FIG. 25 is a perspective view in a different direction from FIG. 24.
Figure 26:
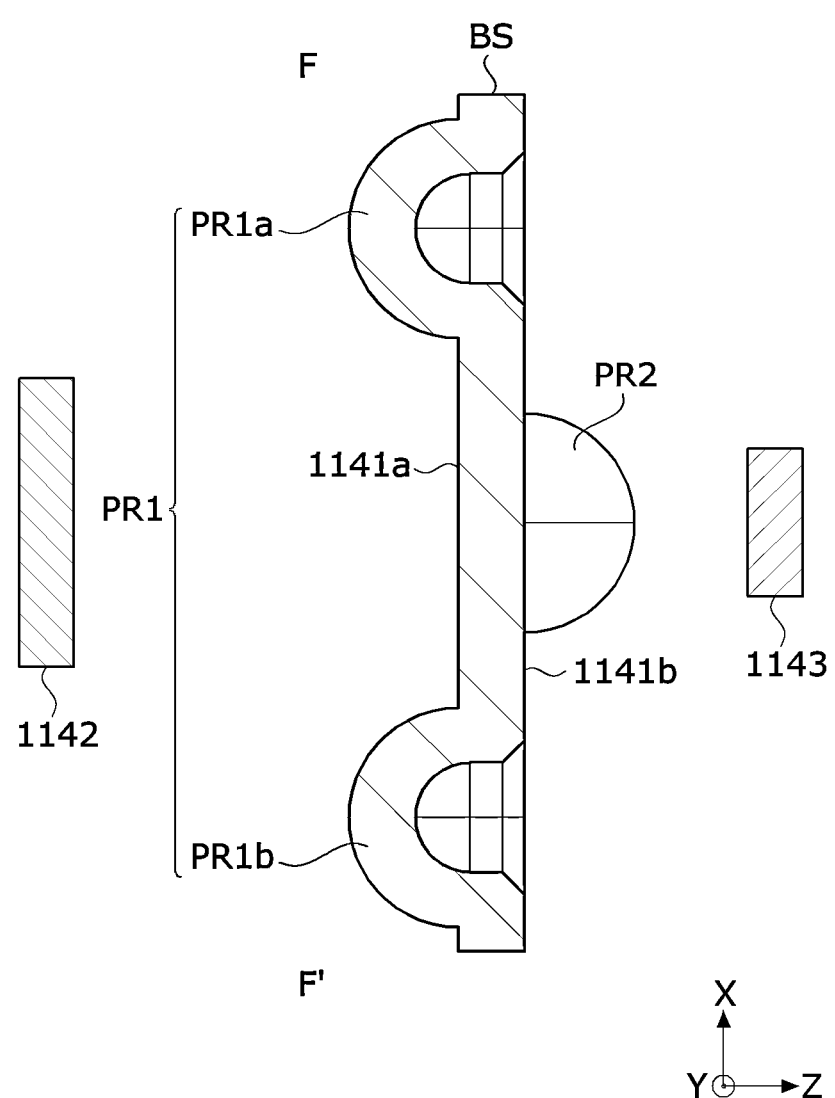
FIG. 26 is a cross-sectional view taken along line F-F' in FIG. 24.

Referring to FIGS. 22 and 23, as described above, the bonding member BM may be applied to the edge area EA in which the seating protrusion 1131p is positioned. In addition, a portion of the bonding member BM may be applied to the internal area IA. Furthermore, at least a portion of the bonding member BM may be positioned under the second area of the coating layer. However, the bonding member BM may be in contact with any one of the second area or the seating surface by the seating protrusion 1131p and the coating groove of the coating layer. In addition, the bonding member BM may be disposed to be spaced apart from the second area SA2 on the seating surface. In other words, the gap may be formed between the bonding member BM and the second area SA2. FIG. 24 is a perspective view of a tilting guide unit of the first camera actuator according to the embodiment, FIG. 25 is a perspective view of the tilting guide unit of the first camera actuator in a different direction from FIG. 24, and FIG. 26 is a cross-sectional view taken along line F-F' in FIG. 24. Referring to FIGS. 24 to 26, the rotating unit 1140 according to the embodiment may include the tilting guide unit 1141, the first magnetic part 1142, and the second magnetic part 1143. The first magnetic part 1142 and the second magnetic part 1143 may be positioned correspondingly based on the tilting guide unit 1141. In addition, the above-described contents may be applied to the first magnetic part 1142 and the second magnetic part 1143 in the same manner to provide the coupling strength between the mover, the tilting guide unit 1141, and the housing.

First, the tilting guide unit 1141 may include a base BS, a first protruding portion PR1 protruding from a first surface 1141a of the base BS, and a second protruding portion PR2 protruding from a second surface 1141b of the base BS. In addition, the first protruding portion and the second protruding portion may be formed on the second surface 1141b and the first surface 1141a according to the structure, respectively, but the present invention will be described below based on the drawings. In addition, it should be understood that the first protruding portion PR1 and the second protruding portion PR2 may be integrally formed with the base BS, and as illustrated in the drawings, the first protruding portion PR1 and the second protruding portion PR2 may have a spherical shape like a ball.

First, the base BS may include the first surface 1141a and the second surface 1141b opposite to the first surface 1141a. In other words, the first surface 1141a may be spaced apart from the second surface 1141b in the third direction (Z-axis direction), and the first surface 1141a and the second surface 1141b may be outer surfaces opposite to each other or facing each other in the tilting guide unit 1141. The first surface 1141a may be positioned to face the fourth housing side portion, and the second surface 1141b may be positioned to face the fourth holder outer surface.

The first surface 1141a and the second surface 1141b may include a plurality of holes or grooves, and a weight of the tilting guide unit 1141 may be decreased through the holes or the grooves.

The tilting guide unit 1141 may include the first protruding portion PR1 extending to one side on the first surface 1141a. According to the embodiment, the first protruding portion PR1 may protrude toward the fourth housing side portion from the first surface 1141a. A plurality of first protruding portions PR1 may be formed and may include a 1-1 protrusion PR1a and a 1-2 protrusion PR1b.

The 1-1 protrusion PR1a and the 1-2 protrusion PR1b may be positioned side by side in the first direction (X-axis direction). In other words, the 1-1 protrusion PR1a and the 1-2 protrusion PR1b may overlap each other in the first direction (X-axis direction). In addition, in the embodiment, the 1-1 protrusion PR1a and the 1-2 protrusion PR1b may be bisected by a virtual line extending in the first direction (X-axis direction).

In addition, each of the 1-1 protrusion PR1a and the 1-2 protrusion PR1b may have a curvature and have, for example, a hemispherical shape. In addition, the 1-1 protrusion PR1a and the 1-2 protrusion PR1b may be in contact with the first groove of the housing at a point that is the farthest from the first surface 1141a of the base BS.

In addition, an align groove (not illustrated) may be positioned in the first surface 1141a. The align groove (not illustrated) may be disposed at one side of the first surface 1141a to provide an assembling position or an assembling direction of the tilting guide unit 1141 during an assembling process.

In addition, the tilting guide unit 1141 may include the second protrusion part PR2 extending to one side on the second surface 1141b. According to the embodiment, the second protruding portion PR2 may protrude toward the housing from the second surface 1141b. In addition, a plurality of second protruding portions PR2 may be formed and may include a 2-1 protrusion PR2a and a 2-2 protrusion PR2b in the embodiment.

The 2-1 protrusion PR2a and the 2-2 protrusion PR2b may be positioned side by side in the second direction (Y-axis direction). In other words, the 2-1 protrusion PR2a and the 2-2 protrusion PR2b may overlap each other in the second direction (Y-axis direction). In addition, in the embodiment, the 2-1 protrusion PR2a and the 2-2 protrusion PR2b may be bisected by a virtual line extending in the second direction (Y-axis direction).

Each of the 2-1 protrusion PR2a and the 2-2 protrusion PR2b may have a curvature and have, for example, a hemispherical shape. In addition, the 2-1 protrusion PR2a and the 2-2 protrusion PR2b may be in contact with the second protrusion groove at a point spaced apart from the second surface 1141b of the base BS.

The 1-1 protrusion PR1a and the 1-2 protrusion PR1b may be positioned in an area between the 2-1 protrusion PR2a and the 2-2 protrusion PR2b in the second direction. According to the embodiment, the 1-1 protrusion PR1a and the 1-2 protrusion PR1b may be positioned at the center of a separation space between the 2-1 protrusion PR2a and the 2-2 protrusion PR2b in the second direction. With this configuration, the actuator according to the embodiment may have an angle of the X-axis tilting in the same range with respect to the X-axis. In other words, the tilting guide unit 1141 and the holder may equally provide a range (e.g., a positive/negative range) in which the X-axis tilting may be performed based on the 1-1 protrusion PR1a and the 1-2 protrusion PR1b with respect to the X-axis.

In addition, the 2-1 protrusion PR2a and the 2-2 protrusion PR2b may be positioned in an area between the 1-1 protrusion PR1a and the 1-2 protrusion PR1b in the first direction. According to the embodiment, the 2-1 protrusion PR2a and the 2-2 protrusion PR2b may be positioned at the center of a separation space between the 1-1 protrusion PR1a and the 1-2 protrusion PR1b in the first direction. With this configuration, the actuator according to the embodiment may have an angle of the Y-axis tilting in the same range with respect to the Y-axis. In other words, the tilting guide unit 1141 and the holder may equally provide a range (e.g., a positive/negative range) in which the Y-axis tilting may be performed based on the 2-1 protrusion PR2a and the 2-2 protrusion PR2b with respect to the Y-axis.

Specifically, the first surface 1141a may include a first outer line M1, a second outer line M2, a third outer line M3, and a fourth outer line M4. The first outer line M1 and the second outer line M2 may face each other, and the third outer line M3 and the fourth outer line M4 may face each other. In addition, the third outer line M3 and the fourth outer line M4 may be positioned between the first outer line M1 and the second outer line M2. In addition, the first outer line M1 and the second outer line M2 may be perpendicular to the first direction (X-axis direction), but the third outer line M3 and the fourth outer line M4 may be parallel to the first direction (X-axis direction).

In this case, the first protruding portion PR1 may be positioned on a first virtual line VL1. Here, the first virtual line VL1 is a line that bisects the first outer line M1 and the second outer line M2. Alternatively, the first and third virtual lines VL1 and VL1' are lines that bisect the base BS in the second direction (Y-axis direction). Therefore, the tilting guide unit 1141 may easily perform the X-axis tilting through the first protruding portion PR1. In addition, since the tilting guide unit 1141 performs the X-axis tilting with respect to the first virtual line VL1, a rotating force may be uniformly applied to the tilting guide unit 1141. Therefore, it is possible to precisely perform the X-axis tilting and improve the reliability of the element.

In addition, the 1-1 protrusion PR1a and the 1-2 protrusion PR1b may be symmetrically disposed with respect to the first virtual line VL1 and a second virtual line VL2. Alternatively, the 1-1 protrusion PR1a and the 1-2 protrusion PR1b may be symmetrically positioned with respect to a first central point C1. With this configuration, upon performing the X-axis tilting, a support force supported by the first protruding portion PR1 may be equally applied to upper and lower sides with respect to the second virtual line VL2. Therefore, it is possible to improve the reliability of the tilting guide unit. Here, the second virtual line VL2 is a line that bisects the third outer line M3 and the fourth outer line M4. Alternatively, the second and fourth virtual lines VL2 and VL2' are lines that bisect the base BS in the first direction (X-axis direction).

In addition, the first central point C1 may be an intersection of the first virtual line VL1 and the second virtual line VL2. Alternatively, the first central point C1 may be a point corresponding to the center of gravity according to a shape of the tilting guide unit 1141.

In addition, the second surface 1141b may include a fifth outer line M1', a sixth outer line M2', a seventh outer line M3', and an eighth outer line M4'. The fifth outer line M1' and the sixth outer line M2' may face each other, and the seventh outer line M3' and the eighth outer line M4' may face each other. In addition, the seventh outer line M3' and the eighth outer line M4' may be positioned between the fifth outer line M1' and the sixth outer line M2'. In addition, the fifth outer line M1' and the sixth outer line M2' may be perpendicular to the first direction (X-axis direction), but the seventh outer line M3' and the eighth outer line M4' may be parallel to the first direction (X-axis direction).

In addition, since the tilting guide unit 1141 performs the Y-axis tilting with respect to the fourth virtual line VL2', a rotating force may be uniformly applied to the tilting guide unit 1141. Therefore, it is possible to precisely perform the Y-axis tilting and improve the reliability of the device.

In addition, the 2-1 protrusion PR2a and the 2-2 protrusion PR2b may be symmetrically disposed on the fourth virtual line VL2' with respect to the third virtual line VL1'. Alternatively, the 2-1 protrusion PR2a and the 2-2 protrusion PR2b may be symmetrically positioned with respect to the first central point C1. With this configuration, upon performing the Y-axis tilting, a support force supported by the second protruding portion PR2 may be equally applied to upper and lower sides of the tilting guide unit with respect to the fourth virtual line VL2'. Therefore, it is possible to improve the reliability of the tilting guide unit. Here, the third virtual line VL1' is a line that bisects the fifth outer line M1' and the sixth outer line M2'. In addition, a second central point C1' may be an intersection of the third virtual line VL1' and the fourth virtual line VL2'. Alternatively, the second central point C1' may be a point corresponding to the center of gravity according to the shape of the tilting guide unit 1141.

However, the above-described configuration is an example, and the tilting guide unit 1141 may be formed in various shapes for the X-axis tilting or the Y-axis tilting.

Figure 27:
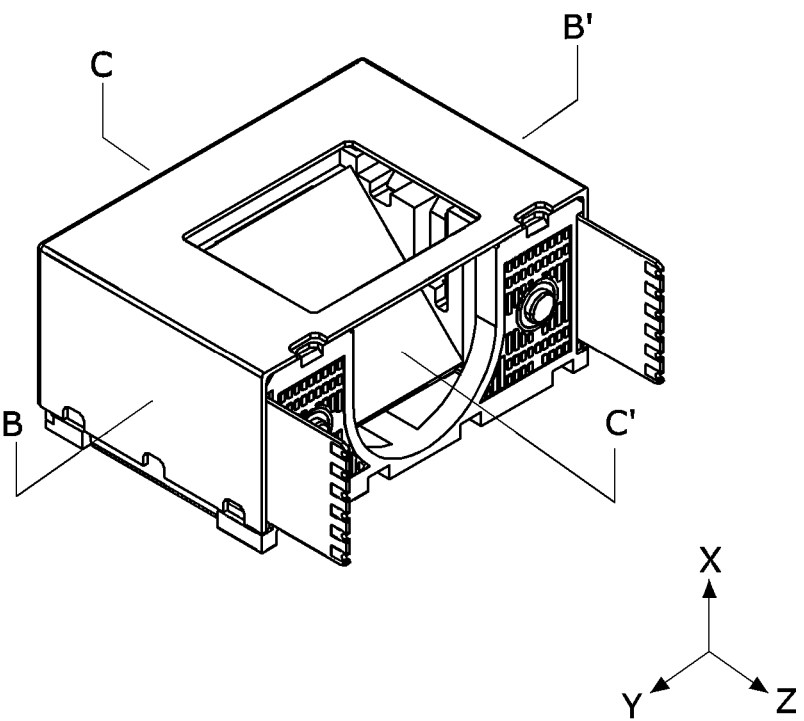
FIG. 27 is a perspective view of the first camera actuator according to the embodiment.
Figure 28:
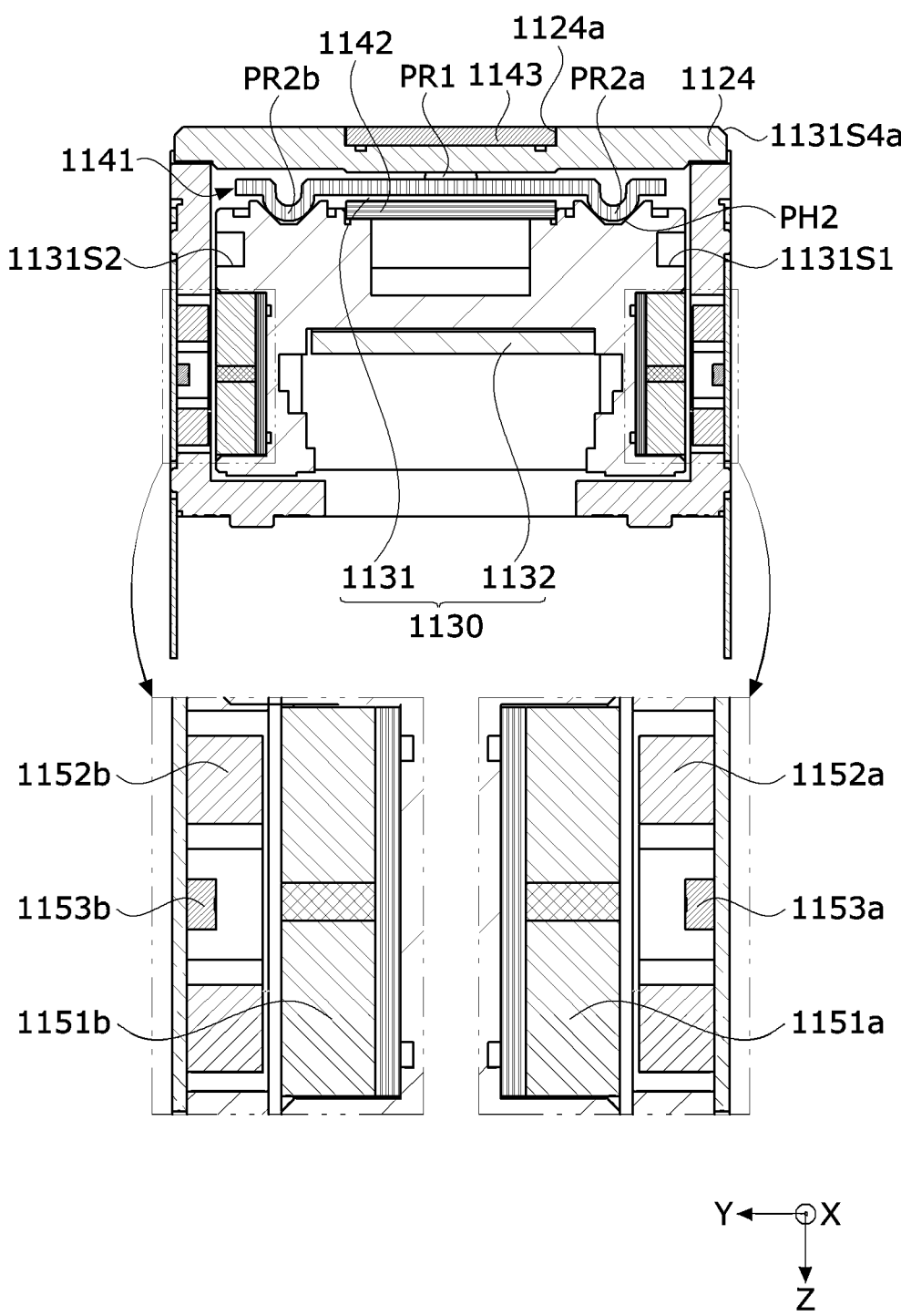
FIG. 28 is a cross-sectional view taken along line B-B' in FIG. 27.
Figure 29:
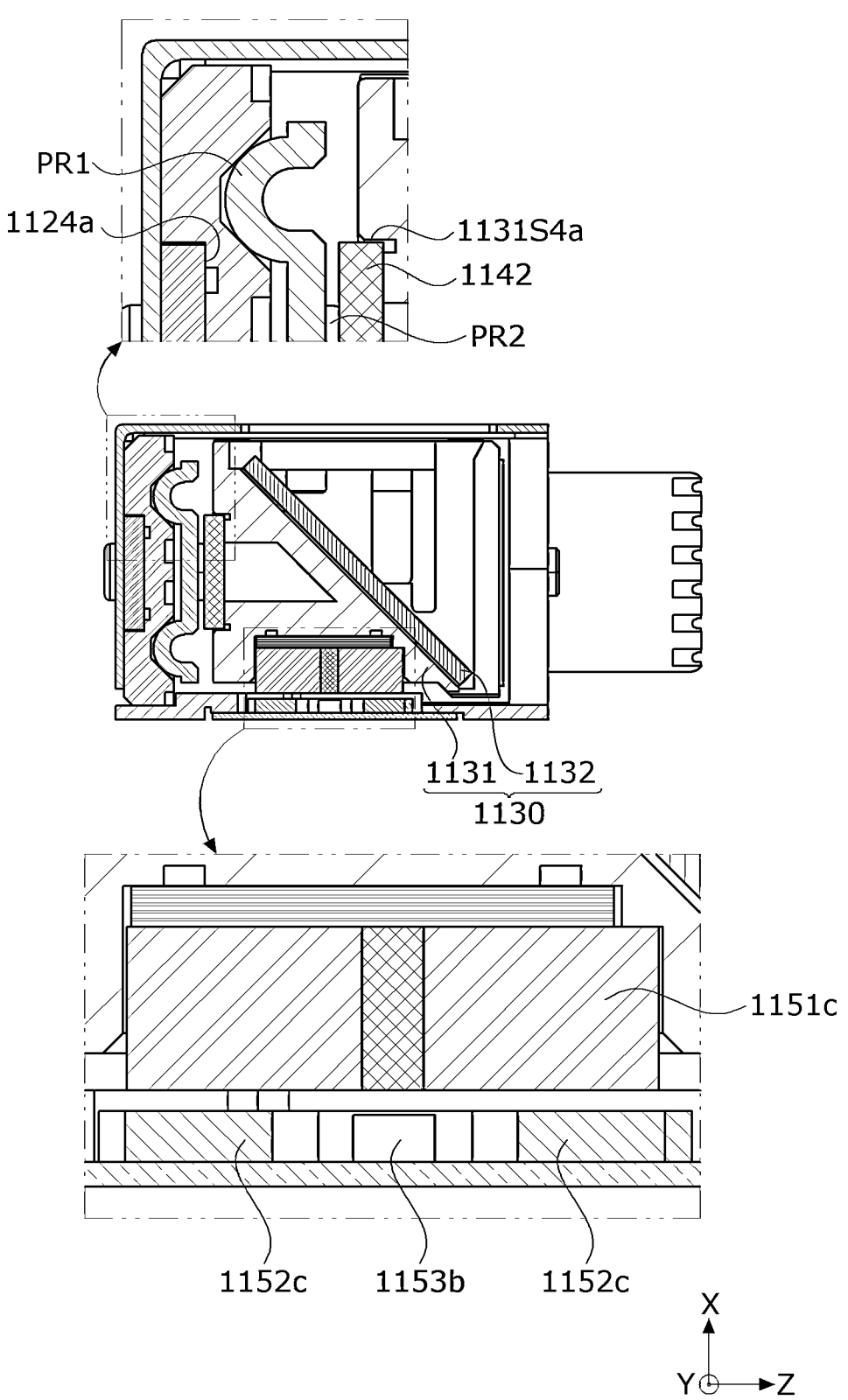
FIG. 29 is a cross-sectional view taken along line C-C' in FIG. 27.

FIG. 27 is a perspective view of the first camera actuator according to the embodiment, FIG. 28 is a cross-sectional view taken along line B-B' in FIG. 27, and FIG. 29 is a cross-sectional view taken along line C-C' in FIG. 27.

Referring to FIGS. 27 to 29, the first coil 1152a may be positioned on the first housing side portion 1121, and the first magnet 1151a may be positioned on the first holder outer surface 1131S1 of the holder 1131. Therefore, the first coil 1152a and the first magnet 1151a may be positioned to face each other. At least a portion of the first magnet 1151a may overlap the first coil 1152a in the second direction (Y-axis direction).

In addition, the second coil 1152b may be positioned on the second housing side portion 1122, and the second magnet 1151b may be positioned on the second holder outer surface 1131S2 of the holder 1131. Therefore, the second coil 1152b and the second magnet 1151b may be positioned to face each other. At least a portion of the second magnet 1151b may overlap the second coil 1152b in the second direction (Y-axis direction).

In addition, the first coil 1152a and the second coil 1152b may overlap each other in the second direction (Y-axis direction), and the first magnet 1151a and the second magnet 1151b may overlap each other in the second direction (Y-axis direction). With this configuration, the electromagnetic force applied to the outer surfaces of the prism holder (the first holder outer surface and the second holder outer surface) may be positioned on an axis parallel to the second direction (Y-axis direction) so that the X-axis tilting may be performed accurately and precisely.

In addition, the second protruding portion PR2a and PR2b of the tilting guide unit 1141 may be positioned in the second protrusion groove PH2 of the housing 1120 and may be in contact with the second protrusion groove PH2. In addition, when the X-axis tilting is performed, the second protruding portion PR2a and PR2b may be reference axes (or rotation axes) of the tilting. Therefore, the tilting guide unit 1141 and the mover 1130 may move vertically.

In addition, the fourth housing side portion 1124 according to the embodiment may include the housing groove 1124a. In addition, the second magnetic part 1143 may be positioned in the housing groove 1124a. The housing groove 1124a may be positioned to correspond to the first magnetic part 1142.

In the embodiment, the housing groove 1124a may be positioned on an outer surface or inner surface of the fourth housing side portion 1124. The following description will be made based on the housing groove 1124a positioned on the outer surface of the fourth housing side portion 1124. The housing groove 1124a may have a shape having an open one side of the inner surface of the fourth housing side portion 1124. For example, the housing groove 1124a may have a structure in which one end of the inner surface of the fourth housing side portion 1124 is open toward the first housing side portion.

In addition, a contact point between the second protruding portion PR2 and the fourth housing side portion 1124 and a center of the second protrusion groove PH2 may overlap each other in the third direction (Z-axis direction) or may be positioned on an axis parallel to the third direction. Therefore, the actuator according to the embodiment can increase the accuracy of the X-axis tilting through the second protruding portion PR2.

In addition, as described above, the first Hall sensor 1153a may be positioned outside for electrical connection and coupling with the first board unit 1154. However, the present invention is not limited to this position.

In addition, the third coil 1152c may be positioned on the third housing side portion 1123, and the third magnet 1151c may be positioned on the third holder outer surface 1131S3 of the holder 1131. The third coil 1152c and the third magnet 1151c may at least partially overlap in the first direction (X-axis direction). Therefore, a strength of the electromagnetic force between the third coil 1152c and the third magnet 1151c may be easily controlled.

As described above, the tilting guide unit 1141 may be positioned on the fourth holder outer surface 1131S4 of the holder 1131. The first magnetic part 1142 may be seated in the fourth seating groove 1131S4a. At least a portion of the fourth seating groove 1131S4a may be positioned to overlap the housing groove 1124a of the fourth housing side portion 1124 in the third direction (Z-axis direction). For example, a center of the fourth seating groove 1131S4a and a center of the housing groove 1124a may overlap each other in the third direction (Z-axis direction) or may be positioned side by side or parallel to each other in the third direction (Z-axis direction).

Figure 30:
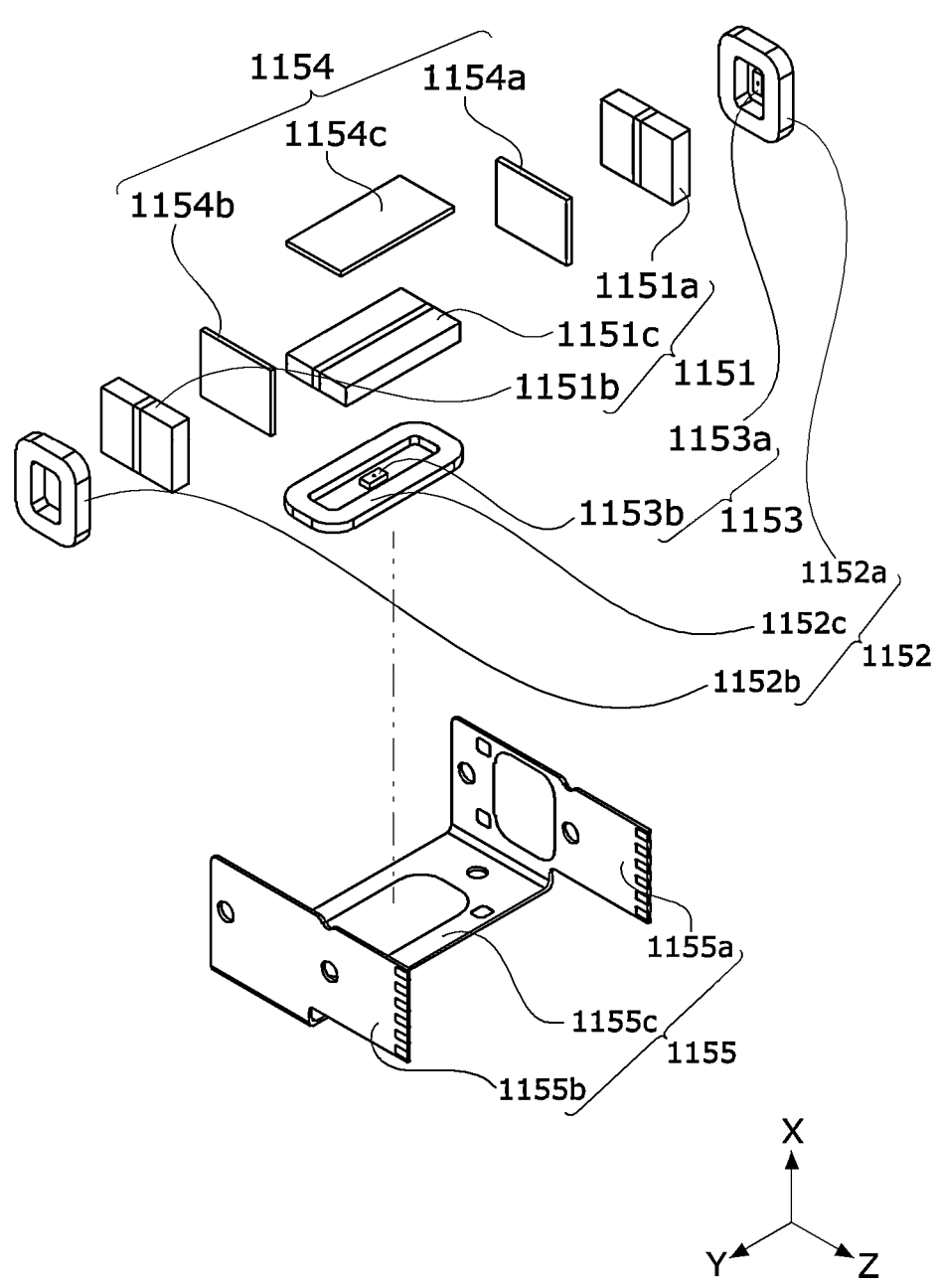
FIG. 30 is a view illustrating a first driving unit of the first camera actuator according to the embodiment.

FIG. 30 is a view of a first driving unit of the first camera actuator according to the embodiment.

Referring to FIG. 30, as described above, the driving unit 1150 (or the first driving unit) includes the driving magnet 1151, the driving coil 1152, the Hall sensing unit 1153, a coupling unit 1154, and a board unit 1155.

In addition, as described above, the driving magnet 1151 may include the first magnet 1151a, the second magnet 1151b, and the third magnet 1151c, which provide a driving force generated by an electromagnetic force. The first magnet 1151a, the second magnet 1151b, and the third magnet 1151c may each be positioned on the outer surface of the holder 1131.

In addition, the driving coil 1152 may include a plurality of coils. In the embodiment, the driving coil 1152 may include the first coil 1152a, the second coil 1152b, and the third coil 1152c.

The first coil 1152a may be positioned to face the first magnet 1151a. Therefore, as described above, the first coil 1152a may be positioned in the first housing hole 1121a of the first housing side portion 1121. In addition, the second coil 1152b may be positioned to face the second magnet 1151b. Therefore, as described above, the second coil 1152b may be positioned in the second housing hole 1122a of the second housing side portion 1122.

The second camera actuator according to the embodiment may control the mover 1130 to rotate in the first direction (X-axis direction) or the second direction (Y-axis direction) by the electromagnetic force between the driving magnet 1151 and the driving coil 1152, thereby minimizing the occurrence of a decentering or tilting phenomenon and providing the best optical characteristics upon implementing an OIS.

In addition, according to the embodiment, it is possible to provide an ultra-slim and ultra-small camera actuator, which resolves the size limit of the actuator by implementing the OIS through the rotating plate of the rotating unit 1140 disposed between the housing 1120 and the mover 1130, and the camera module including the same.

The coupling unit 1154 may include a first coupling member 1154a, a second coupling member 1154b, and a third coupling member 1154c.

In addition, the first coupling member 1154a, the second coupling member 1154b, and the third coupling member 1154c may each be positioned between the first magnet 1151a to the third magnet 1151c and the holder 1131.

The first coupling member 1154a, the second coupling member 1154b, and the third coupling member 1154c may be yokes. Therefore, the first coupling member 1154a, the second coupling member 1154b, and the third coupling member 1154c may be respectively coupled to the first magnet 1151a, the second magnet 1151b, and the third magnet 1151c.

In addition, the first coupling member 1154a, the second coupling member 1154b, and the third coupling member 1154c may each be disposed in the first seating groove, the second seating groove, and the third seating groove, and may be easily coupled to the first seating groove, the second seating groove, and the third seating groove through the bonding member injected through the grooves formed in the first seating groove, the second seating groove, and the third seating groove.

The board unit 1155 may include a first board side portion 1155a, a second board side portion 1155b, and a third board side portion 1155c.

The first board side portion 1155a and the second board side portion 1155b may be disposed to face each other. In addition, the third board side portion 1155c may be positioned between the first board side portion 1155a and the second board side portion 1155b.

In addition, the first board side portion 1155a may be positioned between the first housing side portion and the shield can, and the second board side portion 1155b may be positioned between the second housing side portion and the shield can. In addition, the third board side portion 1155c may be positioned between the third housing side portion and the shield can and may be a lower surface of the board unit 1155.

The first board side portion 1155a may be coupled to and electrically connected to the first coil 1152a. In addition, the first board side portion 1155a may be coupled to and electrically connected to the first Hall sensor 1153a.

The second board side portion 1155b may be coupled to and electrically connected to the second coil 1152b. In addition, it should be understood that the second board side portion 1155b may be coupled to and electrically connected to the second Hall sensor 1153b.

In addition, the first board side portion 1155a and the second board side portion 1155b may extend in the third direction (Z-axis direction). Therefore, the first board side portion 1155a and the second board side portion 1155b may have areas further extending in the third direction (Z-axis direction) than the fifth housing side portion.

In addition, the third board side portion 1155c may be coupled to and electrically connected to the third coil 1152c. In addition, the third board side portion 1155c may be coupled to and electrically connected to a third Hall sensor 1153c.

Figure 31:
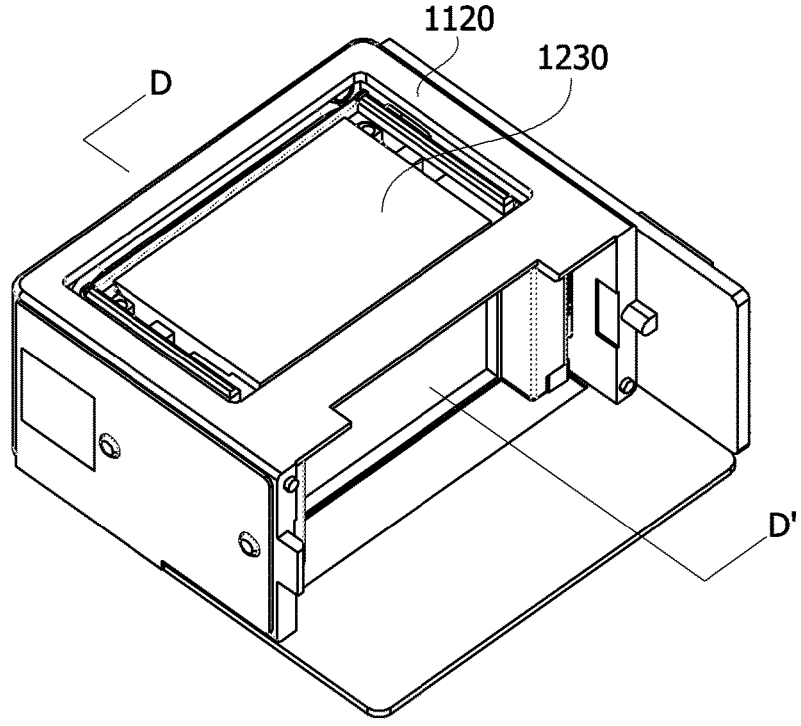
FIG. 31 is a perspective view of the first camera actuator according to the embodiment.
Figure 32:
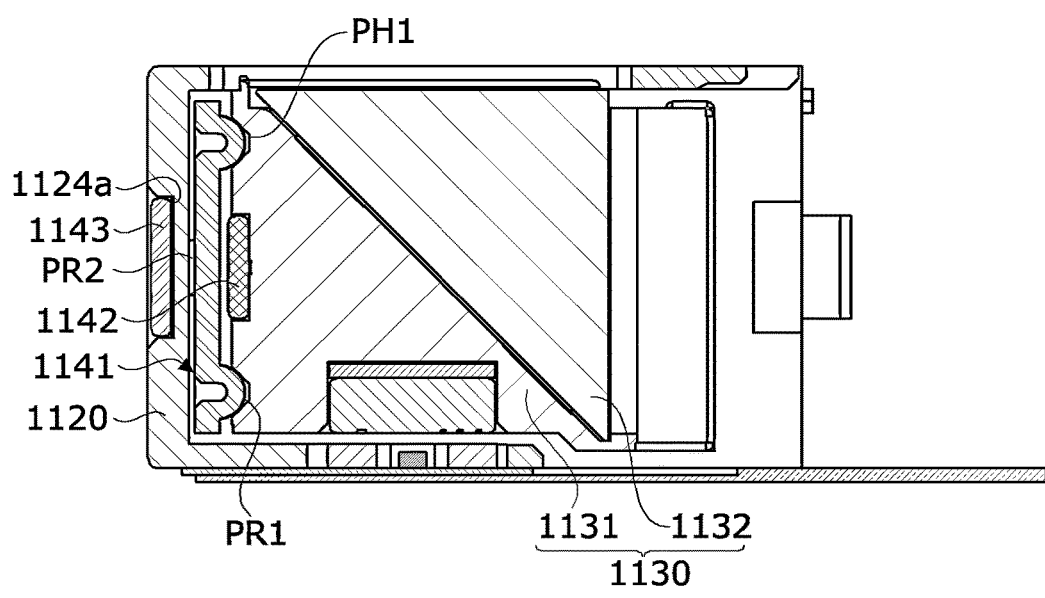
FIG. 32 is a cross-sectional view taken along line D-D' in FIG. 31.
Figure 33:
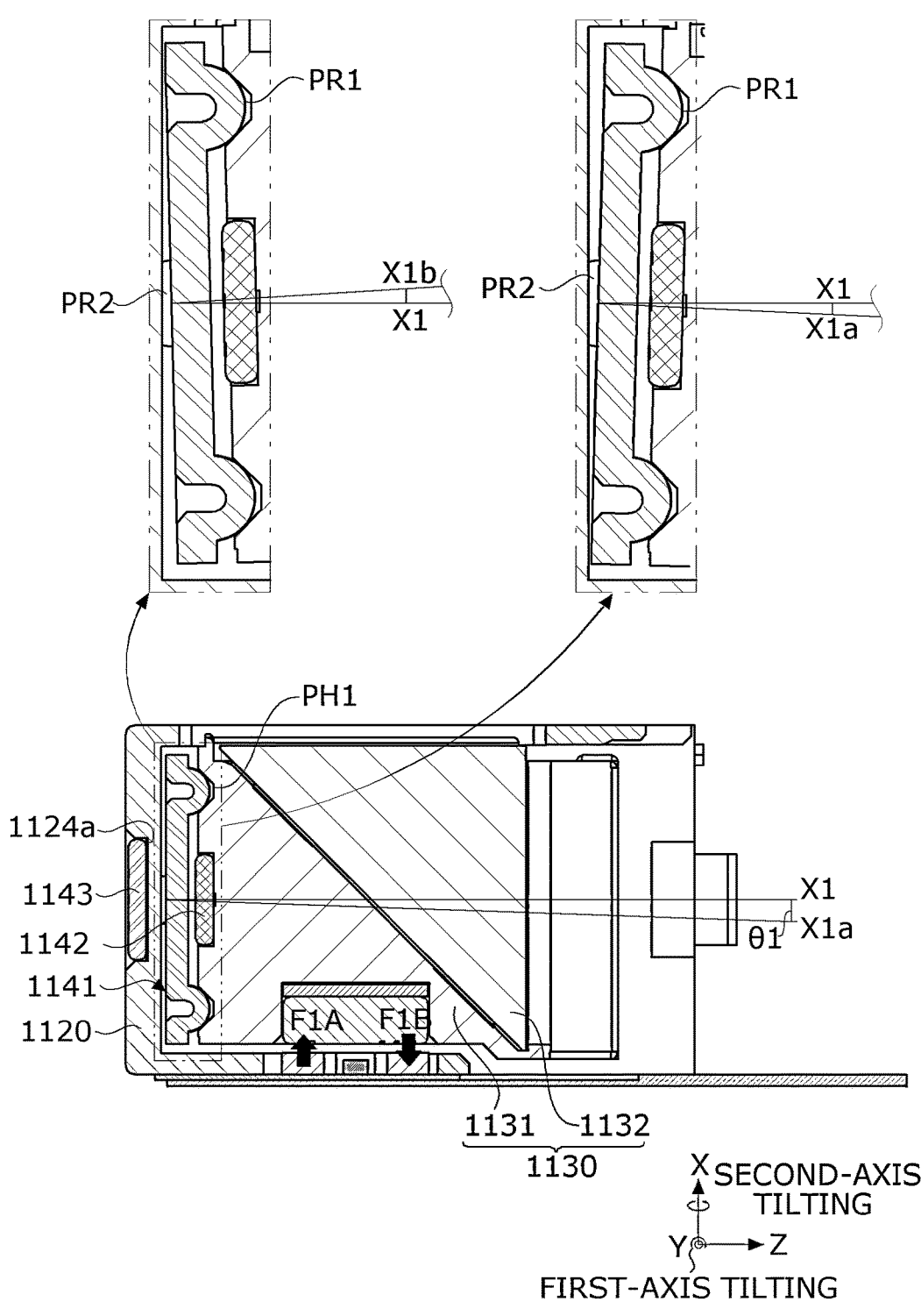
FIG. 33 is an exemplary view of a movement of the first camera actuator illustrated in FIG. 32.

FIG. 31 is a perspective view of the first camera actuator according to the embodiment, FIG. 32 is a cross-sectional view taken along line D-D' in FIG. 31, and FIG. 33 is an exemplary view of a movement of the first camera actuator illustrated in FIG. 32.

Referring to FIGS. 31 to 33, the Y-axis tilting may be performed. In other words, an OIS can be implemented by rotating the first camera actuator in the first direction (X-axis direction).

In the embodiment, the third magnet 1151*c* disposed under the holder 1131 may generate the electromagnetic force with the third coil 1152*c* to tilt or rotate the tilting guide unit 1141 and the mover 1130 in the first direction (X-axis direction).

Specifically, the tilting guide unit 1141, the housing 1120, and the mover 1130 may be coupled by the first magnetic part 1142 and the second magnetic part 1143. In addition, the 1-1 protrusion PR1*a* and the 1-2 protrusion PR1*b* may be spaced apart from each other in the first direction (X-axis direction) to support the mover 1130. In addition, the tilting guide unit 1141 may be rotated or tilted in the first direction (X-axis direction) using the second protruding portion PR2 protruding toward the housing as a reference axis (or a rotation axis).

For example, an OIS can be implemented by rotating (X1→X1*a* or X1*b*) the mover 130 at a first angle θ1 in the X-axis direction by first electromagnetic forces F1A and F1B between the third magnet 1151*c* disposed in the third seating groove and the third coil 1152*c* disposed on the third board side portion. The first angle θ1 may be in a range of ±1° to ±3°. However, the present invention is not limited thereto.

Figure 34:
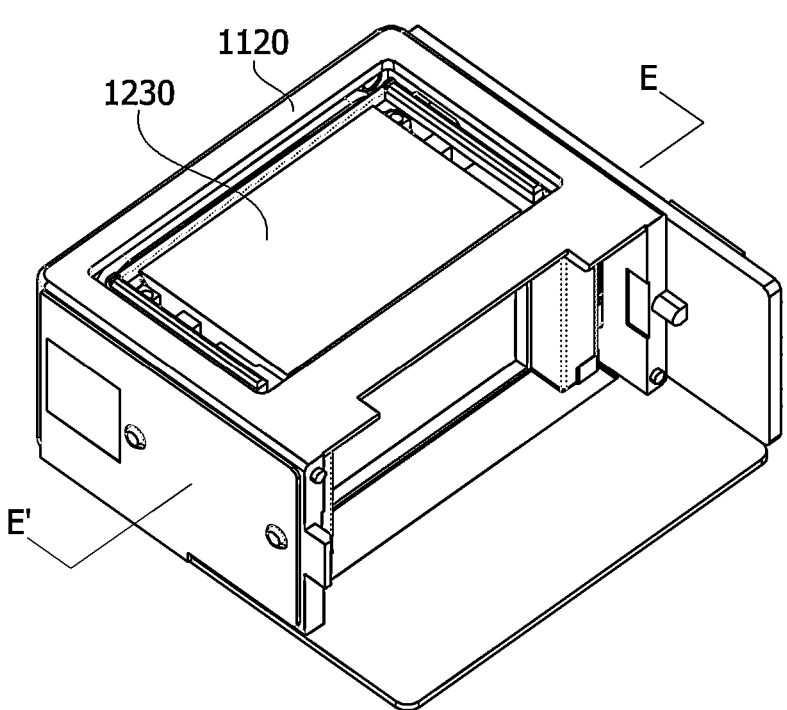
FIG. 34 is a perspective view of the first camera actuator according to the embodiment.
Figure 35:
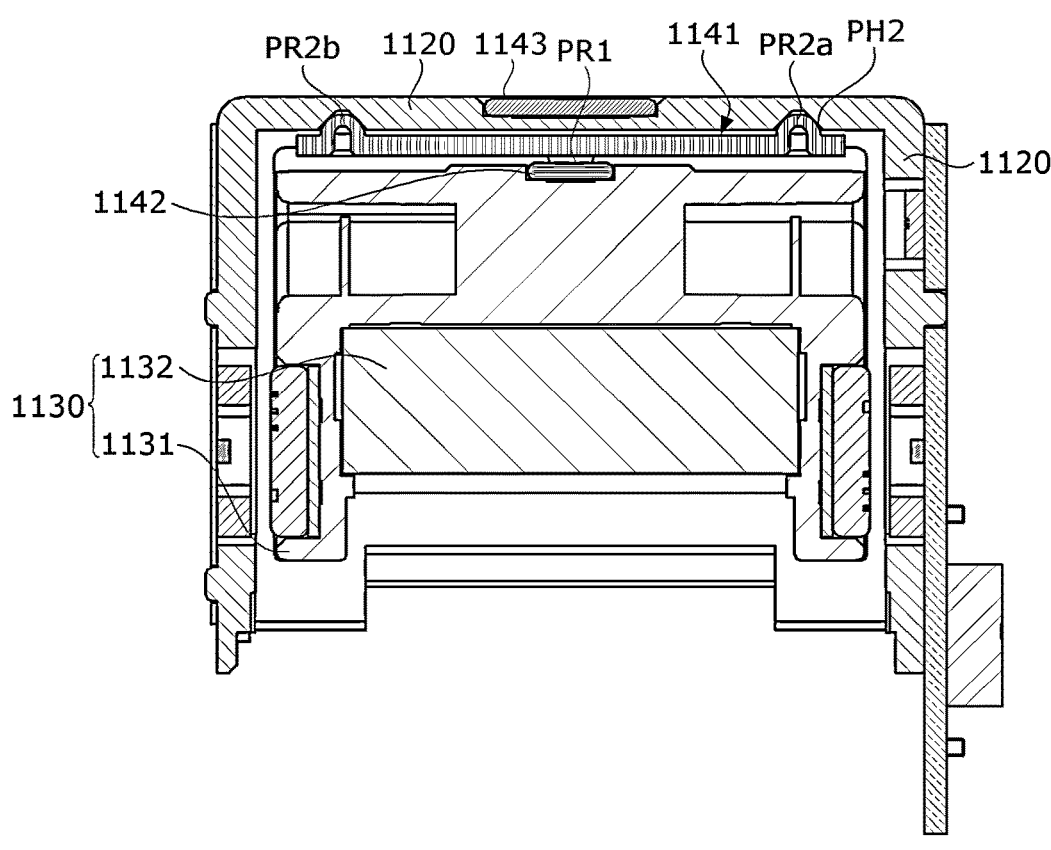
FIG. 35 is a cross-sectional view taken along line E-E' in FIG. 34.
Figure 36:
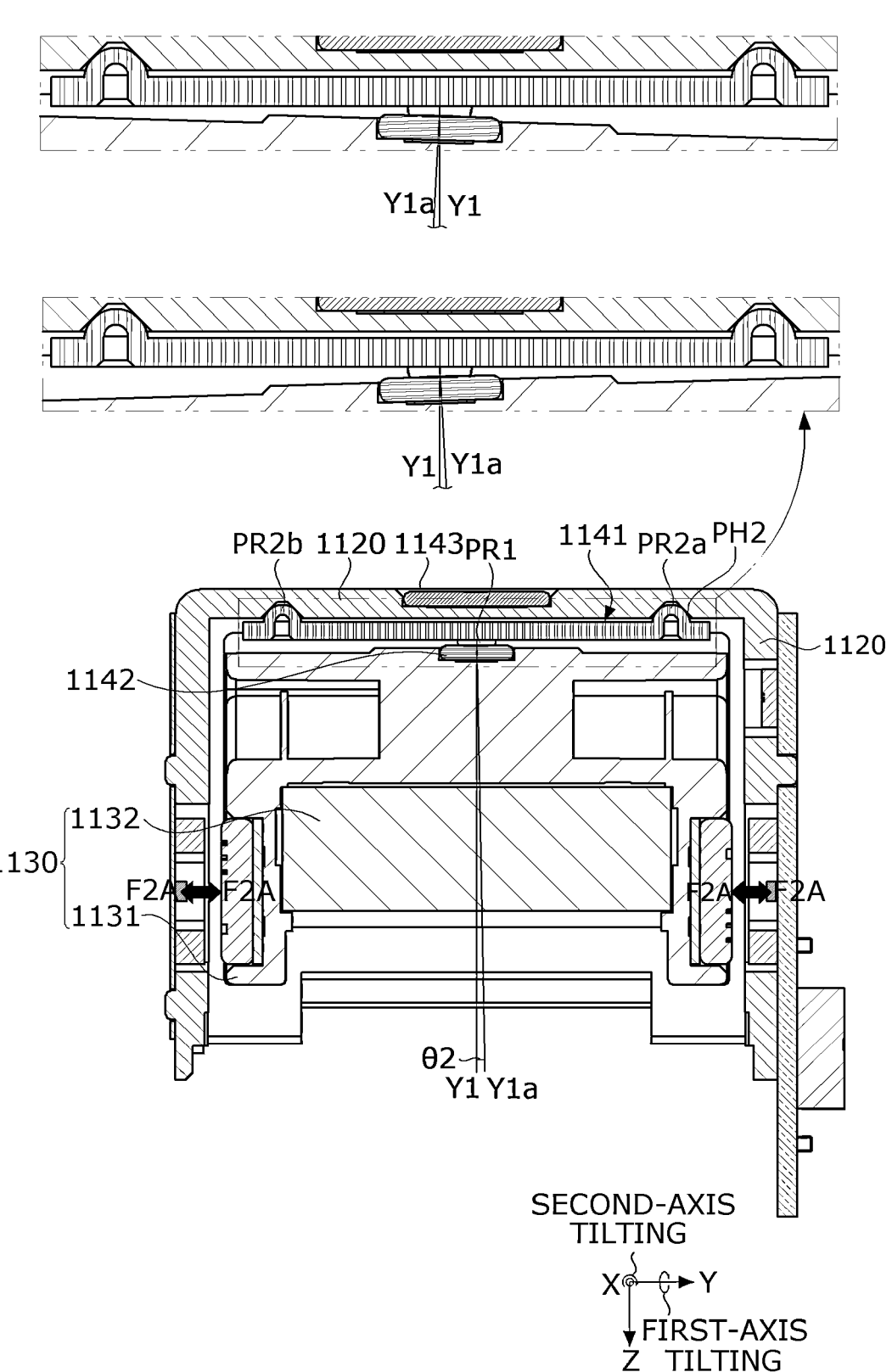
FIG. 36 is an exemplary view of the movement of the first camera actuator illustrated in FIG. 35.

FIG. 34 is a perspective view of the first camera actuator according to the embodiment, FIG. 35 is a cross-sectional view taken along line E-E' in FIG. 34, and FIG. 36 is an exemplary view of the movement of the first camera actuator illustrated in FIG. 35.

Referring to FIGS. 34 to 36, an OIS can be implemented as the mover 1130 tilts or rotates in the Y-axis direction.

In the embodiment, the first magnet 1151*a* and the second magnet 1151*b* disposed in the holder 1131 may tilt or rotate the mover 1130 in the second direction (Y-axis direction) by generating the electromagnetic force with the first coil 1152*a* and the second coil 1152*b*, respectively.

In the first camera actuator according to the embodiment, components tilted in the first direction or tilted in the second direction may be different.

Specifically, the housing and the mover 1130 may be coupled by the second magnetic part 1143 in the tilting guide unit 1141. In addition, as described above, the plurality of first protruding portions PR1 may be spaced apart in the first direction (X-axis direction) to support the mover 1130. In addition, the 2-1 protrusion PR2*a* and the 2-2 protrusion PR2*b* may be in contact with the housing 1120 to support the housing 1120.

In addition, the tilting guide unit 1141 may be rotated or tilted in the first direction (X-axis direction) using the first protruding portion PR1 protruding toward the mover 1130 as a reference axis (or a rotation axis).

For example, an OIS can be implemented by rotating (Y1→Y1*a* or Y1*b*) the mover 130 at a second angle θ2 in the Y-axis direction by second electromagnetic forces F2A and F2B between the first and second magnets 1151*a* and 1151*b* disposed in the first seating groove and the first and second coils 1152*a* and 1152*b* disposed on the first and second board side portions. The second angle θ2 may be in a range of ±1° to ±3°. However, the present invention is not limited thereto.

As described above, the first camera actuator according to the embodiment may control the mover 1130 to rotate in the first direction (X-axis direction) or the second direction (Y-axis direction) by the electromagnetic force between the driving magnet in the prism holder and the driving coil disposed in the housing, thereby minimizing the occurrence of a decentering or tilting phenomenon and providing the best optical characteristics upon implementing an OIS. In addition, as described above, "Y-axis tilting" is rotation or tilting in the first direction (X-axis direction), and "X-axis tilting" is rotating or tilting in the second direction (Y-axis direction)

Figure 37:
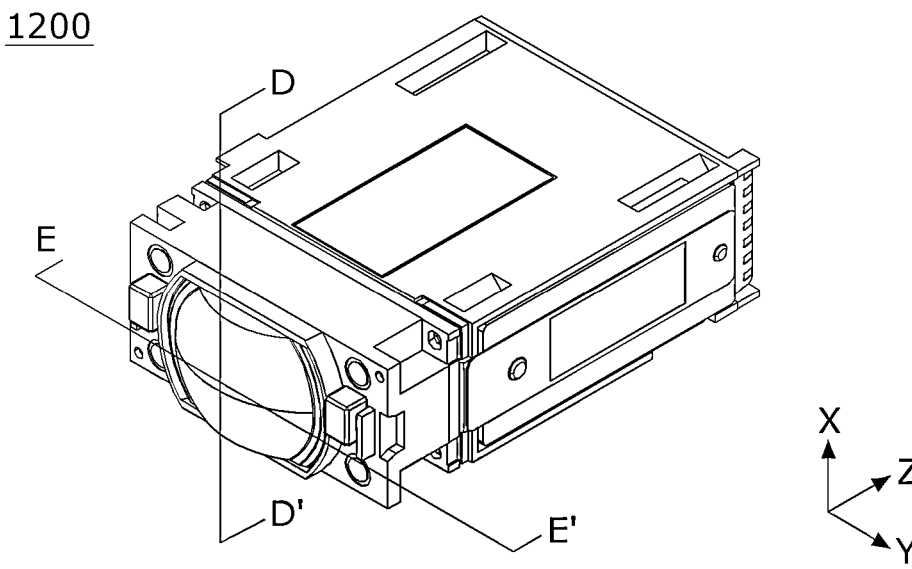
FIG. 37 is a perspective view of a second camera actuator according to the embodiment.
Figure 38:
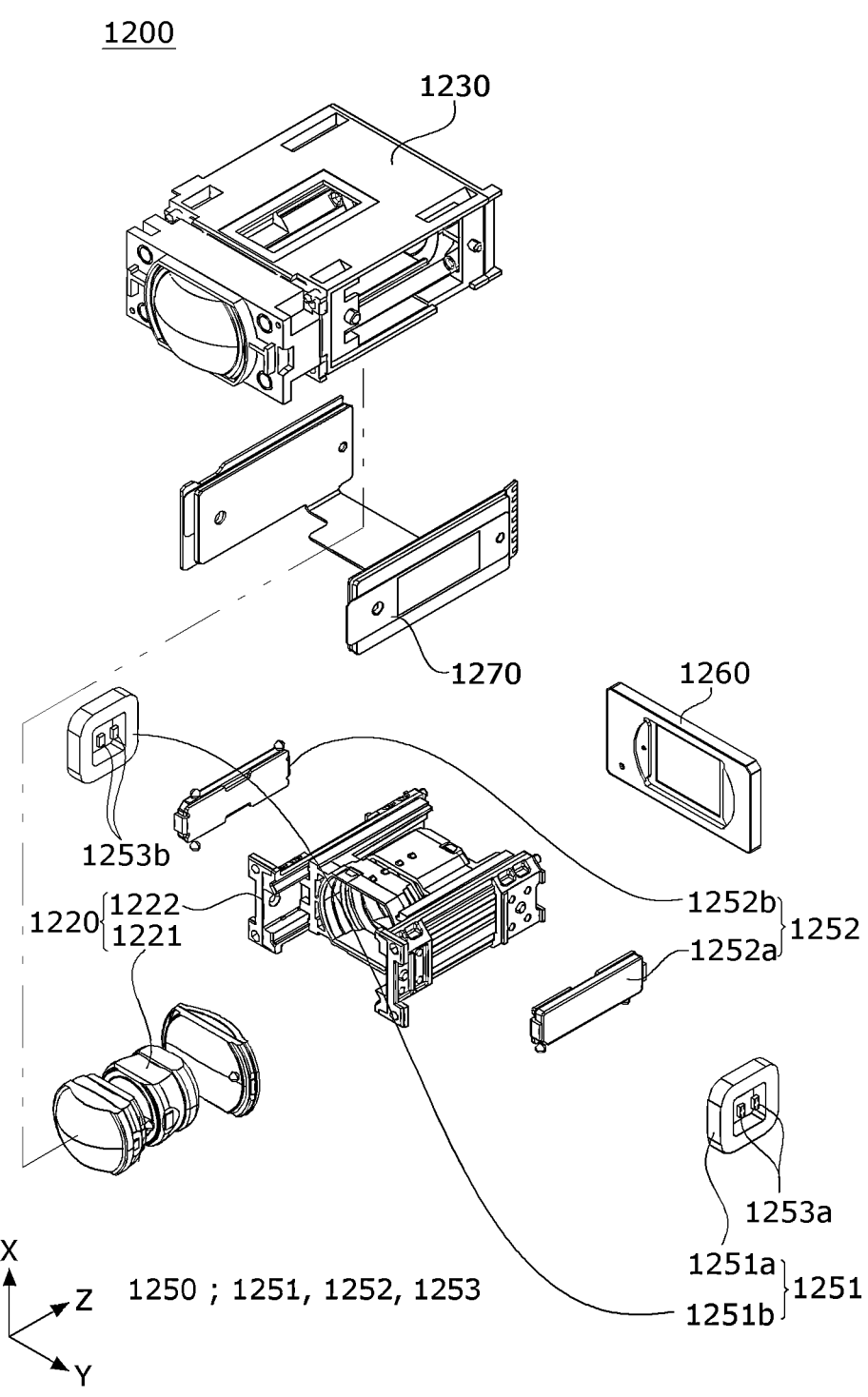
FIG. 38 is an exploded perspective view of the second camera actuator according to the embodiment.
Figure 39:
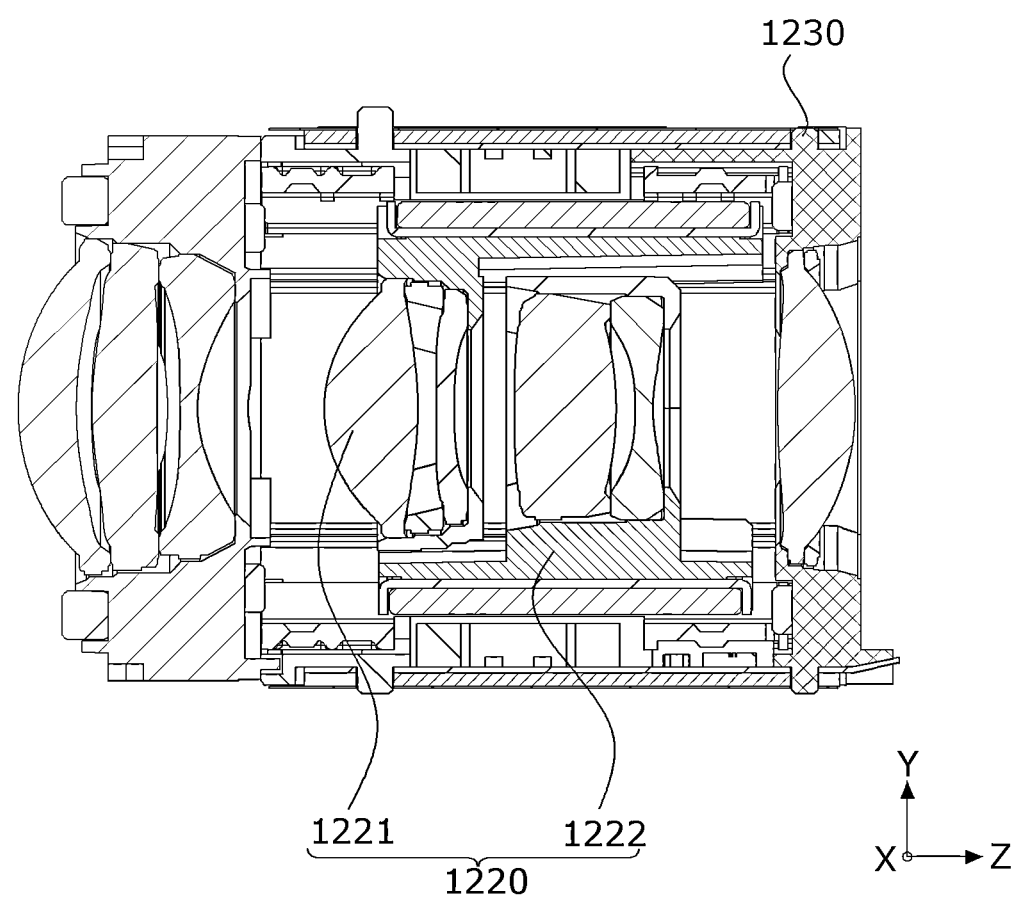
FIG. 39 is a cross-sectional view taken in FIG. 37.
Figure 40:
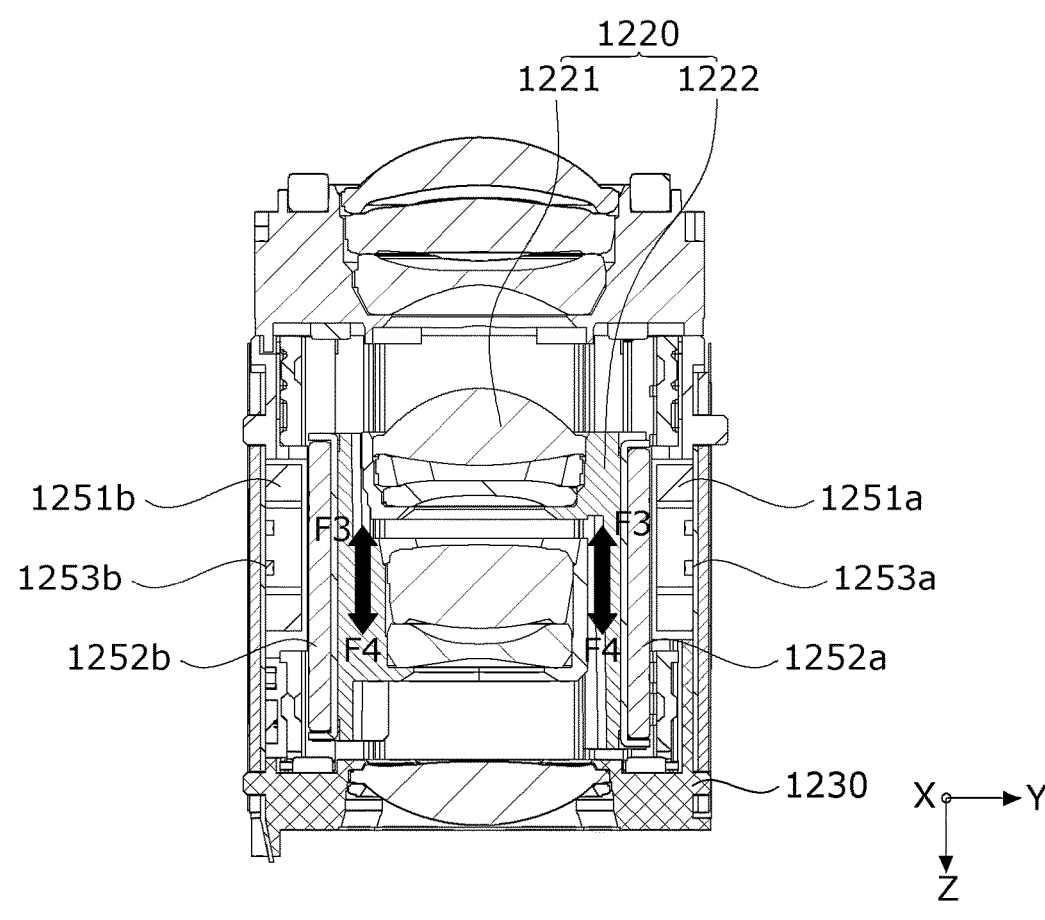
FIG. 40 is a cross-sectional view taken in FIG. 37.

FIG. 37 is a perspective view of a second camera actuator according to the embodiment, FIG. 38 is an exploded perspective view of the second camera actuator according to the embodiment, FIG. 39 is a cross-sectional view taken along line G-G' in FIG. 37, and FIG. 40 is a cross-sectional view taken along line H-H' in FIG. 37.

Referring to FIGS. 37 to 40, the second camera actuator 1200 according to the embodiment may include a lens unit 1220, a second housing 1230, a second driving unit 1250, a base unit (not illustrated), and a second board unit 1270. Furthermore, the second camera actuator 1200 may further include a second shield can (not illustrated), an elastic unit (not illustrated), and a bonding member (not illustrated). Furthermore, the second camera actuator 1200 according to the embodiment may further include the image sensor IS.

The second shield can (not illustrated) may be positioned in one area (e.g., an outermost side) of the second camera actuator 1200 and positioned to surround the components (the lens unit 1220, the second housing 1230, the second driving unit 1250, the base unit (not illustrated), the second board unit 1270, and the image sensor IS) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction). Therefore, the above-described AF function may be performed.

Specifically, the lens unit 1220 may include a lens assembly 1221 and a bobbin 1222.

The lens assembly 1221 may include at least one lens. In addition, although a plurality of lens assemblies 1221 may be formed, the following description will be made based on one lens assembly.

The lens assembly 1221 may be coupled to the bobbin 1222 and moved in the third direction (Z-axis direction) by an electromagnetic force generated from a fourth magnet 1252*a* and a fifth magnet 1252*b* coupled to the bobbin 1222.

The bobbin 1222 may include an opening area surrounding the lens assembly 1221. In addition, the bobbin 1222 may be coupled to the lens assembly 1221 by various methods. In addition, the bobbin 1222 may include a groove in a side surface thereof and may be coupled to the fourth magnet 1252*a* and the second magnet 1252*b* through the groove. A bonding member or the like may be applied to the groove.

In addition, the bobbin 1222 may be coupled to elastic units (not illustrated) on an upper end and a lower end thereof. Therefore, the bobbin 1222 may be supported by the elastic units (not illustrated) while moving in the third direction (Z-axis direction). In other words, the bobbin 1222 may be moved in the third direction (Z-axis direction) while a position thereof is maintained. The elastic unit (not illustrated) may be formed of a leaf spring.

The second housing 1230 may be disposed between the lens unit 1220 and the second shield can (not illustrated). In addition, the second housing 1230 may be disposed to surround the lens unit 1220.

The second housing 1230 may have a hole formed in a side portion thereof. A fourth coil 1251*a* and a fifth coil 1251*b* may be disposed in the hole. The hole may be positioned to correspond to the above-described groove of the bobbin 1222.

The fourth magnet 1252*a* may be positioned to face the fourth coil 1251*a*. In addition, the second magnet 1252*b* may be positioned to face the fifth coil 1251*b*.

The elastic unit (not illustrated) may include a first elastic member (not illustrated) and a second elastic member (not illustrated). The first elastic member (not illustrated) may be coupled to an upper surface of the bobbin 1222. The second elastic member (not illustrated) may be coupled to a lower surface of the bobbin 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the bobbin 1222.

The second driving unit 1250 may provide driving forces F3 and F4 for moving the lens unit 1220 in the third direction (Z-axis direction). The second driving unit 1250 may include a driving coil 1251 (e.g., a second driving coil) and a driving magnet 1252 (e.g., a second driving magnet).

The lens unit 1220 may be moved in the third direction (Z-axis direction) by the electromagnetic force generated between the driving coil 1251 and the driving magnet 1252. A plurality of lens assemblies of the lens unit 1220 may be formed, and each may move separately in the third direction (Z-axis direction). In addition, the plurality of lens assemblies may move in the third direction (Z-axis direction) at the same time. Alternatively, the above may be implemented by a combination of these movements.

The driving coil 1251 may include the fourth coil 1251*a* and the fifth coil 1251*b*. The fourth coil 1251*a* and the fifth coil 1251*b* may be disposed in the holes formed in the side portions of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

The driving magnet 1252 may include the fourth magnet 1252*a* and the fifth magnet 1252*b*. The fourth magnet 1252*a* and the fifth magnet 1252*b* may be disposed in the above-described groove of the bobbin 1222 and positioned to correspond to the fourth coil 1251*a* and the fifth coil 1251*b*.

The base unit (not illustrated) may be positioned between the lens unit 1220 and the image sensor IS. A component such as a filter may be fixed to the base unit (not illustrated). In addition, the base unit (not illustrated) may be disposed to surround the image sensor IS. With this configuration, since the image sensor IS is free from foreign substances and the like, it is possible to improve the reliability of the element.

In addition, the second camera actuator may be a zoom actuator or an AF actuator. For example, the second camera actuator may support one lens or a plurality of lenses and perform an AF function or a zooming function by moving the lenses according to a predetermined control signal of a controller.

In addition, the second camera actuator may be a fixed zoom or a continuous zoom. For example, the second camera actuator may provide a movement of the lens assembly 1221.

In addition, the second camera actuator may be formed of a plurality of lens assemblies. For example, at least one of a first lens assembly, a second lens assembly (not illustrated), a third lens assembly (not illustrated), and a guide pin (not illustrated) may be disposed in the second camera actuator. The above-described contents may be applied thereto. Therefore, the second camera actuator may perform a high-magnification zooming function through the driving unit. For example, although the first lens assembly (not illustrated) and the second lens assembly (not illustrated) may be moving lenses that move through the driving unit and the guide pin (not illustrated) and the third lens assembly (not illustrated) may be a fixed lens, the present invention is not limited thereto. For example, the third lens assembly (not illustrated) may perform a function of a focator by which light forms an image at a specific position, and the first lens assembly (not illustrated) may perform a function of a variator for re-forming an image formed by the third lens assembly (not illustrated), which is the focator, at another position. Meanwhile, the first lens assembly (not illustrated) may be in a state in which a magnification change is large because a distance to a subject or an image distance is greatly changed, and the first lens assembly (not illustrated), which is the variator, may play an important role in a focal length or magnification change of the optical system. Meanwhile, imaging points of an image formed by the first lens assembly (not illustrated), which is the variator, may be slightly different depending on a position. Therefore, the second lens assembly (not illustrated) may perform a position compensation function for the image formed by the variator. For example, the second lens assembly (not illustrated) may perform a function of a compensator for accurately forming an image at an actual position of the image sensor using the imaging points of the image formed by the second lens assembly (not illustrated) that is the variator.

The image sensor IS may be positioned inside or outside the second camera actuator. In the embodiment, as illustrated, the image sensor IS may be positioned inside the second camera actuator. The image sensor IS may receive light and convert the received light into an electrical signal. In addition, the image sensor IS may include a plurality of pixels in the form of an array. In addition, the image sensor IS may be positioned on the optical axis.

Figure 41:
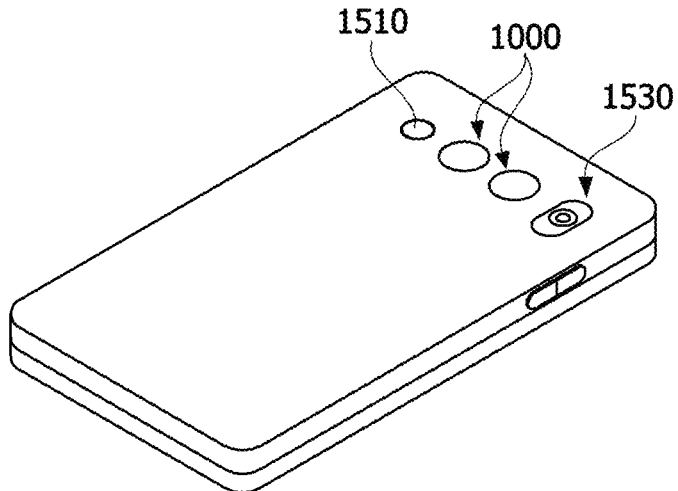
FIG. 41 is a perspective view of a mobile terminal to which the camera module according to the embodiment is applied.

FIG. 41 is a perspective view of a mobile terminal to which the camera module according to the embodiment is applied.

As illustrated in FIG. 41, a mobile terminal 1500 according to an embodiment may include a camera module 1000, a flash module 1530, and an AF device 1510, which are provided on a rear surface thereof.

The camera module 1000 may include an image photographing function and an AF function. For example, the camera module 1000 may include the AF function using an image.

The camera module 1000 processes an image frame of a still image or a moving image obtained by an image sensor in a photographing mode or a video call mode.

The processed image frame may be displayed on a predetermined display and stored in a memory. A camera (not illustrated) may also be disposed on a front surface of a body of the mobile terminal.

For example, the camera module 1000 may be formed of a plurality of camera modules. For example, the camera module 1000 may include a first camera module 1000A and a second camera module 1000B, and the first camera module 1000A may include the above-described first camera actuator and second camera actuator, etc. Therefore, an OIS can be implemented together with the AF or zooming function by the first camera module 1000A.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition that the AF function using the image of the camera module 1000 is degraded, for example, a proximity of 10 m or less or dark environment.

The AF device 1510 may include a light emitting unit including a vertical cavity surface emitting laser (VCSEL) semiconductor device and a light receiving unit for converting light energy into electrical energy, such as a photodiode.

Figure 42:
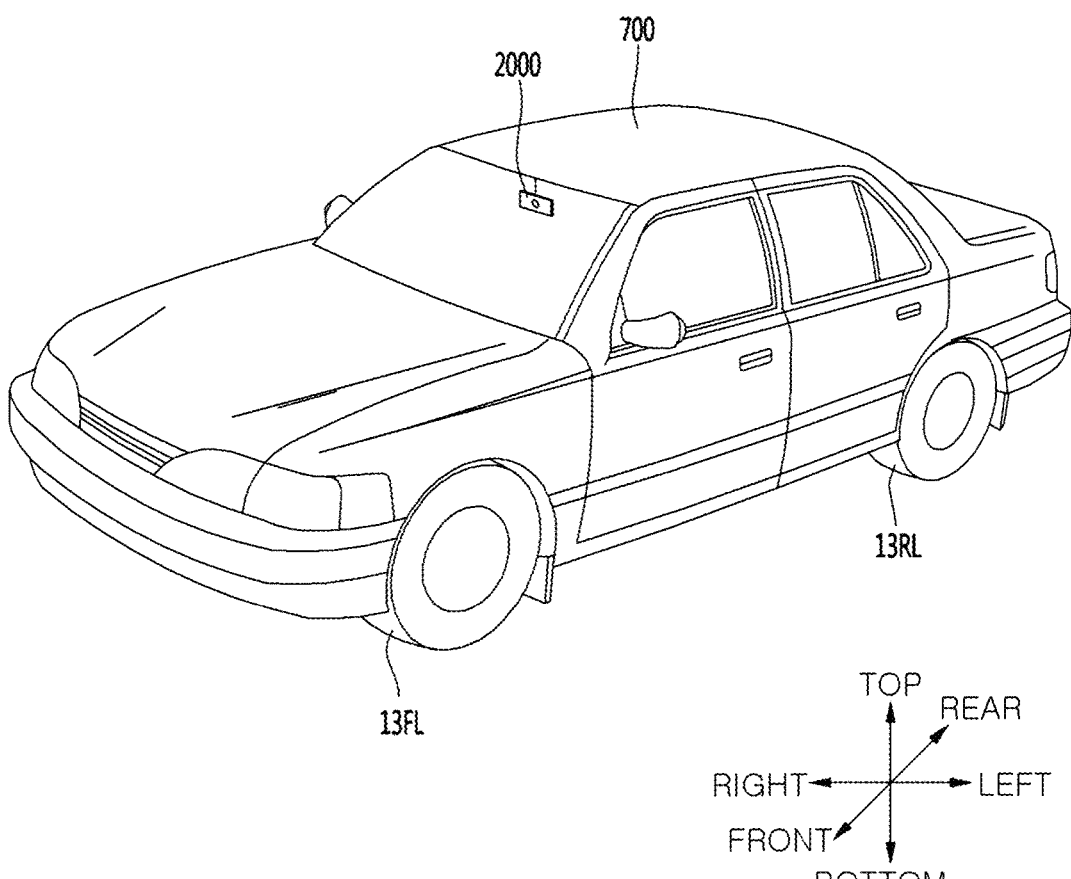
FIG. 42 is a perspective view of a vehicle to which camera module according to the embodiment is applied.

FIG. 42 is a perspective view of a vehicle to which the camera module according to the embodiment is applied.

For example, FIG. 42 is an external view of the vehicle including a vehicle driver assistance device to which the camera module 1000 according to the embodiment is applied.

Referring to FIG. 42, a vehicle 700 according to the embodiment may include wheels 13FL and 13FR rotated by a power source and a predetermined sensor. Although the sensor may be a camera sensor 2000, the present invention is not limited thereto.

The camera sensor 2000 may be a camera sensor to which the camera module 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by photographing a view in front of the vehicle 700, and a processor (not illustrated) may acquire image information by analyzing an object included in the forward image.

For example, when a lane line, an adjacent vehicle, a traveling obstacle, and objects, such as a median, a curb, or a tree corresponding to an indirect road mark, are photographed in the image captured by the camera sensor 2000, the processor may detect the object and include the detected object in the image information. At this time, the processor may further supplement the image information by acquiring distance information to the object detected through the camera sensor 2000.

The image information may be information on the object photographed in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, although the camera sensor 2000 may include a stereo camera for improving the measurement accuracy of the object and further securing information such as a distance between the vehicle 700 and the object, the present invention is not limited thereto.

In addition, for convenience of description in FIGS. 43 to 67 below, the camera device according to the embodiment will be described using a Cartesian coordinate system (x, y, z), but may be described using another coordinate system, and the embodiment is not limited thereto. In each drawing, the X-axis and the Y-axis directions may refer to directions perpendicular to the Z-axis direction, which is the optical axis (OA) direction. In addition, the Z-axis direction, which is the optical axis (OA) direction, may be referred to as "first direction," the X-axis direction may be referred to as "second direction," and the Y-axis direction may be referred to as "third direction." In addition, the Y-axis may be referred to as "first axis," the Y-axis direction may be referred to as "first axis direction," the X-axis may be referred to as "second axis," and the X-axis direction may be referred to as "second axis direction."

Furthermore, each component of the above-described first and second actuators may be described differently in FIGS. 43 to 67 below. However, the terms described in FIGS. 43 to 72 below and the terms described in FIGS. 1 to 42 are different but may be used interchangeably. Furthermore, the descriptions (e.g., a structure and a positional relationship) made with reference to FIGS. 1 to 42 may also be applied to the camera device or camera module illustrated in FIGS. 43 to 72 in the same manner. In addition, the reverse is also possible.

In addition, the term "terminal" below may be interchangeably expressed as a pad, an electrode, or a conductive layer.

In addition, the term "code value" below may be interchangeably expressed as data or a digital value.

In addition, in embodiments, in the coupling between a protrusion and a hole for coupling two components, any one of the components may be a coupling protrusion (or a coupling hole), and the other one may be a coupling hole (or a coupling protrusion) correspondingly.

Figure 43:
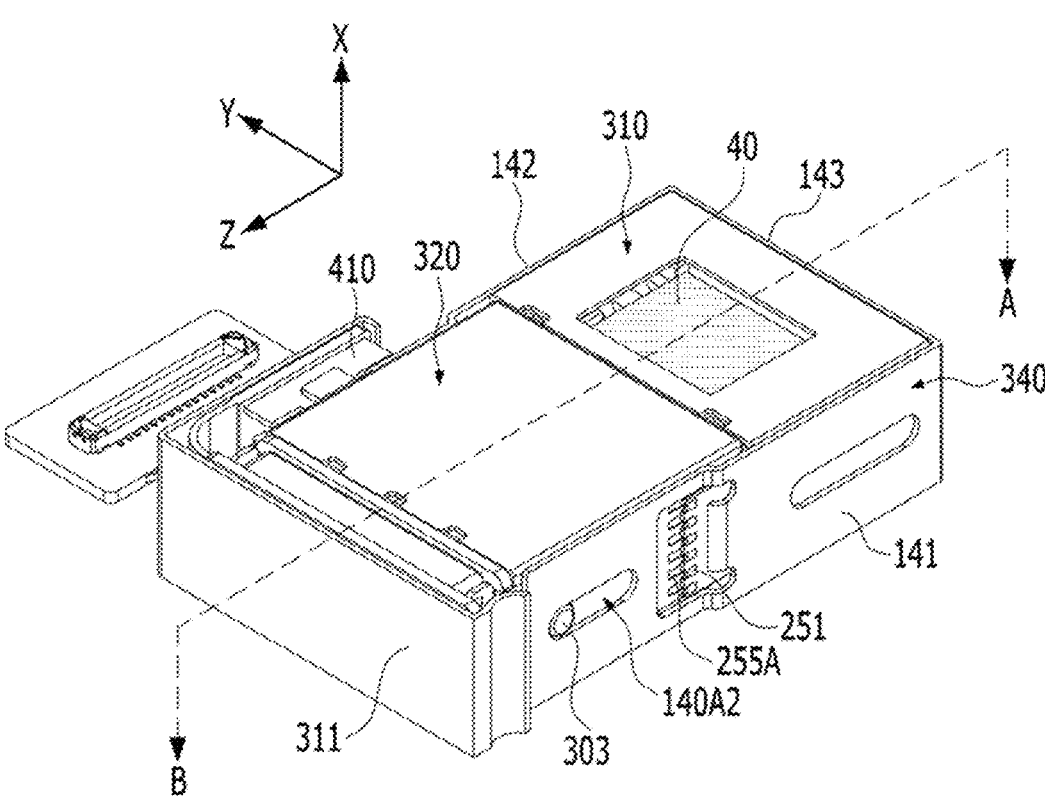
FIG. 43 is a first perspective view of a camera device according to an embodiment.
Figure 44:
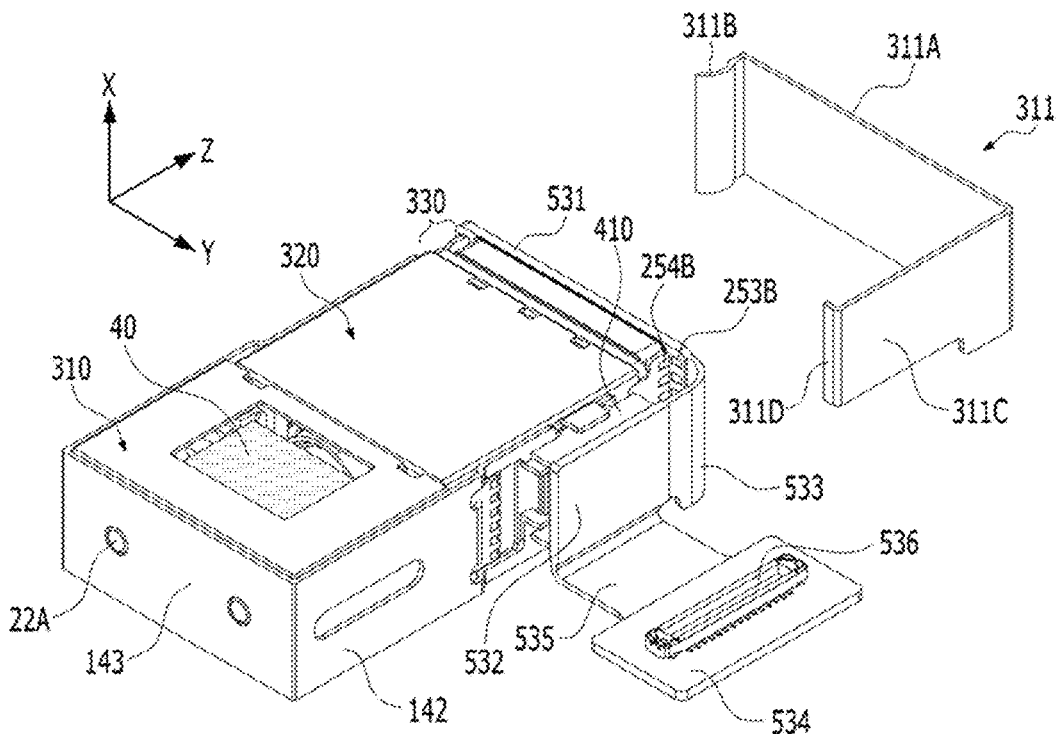
FIG. 44 is a second perspective view of the camera device according to the embodiment.
Figure 45:
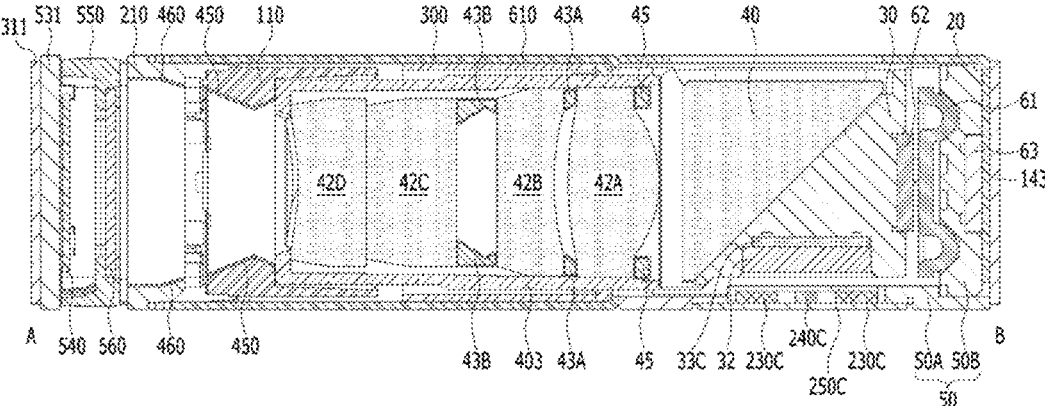
FIG. 45 is a cross-sectional view of the camera device in FIG. 43 in an A-B direction.

FIG. 43 is a first perspective view of a camera device 200 according to the embodiment, FIG. 44 is a second perspective view of the camera device 200 according to the embodiment, and FIG. 45 is a cross-sectional view of the camera device 200 in FIG. 43 in an A-B direction.

Referring to FIGS. 43 to 45, the camera device 200 may include a first actuator 310, a second actuator 320, and an image sensing unit 330.

The first actuator 310 may move an optical member 40, and thus perform an OIS operation for performing hand shaking correction and may be interchangeably expressed as "second driving unit" or "OIS driving unit."

The first actuator 310 may change an optical path. For example, the first actuator 310 may include the optical member 40 for changing the optical path. The first actuator 310 may be alternatively expressed as "optical path changing unit."

The second actuator 320 may move the lens module 400 in the optical axis direction, and thus perform AF and/or zooming functions. The zooming function according to the embodiment may be a fixed zoom for moving one lens barrel (or a lens group), but is not limited thereto. In another embodiment, the zooming function may be a continuous zoom in which two or more lens barrels (or two or more lens groups) move independently. For example, in the continuous zoom, one lens group may be a zoom lens in charge of zooming, and the other lens group may be a focus lens in charge of focus.

The second actuator 320 may be interchangeably expressed as "first driving unit" or "AF driving unit." The first actuator 310 may be interchangeably expressed as "second actuator," and the second actuator 320 may be interchangeably expressed as "first actuator." For example, the lens module 400 may include at least one lens or lens array. For example, the lens module 400 may include various types of optical lenses. For example, the lens module 400 may include a front lens having positive power and a rear lens having negative power.

For example, the second actuator 320 may be disposed at a rear end of the first actuator 310 and coupled to the first actuator 310. For example, the second actuator 320 may be disposed between the first actuator 310 and the image sensing unit 330.

The image sensing unit 330 may receive and detect light passing through the optical member 40 of the first actuator 310 and the lens module 400 of the second actuator 320 and convert the detected light into an electrical signal.

The camera device 200 may further include a support holder 340 for accommodating, supporting, or fixing at least one of the first actuator 310, the second actuator 320, and the image sensing unit 330. The support holder 340 may be interchangeably expressed as a side bar, a housing, or a case. The support holder 340 may be coupled to the first actuator 310 and the second actuator 320.

Figure 46:
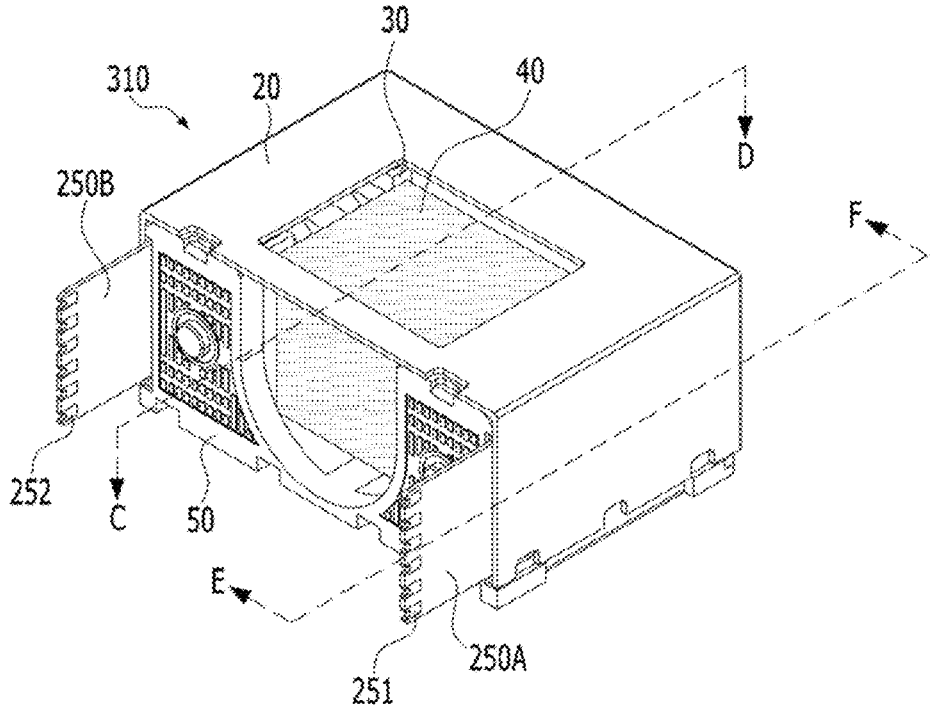
FIG. 46 is a perspective view of a first actuator illustrated in FIG. 43.
Figure 47:
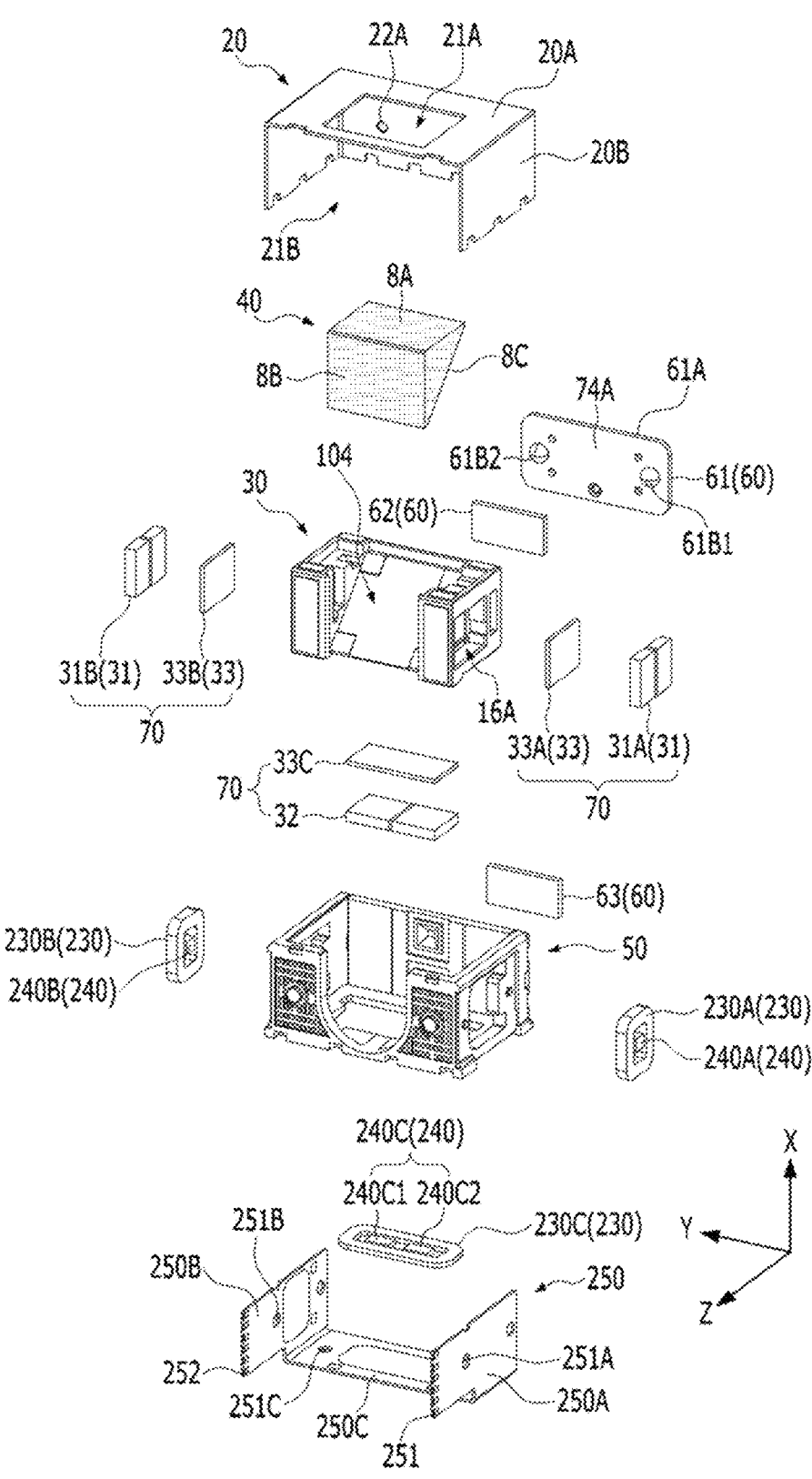
FIG. 47 is an exploded perspective view of the first actuator.
Figure 48A:
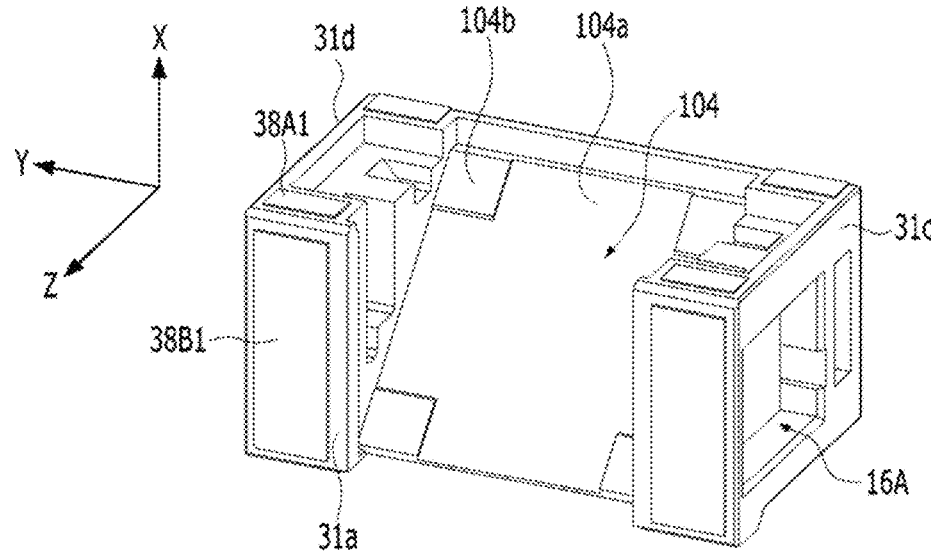
FIG. 48A is a front perspective view of a holder of the first actuator in FIG. 47.
Figure 48B:
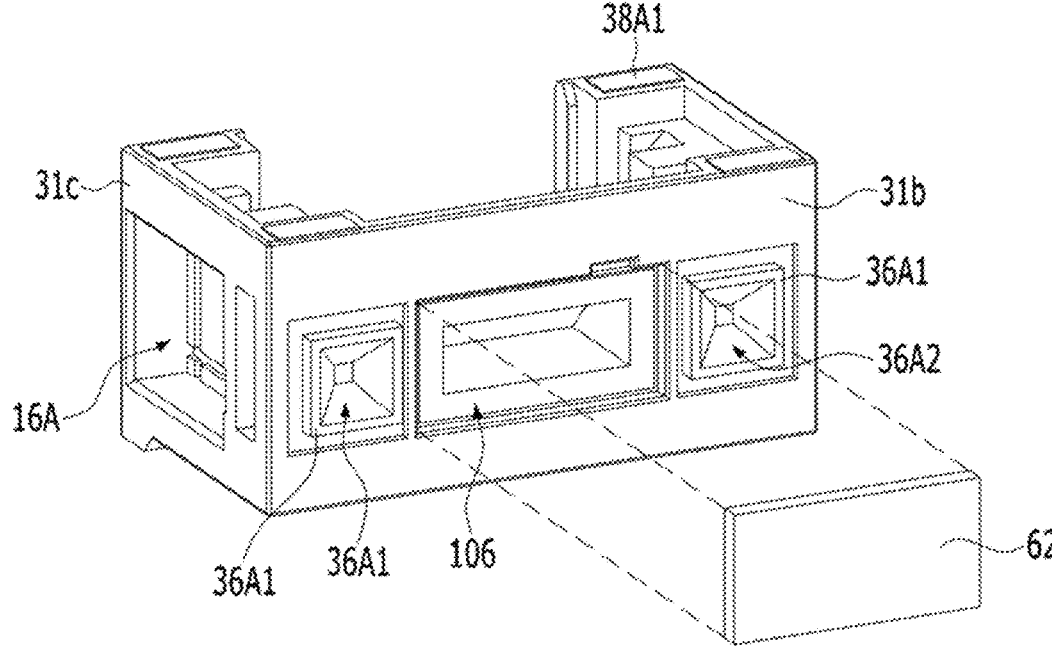
FIG. 48B is a rear perspective view of the holder.
Figure 48C:
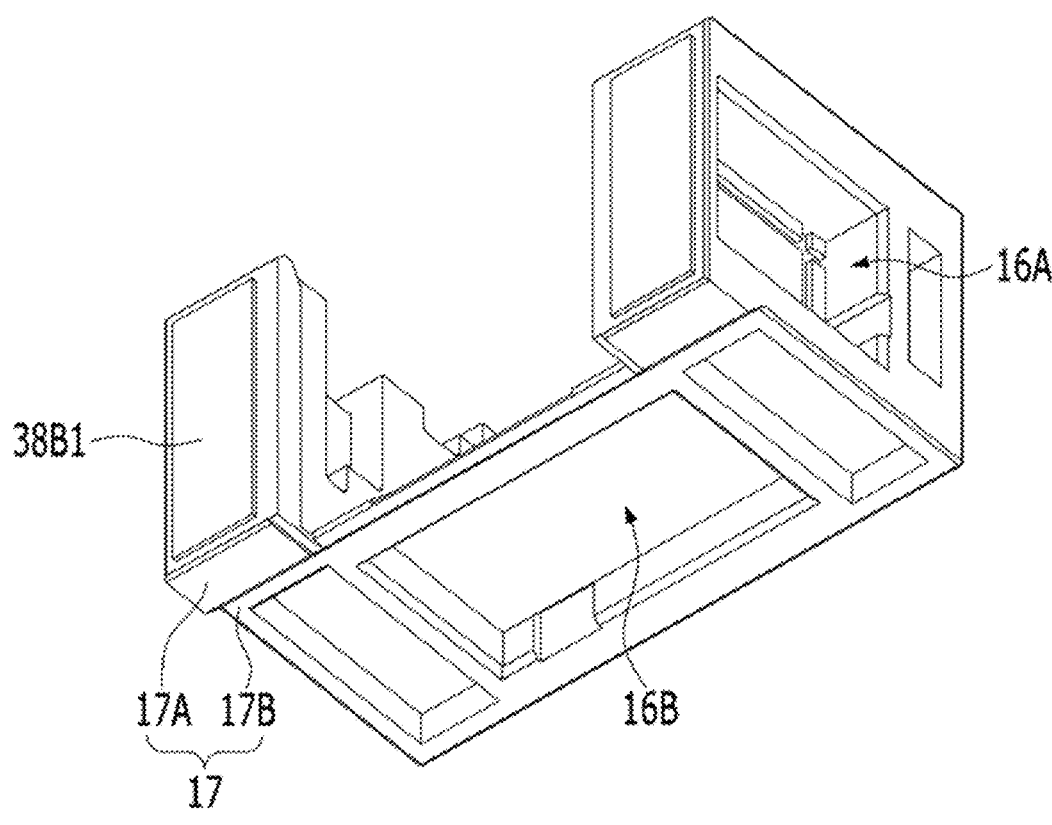
FIG. 48C is a bottom perspective view of the holder.
Figure 49A:
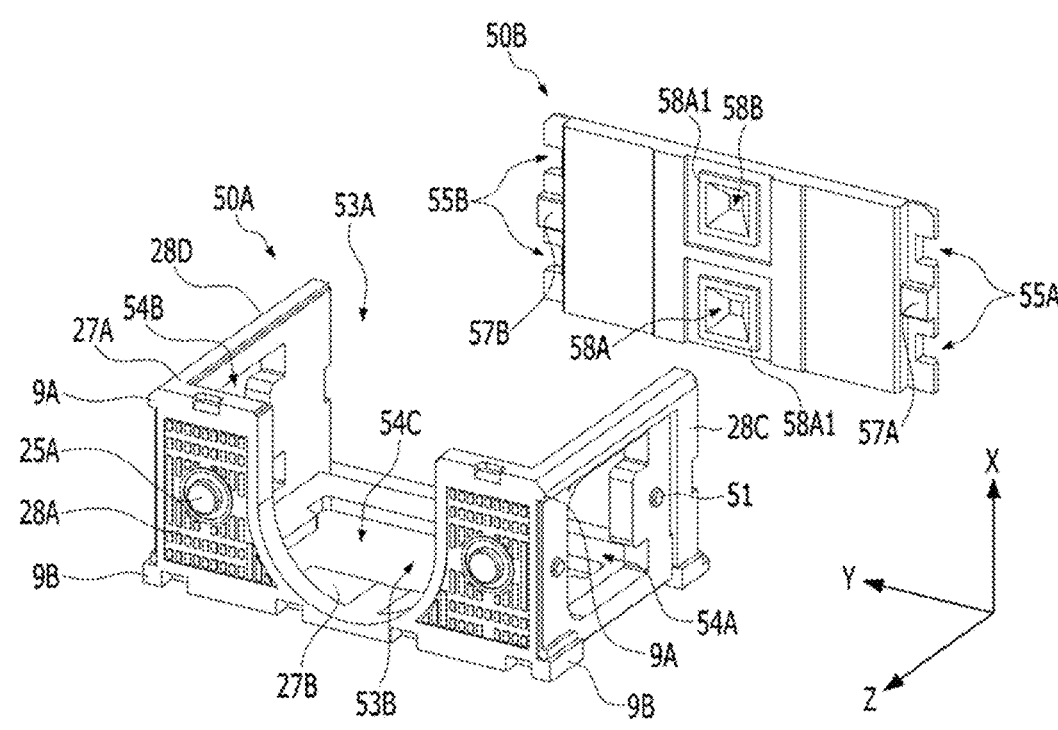
FIG. 49A is a front perspective view of a first housing.
Figure 49B:
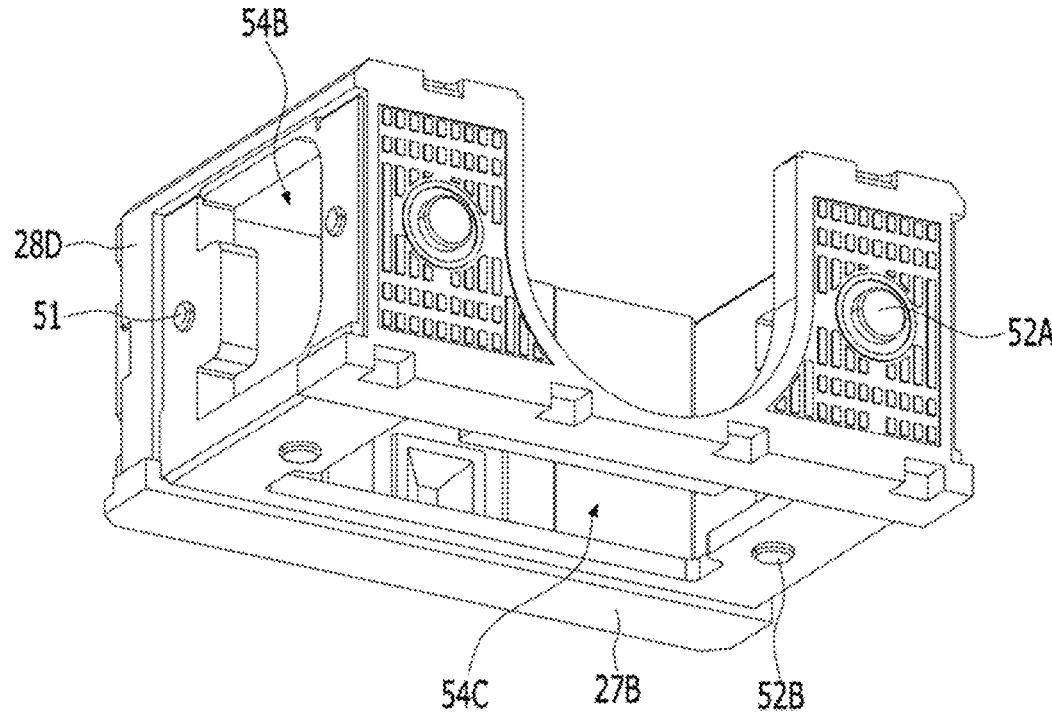
FIG. 49B is a bottom perspective view of the first housing.
Figure 49C:
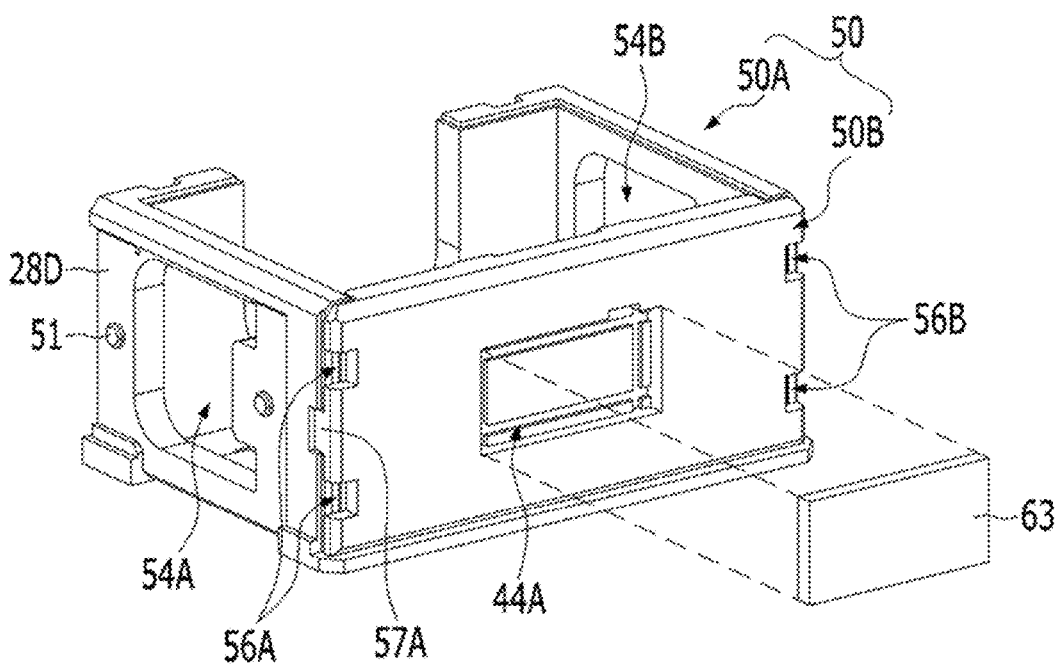
FIG. 49C is a rear perspective view of the first housing.
Figure 50A:
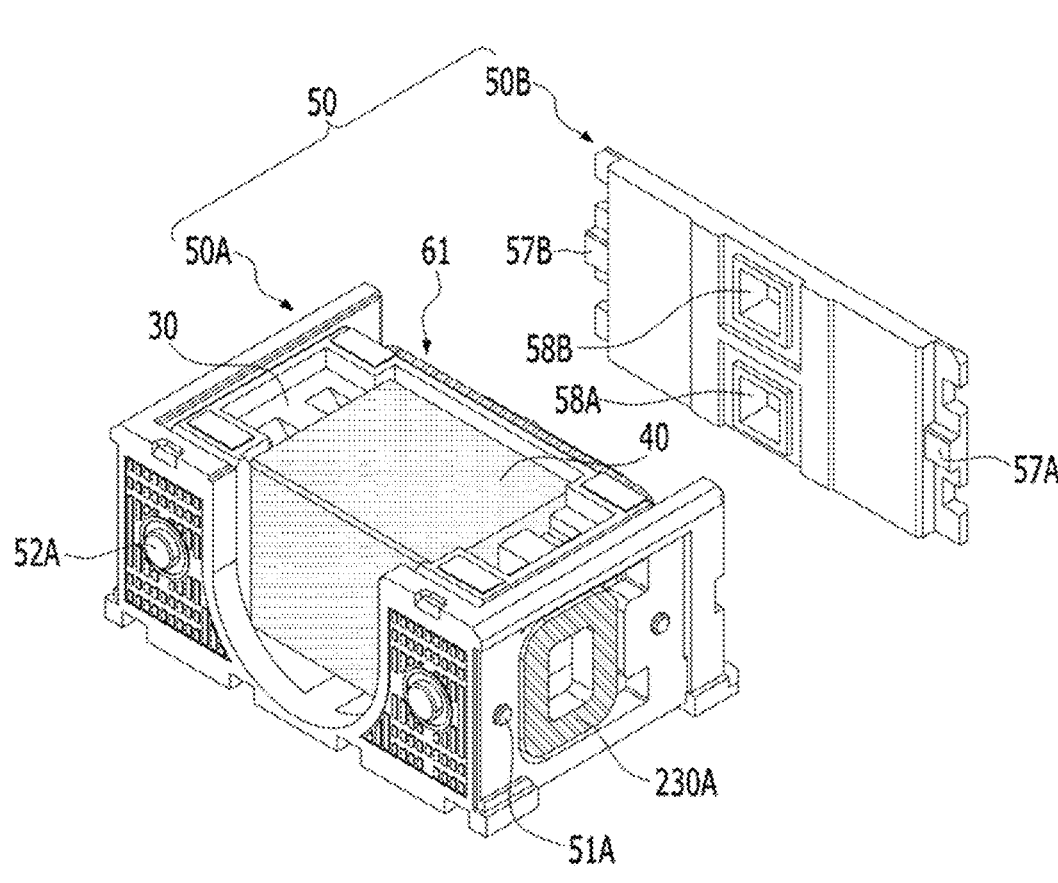
FIG. 50A is a perspective view of the holder, a driving plate, and the first housing.
Figure 50B:
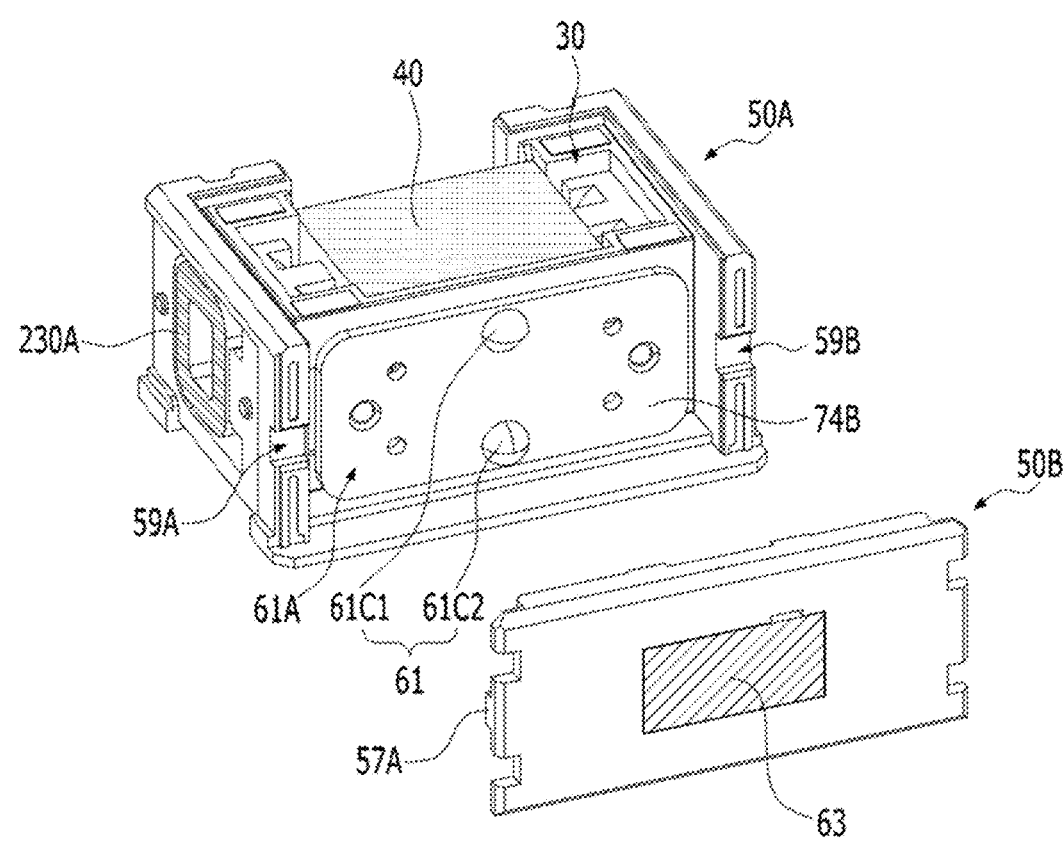
FIG. 50B is a perspective view of the holder, the driving plate, the optical member, and a second magnetic part.
Figure 51A:
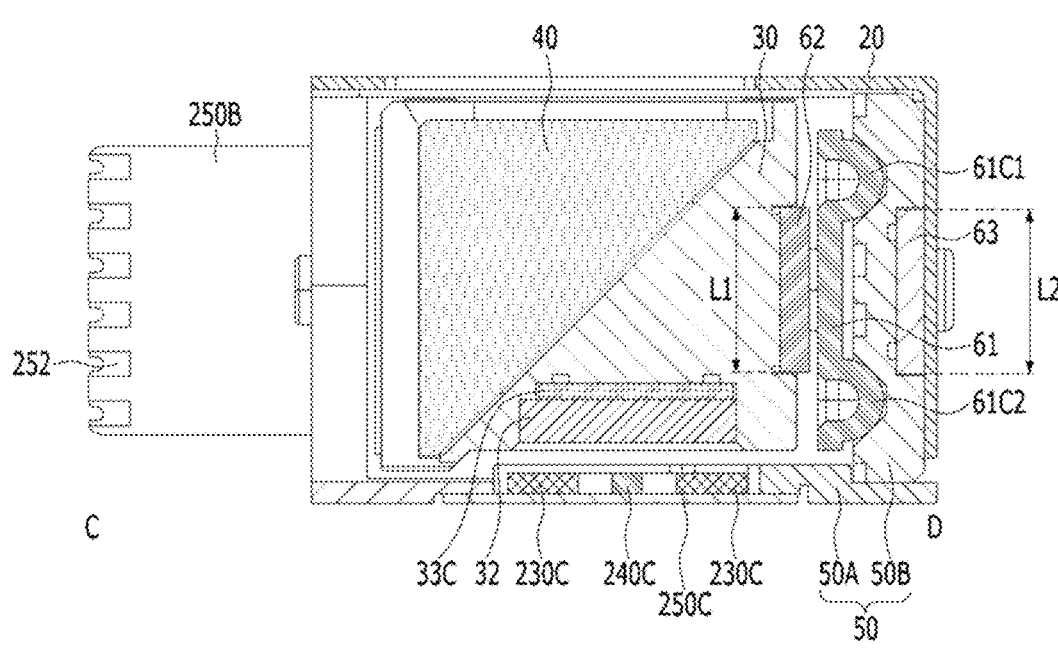
FIG. 51A is a cross-sectional view of the first actuator in FIG. 46 in a C-D direction.
Figure 51B:
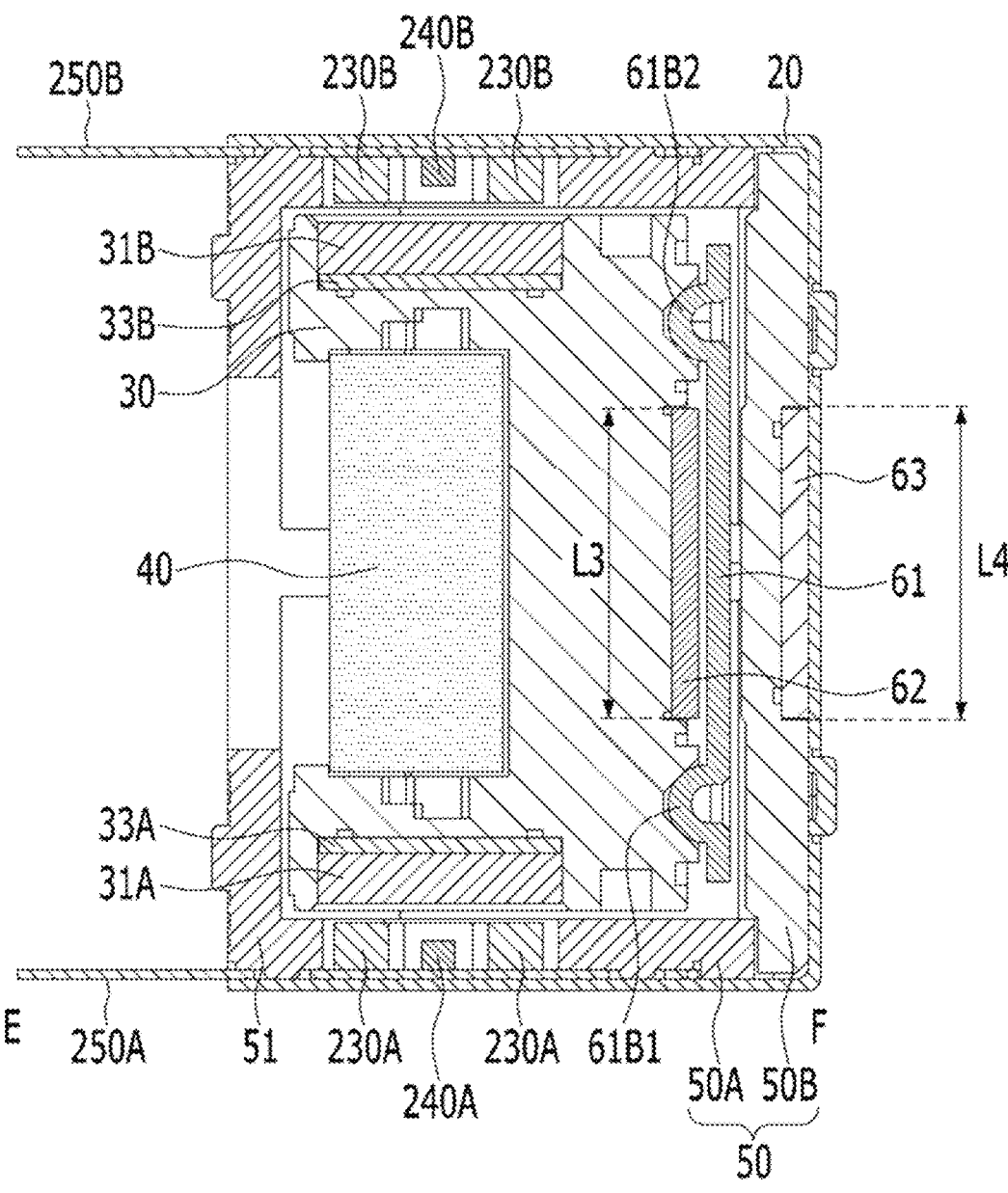
FIG. 51B is a cross-sectional view of the first actuator in FIG. 46 in an E-F direction.
Figure 52:
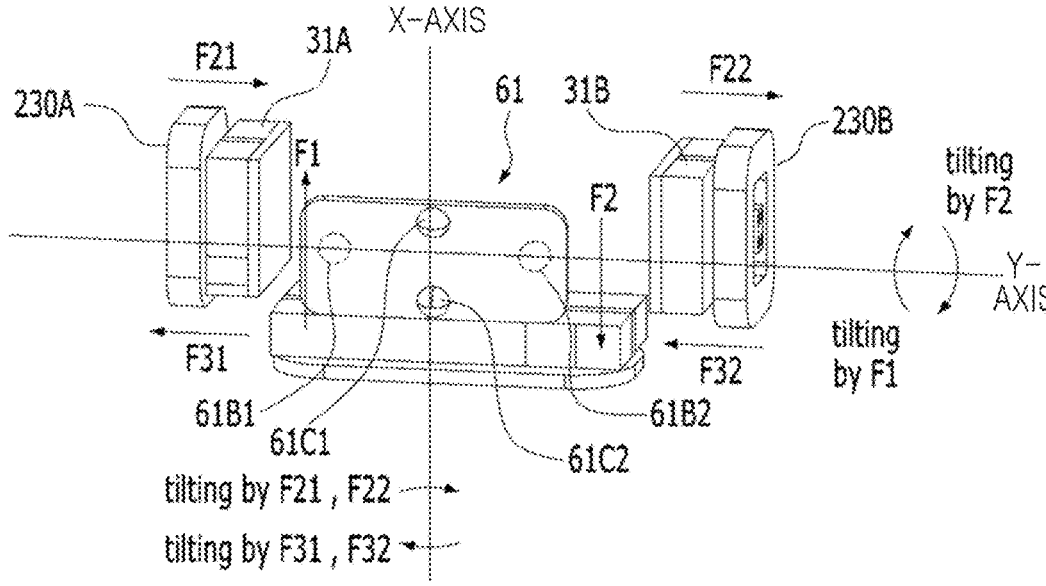
FIG. 52 is a view for describing an electromagnetic force generated by interaction between first to third OIS magnets and first to third coil units and a movement of the driving plate.

FIG. 46 is a perspective view of the first actuator 310 illustrated in FIG. 43, FIG. 47 is an exploded perspective view of the first actuator 310, FIG. 48A is a front perspective view of a holder 30 of the first actuator 310 in FIG. 47, FIG. 48B is a rear perspective view of the holder 30, FIG. 48B is a bottom perspective view of the holder 30, FIG. 49A is a front perspective view of a first housing 50, FIG. 49B is a bottom perspective view of the first housing 50, FIG. 49C is a rear perspective view of the first housing 50, FIG. 50A is a perspective view of the holder 40, a driving plate 61, and the first housing 50, FIG. 50B is a perspective view of the holder 30, the driving plate 61, the optical member 40, and a second magnetic part 63, FIG. 51A is a cross-sectional view of the first actuator 310 in FIG. 46 in a C-D direction, FIG. 51B is a cross-sectional view of the first actuator 310 in FIG. 46 in an E-F direction, and FIG. 52 is a view for describing an electromagnetic force generated by interaction between first to third OIS magnets 31A, 31B, and 31C and first to third coil units 230A to 230C and a movement of the driving plate 61.

Referring to FIGS. 46 to 52, the first actuator 310 may include the optical member 40 and a first driving unit 70 for rotating the optical member 40 at a preset angle in a direction (e.g., the X-axis direction or the Y-axis direction) perpendicular to the optical axis direction (e.g., the Z-axis direction).

The optical member 40 may change the optical path so that light passing through an opening 21A of a first cover member 20 enters the second actuator 320. For example, the optical member 40 may change light entering in the X-axis direction into the optical axis direction (Z-axis direction).

The optical member 40 may include a reflective unit capable of changing a proceeding direction of light. For example, the optical member 40 may be a prism for reflecting light, but is not limited thereto and may be a mirror in another embodiment.

The optical member 40 may change the incident light into parallel light by changing the optical path of the incident light into the optical axis parallel to the central axis (Z-axis) of the lens module 400, and the parallel light may pass through the lens module 400 and reach an image sensor 540.

For example, the optical member 40 may include an incident surface 8A and an emission surface 8B and reflect light entering the incident surface 8A and emit the light to the emission surface 8B. For example, the optical member 40 may be a right angle prism including the incident surface 8A, a reflective surface 8C, and the emission surface 8B. For example, an inner angle between the incident surface 8A and the emission surface 8B may be a right angle.

In addition, for example, each of a first inner angle between the incident surface 8A and the reflective surface 8C and a second inner angle between the emission surface 8B and the reflective surface 8C may be in a range of 30 to 60 degrees. For example, each of the first inner angle and the second inner angle may be 45 degrees, but is not limited thereto. In addition, due to the change in the optical path by the optical member 40, it is possible to decrease a thickness of the camera device 200 in a direction perpendicular to the incident surface 8A of the optical member 40, thereby decreasing a thickness of the mobile device or the terminal 200A in which the camera device 200 is mounted.

For example, the first actuator 310 may include the first housing 50, the holder 30 disposed in the first housing 50, the optical member 40 disposed in the holder 30, a support part 60 disposed between the holder 30 and the first housing 50, and the first driving unit 70.

In addition, for example, the first actuator 310 may further include the first cover member 20 for accommodating the first housing 50. The first cover member 20 may have a box shape with an open lower portion and include an upper plate 20A and a side plate 20B. For example, a plurality of side plates 20B, for example, three side plates 20B may be formed.

The opening 21A or a hole exposing the incident surface 8A of the optical member 40 may be formed in the upper plate 20A of the first cover member 20. At least one protrusion 22A for coupling with a hole 140A1 of the support holder 340 in FIG. 44 may be formed on the side plate 20B of the first cover member 20. The at least one protrusion 22A may protrude from the side plate 20B in the optical axis direction (e.g., the Z-axis direction).

The first cover member 20 may be formed of a metal plate, but is not limited thereto, and may be made of a plastic or resin material. In addition, for example, the first cover member 20 may be made of a material that blocks electromagnetic waves. An opening 21B or hole that exposes the emission surface 8B of the optical member 40 may be formed in the side plate 20B of the first cover member 20.

Referring to FIGS. 47 and 48A to 48C, the holder 30 may include a seating unit 104 on which the optical member 40 is disposed or mounted. The seating unit 104 may have a groove shape and have a mounting surface 104a (or a seating surface) on which the reflective surface 8C of the optical member 40 is disposed. For example, the mounting surface 104a may be an inclined surface that is inclined with respect to the optical axis direction (e.g., the Z-axis direction).

For example, an adhesive for attaching the optical member 40 may be disposed on the mounting surface 104a of the holder 30. For example, in another embodiment, at least one groove for accommodating the adhesive may be formed in the mounting surface 104a.

For example, the holder 30 may include a first opening exposing the incident surface 8A of the optical member 40 and a second opening exposing the emission surface 8B of the optical member 40. For example, the first opening may be disposed in an upper side of the holder 30, and the second opening may be disposed in one side surface 31a (front outer side surface) of the holder 30 facing the lens module 400 of the second actuator 320. The emission surface 8B of the optical member 40 mounted on the holder 30 may be disposed to face the lens module 400 of the second actuator 320.

For example, at least one stopper 38A1 may be formed on the upper surface of the holder 30. The at least one stopper 38A1 may be a protrusion or protruding portion that protrudes upward from an upper surface 18 of the holder 30. For example, the at least one stopper 38A1 may be disposed on the upper surface adjacent to at least one of a front outer surface 31a and a rear outer surface 31b of the holder 30. Tilting or rotation of the holder 30 in the second direction may be restricted by the stopper 38A1 of the holder 30.

The holder 30 may include first and second side portions (or outer surfaces) 31c and 31d facing each other. For example, the seating unit 104 may be positioned between the first side portion 31c and the second side portion 31d of the holder 30. For example, the first side portion 31c and the second side portion 31d may be positioned at opposite sides or to face each other in the third direction (e.g., the Y-axis direction).

In addition, for example, at least one stopper 38B1 may be formed on the front outer surfaces 31a of the first and second side portions 31c and 31d of the holder 30. The at least one stopper 38B1 may be a protrusion or protruding portion that protrudes from the front outer surface 31a of the holder 30.

A lower surface 17 of the holder 30 may include first surfaces 17A and a second surface 17B having a step difference from the first surface 17A in the second direction (e.g., the X-axis direction). The first surface 17A may be positioned adjacent to or in contact with the front outer surface 31a of the holder 30, and the second surface 17B may be positioned adjacent to or in contact with the rear outer surface 31b of the holder 30. The first surface 17A may be positioned under the second surface 17B. For example, the second surface 17B may be positioned closer to the upper surface 18 of the holder 30 than the first surface 17A is.

Since the second surface 17B of the lower surface 17 of the holder 30 has a step difference from the first surface 17A, when the holder 30 is tilted in the second direction (e.g., the X-axis direction) or is rotated at a preset angle, it is possible to prevent spatial interference between the holder 30 and the second OIS coil 230C.

The holder 30 may include a first seating groove 16A for arranging or seating a first OIS magnet 31 and a second seating groove 16B for arranging or seating a second OIS magnet 32.

For example, the first seating groove 16A may be formed on the outer surface of each of the first and second side portions 31c and 31d of the holder 30. For example, the first seating groove 16A may be in the form of a groove recessed from the outer surface of each of the first and second side portions 31c and 31d of the holder 30.

For example, the second seating groove 16B may be formed on the lower surface 17 (e.g., the second surface 16B) of the holder 30. For example, the second seating groove 16B may be in the form of a groove recessed from the lower surface 17 (e.g., the second surface 16B) of the holder 30.

At least two grooves 36A and 36B corresponding to at least two front protrusions 61B1 and 61B2 of the driving plate 61 may be formed on the rear outer surface 31c of the holder 30.

For example, the at least two grooves 36A and 36B of the holder 30 may be arranged to be spaced apart from each other in the third direction (e.g., the Y-axis direction).

For example, the holder 30 may include the first groove 36A formed at one side of the rear outer surface 31c and the second groove 36B spaced apart from the first groove 36A and formed at the other side of the rear outer surface 31c. For example, each of the first groove 36A and the second groove 36B may have a shape recessed from the rear outer surface 31c.

Each of the first groove 36A and the second groove 36B may include a bottom surface and a plurality of side surfaces. For example, each of the plurality of side surfaces of each of the first and second grooves 36A and 36B may have the same shape. In FIG. 48B, the number of side surfaces of the first groove 36A is four, but is not limited thereto, and may be three or five or more in another embodiment.

For example, areas of the plurality of side surfaces of the first and second grooves 36A and 36B may be the same. The plurality of side surfaces of the first and second grooves 36A and 36B may be symmetrical to each other in the second direction and the third direction. For example, bottom surfaces of the first and second grooves 36A and 36B may be a square or circular shape, but are not limited thereto. For example, the first groove 36A and the second groove 36B may have the same shape.

In another embodiment, the first groove and the second groove may have different shapes. For example, an area of at least one of the plurality of side surfaces of the first groove or the second groove may be different from at least one of the remaining side surfaces. By differently forming the shapes of the first and second grooves, it is possible to increase a coupling margin between the front protrusions 61B1 and 61B2 of the driving plate 61 and the first and second grooves 36A and 36B of the holder 30.

A protruding portion 36A1 or a stepped portion may be formed around each of the first groove 36A and the second groove 36B. The protruding portion 36A1 may have a shape that protrudes from the rear outer surface 31c. For example, the protruding portion 36A1 may be formed adjacent to an opening of each of the first and second grooves 36A and 36B and formed to surround the opening of each of the first and second grooves 36A and 36B. The protruding portion 36A1 may have a polygonal (e.g., a quadrangle) or circular shape.

The holder 30 may include a groove 106 or an accommodating groove for accommodating or arranging the first magnetic part 62. For example, the groove 106 for accommodating or arranging the first magnetic part 62 may be formed in the rear outer surface 31b of the holder 30. The groove 106 may have a shape recessed from the rear outer surface 31c. For example, the groove 106 may be disposed between the first groove 36A and the second groove 36B.

The first housing 50 may be disposed in the first cover member 20. For example, an adhesive or a shield member may be disposed between the first housing 50 and the first cover member 20, and the first housing 50 may be coupled or fixed to the first cover member 20. The holder 30 may be disposed in the first housing 50. The first housing 50 may accommodate the holder 30 therein and expose the incident surface 8A and the emission surface 8B of the optical member 40 disposed in the holder 30.

Referring to FIGS. 49A to 49C, for example, the first housing 50 may include a first opening 53A (or a first hole) for exposing the incident surface 8A of the optical member 40 and a second opening 53B (or a second hole) for exposing the emission surface 8B of the optical member 40.

The first housing 50 may include an upper portion 27A, a lower portion 27B, and a plurality of side portions 28A to 28D disposed between the upper portion 27A and the lower portion 27B. The upper portion 27A and the lower portion 27B may face each other or may be positioned to face each other or at opposite sides in the second direction (e.g., the X-axis direction).

For example, the first housing 50 may include the first side portion 28A, the second side portion 28B, the third side portion 28C, and the fourth side portion 28D.

For example, the first side portion 28A of the first housing 50 may be disposed opposite to or face the lens module 400 of the second actuator 320 in the first direction. The first opening 53A may be formed in the upper portion 27A, and the second opening 53B may be formed in the first side portion 28A.

The second side portion 28B may face the first side portion 28A in the first direction or may be positioned at the opposite side of the first side portion 28A. The third side portion 28C and the fourth side portion 28D may be disposed between the first side portion 28A and the second side portion 28B and may face each other or may be positioned at opposite sides in the third direction. For example, the third side portion 28C may connect one end of the first side portion 28A to one end of the second side portion 28B, and the fourth side portion 28D may connect the other end of the first side portion 28A to the other end of the second side portion 28B.

For example, the first housing 50 may include a first seating part 54A formed in the third side portion 28C for seating or arranging the first OIS coil unit 230A, a second seating part 54B formed in the fourth side portion 28D for seating or arranging the second OIS coil unit 230B, and a third seating part 54C formed in the lower portion 27B for seating or arranging the third OIS coil unit 230C. For example, each of the first to third seating parts 54A to 54C may have a hole or through-hole shape, but is not limited thereto, and in another embodiment, at least one of the first to third seating parts 54A to 54C may have a groove shape.

The first housing 50 may include at least one coupling protrusion 51 formed on at least one of the third side portion 28C and the fourth side portion 28D. For example, the coupling protrusion 51 may protrude from the outer surface of each of the third side portion 28C and the fourth side portion 28D. In addition, the first housing 50 may include at least one coupling protrusion 52A formed on the first side portion 28A. For example, the coupling protrusion 52A may protrude from the outer surface of the first side portion 28A.

In addition, the first housing 50 may include at least one coupling protrusion 52B formed on the lower portion 27B. For example, the coupling protrusion 52B may be formed to protrude from the outer surface of the lower portion 27B.

Guide protrusions 9A and 9B for guiding the first circuit board 250A may be formed on at least one of an upper end and a lower end of the third side portion 28C of the first housing 50. In addition, guide protrusions 9A and 9B for guiding the second circuit board 250B may be formed on at least one of an upper end and a lower end of the fourth side portion 28D of the first housing 50.

The first housing 50 may include a body 50A and a support part 50B coupled to the body 50A and for supporting at least a portion of the driving plate 61. The body 50A may include the first, third, and fourth side portions 28A, 28C, and 28D, and the support part 50B may include the second side portion 28B. The reason why the body 50A and the support part 50B are formed separately is for arranging the driving plate 61 between the first housing 50 and the holder 30 to be coupled to each other.

For example, an end portion of one side of the support part 50B may be coupled to one end of the third side portion 28C of the first housing 50, and an end portion of the other side of the support part 50B may be coupled to the fourth side portion 28D of the first housing 50.

For example, a first coupling portion may be formed on the end portion of one side of the support part 50B, and a second coupling portion may be formed on the end portion of the other side of the support part 50B. In addition, a third coupling portion coupled to the first coupling portion of the support part 50B may be formed at one end of the third side portion 28C of the first housing 50, and a fourth coupling portion coupled to the second coupling portion of the support part 50B may be formed at one end of the fourth side portion 28D of the first housing 50.

For example, each of the first and second coupling portions of the support part 50B may include at least one of at least one groove 55A and 55B or at least one protrusion 57A and 57B. Each of the third coupling portion of the third side portion 28C of the first housing 50 and the fourth coupling portion of the fourth side portion 28D of the first housing 50 may include at least one protrusion 59A or at least one groove.

The support part 50B (or the second side portion 28B) may include at least two grooves 58A and 58B corresponding to at least two rear protrusions 61C1 and 61C2 of the driving plate 61. For example, the at least two grooves 58A and 58B of the first housing 50 may be arranged to be spaced apart in the second direction. For example, the at least two grooves 58A and 58B may be formed on an inner surface of the support part 50B (or the second side portion 28B). The at least two grooves 58A and 58B may have a shape recessed from the inner surface of the support part 50B (or the second side portion 28B).

For example, the support part 50B may include the first groove 58A and the second groove 58B that correspond to, face, or overlap the rear protrusions 61C1 and 61C2 of the driving plate 61.

A protruding portion 58A1 or a stepped portion may be formed around each of the first groove 58A and the second groove 58B of the support part 50B, and a description of the protruding portion 36A1 of the holder 30 may be applied or analogously applied to the protruding portion 58A1 (or the stepped portion) of the support part 50B.

The first housing 50 may include a groove 44A for arranging or seating the second magnetic part 63. For example, the groove 44A may be formed in the third side portion 28C of the first housing 50. For example, the groove 44A may have a shape recessed from the outer surface of the third side portion 28C of the first housing 50. For example, the groove 44A may be formed in the support part 50B.

Although the two grooves 36A and 36B of the holder 30 may be arranged or disposed to be spaced apart from each other in the third direction in FIG. 48B and the two grooves 58A and 58B of the first housing may be arranged or disposed to be spaced apart from each other in the second direction in FIG. 49A, the present invention is not limited thereto. In another embodiment, the two grooves of the holder 30 may be arranged or disposed to be spaced apart from each other in the second direction, the two grooves of the first housing 50 may be arranged or disposed to be spaced apart from each other in the third direction, the front protrusions of the driving plate 61 may be arranged or disposed to be spaced apart from each other in the second direction, and the rear protrusions of the driving plate 61 may be arranged or disposed to be spaced apart from each other in the third direction.

Next, the support part 60 will be described.

The support part 60 may be disposed between the holder 30 and the first housing 50 and may support the holder 30 with respect to the first housing 50.

The support part 60 may include the driving plate 61 disposed between the holder 30 and the first housing 50. The driving plate 61 may be interchangeably expressed as "mover plate," "driving plate," "plate," "moving plate," or "support plate."

Referring to FIGS. 47 and 50B, the driving plate 61 may include the at least two front protrusions 61B1 and 61B2 coupled to the holder 30 and the at least two rear protrusions 61C1 and 61C2 coupled to the first housing 50. In this case, the front protrusion may be interchangeably expressed as a front protruding portion or a first protrusion, and the rear protrusion may be interchangeably expressed as a rear protruding portion or a second protrusion.

For example, the at least two front protrusions 61B1 and 61B2 may be arranged to be spaced apart from each other in the third direction. Each of the front protrusions 61B1 and 61B2 may be disposed by being inserted into any one of the first and second grooves 36A and 36B of the holder 30, which corresponds thereto.

For example, the at least two rear protrusions 61C1 and 61C2 may be arranged to be spaced apart from each other in the second direction. Each of the rear protrusions 61C1 and 61C2 may be disposed by being inserted into any one of the first and second grooves 58A and 58B of the first housing 50, which corresponds thereto.

For example, the driving plate 61 may include a body 61A, the front protrusions 61B1 and 61B2 protruding from a front surface 74A (or a first surface or any one surface) of the body 61A, and the rear protrusions 61C1 and 61C2 protruding from a rear surface 74B (or a second surface or the other surface) of the body 61A. For example, the front protrusions 61B1 and 61B2 and the rear protrusions 61C1 and 61C2 may protrude in opposite directions. The front protrusion may be interchangeably expressed as "first protrusion," and the rear protrusion may be interchangeably expressed as "second protrusion."

For example, the body 61A may be a plate-shaped member and may include a flat portion. For example, each of the front protrusions 61B1 and 61B2 may have a curved shape, a hemispherical shape, a dome shape, or a polyhedral shape, but is not limited thereto. For example, the front protrusions 61B1 and 61B2 may have a curved shape, a hemispherical shape, or a dome shape, which is convex from the rear surface 74B to the front surface 74A of the body 61A. For example, the shapes of the front protrusions 61B1 and 61B2 when viewed from the front may be a circular, oval, or polygonal shape.

In addition, for example, each of the rear protrusions 61C1 and 61C2 may have a curved shape, a hemispherical shape, a dome shape, or a polyhedral shape, but is not limited thereto. For example, the rear protrusions 61C1 and 61C2 may have a curved shape, a hemispherical shape, or a dome shape, which is convex from the front surface 74A to the rear surface 74B of the body 61A. For example, the shapes of the rear protrusions 61C1 and 61C2 when viewed from the rear may be a circular, oval, or polygonal shape.

A lubricant, for example, grease may be disposed between the front protrusions 61B1 and 61B2 of the driving plate 61 and the first and second grooves 36A and 36B of the holder 30.

The lubricant can be prevented from overflowing toward the body 61A of the driving plate 61 by the protruding portions 36A1 of the holder 30.

In addition, a lubricant, for example, grease may be disposed between the rear protrusions 61C1 and 61C2 of the driving plate 61 and the first and second grooves 58A and 58B of the first housing 50. The lubricant can be prevented from overflowing toward the body 61A of the driving plate 61 by the protruding portions 58A1 of the first housing 50.

In another embodiment, the front grooves instead of the front protrusions may be formed in the front surface of the driving plate, the rear grooves instead of the rear protrusions may be formed in the rear surface of the driving plate, the protrusions for coupling with the front grooves of the driving plate instead of the first and second grooves 36A and 36B may be formed on the holder, and the protrusions for coupling with the rear grooves of the driving plate instead of the first and second grooves 58A and 58B may be formed in the first housing.

The support part 60 may further include the first magnetic part 62 coupled to the holder 30 and the second magnetic part 63 coupled to the first housing 140. For example, referring to FIG. 48B, the first magnetic part 62 may be disposed in the groove 106 of the holder 30, and referring to FIG. 49C, the second magnetic part 63 may be disposed in the groove 44A of the first housing 50. For example, the first magnetic part 62 may be coupled to the groove 106 of the holder 30 by an adhesive, and the second magnetic part 63 may be coupled to the groove 44A of the first housing 50 by an adhesive.

Referring to FIGS. 51A and 51B, the first magnetic part 62 and the second magnetic part 63 may be disposed to face or overlap each other in the first direction.

For example, the driving plate 61 may be disposed between the first magnetic part 62 and the second magnetic part 63, and the first magnetic part 62, the driving plate 61, and the second magnetic part 63 may face or overlap each other in the first direction.

An attractive force may act between the first magnetic part 62 and the second magnetic part 63, and due to the attractive force, the driving plate 61 may be in close contact with the holder 30 and the first housing 50, and the holder 30 may be stably supported with respect to the first housing 50 by the driving plate 61, and thus a stable and accurate OIS operation may be performed.

In another embodiment, the first magnetic part and the second magnetic part may be disposed at one side of the driving plate with respect to the driving plate, and a magnetic force between the first magnetic part and the second magnetic part may be a repulsive force.

Referring to FIG. 51A, a length L1 of the first magnetic part 62 in the second direction may be smaller than or equal to a length L2 of the second magnetic part 63 in the second direction (L1≤L2). In addition, referring to FIG. 51B, a length L3 of the first magnetic part 62 in the third direction may be smaller than or equal to a length L4 of the second magnetic part 63 in the third direction (L3≤L4).

In another embodiment, the length of the first magnetic part 62 in the second direction may be larger than the length of the second magnetic part 63 in the second direction, and the length of the first magnetic part 62 in the third direction may be larger than the length of the second magnetic part 63 in the third direction.

For example, an area of a first surface of the first magnetic part 62 facing the second magnetic part 63 may be smaller than or equal to an area of a first surface of the second magnetic part 63 facing the first magnetic part 62. In another embodiment, the area of the first surface of the first magnetic part may be larger than the area of the first surface of the second magnetic part.

For example, an attractive force may act between the first magnetic part 62 and the second magnetic part 63. The first magnetic part 62 may include the first magnet, and the second magnetic part 63 may include the second magnet of which an attractive force acts with the first magnet. For example, facing surfaces of the first magnetic part 62 and the second magnetic part 63 may have different polarities (an N pole or an S pole).

Next, the first driving unit 70 will be described.

The first driving unit 70 tilts the holder 30 in the second direction or the third direction or rotates the holder 30 at a preset angle.

The first driving unit 70 may include an OIS magnet 31 and an OIS coil 230. For example, the first driving unit 70 may further include an OIS position sensing unit 240 and a first board unit 250.

The OIS magnet 31 may be disposed in the holder 30. For example, the OIS magnet units 31 may include the first OIS magnets 31A and 31B and the second OIS magnet 32.

For example, the first OIS magnet may include the first magnet unit 31A disposed on the first side portion 31*c* of the holder 30 and the second magnet unit 31B disposed on the second side portion 31*d* of the holder 30. For example, the first magnet unit 31A may face or overlap the second magnet unit 31B in the third direction. For example, the first magnet unit 31A may be disposed in the first seating groove 16A of the first side portion 31*c* of the holder 30, and the second magnet unit 31B may be disposed in the first seating groove 16A of the second side portion 31*d* of the holder 30.

The second OIS magnet 32 may include the third magnet unit 32 disposed on the lower surface 17 of the holder 30. The third magnet unit 32 may be disposed in the second seating groove 16B of the holder 30.

Each of the first to third magnet units 31A, 31B, and 32 may be a unipolar magnetization magnet having one N pole and one S pole, but is not limited thereto, and in another embodiment, may be a bipolar magnetization magnet having two N poles and two S poles. In still another embodiment, at least one of the first to third magnet units 31A, 31B, and 32 may be a unipolar magnetization magnet, and the remaining magnet units may be a bipolar magnetization magnet.

The OIS coil 230 may be disposed in the first housing 50 to correspond to or face the OIS magnet 31. For example, the OIS coil 230 may include the first OIS coils 230A and 230B, which correspond to, face, or overlap the first OIS magnets 31A and 31B in the third direction, and the second OIS coil 230C, which corresponds to, faces, or overlaps the second OIS magnet 32 in the second direction.

For example, the first OIS coil may include the first OIS coil unit 230A, which corresponds to, faces, or overlaps the first magnet unit 31A in the third direction, and the second OIS coil unit 230B, which corresponds to, faces, or overlaps the second magnet unit 31B in the third direction. For example, the second OIS coil may include the third OIS coil unit 230C, which corresponds to, faces, or overlaps the third magnet unit 32 in the second direction. The term "OIS coil unit" may be interchangeably expressed as "coil unit" or "coil."

For example, the first OIS coil unit 230A may be disposed on the third side portion 28C (e.g., in the first hole 34A) of the first housing 50, the second OIS coil unit 230B may be disposed on the fourth side portion 28D (e.g., in the second hole 54B) of the first housing 50, and the third OIS coil unit 230C may be disposed on the lower portion 28B (e.g., in the third hole 54C) of the first housing 50.

For example, the first OIS coil unit 230A may have a closed curve or ring shape including a hollow or a hole. The first OIS coil unit 230A may be implemented in the form of a coil ring wound clockwise or counterclockwise about the third axis parallel to the third direction.

The second OIS coil unit 230B may have a closed curve or ring shape including a hollow or a hole. The second OIS coil unit 230B may be implemented in the form of a coil ring wound clockwise or counterclockwise about the third axis parallel to the third direction.

The third OIS coil unit 230C may have a closed curve or ring shape including a hollow or a hole. The third OIS coil unit 230C may be implemented in the form of a coil ring wound clockwise or counterclockwise about the second axis parallel to the second direction.

Referring to FIG. 52, first electromagnetic forces F21, F22, F31, and F32 may be generated by interaction between the first OIS magnets 31A and 31B and the first OIS coils 230A and 230B. In other words, the first electromagnetic forces may be generated by the interaction between the first magnet unit 31A and the first OIS coil unit 230A and the interaction between the second magnet unit 31B and the second OIS coil unit 230B. For example, 1-1 electromagnetic forces F21 and F31 may be generated by the interaction between the first magnet unit 31A and the first OIS coil unit 230A, 1-2 electromagnetic forces F22 and F32 may be generated by the interaction between the second magnet unit 31B and the second OIS coil unit 230B, and the first electromagnetic force may include the 1-1 electromagnetic forces F21 and F31 and the 1-2 electromagnetic forces F22 and F32.

In addition, second electromagnetic forces F1 and F2 may be generated by interaction between the second OIS magnet 32 and the third OIS coil unit 230C.

The OIS moving unit (e.g., the holder 30) may be tilted with respect to the second axis (e.g., the X-axis) by the first electromagnetic forces F21, F22, F31, and F32. Here, the second-axis (X-axis) tilting is tilting of the OIS moving unit with respect to the second axis (X-axis) or rotation of the OIS moving unit at a preset angle using the second axis (X-axis) as a rotation axis.

The OIS moving unit may be tilted along the third axis (e.g., the Y-axis) by the second electromagnetic forces F1 and F2. Here, the third-axis (Y-axis) tilting is tilting of the OIS moving unit about the third axis or rotation of the OIS moving unit at a preset angle using the third axis as a rotation axis.

In this case, the OIS moving unit may include the holder 30. Alternatively, the OIS moving unit may further include a component, for example, the OIS magnets 31A, 31B, and 32 and the yoke 33 coupled to or mounted on the holder 30. In addition, the OIS moving unit may further include at least one of the driving plate 61 and the first magnetic part 62.

In addition, the first OIS coil unit 230A and the second OIS coil unit 230B may overlap each other in the third direction (Y-axis direction), and the first OIS magnet 31A and the second OIS magnet 31B may overlap each other in the third direction. With the arrangement, since an electromagnetic force may be applied to the first side portion 31*c* and the fourth side portion 31*d* of the holder 30 in a balanced manner, the X-axis tilting may be performed accurately and precisely.

The camera device 200 may further include the yoke 33 (33A, 33B, and 33C) disposed on the OIS magnets 31 and 32.

For example, the yoke 33 may include the first yoke 33A disposed on the first magnet unit 31A, the second yoke 33B disposed on the second magnet unit 31B, and the third yoke 33C disposed on the third magnet unit 32.

For example, the first yoke 33A may be disposed in the first seating groove 16A of the first side portion 31*c* of the holder 30. For example, the first yoke 33A may be disposed inward from the first magnet unit 31A. The second yoke 33B may be disposed in the first seating groove 16A of the second side portion 31d of the holder 30. For example, the second yoke 33B may be disposed inward from the second magnet unit 31B. The third yoke 33C may be disposed in the second seating groove 16B of the holder 30. The third yoke 33C may be disposed inward from the third magnet unit 32. The first yoke 33A and the second yoke 33B may increase the first electromagnetic force, and the third yoke 33C may increase the second electromagnetic force.

The first board unit 250 may be disposed in the first housing 50. For example, the first board unit 250 may be coupled to the first housing 50. The first board unit 250 may be electrically connected to the OIS coil 230 and may supply a driving signal to the OIS coil 230.

For example, the first OIS coil unit 230A and the second OIS coil unit 230B may be connected in series, and the first board unit 250 may transmit a first driving signal to the first and second OIS coil units 230A and 230B connected in series. In addition, the first board unit 250 may provide a second driving signal to the third OIS coil unit 230C. In another embodiment, the first OIS coil unit 230A and the second OIS coil unit 230B are not electrically connected and may be independently and separately connected to the first board unit 250, and the first board unit 250 may provide an independent and separate driving signal to each of the first OIS coil unit 230A and the second OIS coil unit 230B.

The first board unit 250 may include the first circuit board 250A disposed on the third side portion 28C of the first housing 50, the second circuit board 250B disposed on the fourth side portion 28D of the first housing 50, and the third circuit board 250C disposed on the lower portion 27B of the first housing 50.

In FIG. 47, the first to third circuit boards 250A to 250C may be one integrated board and electrically connected. In another embodiment, at least one of the first to third circuit boards may not be integrated with the remaining ones, and both may be electrically connected by a solder or conductive bonding member.

A hole 251A for coupling with the coupling protrusion 51 of the third side portion 28C of the first housing 50 may be formed in the first circuit board 250A. In addition, the first circuit board 250A may include a plurality of terminals 251.

The first OIS coil unit 230A may be disposed or mounted on a first surface of the first circuit board 250A. For example, the plurality of terminals 251 may be disposed on a second surface of the first circuit board 250A, but are not limited thereto, and in another embodiment, may be disposed on the first surface of the first circuit board 250A. The first surface of the first circuit board 250A may be a surface facing the outer surface of the third side portion 28C of the first housing 50. The second surface of the first circuit board 250A may be a surface opposite to the first surface of the first circuit board 250A.

The first board unit 250 may include a bent portion connecting the second circuit board 250B to the third circuit board 250C and the first circuit board 250A to the third circuit board 250C.

A hole 251B for coupling with the coupling protrusion 51 of the fourth side portion 28D of the first housing 50 may be formed in the second circuit board 250B, and the second circuit board 250B may have a plurality of terminals 252.

A hole 251C for coupling with the coupling protrusion 52B of the lower portion 28B of the first housing 50 may be formed in the third circuit board 250C.

The second OIS coil unit 230B may be disposed or mounted on a first surface of the second circuit board 250B.

For example, the plurality of terminals 252 may be disposed on a second surface of the second circuit board 250B, but are not limited thereto, and in another embodiment, may be disposed on the first surface of the second circuit board 250B. The first surface of the second circuit board 250B may be a surface facing the outer surface of the fourth side portion 28D of the first housing 50. The second surface of the second circuit board 250B may be a surface opposite to the first surface of the second circuit board 250B.

The third OIS coil unit 230C may be disposed or mounted on the first surface of the third circuit board 250C. A first surface of the third circuit board 250C may be a surface facing the outer surface of the lower portion 28B of the first housing 50.

The first board unit 250 may include at least one of a rigid PCB, a flexible PCB, and a rigid-flexible PCB. In addition, the first board unit 250 may include wiring patterns for electrically connecting components disposed on the first to third circuit boards 250A, 250B, and 250C to the plurality of terminals 251.

The OIS position sensing unit 240 detects a position of the OIS moving unit in the second direction or/and the third direction according to the movement of the OIS moving unit and outputs an output signal according to a result of detecting the position. The OIS position sensing unit 240 may be interchangeably expressed as "second position sensing unit."

The OIS position sensing unit 240 may include a plurality of position sensors. For example, the OIS position sensing unit 240 may include first OIS position sensors 240A and 240B and a second OIS position sensor 240C.

At least a portion of the first OIS position sensors 240A and 240B may correspond to, face, or overlap the first OIS magnet 31 in the third direction and detect a strength of a magnetic field of the first OIS magnet 31.

For example, the first OIS position sensor may include the first sensor 240A disposed or mounted on the first circuit board 250A and the second sensor 240B disposed or mounted on the second circuit board 250B. For example, the first sensor 240A may be disposed in the hollow (or the hole) of the first OIS coil unit 230A, and the second sensor 240B may be disposed in the hollow (or the hole) of the second OIS coil unit 230B.

For example, each of the first sensor 240A and the second sensor 240B may be a Hall sensor including first and second input terminals and first and second output terminals.

The first and second input terminals of the first sensor 240A and the first and second input terminals of the second sensor 240B may be connected in parallel, and a driver 542 may supply driving signals or powers to the first and second input terminals of the first and second sensors 240A and 240B, which are connected in parallel.

The first and second output terminals of the first sensor 240A and the first and second output terminals of the second sensor 240B may be connected in series, a first output signal may be output from both ends of the first and second output terminals of the first and second sensors 240A and 240B, which are connected in series, and the first output signal may be transmitted to the driver 542.

For example, the first output terminal of the first sensor 240A may be connected in series with the second output terminal of the second sensor 240B through the first board unit 250, and the first output terminal of the first sensor 240A and the second output terminal of the second sensor 240B may be output terminals having opposite polarities. For example, the first output signal of the first OIS position sensor may be output to the second output terminal of the first sensor 240A and the first output terminal of the second sensor 240B, and the second output terminal of the first sensor 240A and the first output terminal of the second sensor 240B may be output terminals having opposite polarities.

At least a portion of the second OIS position sensor 240C may correspond to, face, or overlap the first OIS magnet 32 in the second direction and detect a strength of a magnetic field of the second OIS magnet 32.

For example, the second OIS position sensor 240C may include a third sensor 240C1 and a fourth sensor 240C2 disposed or mounted on the third circuit board 250C. The third sensor 240C1 and the fourth sensor 240C2 may face or overlap the third OIS magnet 32 in the second direction. For example, the third sensor 240C1 and the fourth sensor 240C2 may be arranged to be spaced apart from each other in the third direction. For example, the third sensor 240C1 and the fourth sensor 240C2 may be disposed in the hollow (or the hole) of the third OIS coil unit 230C.

For example, each of the third sensor 240C1 and the fourth sensor 240C2 may be a Hall sensor including first and second input terminals and first and second output terminals.

The first and second input terminals of the third sensor 240C1 and the first and second input terminals of the fourth sensor 240C2 may be connected in parallel, and the driver 542 may supply driving signals or powers to the first and second input terminals of the third and fourth sensors 240C1 and 240C2, which are connected in parallel.

The first and second output terminals of the third sensor 240C1 and the first and second output terminals of the fourth sensor 240C2 may be connected in series, a second output signal may be output from both ends of the first and second output terminals of the third and fourth sensors 240C1 and 240C2, which are connected in series, and the second output signal may be transmitted to the driver 542.

For example, the first output terminal of the third sensor 240C1 may be connected in series with the second output terminal of the fourth sensor 240C2 through the first board unit 250, and the first output terminal of the third sensor 240C1 and the second output terminal of the fourth sensor 240C2 may be output terminals having opposite polarities.

The second output signal of the second OIS position sensor may be output to the second output terminal of the third sensor 240C1 and the first output terminal of the fourth sensor 240C2, and the second output terminal of the third sensor 240C1 and the first output terminal of the fourth sensor 240C2 may be output terminals having opposite polarities.

Since the output terminals of the first and second sensors 240A and 240B are connected in series, a magnitude of the first output signal may be larger than a magnitude of the output of one sensor. In addition, since the output terminals of the third and fourth sensors 240C1 and 240C2 are connected in series, a magnitude of the second output signal may be larger than the magnitude of the output of one sensor.

In other words, since the magnitude of the first output signal and the magnitude of the second output signal may be increased, in the embodiment, it is possible to increase the sensitivity of each of the first OIS position sensors 240A and 240B and the second OIS position sensor 240C.

In another embodiment, the output terminals of each of the first and second sensors may be independent of each other without being connected and may output independent output signals. In addition, the output terminals of each of the third and fourth sensors may be independent of each other without being connected and may output independent output signals.

In still another embodiment, the first OIS position sensor may include one position sensor (e.g., a Hall sensor or a driver IC including the Hall sensor), and the second OIS position sensor may include one position sensor (e.g., a Hall sensor or a driver IC including the Hall sensor).

Figure 53:
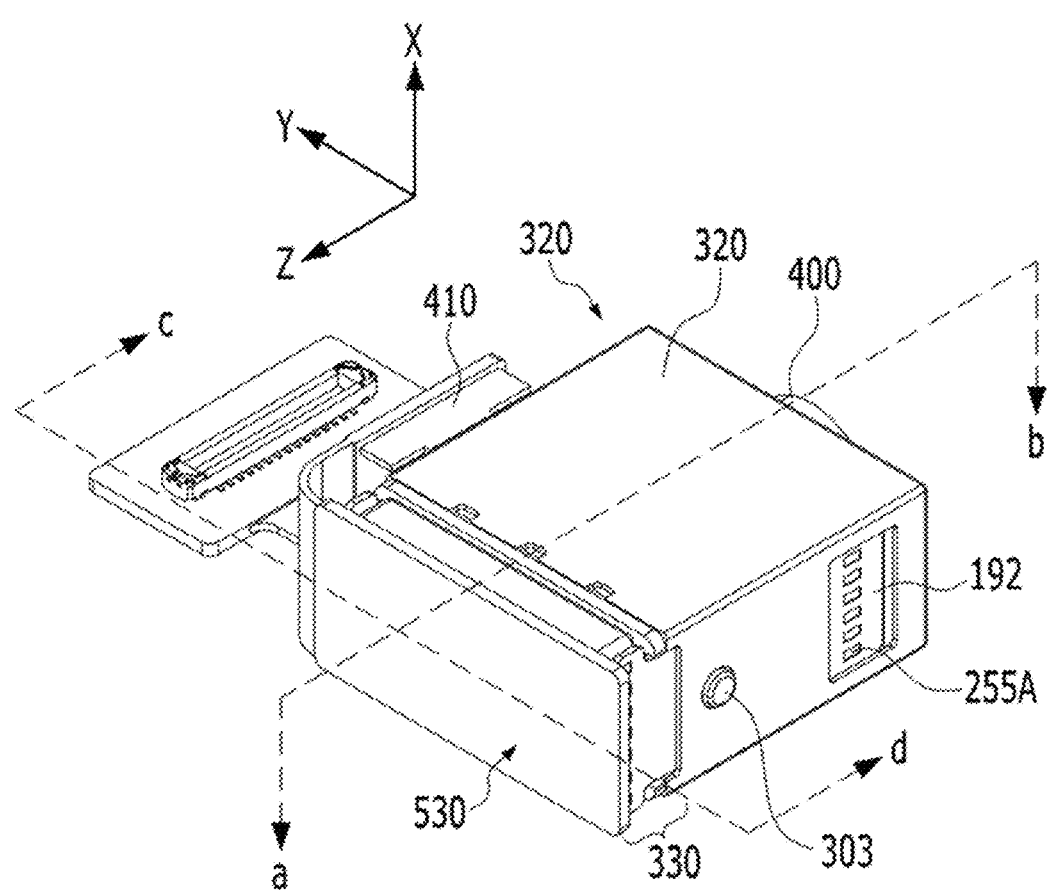
FIG. 53 is a perspective view of a second actuator and an image sensing unit according to the embodiment.
Figure 54A:
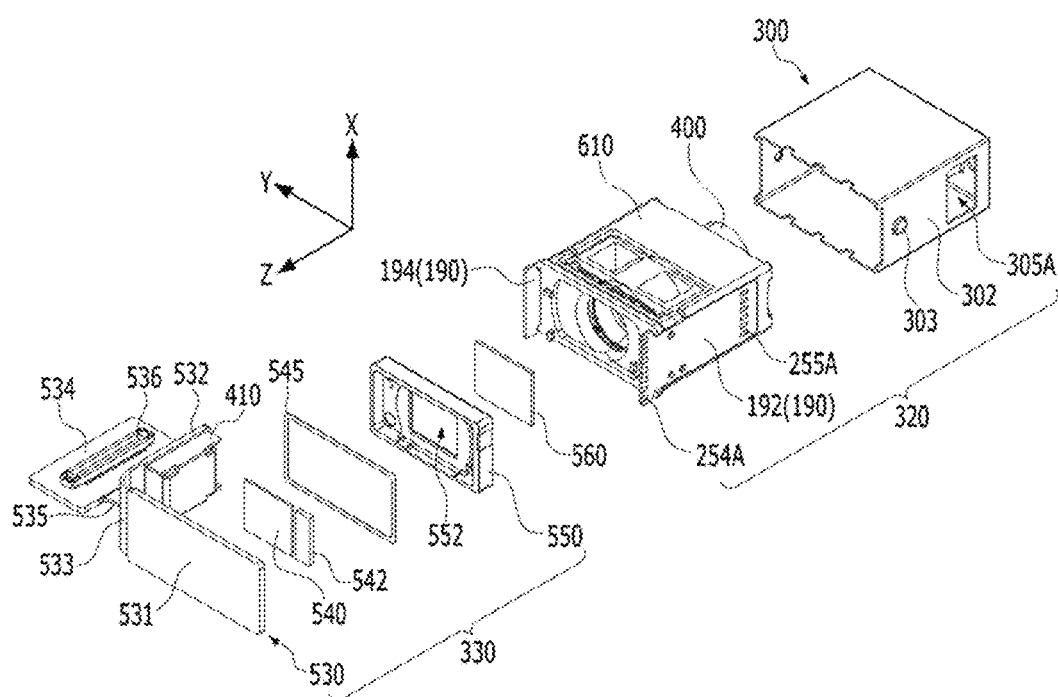
FIG. 54A is a first exploded perspective view of the second actuator and the image sensing unit in FIG. 53.
Figure 54B:
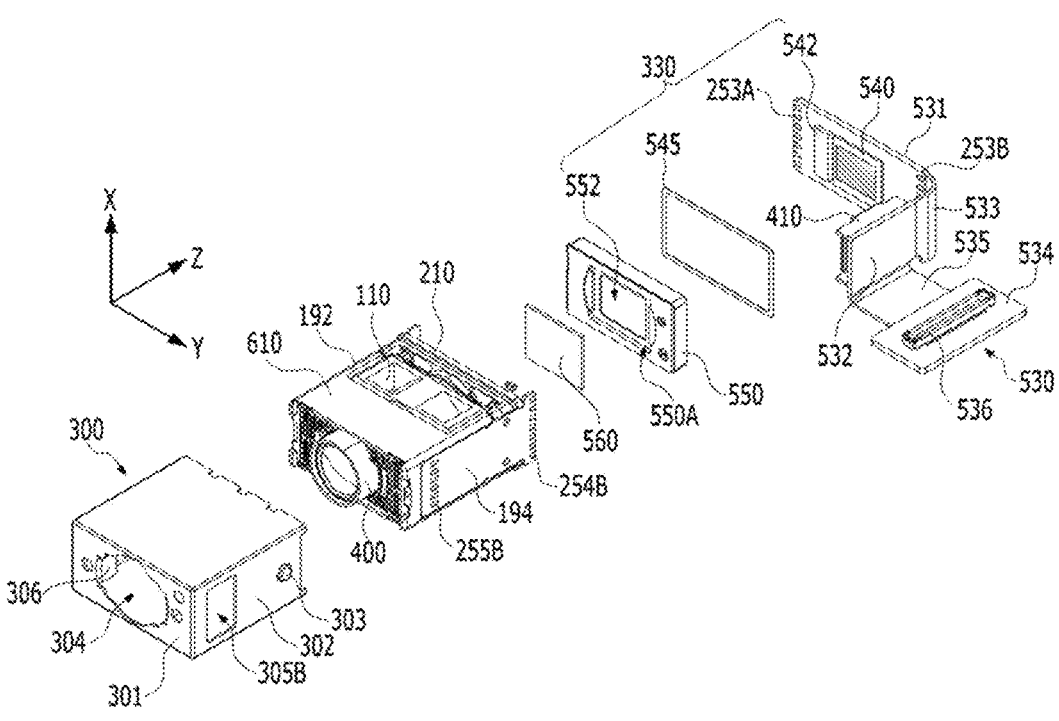
FIG. 54B is a second exploded perspective view of the second actuator and the image sensing unit in FIG. 53.
Figure 55:
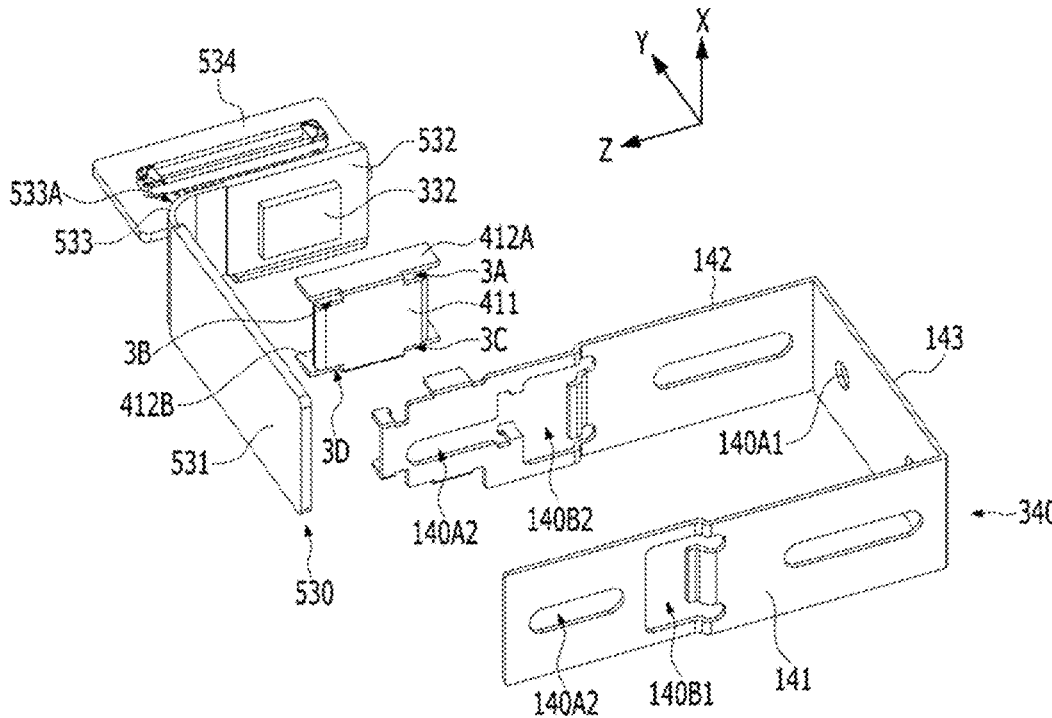
FIG. 55 is a perspective view of a third board unit, a gyro sensor, a fixing unit, and a support holder.
Figure 56:
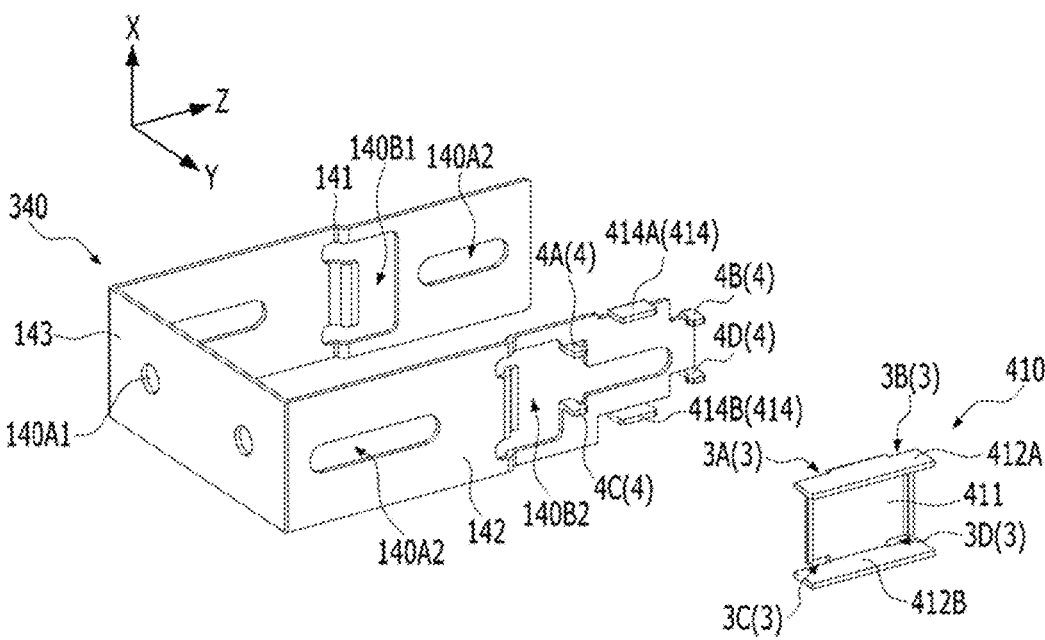
FIG. 56 is a perspective view of the support holder and the fixing unit.
Figure 57A:
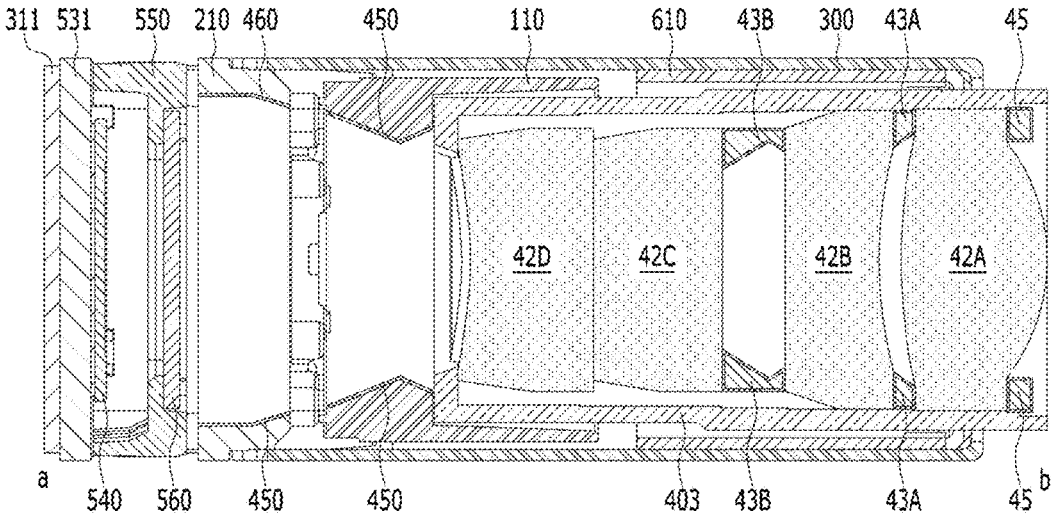
FIG. 57A is a cross-sectional view of the second actuator and the image sensing unit along line a-b in FIG. 53.
Figure 57B:
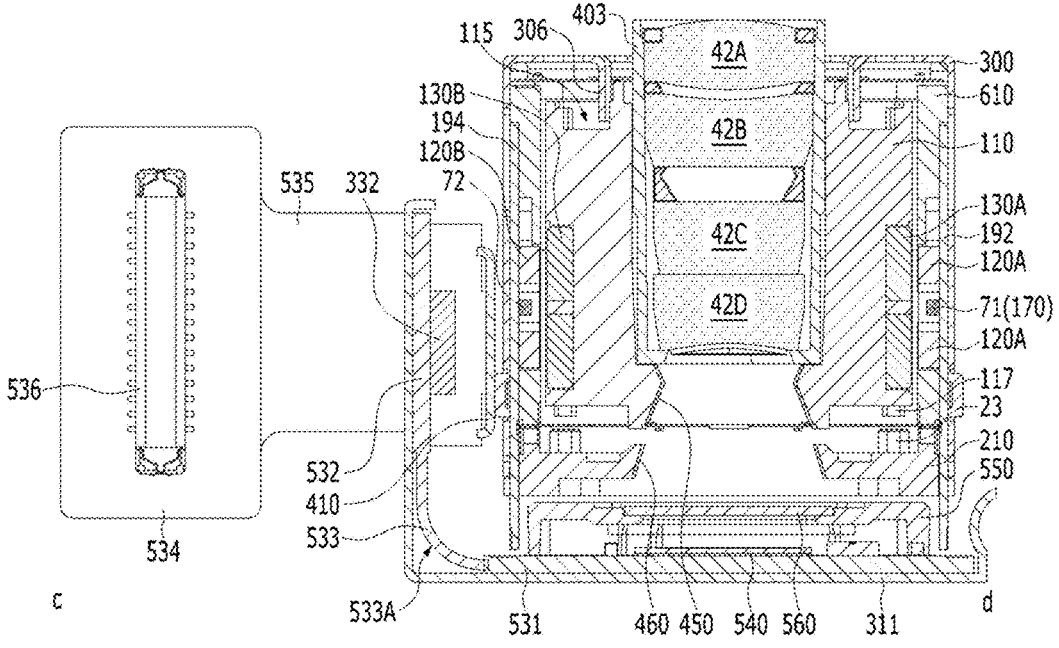
FIG. 57B is a cross-sectional view of the second actuator and the image sensing unit along line c-d in FIG. 53.
Figure 58A:
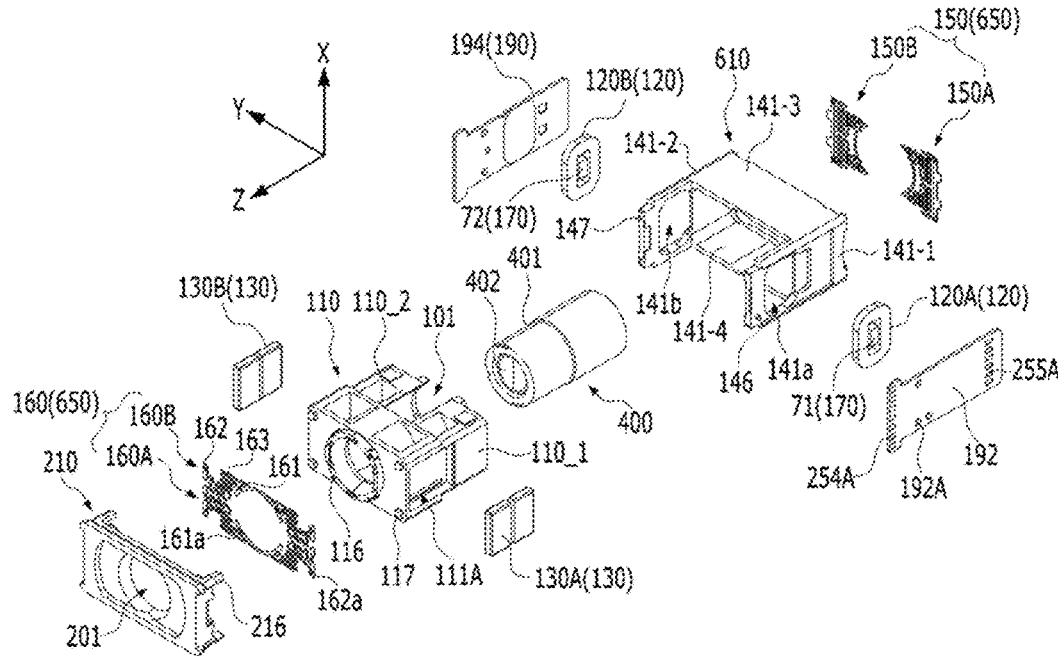
FIG. 58A is a first exploded perspective view of the second actuator.
Figure 58B:
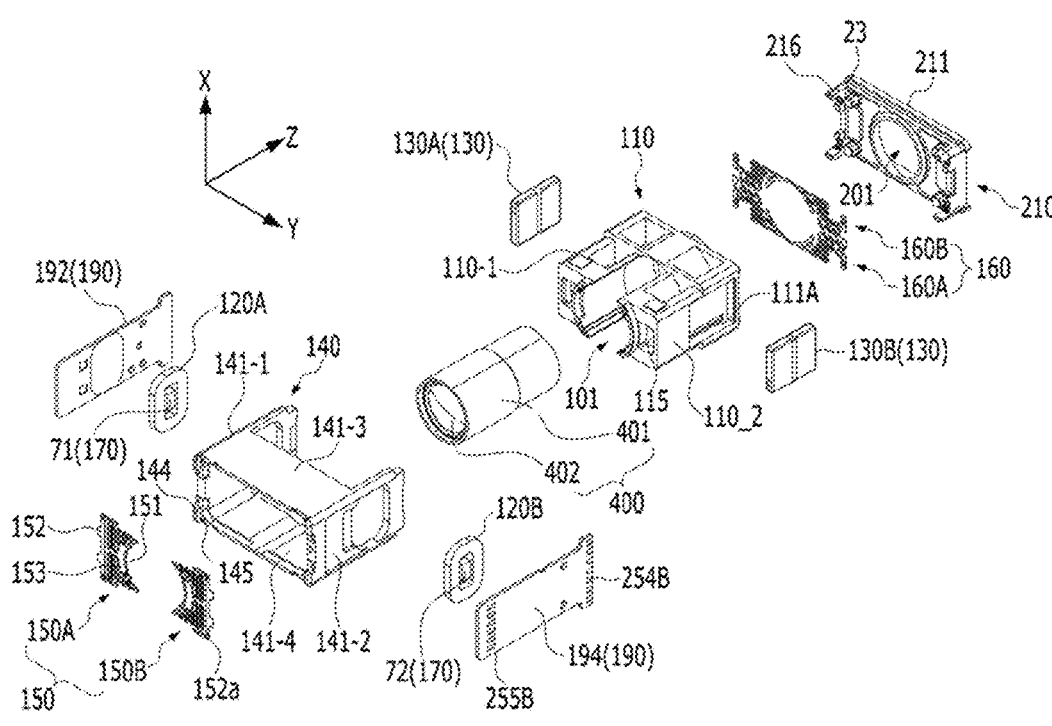
FIG. 58B is a second exploded perspective view of the second actuator.

FIG. 53 is a perspective view of the second actuator 320 and the image sensing unit 330 according to the embodiment, FIG. 54A is a first exploded perspective view of the second actuator 320 and the image sensing unit 330 in FIG. 53, FIG. 54B is a second exploded perspective view of the second actuator 320 and the image sensing unit 330 in FIG. 53, FIG. 55 is a perspective view of a third board unit 530, a gyro sensor 332, a fixing unit 410, and the support holder 340, FIG. 56 is a perspective view of the support holder 340 and the fixing unit 410, FIG. 57A is a cross-sectional view of the second actuator 320 and the image sensing unit 330 along line a-b in FIG. 53, FIG. 57B is a cross-sectional view of the second actuator 320 and the image sensing unit 330 along line c-d in FIG. 53, FIG. 58A is a first exploded perspective view of the second actuator 320, and FIG. 58B is a second exploded perspective view of the second actuator 320.

Referring to FIGS. 53 to 58B, the second actuator 320 may include a second housing 610, a bobbin 110 disposed in the second housing 610, and a second driving unit 630 for moving the bobbin 110 in the first direction (e.g., in the optical axis direction or the Z-axis direction). The bobbin 110 may be interchangeably expressed as "lens holder."

The second actuator 320 may further include the lens module 400 coupled to the bobbin 110. The second actuator 320 may include an elastic member 650 coupled to the bobbin 110 and the second housing 610, and the elastic member 650 may support the bobbin 110 with respect to the housing 610 so that the bobbin 110 may be moved in the optical axis direction. For example, the housing 610 may be a fixed unit, and the bobbin 110 may be an AF moving unit.

The second actuator 320 may further include a second cover member 300 for accommodating the second housing 610 and the bobbin 110. The second cover member 300 may have a box shape including an upper plate 301 and a side plate 302 and have an open lower portion.

An opening 304 or a hole exposing at least a portion of the lens module 400 may be formed in the upper plate 301 of the second cover member 300. At least one protrusion 303 for coupling with a hole 140A2 of the support holder 340 in FIG. 55 may be formed on the side plate 302 of the second cover member 300. The at least one protrusion 303 may protrude from the side plate 302 in a direction perpendicular to the optical axis direction.

In addition, referring to FIGS. 54B and 58B, the second cover member 300 may include at least one protruding portion 306 extending from one area of the opening 304 formed in the upper plate 301 toward an upper surface of the bobbin 110. At least a portion of the protruding portion 306 may be disposed in a groove 115 provided in an upper portion or the upper surface of the bobbin 110.

During AF driving, the protruding portion 306 may be in contact with a bottom surface of the groove 115 of the bobbin 110, and thus the protruding portion 306 may function as a stopper for restricting the movement of the bobbin 110 in the first direction, for example, a direction from the image sensing unit 330 toward the first actuator 310, within a preset range.

The second cover member 300 may be formed of a metal plate, but is not limited thereto, and may be made of a plastic or resin material. In addition, for example, the second cover member 300 may be made of a material that blocks electromagnetic waves.

The side plate 302 of the second cover member 300 may include openings 305A and 305B exposing the terminals 251 and 252 of the first board unit 250 and terminals 255A and 255B of a second board unit 190.

For example, the second cover member 300 may include the first opening 305A formed in a first side plate of the second cover member 300 corresponding to or facing the first circuit board 250A of the first board unit 250 and the second opening 305B formed in a second side plate of the second cover member 300 corresponding to or facing the second circuit board 250B of the first board unit 250. For example, each of the first and second openings 305A and 305B may be a through-hole, the first opening 305A may expose the terminals 251 of the first circuit board 250A of the first board unit 250 and the terminals 255A of a first circuit board 192 of the second board unit 190, and the second opening 305B may expose the terminals 252 of the second circuit board 250B of the first board unit 250 and the terminals 255B of a second circuit board 194 of the second board unit 190.

Referring to FIGS. 58A and 58B, the second housing 610 may be disposed between the first housing 50 and the image sensing unit 330 (e.g., a sensor base 550). The second housing 610 may be interchangeably expressed as "base," "holder," etc.

The second housing 610 may be disposed inside the second cover member 300 and may have a polyhedral (e.g., rectangular parallelepiped) shape in which a space for accommodating the lens module 400 and the second driving unit 630 is formed. For example, the second housing 610 may have a hollow or through hole for accommodating the bobbin 110.

For example, the second housing 610 may include an upper portion (or an upper end), a lower portion (or a lower end), and a plurality of side portions 141-1 to 141-4 disposed between the upper portion (or the upper end) and the lower portion (or the lower end). The upper portion (or the upper end) of the second housing 610 may face the upper plate 301 of the second cover member 300, and the side portions 141-1 to 141-4 may face the side plate 302 of the second cover member 300. An opening may be formed in each of the upper portion and the lower portion of the second housing 610.

The side portions 141-1 to 141-4 may be interchangeably expressed as "side plates" or "side walls." For example, the first side portion 141-1 and the second side portion 141-2 may face each other or may be positioned at opposite sides in the third direction. The third side portion 141-3 and the fourth side portion 141-3 may be disposed between the first side portion 141-1 and the second side portion 141-2 and may face each other or may be positioned at opposite sides in the second direction.

For example, a first opening 141*a* (or a first hole) in which the first coil 120A is disposed or seated may be formed in the first side portion 141-1 of the second housing 610, and a second opening 141*b* (or a second hole) in which the second coil 120B is disposed or seated may be formed in the second side portion 141-2 of the second housing 610. Each of the first and second openings 141*a* and 141*b* has a through-hole shape, but is not limited thereto, and may have a groove shape.

In order to prevent the upper end (or the upper surface) of the second housing 610 from directly colliding with an inner surface of the upper plate 301 of the second cover member

300, a stopper 144 may be formed on the upper portion, upper end, or upper surface of the second housing 610.

The bobbin 110 may include an opening, a through-hole, or a hollow 101 for mounting the lens module 400 and may be disposed in a housing 140.

For example, the bobbin 110 may include an accommodating groove 111A for accommodating, arranging, or seating first and second magnet units 130-1 and 130-2. The accommodating groove 111A may be formed in each of a first side portion 110-1 of the bobbin 110 facing the first coil unit 120A and a second side portion 110-2 of the bobbin 110 facing the second coil unit 120B.

For example, at least one groove 115 corresponding to the protruding portion 306 of the second cover member 300 may be formed in the upper portion or upper surface of the bobbin 110. For example, the groove 115 may overlap the protruding portion 306 of the second cover member 300 in the first direction. For example, the bobbin 110 may include a lower stopper 117 protruding from the lower portion (or the lower surface) thereof.

The elastic member 650 may include at least one of a first elastic member 150 and a second elastic member 160. For example, the elastic member may be interchangeably expressed as an elastic unit or a spring.

The first elastic member 150 may be coupled to the upper portion (upper end or upper surface) of the second housing 610 and the upper portion (upper end or upper surface) of the bobbin 110.

For example, the first elastic member 150 may include a plurality of first upper elastic members, for example, a first upper elastic member 150A and a second upper elastic member 150B, which are spaced apart from each other.

For example, at least one of the first and second upper elastic members 150A and 150B may include a first inner frame 151 coupled to the upper portion, upper surface, or upper end of the bobbin 110, a first outer frame 152 coupled to the upper portion, upper surface, or upper end of the second housing 610, and a first frame connecting unit 153 connecting the first inner frame 151 to the first outer frame 152.

For example, a through-hole may be formed in the first inner frame 151, and a protrusion for coupling with the through-hole of the first inner frame may be provided on the upper portion (upper end or upper surface) of the bobbin 110. In addition, a through-hole 152*a* may be formed in the first outer frame 152, and a protrusion 145 for coupling with the through-hole 152*a* may be provided on the upper portion (upper end or upper surface) of the second housing 610. In another embodiment, the first elastic member may include one upper elastic member that is not separated from each other.

The second elastic member 160 may be coupled to a lower portion (lower end or lower surface) of the second housing 610 and a lower portion (lower end or lower surface) of the bobbin 110.

The second elastic member 160 may include a plurality of lower elastic members, for example, first and second lower elastic members 160A and 160B, which are spaced apart from each other.

At least one of the first and second lower elastic members 160A and 160B may include a second inner frame 161 coupled to the lower portion, lower surface, or lower end of the bobbin 110, a second outer frame 162 coupled to the lower portion, lower surface, or lower end of the second housing 610, and a second frame connecting part 163 connecting the second inner frame 161 to the second outer frame 162.

For example, a through-hole 161*a* may be formed in the second inner frame 161, and a protrusion 116 for coupling with the through-hole 161*a* of the second inner frame 161 may be provided on the lower portion (lower end or lower surface) of the bobbin 110. In addition, a through-hole 162*a* may be formed in the second outer frame 162, and a protrusion 147 for coupling with the through-hole 162*a* may be provided on the lower portion (lower end or lower surface) of the second housing 610. In another embodiment, the second elastic member may include one lower elastic member that is not separated from each other.

The above-described inner frame may be interchangeably expressed as "inner part," the outer frame may be interchangeably expressed as "outer part," and the frame connecting part may be interchangeably expressed as "connecting part."

Next, the second driving unit 630 will be described.

The second driving unit 630 moves the bobbin 110 and the lens module 400 in the first direction. The second driving unit 630 may include a magnet 130 disposed in the bobbin 110 and a coil 120 disposed in the second housing 610.

For example, the magnet 130 may include a first magnet 130A disposed on the first side portion 110-1 of the bobbin 110 and a second magnet 130B disposed on the second side portion 110-2 of the bobbin 110. For example, the first magnet 130A and the second magnet 130B may be disposed in the accommodating groove 111A of the bobbin 110.

For example, each of the first and second magnets 130A and 130B may be a unipolar magnetization magnet including one N pole and one S pole. In another embodiment, each of the first and second magnets 130A and 130B may be a bipolar magnetization magnet including two N poles and two S poles.

The coil 120 may include a first coil 120A corresponding to, facing, or overlapping the first magnet 130A and disposed on the first side portion 141-1 of the second housing 610 in the third direction and a second coil 120B corresponding to, facing, or overlapping the second magnet 130B and disposed on the second side portion 141-2 of the second housing 610 in the third direction. For example, each of the first coil 120A and the second coil 120B may be disposed in any one of the first and second openings 141*a* and 141*b* of the second housing 610, which corresponds thereto.

For example, each of the first coil 120A and the second coil 120B may have a closed or circular shape with a hollow (or a hole). For example, each of the first coil 120A and the second coil 120B may be in the form of a coil ring wound clockwise or counterclockwise based on (or around) the third axis parallel to the third direction.

For example, the N pole and the S pole of the first magnet 130A may be disposed to face the first coil 120A, and the N pole and the S pole of the second magnet 130B may be disposed to face the second coil 120B. For example, a hollow or hole of each of the first and second coils 120A and 120B may face the first and second magnets 130A and 130B in the third direction.

The bobbin 110 supported by the elastic member 650 may be moved in the first direction by an electromagnetic force generated by interaction between the first coil 120A and the first magnet 130A and an electromagnetic force generated by interaction between the second coil 120B and the second magnet 130B.

By controlling the driving signals provided to the first and second coils 120A and 120B, the movement of the lens module 400 mounted in the bobbin 110 in the optical axis direction or the first direction may be controlled, and thus the AF function or/and the zooming function may be performed.

Each of the number of coils included in the coil 120 and the number of magnets included in the magnet 130 is not limited to two and in another embodiment, may be one or more.

In addition, in FIGS. 58A and 58B, although the coil 120 is disposed in the second housing 610 and the magnet 130 is disposed in the bobbin 110, the present invention is not limited thereto. In another embodiment, the coil may be disposed in the bobbin 110, and the magnet may be disposed in the housing 610 to correspond to or face the coil.

The second driving unit 630 may further include the second board unit 190 electrically connected to the first coil 120A and the second coil 120B. For example, the second board unit 190 may be a PCB.

The second board unit 190 may be disposed in the second housing 610. For example, the second board unit 190 may include the first circuit board 192 disposed on the first side portion 141-1 of the second housing 610 and the second circuit board 194 disposed on the second side portion 141-2 of the second housing 610.

For example, the first circuit board 192 may be coupled to the first side portion 141-1 of the second housing 610, and the second circuit board 194 may be coupled to the second side portion 141-2 of the second housing 610.

For example, a coupling protrusion (e.g., 146) may be formed on at least one of the first side portion 141-1 and the second side portion 141-2 of the second housing 610, and a coupling hole 192A for coupling with the coupling protrusion (e.g., 146) may be formed in at least one of the first and second circuit boards 192 and 194.

The first coil 120A may be disposed, coupled, or mounted on the first circuit board 192 and electrically connected to the first circuit board 192. The second coil 120B may be disposed, coupled, or mounted on the second circuit board 194 and electrically connected to the second circuit board 194.

For example, the first coil 120A may be disposed or mounted on a first surface of the first circuit board 192. In this case, the first surface of the first circuit board 192 may be a surface facing the first side portion 141-1 of the second housing 610 in the third direction. The second coil 120B may be disposed or mounted on a first surface of the second circuit board 194. In this case, the first surface of the second circuit board 194 may be a surface facing the second side portion 141-2 of the second housing 610 in the third direction.

The first circuit board 192 may be electrically connected to the first coil 120A. For example, two pads electrically connected to the first coil 120A may be formed on the first surface of the first circuit board 192. In addition, the first circuit board 192 may include a plurality of terminals 254A. For example, the plurality of terminals 254A may be formed on a second surface of the first circuit board 192. For example, the second surface of the first circuit board 192 may be a surface opposite to the first surface of the first circuit board 192. For example, two of the plurality of terminals 254A may be electrically connected to the two pads of the first circuit board 192 connected to the first coil 120A and electrically connected to the first coil 120A.

The second circuit board 194 may be electrically connected to the second coil 120B. For example, two pads electrically connected to the second coil 120B may be formed on the first surface of the second circuit board 194. In addition, the second circuit board 194 may include a plurality of terminals 254B.

For example, the plurality of terminals 254B may be formed on a second surface of the second circuit board 194. For example, the second surface of the second circuit board 194 may be a surface opposite to the first surface of the first circuit board 192. For example, two of the plurality of terminals 254B may be electrically connected to the two pads of the second circuit board 194 connected to the second coil 120B and electrically connected to the second coil 120B.

The second board unit 190 may include the terminals 255A and 255B electrically connected to the terminals 251 and 252 of the first board unit 250. For example, the terminals 255A of the first circuit board 192 of the second board unit 190 may be electrically connected to the terminals 251 of the first circuit board 250A of the first board unit 250 by a solder or conductive adhesive.

For example, the terminals 255B of the second circuit board 194 of the second board unit 190 may be electrically connected to the terminals 252 of the second circuit board 250B of the first board unit 250 by a solder or conductive adhesive.

The second actuator 320 may further include a base 210 disposed at rears of the bobbin 110 and/or the housing 610. Based on the bobbin 110 and/or the housing 610, one side of the first actuator 310 side is referred to as a front, and the other side of the image sensing unit 330 side is referred to as a rear. For example, the base 210 may be disposed at a rear of the second elastic member 160.

The base 210 may include an opening 201 corresponding to the opening 101 of the bobbin 110 or/and the opening of the second housing 610 and have a shape that matches with or corresponds to the second cover member 300, for example, a quadrangular shape. For example, the opening 201 of the base 210 may be in the form of a hole or a through-hole. For example, the base 210 may be disposed under the second elastic member 160.

A stepped portion 211 to which an adhesive may be applied may be provided on a lower end of a side surface of the base 210 when the second cover member 300 is fixedly bonded. In this case, the stepped portion 211 may guide the second cover member 300 coupled to an upper side thereof and face a lower end of the side plate 302 of the second cover member 300. An adhesive member or/and a sealing member may be disposed or applied between the lower end of the side plate 302 of the base 210 and the stepped portion 211 of the base 210.

Protruding portions 216 (or pillar portions) may be provided at corners of the upper surface of the base 210. For example, the protruding portion 216 may have a polygonal pillar shape that protrudes from the upper surface of the base 210 to be perpendicular to the upper surface of the base 210, but is not limited thereto.

For example, the protruding portions 216 may be coupled to lower portions of the corners of the second housing 610. For example, the protruding portions 216 and the corners of the second housing 610 may be fastened or coupled by a bonding member (not illustrated) such as an epoxy or a silicone.

The base 210 may include a stopper 23 protruding from the upper surface thereof, and the stopper 23 may correspond to, face, or overlap the stopper 117 of the bobbin 110 in the first direction. The stopper 23 of the base 210 and the stopper 117 of the bobbin 110 can prevent the lower surface or lower end of the bobbin 110 from directly colliding with the upper surface of the base 210 in the event of an external impact.

Although not illustrated in FIGS. 58A and 58B, the second actuator may further include an AF position sensing unit 170 for performing feedback driving for an accurate AF operation. The AF position sensing unit 170 may be disposed on the second board unit 190 and electrically connected to the second board unit 190. The AF position sensing unit 170 may detect a strength of a magnetic field of the magnet 130 and detect a position or displacement of the bobbin 110.

The AF position sensing unit 170 may include a first position sensor 71 and a second position sensor 72.

For example, the first position sensor 71 may be disposed or mounted on the first circuit board 192 and electrically connected to the first circuit board 192. The second position sensor 72 may be disposed or mounted on the second circuit board 194 and electrically connected to the second circuit board 194.

For example, the first position sensor 71 may be disposed or mounted on the first surface of the first circuit board 192, and the second position sensor 72 may be disposed or mounted on the first surface of the second circuit board 194. For example, the first position sensor 71 may be disposed in the hollow of the first coil 120A, and the second position sensor 72 may be disposed in the hollow of the second coil 120B.

For example, the first position sensor 71 may face or overlap the first magnet 130A in the third direction and detect a strength of a magnetic field of the first magnet 130A.

The second position sensor 72 may face or overlap the second magnet 130B in the third direction and detect a strength of a magnetic field of the second magnet 130B. For example, each of the first and second position sensors 71 and 72 may be a Hall sensor. In another embodiment, any one of the first position sensor 71 and the second position sensor 72 may be omitted, and in this case, one position sensor may be a Hall sensor or a driver IC including the Hall sensor.

For example, the first position sensor 71 may include first and second input terminals and first and second output terminals, and the second position sensor 72 may include first and second input terminals and first and second output terminals.

The first and second output terminals of the first position sensor 71 and the first and second output terminals of the second position sensor 72 may be connected in series, the first output signal may be output from both ends of the first and second output terminals of the first and second position sensors 71 and 72, which are connected in series, and the first output signal may be transmitted to the driver 542.

For example, the first output terminal of the first position sensor 71 may be connected in series with the second output terminal of the second position sensor 72, and the first output terminal of the first position sensor 71 and the second output terminal of the second position sensor 72 may be output terminals having opposite polarities. An output signal of the AF position sensing unit may be output to the second output terminal of the first position sensor 71 and the first output terminal of the second position sensor 72, and the second output terminal of the first position sensor 71 and the first output terminal of the second position sensor 72 may be output terminals having opposite polarities.

The image sensing unit 330 may include the image sensor 540 for receiving and detecting light passing through the optical member 40 of the first actuator 310 and the lens module 400 of the second actuator 320 and converting the detected light into an electrical signal.

For example, the image sensor 540 may include an imaging area for detecting light. Here, the imaging area may be interchangeably expressed as an effective area, a light receiving area, or an active area. For example, the imaging area may include a plurality of pixels on which images are formed. For example, the image sensor 540 may include a light receiving unit for receiving light and converting the light into an electrical signal and an analog-to-digital converter for converting the converted electrical signal into a digital signal. In addition, for example, the image sensor 540 may further include an image signal processor for performing signal processing on the digital signals.

Referring to FIGS. 54A and 54B, the image sensing unit 330 may include the third board unit 530 electrically connected to the image sensor 540. The third board unit 530 may be electrically connected to the second board unit 190. The third board unit 530 may be a PCB.

The third board unit 530 may include a first board 531 on which the image sensor 540 is disposed or mounted. For example, the image sensor 540 may be disposed on a first surface of the first board 531, and the first surface of the first board 531 is a surface facing the second actuator 320 or the lens module 400.

The first board 531 may include a plurality of first terminals 253A and a plurality of second terminals 253B. For example, the plurality of first terminals 253A may be disposed between the image sensor 540 and a first end portion of the first board 531, and the plurality of second terminals 253B may be disposed between the image sensor 540 and a second end portion of the first board 531. The first end portion may be positioned at an opposite side of the second end portion.

For example, the plurality of first terminals 253A of the first board 531 may correspond to, face, or overlap the plurality of terminals 254A of the first circuit board 192 of the second board unit 190 in the first direction and may be electrically connected to the plurality of terminals 254A of the first circuit board 192 by a solder or conductive adhesive.

For example, the plurality of second terminals 253B of the first board 531 may correspond to, face, or overlap the plurality of terminals 254B of the second circuit board 194 of the second board unit 190 in the first direction and may be electrically connected to the plurality of terminals 254B of the second circuit board 194 by a solder or conductive adhesive.

The first board 531 may be coupled or fixed to the second actuator 320.

For example, the first board 531 may be coupled to the second actuator 320 by the sensor base 550 and the base 210. For example, the sensor base 550 may be coupled to the first board 531 by an adhesive, the base 550 may be coupled to the sensor base 550 by the adhesive, and the base 210 may be coupled to the second cover member 300 of the second actuator 320 by the adhesive.

The third board unit 530 may further include a second board 532 on which an electronic element or a circuit element, for example, the gyro sensor 332 (see FIG. 55) is disposed and a third board 533 connecting the first board 531 to the second board 532. The first to third boards 531, 532, and 533 may be electrically connected.

For example, the electronic element, such as the gyro sensor 332, may be disposed on a first surface of the second board 532, and the first surface of the second board 532 may be a surface facing the support holder 340.

For example, the first surface of the second board 532 may be perpendicular to the first surface of the first board 531. For example, an inner angle formed by the first surface of the second board 532 and the first surface of the first board 531 may be in a range of 80 degrees or more and 100 degrees or less.

The third board unit 530 may further include a connector 534 on which a port 536 for electrical connection with an external device is formed and a fourth board 535 connecting the second board 532 to the connector 534.

For example, each of the first and second boards 531 and 532 and the connector 534 may include a rigid board. For example, each of the third board 533 and the fourth board 535 may include a flexible board.

In another embodiment, at least one of the first to fourth boards may include at least one of the rigid board and the flexible board, and the connector 534 may include at least one of the rigid board and the flexible board.

The image sensing unit 330 may further include the driver 542 disposed on the third board unit 530. The driver 542 may be disposed or mounted on the first board 531. For example, the driver 542 may be disposed between the image sensor 540 and the plurality of first terminals 253A. The third board unit 530 may include a circuit element, a passive element, an active element, a circuit pattern, etc.

The image sensing unit 330 may further include the gyro sensor 332 disposed on the third board unit 530. For example, the gyro sensor 332 may be a 2-axis, 3-axis, or 5-axis gyro sensor or an angular velocity sensor. The gyro sensor 332 may be disposed or mounted on the second board 532 of the third board unit 530 and electrically connected to the second board 532.

The image sensing unit 330 may further include the sensor base 550 disposed between the third board unit 530 and the second actuator 320. For example, the sensor base 550 may be disposed between the first board 531 of the third board unit 530 and the second housing 610 (or the base 210).

The sensor base 550 may be coupled, attached, or fixed to the first surface of the first board 531 by an adhesive 545. A lower portion or lower surface of the sensor base 550 may be coupled to the first surface of the first board 531 by the adhesive 545. In addition, for example, the sensor base 550 may be coupled to the base 210 of the second actuator 320 by the adhesive.

The sensor base 550 may include a seating portion 550A for arranging or seating a filter 560. For example, the seating portion 550A may be formed on a first surface of the sensor base 550. The first surface of the sensor base 550 may be a surface facing the second housing 610 in the first direction. For example, the seating portion 550A may be in the form of a groove, cavity, or hole recessed from the first surface of the sensor base 550, but is not limited thereto. In another embodiment, the seating portion may be in the form of a protruding portion protruding from the first surface of the sensor base 550. The sensor base 550 may be interchangeably expressed as "holder."

The filter 560 is disposed on the seating portion 550A of the sensor base 550. For example, the seating portion 550A of the sensor base 550 may include an inner surface and a bottom surface, and the filter 560 may be disposed on the bottom surface of the seating portion 550A of the sensor base 550.

The sensor base 550 may include an opening 552 (or a through-hole) so that light passing through the filter 560 may enter the image sensor 540. The opening 552 may correspond to, face, or overlap the image sensor 550 (e.g., an imaging area or an active area). For example, the opening 552 may be formed in the bottom surface of the seating portion 550A. Although an area of the opening 552 may be smaller than an area of an upper surface or lower surface of the filter 560, the present invention is not limited thereto.

The filter 560 may function to block light in a specific frequency band from the light passing through the lens module 400 from entering the image sensor 540. For example, the filter 560 may be an infrared cut-off filter, but is not limited thereto. For example, the filter 560 may be disposed parallel to an x-y plane perpendicular to the first direction. For example, the filter 560 may be attached to the bottom surface of the seating portion 550A of the sensor base 550 by a bonding member (not illustrated) such as a UV epoxy. The filter 560 and the image sensor 540 may be disposed to be spaced apart from each other in the first direction.

The driver 542 may control driving signals for driving each of the first driving unit 70 and the second driving unit 630.

The driver 542 may receive the first output signals of the first OIS position sensors 240A and 240B of the OIS position sensing unit 240 and the second output signal of the second OIS position sensor 240C.

The driver 542 may generate a first code value according to a result of performing analog-to-digital conversion of the received first output signals of the first OIS position sensors 240A and 240B and control the first driving signals applied to the first OIS coils 230A and 230B of the first driving unit 70 based on a result of comparing the generated first code value with a first target value.

In addition, the driver 542 may generate a second code value according to a result of performing analog-to-digital conversion of the received second output signals of the second OIS position sensor 240C and control the second driving signal applied to the second OIS coils 230C of the first driving unit 70 based on a result of comparing the generated second code value with a second target value.

For example, the first target value may be a reference code value for the outputs of the first OIS position sensors 240A and 240B corresponding to a target second-axis (X-axis) tilting position of the OIS moving unit of the first actuator 310. In addition, for example, the second target value may be a reference code value for the output of the second OIS position sensor 240C corresponding to a target third-axis (Y-axis) tilting position of the OIS moving unit of the first actuator 310. The reference code value for the output of each of the first OIS position sensors 240A and 240B and the second OIS position sensor 240C may be preset through calibration and stored in the driver 542 or stored in a separate memory.

The movement of the holder 30 coupled to the optical member 40 may be controlled by the first driving unit 70, and the path of light entering the optical member 40 may be changed on a plane (e.g., an x-y plane), and thus the image formed on the image sensor 540 may be moved in the X-axis direction or/and the Y-axis direction. In other words, by controlling the movement of the holder 30 by the first driving unit 70, in the embodiment, it is possible to correct blurring of the image, shaking of the video, or the like caused by shaking of the camera module due to the user's hand shaking when capturing images or videos.

In addition, the driver 542 may receive the output signal of the AF position sensing unit 170, generate a code value according to the result of performing the analog-to-digital conversion of the received output signal, and control the driving signals applied to the first coil 120A and the second coil 120B of the second driving unit 630 based on a result of comparing the generated code value with a third target value. For example, the third target value may be a reference code value corresponding to a target focus position of the lens module 400. The reference code value for the output of the AF position sensing unit 170 may be preset through calibration and stored in the driver 542 or a separate memory.

Since the movement of the lens module 400 in the optical axis direction may be controlled by the second driving unit 630, accurate zoom or focus control may be performed.

Referring to FIGS. 55 and 56, the support holder 340 may include at least one side plate or side bar coupled to the first actuator 310 and the second actuator 320. For example, the support holder 340 may include first and second side plates 141 and 142 facing each other and a third side plate 143 connecting the first side plate 141 to the second side plate 142.

At least one of the side plates 141 to 143 of the support holder 340 may include at least one hole 140A1 for coupling with at least one side plate 20B of the first cover member 20 of the first actuator 310. For example, at least one protrusion 22A (see FIG. 47) for coupling with the at least one hole 140A1 may be formed in the first cover member 20.

In addition, the at least one of the side plates 141 to 143 of the support holder 340 may include the at least one hole 140A2 for coupling with the at least one side portion (or the outer surface) of the second cover member 300 of the second actuator 320. The protrusion 303 for coupling with the at least one hole 140A2 may be formed on the second cover member 300.

The support holder 340 may include a first opening 140B1 for exposing the terminals 251 of the first circuit board 250A of the first board unit 250 and the terminals 255A of the first circuit board 192 of the second board unit 190 and a second opening 140B2 for exposing the terminals 252 of the second circuit board 250B of the first board unit 250 and the terminals 255B of the second circuit board 194 of the second board unit 190. The first opening 140B1 may be formed in the first side plate 141 of the support holder 340, and the second opening 140B2 may be formed in the second side plate 142 of the support holder 340. For example, each of the first and second openings 140B1 and 140B2 may be a through-hole.

For example, the support holder 340 may be formed of an injection-molding material (e.g., a resin or a plastic) or made of a metal material.

The image sensing unit 330 may include the fixing unit 410 coupling or fixing the second board 532 of the third board unit 530 to the support holder 340.

The fixing unit or the cover 410 may include an electronic element (or a circuit element), for example, the gyro sensor 332 and may be coupled to the second board 532. The fixing unit 410 may be interchangeably expressed as "support unit," "protection unit," "cover can," "gyro can," "cover," etc.

For example, the fixing unit 410 may include a metal material, for example, a stainless steel material. In another embodiment, the fixing unit 410 may be made of a material of an injection-molded product, for example, a plastic or resin material.

The fixing unit 410 may be coupled or attached to a first surface of the second board 532 by an adhesive. The first surface of the second board 532 may be a surface on which an electronic element, for example, the gyro sensor 332 is disposed or mounted.

The support holder 340 may include a first coupling portion 4 for coupling with the fixing unit 410. The first coupling portion 4 may be formed on the outer surface of the support holder 340 facing the first surface of the second board 532. For example, the first coupling portion 40 may be formed on the second side plate 142 of the support holder 340. The fixing unit 410 may include a second coupling portion 3 coupled to the first coupling portion 4 of the support holder 340.

For example, the first coupling portion 4 may include at least one protrusion 4A to 4D protruding from the outer surface of the support holder 340 (e.g., the outer surface of the second side plate 142). The protrusions 4A to 4D may have a bent shape or hook shape. For example, the first coupling portion 4 may include four protrusions 4A to 4D spaced apart from each other.

The second coupling portion 3 may include at least one hole 3A to 3D (or groove) corresponding to the at least one protrusion 4A to 4D of the first coupling portion 4. For example, the holes 3A to 3D may be through-holes into which the protrusions 4A to 4D may be inserted. The second coupling portion 3 may include four holes 3A to 3D corresponding to the four protrusions 4A to 4D.

In another embodiment, the first coupling portion of the support holder 340 may include at least one hole or groove, and the second coupling portion of the fixing unit 410 may include at least one protrusion for coupling with the at least one hole of the first coupling portion.

The first coupling portion 4 and second coupling portion 3 may be included in the fixing unit for fixing or coupling the cover 410 to the support holder. In another embodiment, the fixing unit may include the cover 410 and at least one of the first coupling portion 4 and the second coupling portion 3.

In addition, at least one of the support holder 340 and the cover 410 may function as a ground or a ground electrically connected to a ground of the board unit.

An adhesive (e.g., an epoxy bond) may be disposed between the fixing unit 410 and the support holder 340 to increase a coupling strength. For example, the adhesive may be disposed between an upper plate 411 of the fixing unit 410 and the second side plate 142 of the support holder 340 (or the outer surface of the second side plate 142).

The fixing unit 410 may be mechanically fixed to the support holder 340 by coupling a ring-shaped protrusion 4 to a hole 3, and the fixing unit may be chemically fixed to the support holder 340 by the adhesive.

The support holder 340 may include at least one guide unit 414 for supporting or guiding at least a portion of the fixing unit 410 in order to prevent a change in the position of the fixing unit 410 caused by an external impact, etc. When the fixing unit 410 is coupled to the support holder 340, the guide unit 414 may function to guide a coupling position of the fixing unit 410 to facilitate the coupling.

For example, the guide unit 414 may support the side portion (or the side plate) of the fixing unit 410.

For example, the guide unit 414 may support or be in contact with outer surfaces of side portions 412A and 412B (or side plates) of the fixing unit 410.

For example, the guide unit 414 may include a first guide portion 414A for supporting or guiding one side, one end, or a portion of the fixing unit 410 and a second guide portion 414B for supporting or guiding the other side, the other end, or the remaining portions of the fixing unit 410.

For example, the first guide portion 414A may be positioned between a first protrusion 4A and a second protrusion 4B, and the second guide portion 414B may be positioned between a third protrusion 4C and a fourth protrusion 4D.

For example, the first and second guide portions 414A and 414B may be disposed to be spaced apart from each other in the second direction or to face each other in the second direction. For example, each of the first and second guide portions 414A and 414B may have a plate shape or a bar shape, but is not limited thereto.

The fixing unit 410 may be disposed between the first guide portion 414A and the second guide portion 414B. For example, the first guide portion 414A may support the first side portion 412A (or the first side plate) of the fixing unit 410 and may be in contact with the first side portion 412A (or the first side plate). For example, the second guide portion 414B may support the second side portion 412B (or the second side plate) of the fixing unit 410 and may be in contact with the second side portion 412B (or the second side plate). For example, an adhesive may be disposed between the guide unit 414 and the fixing unit 410.

When the fixing unit 410 and the support holder 340 are fixed using only the adhesive (an epoxy bond) without mechanical fixation, the adhesive may deteriorate over time and peel off, and thus the coupling between the fixing unit 410 and the support holder 340 may be weakened, resulting in a change in the position of the gyro sensor. In the embodiment, by physically fixing the fixing unit 410 to the support holder 340 primarily and chemically fixing the fixing unit 410 to the support holder 340 using the adhesive secondarily, it is possible to increase the coupling strength between the fixing unit 410 and the support holder 340, thereby stably fixing or attaching the second board 532 to the support holder 340. In addition, since the physical fixation between the fixing unit 410 and the support holder 340 may be reinforced through the guide unit 414, the second board 532 may be stably fixed or attached to the support holder 340.

The fixing unit 410 may cover the gyro sensor 332 to protect the gyro sensor 332 disposed on the second board 532. For example, the gyro sensor 332 may be disposed inside the fixing unit 410.

The fixing unit 410 may be disposed on the second board 532 to surround the gyro sensor 332 and protect the gyro sensor 332 from an external impact.

For example, the fixing unit 410 may include the upper plate 411 and the side plate 412. The upper plate 411 may correspond to or face the gyro sensor 332 in the third direction. The side plate 412 may be connected to the upper plate 411 and disposed between the second board 532 and the upper plate 411. The side plate 412 may be coupled, attached, or fixed to the second board 532 by an adhesive.

For example, the holes 3A to 3D may be formed in an area in which the upper plate 411 and the side plates 412A and 412B of the fixing unit 410 are connected or in contact with each other. For example, the two holes 3A and 3B may be formed in the area in which the upper plate 411 and the first side plate 412A of the fixing unit 410 are connected or meet, and the remaining two holes 3C and 3D may be formed in the area in which the upper plate 411 and the second side plate 412B of the fixing unit 410 are connected or meet.

The upper plate 411 of the fixing unit 410 may be coupled to the second side plate 142 of the support holder 340.

For example, the fixing unit 410 may include first and second side plates 412A and 412B facing each other. For example, the first and second side plates 412A and 412B may face each other in the second direction. In another embodiment, the fixing unit 410 may further include third and fourth side plates positioned between the first and second side plates and facing each other in the first direction.

In another embodiment, the support holder 340 may have a box shape including at least one of an upper plate, a side plate, and a lower plate and include at least one of the first actuator, the second actuator, and the image sensing unit therein.

The third board unit 530 may include a board including a bent or curved portion 533A. As illustrated in FIG. 55, the third board 533 may include the bent or curved portion 533A, and the curved portion 533A may have a structure that is vulnerable to an external impact. For example, the third board 533 may include a portion that is bent or curved vertically or substantially vertically.

A case in which the fixing unit 410 is omitted from the camera device 200 according to the embodiment is referred to as a first camera device. In addition, a case in which a cover can attached to the second board of the third board unit to protect the gyro sensor is provided but the cover can is not fixed to the support holder is referred to as a second camera device.

In the case of each of the first and second camera devices, the second board of the third board unit may move freely, and the position of the second board of the third board unit may be easily changed by the external impact. In general, since the gyro sensor is sensitive to a position, the position of the gyro sensor may be easily changed by the free movement of the second boards of the first and second camera devices, which may cause noise in the gyro sensor, and due to the noise, the reliability of the gyro sensor may be degraded.

In addition, since the third board 533 is positioned adjacent to bonding portions (or soldering portions) between the terminals 254B of the second circuit board 194 of the second board unit 190 and the second terminals 253B of the first board 531 of the third board unit 530, the bonding portions peel off or cracks occurs in the bonding portions due to the free and easy movements of the second boards of the first and second camera devices, and thus the first and second camera devices may not be operated. In addition, the above-described cover can may be separated from the second boards due to the free and easy movements of the second boards of the first and second camera devices.

In addition, since the second boards of the first and second camera devices move freely and easily, cracks may occur inside the third board unit 530 due to an external impact and exposure to an environment, and thus the first and second camera devices may not be operated.

In the embodiment, since the second board 532 is stably fixed to the support holder 340 by the fixing unit 410, it is possible to suppress the change in the position of the gyro sensor 332 caused by the external impact or the like, thereby securing the reliability of the gyro sensor 332.

In addition, since the second board 532 is stably fixed to the support holder 340 by the fixing unit 410, it is possible to prevent the occurrence of micro cracks in the bonding portions (or the soldered portions) between the terminals 254B of the second circuit board 194 of the second board unit 190 and the second terminals 253B of the first board 531 of the third board unit 530, thereby securing the reliability of the electrical connection of the camera device.

In addition, since the second board 532 is stably fixed to the support holder 340 by the fixing unit 410, it is possible to minimize the stress acting on the bent or curved portion 533A of the third board 533, thereby preventing the occurrence of cracks inside the third board unit 530 caused by the external impact. In particular, it is possible to suppress or prevent the occurrence of cracks in the bent or curved portion 533A of the third board 533.

The camera device 200 according to the embodiment may further include a reinforcing member 311 for physically or mechanically supporting and protecting the third board unit 530. Referring to FIG. 44, the reinforcing member 311 may include a first reinforcing portion 311A disposed on a second surface of the first board 531 of the third board unit 530, a second reinforcing portion 311B connected to one end of the first reinforcing portion 311A and for supporting the one end of the first board 531, and a third reinforcing portion 311C connected to the other end of the first reinforcing portion 311A, disposed on the second surface of the second board 531, and for supporting and protecting the second board 532. The second surface of the first board 531 may be a surface opposite to the first surface of the first board 531, and the second surface of the second board 532 may be a surface opposite to the first surface of the second board 532. The reinforcing member 311 may include a metal material, for example, a stainless steel material.

The second reinforcing portion 311B may be bent from one end of the first reinforcing portion 311A toward the first circuit board 192 of the second board unit 190. The second reinforcing portion 311B may function to protect the bonding portions (e.g., the soldering portions) between the terminals 254A of the first circuit board 192 of the second board unit 190 and the terminals 253A of the first board 531 of the third board unit 530. For example, the second reinforcing portion 311B may include a curved surface. For example, the second reinforcing portion 311B may include a curved surface that is convex toward the bonding portions between the terminals 254A of the first circuit board 192 and the terminals 253A of the first board 531 of the third board unit 530.

The third reinforcing portion 311C may include a portion that is bent or curved from the other end of the first reinforcing portion 311A toward the second circuit board 194 of the second board unit 190 or the fixing unit 410. The third reinforcing portion 311C can protect a curved portion of the third board 533 from an external impact. In addition, the third reinforcing portion 311C can protect the second board 532 from the external impact.

The reinforcing member 311 may further include a fourth reinforcing portion 311D that is bent from one end of the third reinforcing portion 311C and extends to surround one end of the second board 532. The fourth reinforcing portion 311D may be bent toward the second circuit board 194.

Figure 59A:
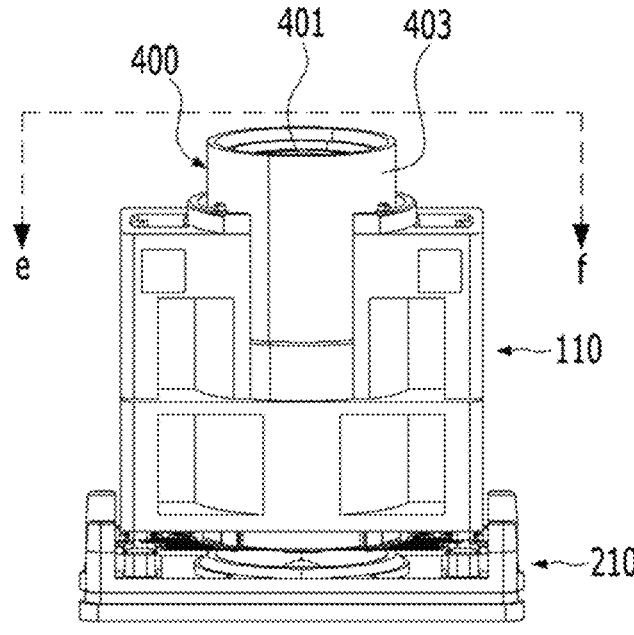
FIG. 59A is a perspective view of a lens module and a base coupled to a bobbin.
Figure 59B:
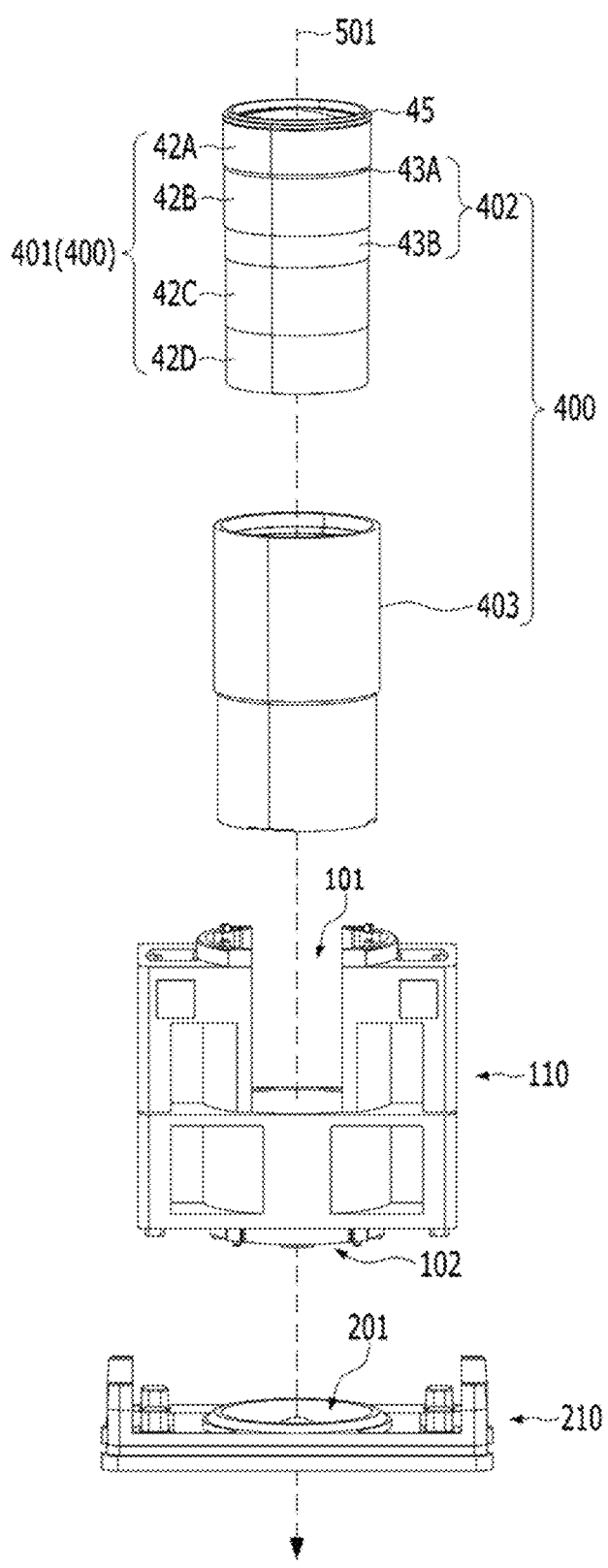
FIG. 59B is an exploded perspective view of the lens module, the bobbin, and the base in FIG. 59A.
Figure 59C:
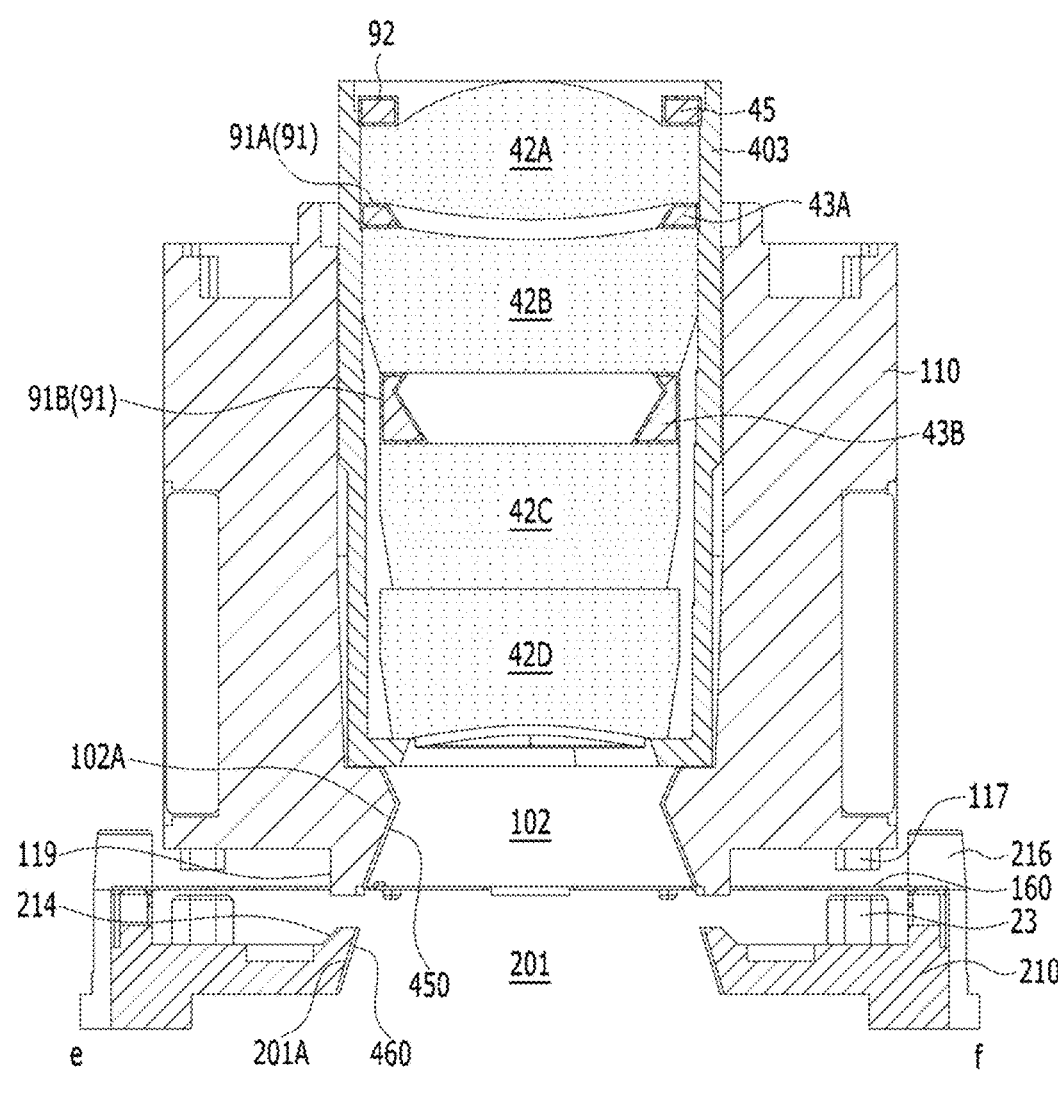
FIG. 59C is a cross-sectional view of the lens module, the bobbin, and the base in FIG. 59A in an e-f direction.
Figure 60:
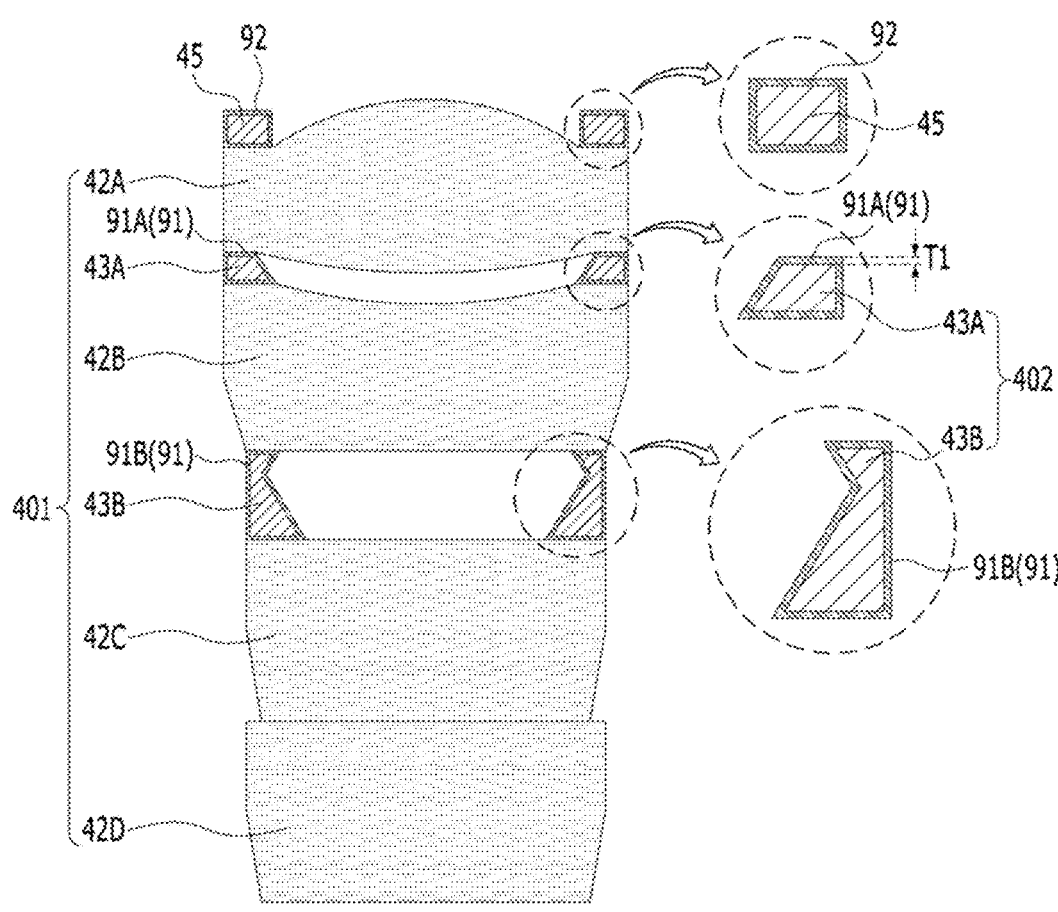
FIG. 60 is an enlarged view of the lens module in FIG. 59C.

FIG. 59A is a perspective view of the lens module 400 and the base 210 coupled to the bobbin 110, FIG. 59B is an exploded perspective view of the lens module 400, the bobbin 110, and the base 210 in FIG. 59A, FIG. 59C is a cross-sectional view of the lens module 400, the bobbin 110, and the base 210 in FIG. 59A in an e-f direction, and FIG. 60 is an enlarged view of the lens module 400 in FIG. 59C.

Referring to FIGS. 59A to 60, light 501 passing through the lens module 400 may pass through the hole 102 of the bobbin 110 and the opening 201 of the base 210 and reach the image sensor 540.

The lens module 400 may include at least one lens or lens array 401, at least one spacer 402, and a first light absorption layer 91 disposed on the at least one spacer 402.

For example, the lens array 401 may include a plurality of lenses 42A to 42D arranged in the first direction.

The spacer 402 may be disposed between adjacent two lenses among the plurality of lenses 42A to 42D. Since a distance between the lenses may be adjusted by the spacer 402, it is possible to improve and correct the optical performance of the lens array 401.

A shape of the spacer 402 when viewed in the first direction may be a closed curve shape, for example, a circular, oval, or polygonal ring shape. For example, the spacer 402 may have a hollow.

For example, the spacer 402 may be disposed on an edge portion of the lens and may support the edge portion of the lens. For example, the spacer 402 may be disposed between a first edge of a lower surface of any one of adjacent two lenses and a second edge of an upper surface of the other one of the two lenses and may support the first edge and the second edge.

For example, the spacer 402 may be made of or may include a metal material.

For example, the spacer 402 may include a plurality of spacers 43A and 43B, and one or more spacers may be formed.

For example, the spacer 402 may include a first spacer 43A disposed between a first lens 42A and a second lens 42B and a second spacer 42B disposed between the second lens 42B and a third lens 42C. A length of any one of the spacers 43A and 43B in the first direction may be different from a length of the other one of the spacers 43A and 43B in the first direction.

A surface of the spacer 402 may be coated with the first light absorption layer 91, or the first light absorption layer 91 may be disposed or applied on a surface of the spacer 402. For example, the first light absorption layer 91 may be disposed on at least one of an upper surface, a lower surface, and a side surface of the spacer 402.

For example, the first light absorption layer 91 may be disposed to surround the surface of the spacer 402. The first light absorption layer 91 may have a high light absorption rate and a low light reflectivity.

For example, the first light absorption layer 91 may be a coating layer. In addition, for example, the first light absorption layer 91 may be a matte coating layer. Alternatively, for example, the first light absorption layer 91 may be a matte layer or a matte film.

Alternatively, for example, the first light absorption layer 91 may be a black coating layer. Alternatively, for example, the first light absorption layer 91 may be a black layer or a black coating film.

For example, the first light absorption layer 91 may be disposed to surround the surface of the spacer 402. The first light absorption layer 91 may be interchangeably expressed as "light absorption film" or "black coating film." The first light absorption layer 91 may have a high light absorption rate and a low light reflectivity.

The first light absorption layer 91 may include a 1-1 light absorption layer 91A disposed on the surface of the first spacer 43A and a 1-2 light absorption layer 91B disposed on the surface of the second spacer 43B.

For example, the first light absorption layer 91 may be formed by coating the surface of the spacer 402 with a material having a high light absorption rate and a low light reflectivity.

The first light absorption layer 91 may include a black material that absorbs light.

For example, the first light absorption layer 91 may include at least one of black titanium, black titanium-carbon, and black carbon. For example, the first light absorption layer 91 may include at least one of black titanium oxide, black titanium-carbon oxide, and black carbon oxide.

Alternatively, for example, the first light absorption layer 91 may include any one of titanium, titanium oxide, titanium-carbon oxide, black carbon, or black carbon oxide. For example, a composition of the first light absorption layer 91 may be $Ti_nO_{2n-1}$, and n may be $1.5 < n < 4.5$. In another embodiment, n may be $2 \leq n \leq 4$.

When n exceeds 4.5, a color of the light absorption layer may be changed. When $n > 4.5$, the color of the light absorption layer may be changed from black to blue-black, gray, or white, and thus the light absorption ability may be reduced, and the effect of resolving the flare phenomenon may not be obtained due to light reflection. In addition, when n is smaller than 1.5, black coating oxide may not be formed.

In addition, for example, the composition of the first light absorption layer 91 may be $Ti_xO_yC_z$, and x, y, and z may be $0.5 < x < 4.5$, $1.5 < y < 7.5$, and $0.5 < z < 4.5$. In another embodiment, x, y, and z may be $1 \leq x \leq 4$, $2 \leq y \leq 7$, and $1 \leq z \leq 4$.

In addition, the first light absorption layer 91 may be made of a mixture of at least one of black titanium, black titanium-carbon, and black carbon and a resin. Alternatively, the first light absorption layer 91 may be made of a mixture of at least one of black titanium oxide, black titanium-carbon oxide, and black carbon oxide and a resin.

For example, a ratio (M1:M2) of a weight M1 of the resin to a weight M2 of the black material may be in a range of 1:1.5 to 1:5. In another embodiment, M1:M2 may be in a range of 1:2 to 1:3.

For example, the black material may be at least one of black titanium, black titanium-carbon, and black carbon. Alternatively, for example, the black material may be at least one of black titanium oxide, black titanium-carbon oxide, and black carbon oxide.

Alternatively, a thickness of the first light absorption layer 91 may be in a range of 0.5 micrometers or more and 10 micrometers or less. When a thickness T1 of the first light absorption layer 91 is smaller than 0.5 micrometers, the effect of the black coating is insignificant, and thus the flare reduction effect to be described below may not be obtained. When the thickness T1 of the first light absorption layer 91 exceeds 10 micrometers, the characteristics of the lens may be affected, resulting in a decrease in resolution power, and interference may occur in lens assembly. In another embodiment, the thickness of the first light absorption layer 91 may be in a range of 1 micrometer or more and 5 micrometers or less.

A size of a particle of the black material included in the first light absorption layer 91 may be in a range of 0.05 micrometers or more and 2 micrometers or less. In another embodiment, the size of the particle of the black material included in the first light absorption layer 91 may be in a range of 0.1 micrometer or more and 1 micrometer or less.

In order to use a coating material, the smaller the size of the black material, the more advantageous it is. This is because, as a uniformity, that is, a density of the coating increases, the diffused reflection of light occurs less. However, when the size of the particle of the black material is smaller than 0.05 micrometers, the effect of light absorption may be rapidly reduced.

When the black material is formed of large-sized particles, as a surface coating is not uniform, the diffused reflection occurs more easily and thus light is reflected in all directions, resulting in worsening the flare phenomenon. In other words, when the size of the particle of the black material exceeds 2 micrometers, the diffused reflection occurs easily and thus light is reflected in all directions, resulting in worsening the flare phenomenon.

The lens module 400 may further include a stopper 45 disposed on the first lens 42A and a second light absorption layer 92 disposed on the stopper 45. The stopper 45 may be disposed on an upper surface of the first lens 42A and may function to protect the lens array 401 from an external impact. The description of the material and the shape of the spacer 402 may be applied or analogously applied to the stopper 45.

The description of the material, the composition, and the thickness of the first light absorption layer 91 may be applied or analogously applied to the second light absorption layer 92 surrounding the stopper 45.

In addition, the lens module 400 may include a lens barrel 403 for accommodating the lens array 401 and a third light absorption layer disposed on an inner surface of the lens barrel 403. The lens barrel 403 may be coupled to the bobbin 110.

Figure 61A:
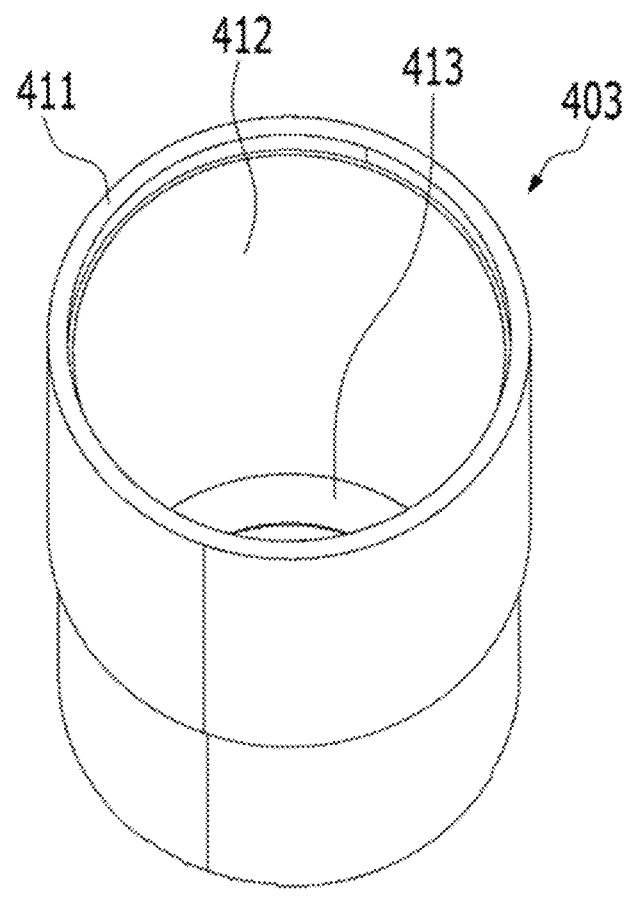
FIG. 61A is a perspective view of a lens barrel.
Figure 61B:
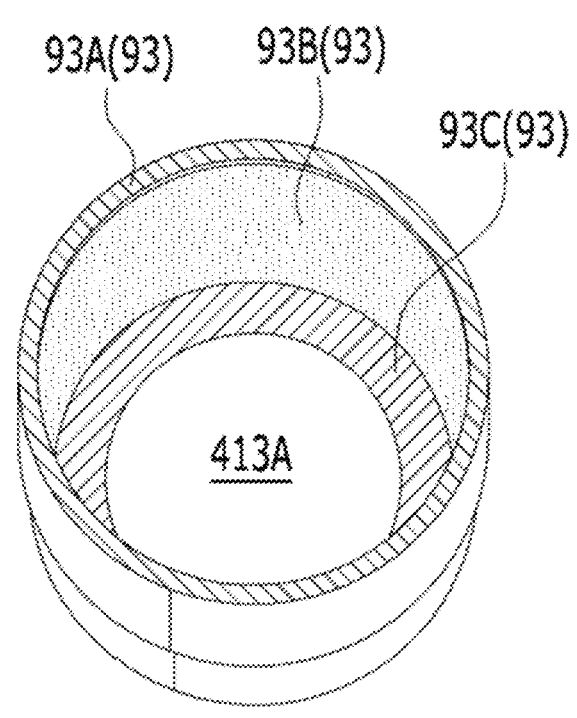
FIG. 61B is a view illustrating a third light absorption layer disposed in the lens barrel.
Figure 61C:
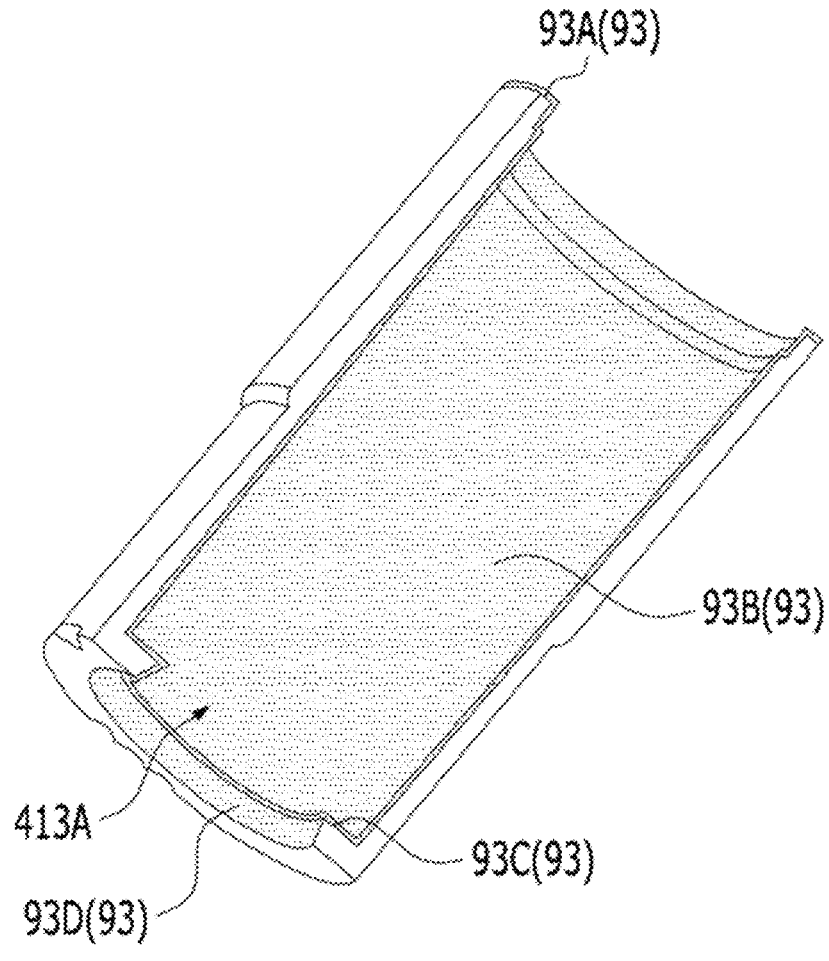
FIG. 61C is a cross-sectional perspective view of the lens barrel and the third light absorption layer.
Figure 61D:
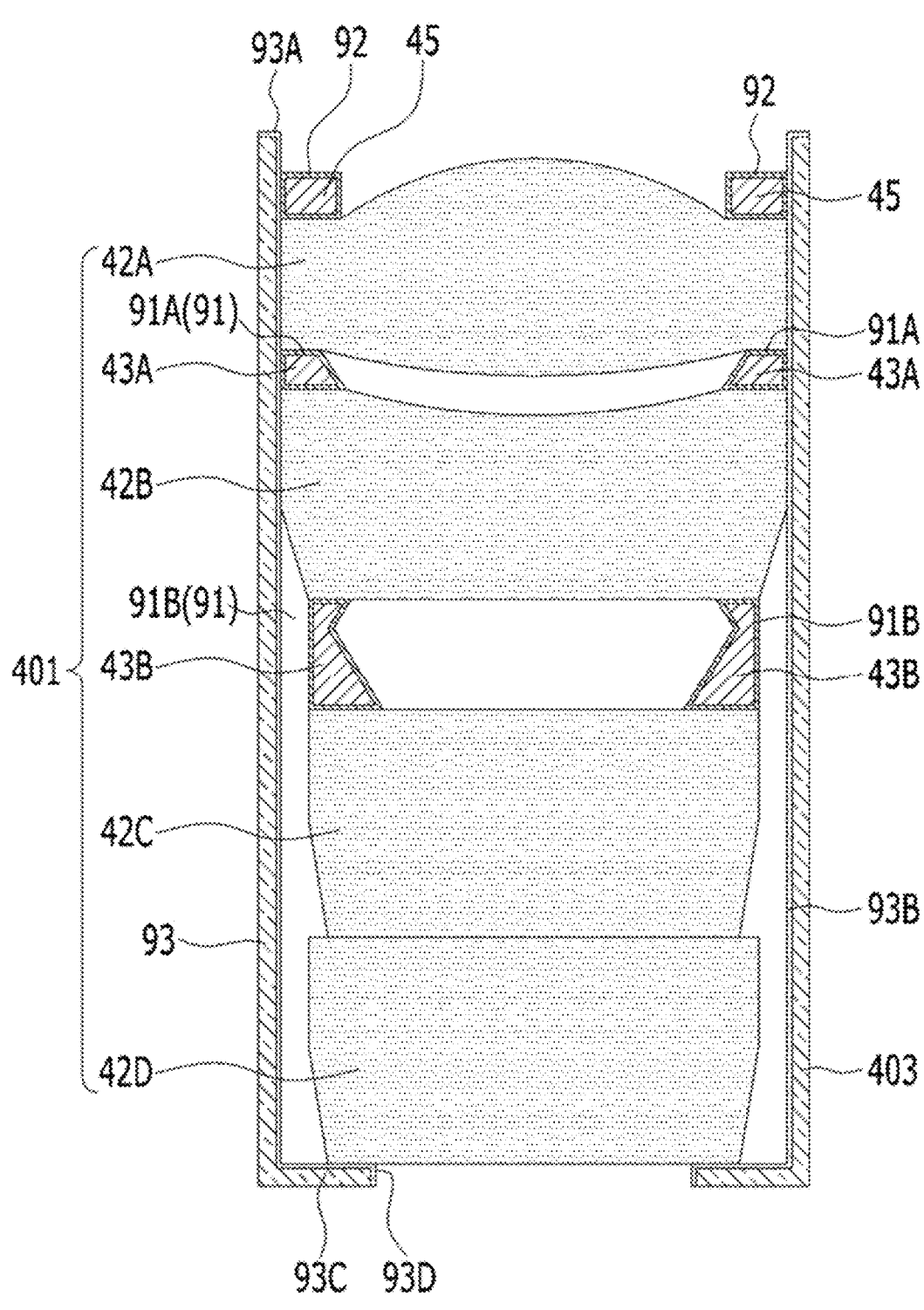
FIG. 61D is a cross-sectional view of the lens barrel, a lens array, a spacer, and first to third light absorption layers.

FIG. 61A is a perspective view of the lens barrel 403, FIG. 61B is a view illustrating a third light absorption layer 93 disposed in the lens barrel 403, FIG. 61C is a cross-sectional perspective view of the lens barrel 403 and the third light absorption layer 93, and FIG. 61D is a cross-sectional view of the lens barrel 403, the lens array 401, the spacer 402, and the first to third light absorption layers 91, 92, and 93.

Referring to FIGS. 61A to 61D, the lens array 401 and the spacer 402 may be disposed in the lens barrel 403. For example, the lens barrel 403 may be a cylinder having an internal space capable of accommodating the lens array 401 and the spacer 402.

The lens barrel 403 may include an upper surface 411, an inner surface 412 (or an internal surface), and a bottom portion 413.

At least one of the upper surface 411, the inner surface 412, and the bottom portion 413 of the lens barrel 403 may be coated with the third light absorption layer 93, or third light absorption layer 93 may be disposed or applied on the at least one of the upper surface 411, the inner surface 412, and the bottom portion 413 of the lens barrel 403.

For example, the third light absorption layer 93 may include a first portion 93A disposed on the upper surface 411 of the lens barrel 403, a second portion 93B disposed on the inner surface 412 of the lens barrel 403, and a third portion 93C disposed on an inner surface of the bottom portion 413 of the lens barrel 403.

In addition, the lens barrel 403 may include a hole 413A passing through the bottom portion 413 to expose the lens array 401. For example, the lens barrel 403 may include the hole 413A passing through the bottom portion 413 (lower surface or lower portion) from the upper surface 411.

As illustrated in FIG. 61C, the third light absorption layer 93 may further include a fourth portion 93D disposed on an inner circumferential surface formed by the hole 413A of the bottom portion 413 (lower surface or lower portion) of the lens barrel 403.

The description of the material, the composition, and the thickness of the first light absorption layer 91 may be applied or analogously applied to the third light absorption layer 93.

The lens barrel 403 may be formed of an injection-molded product. For example, the lens barrel 403 may be made of a resin or plastic material. For example, the lens barrel 403 may be made of polycarbonate or a liquid crystal polymer (LCP).

In general, a spacer made of a metal material and a lens barrel formed of an injection-molded product may not absorb 100% of light. Therefore, in a process in which light flowing into the lens barrel from the outside reaches the image sensor, the light is reflected by the spacer and the lens barrel, resulting in the occurrence of flare or ghost that is noise. In particular, since an optical path up to the image sensor increases when a length of the lens barrel in the optical axis direction increases like a zoom camera device, many beams are reflected by the spacer and the lens barrel, and thus a flare phenomenon or a ghost phenomenon may occur, and an image degradation of the camera device may occur.

In the embodiment, it is possible to suppress or prevent the light reflection by the spacer and the lens barrel by the first light absorption layer 91 disposed on the surface of the spacer 402 and the third light absorption layer 93 disposed on the inner surface of the lens barrel, thereby preventing the flare phenomenon and the ghost phenomenon and preventing the image degradation of the camera device.

In addition, in the embodiment, it is possible to suppress or prevent the light reflection by the stopper 45 by the second light absorption layer 92, thereby preventing the flare phenomenon or the ghost phenomenon and preventing the image degradation of the camera device.

Figure 62:
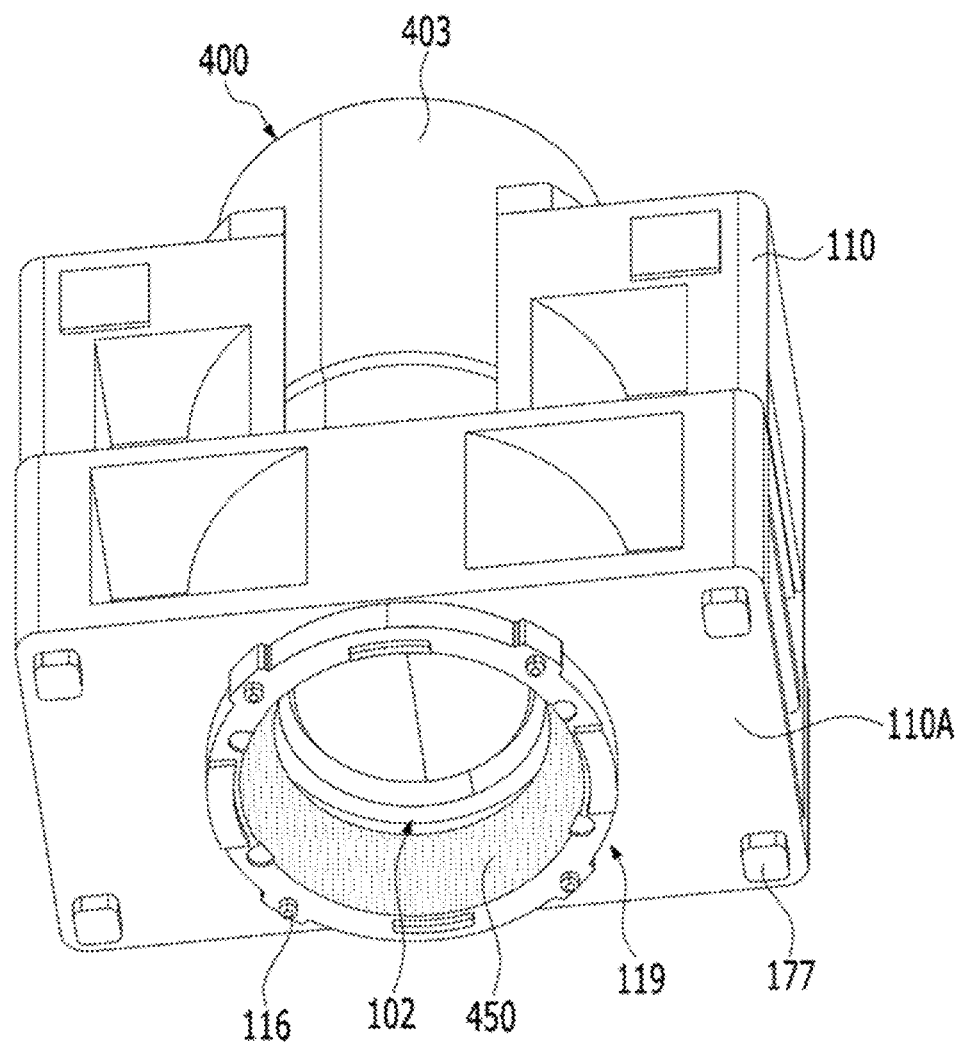
FIG. 62 is a perspective view of the lens barrel, the bobbin, and a fourth light absorption layer.

FIG. 62 is a perspective view of the lens module 400, the bobbin 110, and a fourth light absorption layer 450.

Referring to FIGS. 59C and 62, the hole 102 for exposing a portion of the lens array disposed in the lens module 400 may be formed in the lower portion of the bobbin 110. The hole 102 may be positioned under the lens module 400 or the lens barrel 403.

For example, the hole 102 may be positioned under the lens barrel 403 and may expose the lens (e.g., 42D) positioned on a lowermost portion of the lens array 401.

The light passing through the lens array may be emitted from the bobbin 110 through the hole 102.

For example, a diameter of the hole 102 may be smaller than a diameter of the lens barrel 403. The bobbin 110 may include a hole 101 or a through-hole for accommodating the lens barrel 403 or the lens module 400 on the hole 102. The hole 102 may be positioned between the hole 101 and the lower surface of the bobbin 110.

In addition, the hole 102 of the bobbin 110 may correspond to, face, or overlap the hole 413A of the lens barrel 403 in the first direction. The light passing through the lens module 400 may pass through the hole 102 formed in the lower portion of the bobbin 110.

The camera device 200 may include the fourth light absorption layer 450 disposed on an inner surface 102A (or an inner circumferential surface) of the bobbin 110 formed by the hole 102.

For example, the inner surface 102A of the bobbin 110 may be coated with the fourth light absorption layer 450, or the fourth light absorption layer 450 may be applied to the inner surface 102A of the bobbin 110. The fourth light absorption layer 450 may be positioned between the lens barrel 403 and the opening 201 of the base 210.

The inner circumferential surface 102A of the bobbin 110 formed by the hole 102 of the bobbin 110 may include a first area 102-1 in which the hole 102 has a decreased diameter in a direction from the upper portion to the lower portion of the bobbin 110. In the cross-sectional view of the hole 102 in FIG. 59C, the first area 102-1 of the inner circumferential surface 102A of the bobbin 110 may have a first inclined surface.

The inner circumferential surface 102A of the bobbin 110 formed by the hole 102 of the bobbin 110 may include a second area 102-2 in which the hole 102 has an increased diameter in a direction from the upper portion to the lower portion of the bobbin 110. The second area 102-2 may be positioned under the first area 102-1, and the first area 102-1 and the second area 102-2 may be connected.

In the cross-sectional view of the hole 102 in FIG. 59C, the second area 102-2 of the inner circumferential surface 102A of the bobbin 110 may have a second inclined surface. For example, the first inclined surface and the second inclined surface may have different slopes. In another embodiment, the first inclined surface and the second inclined surface may have the same slope. For example, a length of the second area 102-2 in the optical axis direction may be larger than a length of the first area 102-1 in the optical axis direction. In another embodiment, the length of the second area 102-2 in the optical axis direction may be equal to or smaller than the length of the first area 102-1 in the optical axis direction.

In another embodiment, the inner circumferential surface of the bobbin 110 may include a portion in which the hole 102 has a constant diameter.

The fourth light absorption layer 450 may include a first portion 450A disposed on the first area 102-1 of the inner circumferential surface 102A of the bobbin 110. In addition, the fourth light absorption layer 450 may include a second portion 450B disposed on the second area 102-2 of the inner circumferential surface 102A of the bobbin 110.

For example, the fourth light absorption layer 450 may include at least one of the first portion 450A and the second portion 450B.

For example, the bobbin 110 may include a protruding portion 119 protruding downward from the lower surface of the bobbin 110, and the protruding portion 119 may be formed at a position corresponding to or facing the lens barrel 403. For example, the hole 102 may pass through the protruding portion 119.

The description of the material, the composition, and the thickness of the first light absorption layer 91 may be applied or analogously applied to the fourth light absorption layer 450.

In the embodiment, it is possible to suppress or prevent the light reflection by the inner surface 102A of the bobbin 110 by the fourth light absorption layer 450, thereby preventing the flare phenomenon or the ghost phenomenon and preventing the image degradation of the camera device.

Figure 63:
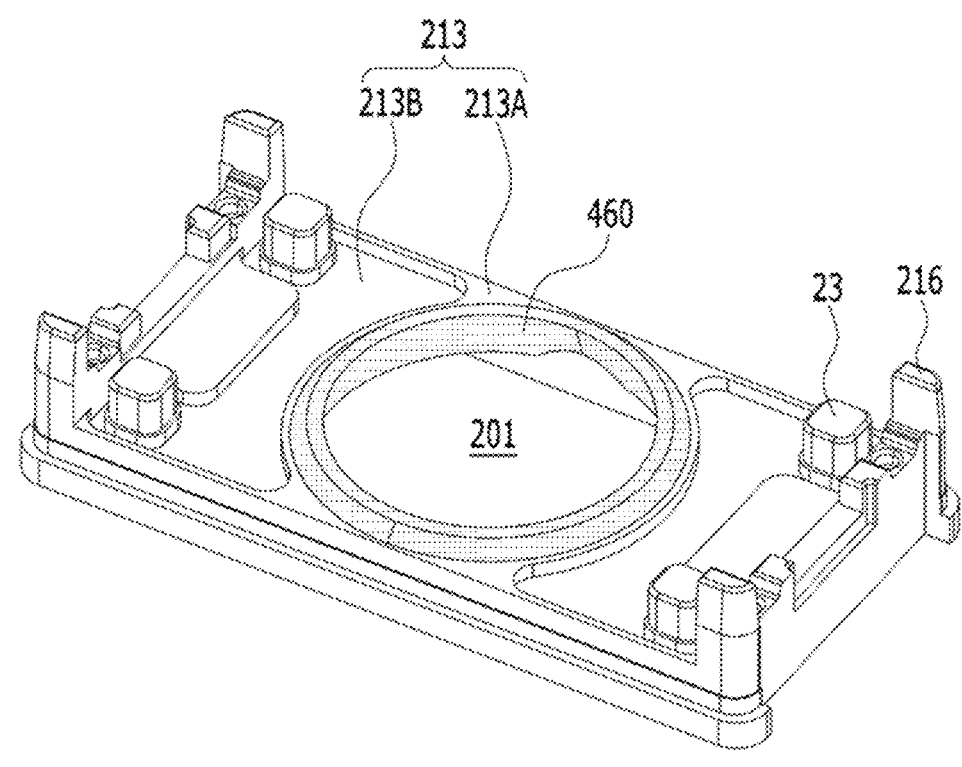
FIG. 63 is a perspective view of the base and a fifth light absorption layer.

FIG. 63 is a perspective view of the base 210 and a fifth light absorption layer 460.

Referring to FIGS. 59C and 63, the light passing through the lens module 400 may pass through the opening 201 of the base 210 and reach the image sensor 540.

The camera device 200 may include the fifth light absorption layer 460 disposed on an inner surface 201A (or an inner circumferential surface) formed by the opening 201 of the base 210. For example, the inner surface 201A of the base 210 may be coated with the fifth light absorption layer 460, or the fifth light absorption layer 460 may be applied to the inner surface 201A of the base 210. The fifth light absorption layer 460 may be positioned between the hole 102 of the bobbin 110 and the image sensor 540.

For example, the opening 201 of the base 210 may have an increased diameter in a direction from the upper surface of the base 210 to the lower surface of the base 210. In the cross-sectional view of the opening 201 in FIG. 59C, an inner circumferential surface of the opening 201 of the base 210 may have an inclined surface. In another embodiment, the inner circumferential surface of the base 210 may include a portion in which the opening 201 has a constant diameter.

For example, the inner circumferential surface 201A of the base 210 may include a first area 213A in which opening 201 has an increased diameter in a direction from the upper surface of the base 210 to the lower surface of the base 210.

For example, the fifth light absorption layer 460 may include a first portion 460A disposed on the first area 213A of the inner circumferential surface 201A of the base 210.

In addition, the inner circumferential surface 201A of the base 210 may include a second area 213B in which the opening 201 has a constant diameter in a direction from the upper surface of the base 210 to the lower surface of the base 210. For example, the fifth light absorption layer 460 may include a second portion 460B disposed on the second area 213B of the inner circumferential surface 201A of the base 210. For example, the fifth light absorption layer 460 may include at least one of the first portion 460A and the second portion 460B.

The fifth light absorption layer 460 may include a portion disposed in one area of the upper surface of the base 210 adjacent to the opening 201.

For example, an upper surface 213 of the base 210 may include the first surface 213A and the second surface 213B having a step difference with the first surface 213A in the first direction. The second surface 213B may be closer to the lower surface of the base 210 than the first surface 213A is. The stopper 23 may protrude from the second surface 213B, and an upper surface of the stopper 23 may be positioned above the first surface 213A.

The base 210 may include a protruding portion 214 protruding from the first surface 213A. The opening 201 may pass through the protruding portion 214. The protruding portion 214 may be formed around the opening 201.

The fifth light absorption layer 460 may include a portion disposed on an inner surface of the protruding portion 214 formed by the opening 201. In addition, the fifth light absorption layer 460 may include a portion disposed on an upper surface of the protruding portion 214.

The description of the material, the composition, and the thickness of the first light absorption layer 91 may be applied or analogously applied to the fifth light absorption layer 460.

In the embodiment, it is possible to suppress or prevent the light reflection by the inner surface 201A of the base 210 by the fifth light absorption layer 460, thereby preventing the flare phenomenon or the ghost phenomenon and preventing the image degradation of the camera device.

Figure 64A:
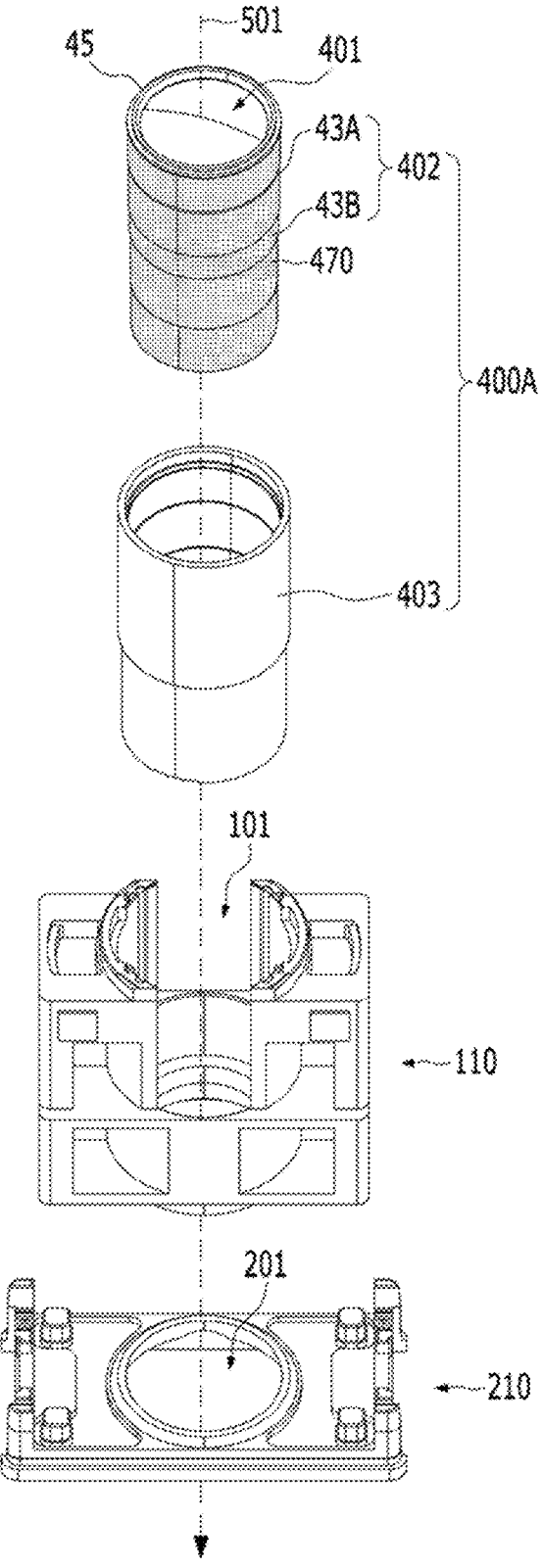
FIG. 64A is an exploded perspective view of the bobbin, the base, and a lens module according to another embodiment.
Figure 64B:
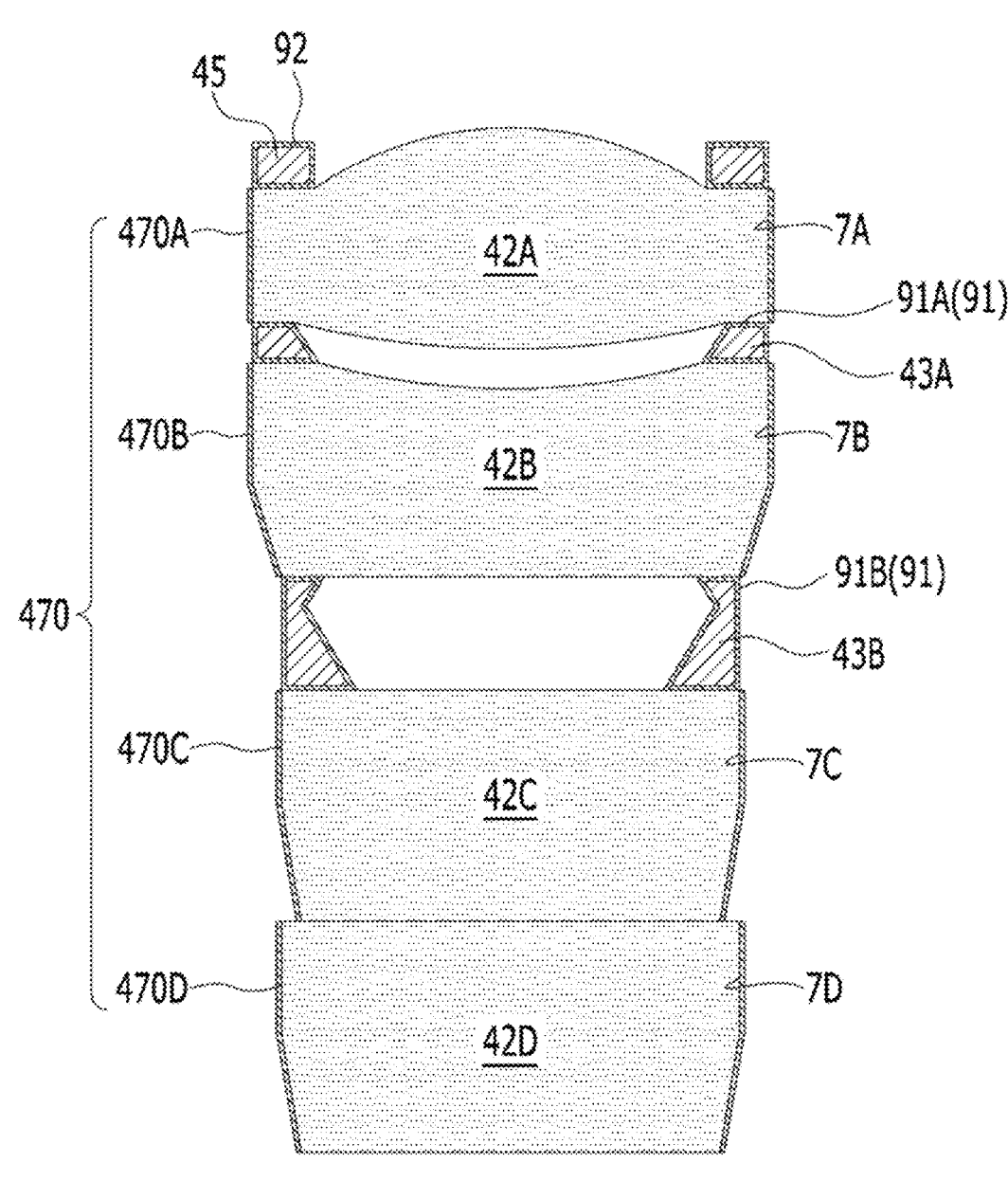
FIG. 64B is a cross-sectional view of the lens array and a sixth light absorption layer in FIG. 64A.

FIG. 64A is an exploded perspective view of the bobbin 110, the base 210, and a lens module 400A according to another embodiment, and FIG. 64B is a cross-sectional view of the lens array and a sixth light absorption layer 470 in FIG. 64A. The same reference numerals as in FIG. 59B denote the same components in FIG. 64A, and descriptions of the same components will be omitted or simplified.

Referring to FIGS. 64A and 64B, the lens module 400A may include the lens array 401, the lens barrel 403, and the sixth light absorption layer 470. The lens module 400A may further include the spacer 402 and the stopper 45.

The sixth light absorption layer 470 may be disposed on the outer surface of the lens array 401. For example, the outer surface of each of the plurality of lenses 42A to 42D may be coated with the sixth light absorption layer 470, or the sixth light absorption layer 470 may be disposed or applied on the outer surface of each of the plurality of lenses 42A to 42D.

For example, the sixth light absorption layer 470 may include a first layer 470A disposed on the outer surface of the first lens 42A, a second layer 470B disposed on the outer surface of the second lens 42B, a third layer 470C disposed on the outer surface of the third lens 42C, and a fourth layer 470D disposed on the outer surface of the fourth lens 42D.

The upper surface (or the incident surface) and the lower surface (or the emission surface) of each of the plurality of lenses 42A to 42D may be exposed from the sixth light absorption layer 470. In other words, the sixth light absorption layer 470 may not be disposed on the upper surface (or the incident surface) and the lower surface (or the emission surface) of each of the plurality of lenses 42A to 42D.

The description of the material, the composition, and the thickness of the first light absorption layer 91 may be applied or analogously applied to the sixth light absorption layer 470.

In the embodiment, it is possible to suppress or decrease light discharged after passing through the outer surface of the lens array 401 by the sixth light absorption layer 470, thereby suppressing or preventing light reflection by the inner surface of the lens barrel 403, and prevent the flare phenomenon or the ghost phenomenon, thereby preventing the image degradation of the camera device.

The above descriptions of the first to fifth light absorption layers 91 to 93, 450, and 460 may be applied or analogously applied to the embodiment of FIGS. 64A and 64B.

Figure 65A:
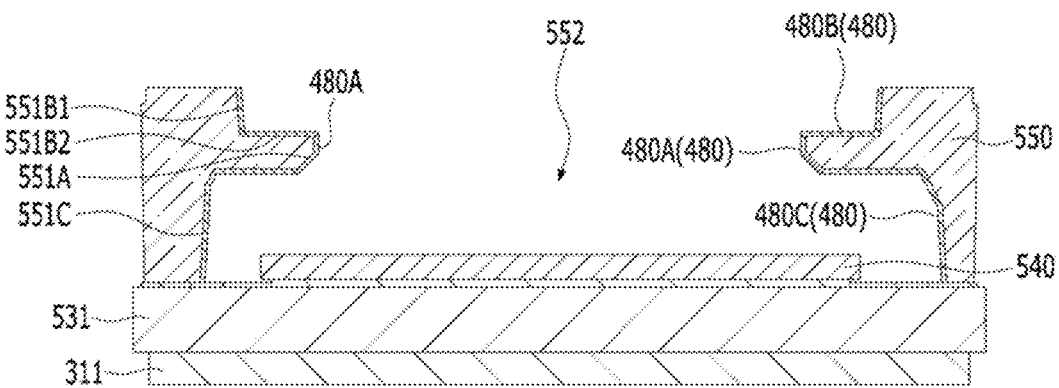
FIG. 65A is a cross-sectional view of a sensor base and a seventh light absorption layer.
Figure 65B:
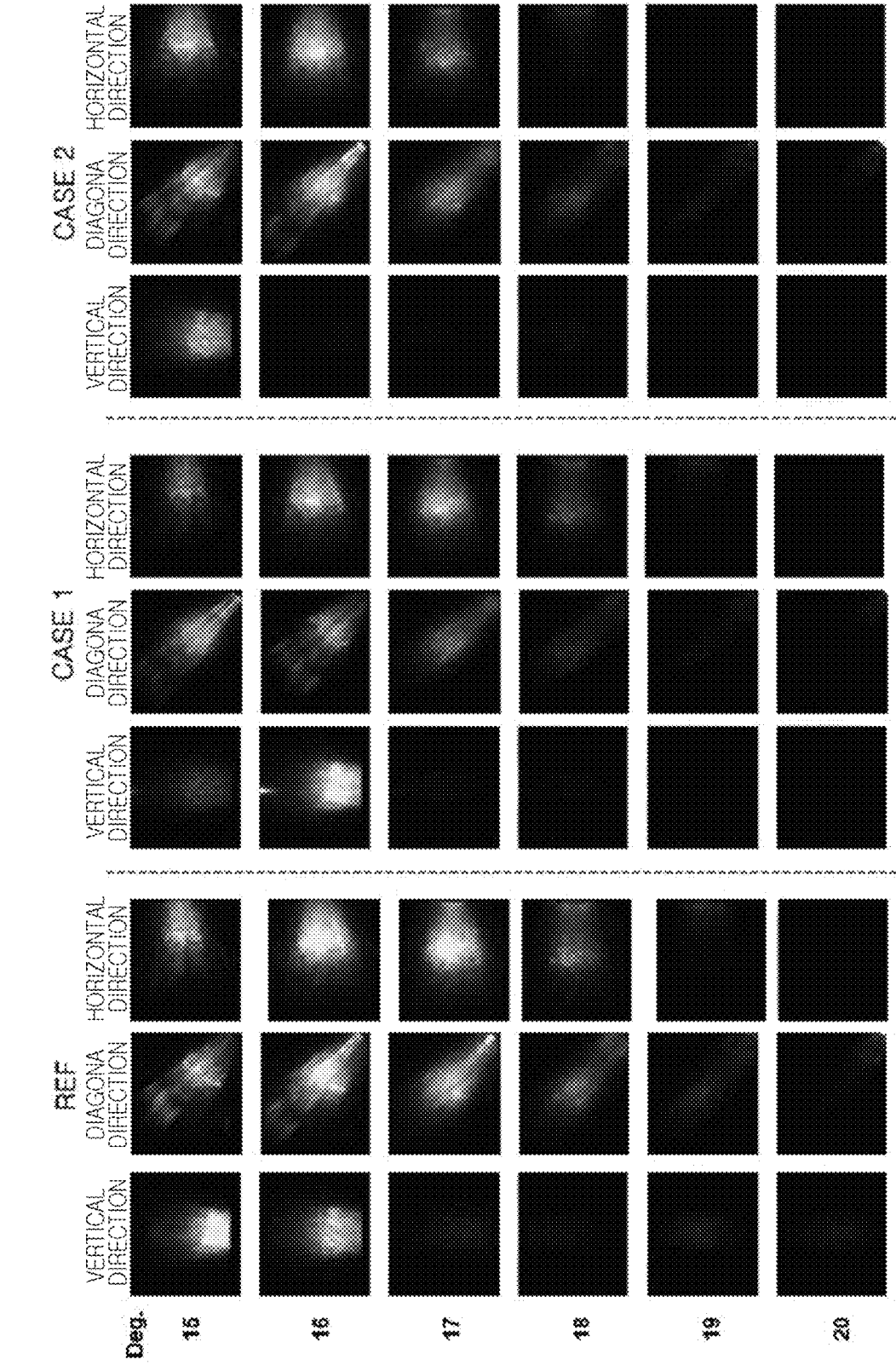
FIG. 65B is a view illustrating experimental results on a flare phenomenon of the camera device including the light absorption layers according to the embodiment.

FIG. 65A is a cross-sectional view of a sensor base and a seventh light absorption layer. FIG. 65B is a view illustrating experimental results on a flare phenomenon of the camera device including the light absorption layers according to the embodiment.

Referring to FIG. 65A, the camera device 200 may include a seventh light absorption layer 480 disposed on an inner surface (or an inner circumferential surface) formed by the opening 552 of the sensor base 550 of the sensor base 550.

For example, the inner surface (or the inner circumferential surface) of the sensor base 550 may be coated with the seventh light absorption layer 480, or the seventh light absorption layer 480 may be applied to the inner surface (or the inner circumferential surface) of the sensor base 550. The seventh light absorption layer 480 may be positioned between the image sensor 540 and the opening 201 of the base 210. Alternatively, the seventh light absorption layer 480 may be disposed on the inner surface of the sensor base 550 around the image sensor 540.

The seventh light absorption layer 480 may include a first portion 480A formed in the first area 551A of the inner circumferential surface formed by the opening 552 of the sensor base 550. For example, the first area 551A may be an inner circumferential surface adjacent to a bottom surface of the seating portion 550A supporting the filter 560. For example, the first area 551A may be an inner circumferential surface of a protruding portion protruding from the inner surface of the sensor base 550.

For example, the first area 551A may include a portion in which the opening 552 has a decreased diameter in a direction from the lower surface to the upper surface of the sensor base 550. In addition, the first area 551A may include a portion in which the opening 552 has a constant diameter.

The seventh light absorption layer 480 may include a second portion 480B formed in second areas 551B1 and 551B2 of the inner circumferential surface of the sensor base 550. For example, the second area 551B1 and 551B2 may be areas between the first area 551A and the upper surface of the sensor base 550. For example, the seventh light absorption layer 480 may include the second portion 480B disposed on at least one of the side surface 551B1 and the bottom surface 551B2 of the seating portion 550A of the sensor base 550.

In addition, the seventh light absorption layer 480 may include a third portion 480C formed in a third area 551C of the inner circumferential surface of the sensor base 550. The third area 551C may be an area between the first area 551A and the lower surface of the sensor base 550. For example, the seventh light absorption layer 480 may include the third portion 480C disposed on the inner circumferential surface 551C between the seating portion 550A of the sensor base 550 and the lower surface of the sensor base 550.

The seventh light absorption layer 480 may include at least one of the first to third portions 480A to 480C.

In the embodiment, it is possible to suppress or prevent the light reflection by the inner surfaces 551A, 551B1, 551B2, and 551C of the sensor base 550 by the seventh light absorption layer 480, thereby preventing the flare phenomenon or the ghost phenomenon and preventing the image degradation of the camera device.

The inner circumferential surface 102A of the bobbin 110 formed by the hole 102 of the bobbin 110 may include a first area 102-1 in which the hole 102 has a decreased diameter in a direction from the upper portion to the lower portion of the bobbin 110. In the cross-sectional view of the hole 102 in FIG. 59C, the first area 102-1 of the inner circumferential surface 102A of the bobbin 110 may have a first inclined surface.

The inner circumferential surface 102A of the bobbin 110 formed by the hole 102 of the bobbin 110 may include a second area 102-2 in which the hole 102 has an increased diameter in a direction from the upper portion to the lower portion of the bobbin 110. The second area 102-2 may be positioned under the first area 102-1, and the first area 102-1 and the second area 102-2 may be connected.

REF is an experimental result on the camera device not including the light absorption layers 450 and 460 according to the embodiment, and each of CASE 1 and CASE 2 is an experimental result on the camera device including the light absorption layers 450 and 460. The light absorption layers 450 and 460 in CASE 1 are made of black titanium oxide ($Ti_4O_7$), and the light absorption layers 450 and 460 in CASE 2 are made of black titanium-carbon oxide ($Ti_4O_7C$).

A horizontal direction is a result of measuring flare while tilting the image sensor 540 so that the light received in the imaging area (e.g., the center) of the image sensor 540 is moved in the third direction (Y-axis direction).

A vertical direction is a result of measuring flare while tilting the image sensor 540 so that the light received in the imaging area (e.g., the center) of the image sensor 540 is moved in the second direction (X-axis direction).

A diagonal direction is a result of measuring flare while tilting the image sensor 540 so that the light received in the imaging area (e.g., the center) of the image sensor 540 is moved in a diagonal direction of the imaging area.

When a tilting angle of the image sensor 540 when light received from a light source is aligned at the center of the imaging area of the image sensor 540 is defined as 0 degrees, an angle in FIG. 65 may be an angle tilted in each direction (horizontal direction, vertical direction, or diagonal direction) based on 0 degrees.

Referring to FIG. 65, when compared to REF, a flare phenomenon in each of CASE 1 and CASE 2 can be reduced in the horizontal direction, the vertical direction, and the diagonal direction.

In the embodiment, by providing the light absorption layers 450 and 460, it is possible to suppress the flare phenomenon or the ghost phenomenon, thereby preventing a deterioration phenomenon of the image sensor 540 and preventing the degradation in resolution power of the camera device 200.

In addition, in the embodiment, by providing at least one of the light absorption layers 91, 92, 93, 550, 460, 470, and 480, it is possible to further suppress the flare phenomenon or the ghost phenomenon, thereby preventing the deterioration phenomenon of the image sensor 540 and preventing the degradation in resolution power of the camera device 200.

In addition, a distance LD1 from an incident surface (e.g., a center of the incident surface) of the first lens 42A of the lens array 401 into which light enters to the image sensor 540 (or the imaging area) may be in a range of 10 to 15 mm. Alternatively, in another embodiment, LD1 may be in a range of 11 to 14 mm.

In addition, a distance LD2 from an emission surface (e.g., a center of the emission surface) of the last lens 42D of the lens array 401 to the image sensor 540 (or the imaging area) may be in a range of 4 to 6 mm.

In addition, a distance LD2 from an uppermost end of the hole 102 of the bobbin 110 positioned under the lens barrel 403 or an lowermost end of the lens barrel 403 to the image sensor 540 (or the imaging area) may be in a range of 3.5 to 4.2 mm.

For example, LD2 may be in a range of 27 to 60% of LD1. Alternatively, for example, LD2 may be in a range of 30 to 40% of LD1.

In addition, LD3 may be in a range of 24 to 42% of LD1. Alternatively, for example, LD3 may be in a range of 30 to 35% of LD1.

In a path (hereinafter referred to as "first path") in which light enters the lens array 401 and reaches the image sensor 540, light reflection may be caused by the inner surface of the lens barrel 403, the spacer 402, the inner surface of the bobbin 110, the inner surface of the base 210, and the inner surface of the sensor base 550. In particular, in a path (hereinafter referred to as "second path") in which the light emitted from the last lens (e.g., 42D) of the lens array 401 reaches the image sensor 540, light reflection may be caused by the inner surface of the bobbin 110, the inner surface of the base 210, and the inner surface of the sensor base 550. Since the second path is close to or adjacent to the image sensor 540, the light reflected in the second path may significantly cause the flare phenomenon.

As described above, a length of the second path may be in a range of 27 to 60% of a length of the first path. By arranging the third light absorption layer 93, the fourth light absorption layer 450, the fifth light absorption layer 460, and the sixth light absorption layer 470 in "second path," in the embodiment, it is possible to suppress the occurrence of the light reflection by the inner circumferential surface of the bottom portion of the lens barrel 403, the inner surface of the bobbin 110, the inner surface of the base 210, and the inner surface of the sensor base 550 and preventing the flare phenomenon, thereby preventing the deterioration phenomenon of the image sensor 540 and preventing the degradation in resolution power of the camera device 200.

Figure 66:
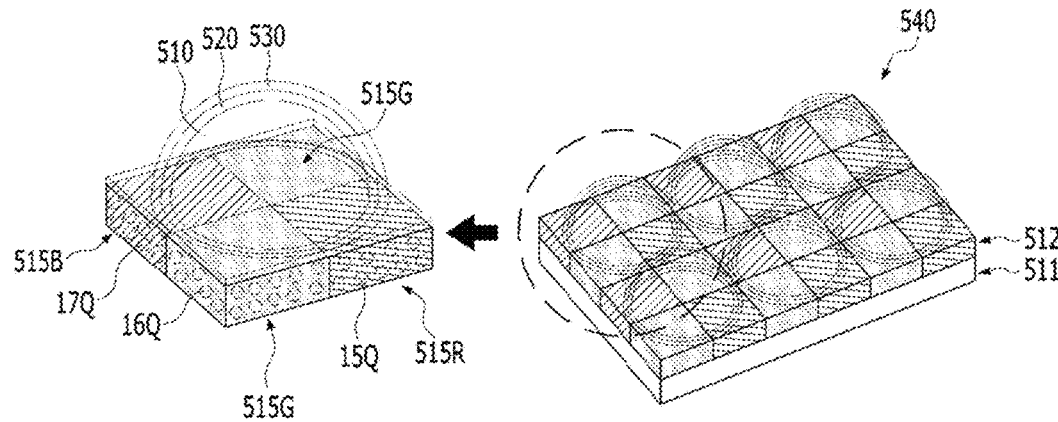
FIG. 66 is a partial perspective view of the image sensor according to the embodiment.
Figure 67:
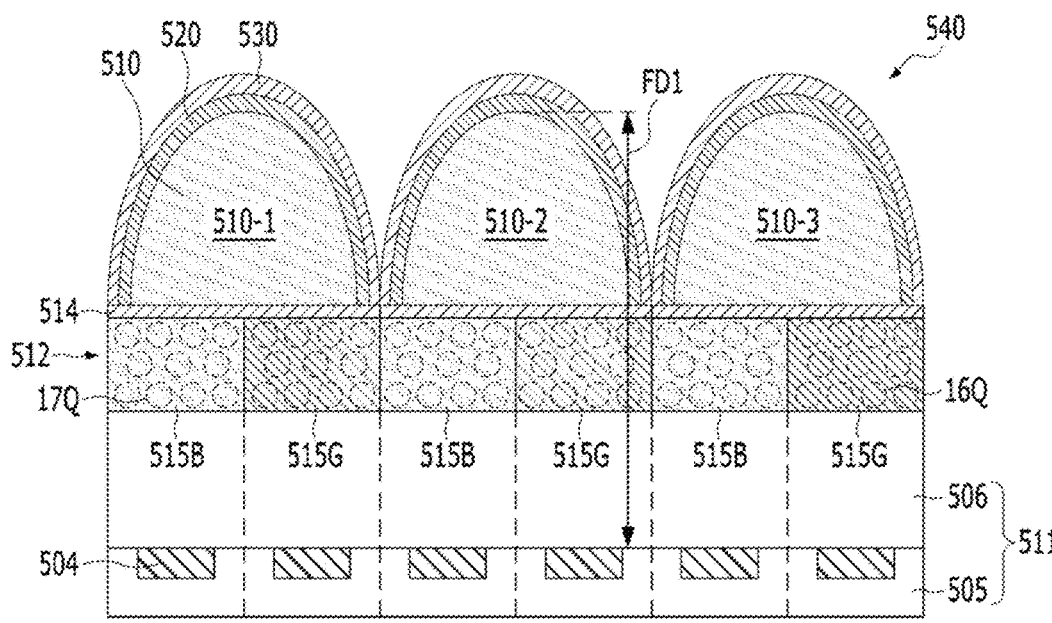
FIG. 67 is a partial cross-sectional view of the image sensor in FIG. 66.

FIG. 66 is a partial perspective view of the image sensor 540 according to the embodiment, and FIG. 67 is a partial cross-sectional view of the image sensor 540 in FIG. 66. FIG. 67 illustrates a portion of the image sensor 540, and the image sensor 540 may have substantially an expanded structure by repeating the structure of FIG. 66.

Referring to FIGS. 66 and 67, the image sensor 540 includes a light receiving unit 511 for detecting light, a micro lens unit 510 disposed on the light receiving unit, a cut-off filter layer 520 disposed on the micro lens unit 510, and a phosphor layer 530 disposed on the cut-off filter layer 520.

The image sensor 540 may further include a color filter layer 512 disposed between the light receiving unit 510 and the micro lens unit 510.

The light receiving unit 511 of the image sensor 540 may include a photoelectric conversion element, for example, a photodiode 504. The light receiving unit 511 may further include a substrate 505 on which the photodiode 504 is formed. For example, the substrate 505 may be a semiconductor substrate. For example, the photodiode 504 may be formed in an active area of the semiconductor substrate. For example, a unit pixel including the photodiode 504 may be formed on the substrate 505. For example, the light receiving unit 511 may include a plurality of photodiodes. The light receiving unit 511 may include a plurality of unit pixels.

For example, in order to form the unit pixel, the light receiving unit 511 may include a floating diffusion area (not illustrated) formed on the substrate 505, at least one transistor, for example, a transmission transistor, a selection transistor, and a driving transistor.

The light receiving unit 511 may further include an insulating layer 506 disposed between the substrate 505 (or/and the photodiode 504) and the color filter layer. The insulating layer 506 may be made of an insulating material with high light transmittance. For example, a wiring electrically connected to the photodiode 504 may be formed on the insulating layer 506.

The color filter layer 512 transmits light of a specific color for each pixel (or each photodiode 504) to obtain a color image. The color filter layer 512 may include a red filter 515R, a green filter 515G, and a blue filter 515B.

For example, the red filter 515R may filter visible light and transmit red light, the green filter 515G may filter the visible light and transmit green light, and the blue filter 515B may filter the visible light and transmit blue light.

For example, the color filter layer 512 may include a phosphor. For example, the color filter layer 512 may be a mixture of phosphor and pigment (or dye). For example, the phosphor may include a quantum dot, an inorganic material, an organic material, or perovskite structure material.

For example, the color filter layer 512 may include a phosphor having a perovskite structure. For example, the color filter layer 512 may include a phosphor having a perovskite structure doped with Er or Yb.

For example, the red filter 515R may include $K_2SiF_6$: $Mn^{4+}$ or $(Sr,Ca)AlSiN_3$:$Eu^{2+}$. For example, the green filter 515G may include Beta-$Si_{(6-z)}Al_zO_zN_{(8-z)}$:$Eu^{2+}$ or (CsRb)PbBr3. For example, the blue filter 515B may include $BaMgAl_{10}O_{17}$:$Eu^{2+}$.

Alternatively, for example, the color filter layer 512 may include at least one quantum dot. For example, the red filter 515R may include a plurality of first quantum dots 15Q emitting red light, the green filter 515GR may include a plurality of second quantum dots 16Q emitting green light, and the blue filter 515B may include a plurality of third quantum dots 17Q emitting blue light. For example, each of the plurality of filters 515R, 515G, and 515B of the color filter layer 512 may correspond to, face, or overlap any one of the plurality of photodiodes, which corresponds thereto.

For example, the first quantum dot may include at least one of InP, GaP, or ZnS. For example, the second quantum dot may include at least one of InP, GaP, or ZnS. Alternatively, the second quantum dot may include at least one of CuInGaS or ZnS. For example, the third quantum dot may include at least one of InP, GaP, or ZnS or include at least one of CuInGaS or ZnS. At least one of the first to third quantum dots may be doped with Er or Yb.

The image sensor 540 may further include an antireflective layer 514 disposed on the color filter layer 512. For example, the antireflective layer 514 may be disposed between the color filter layer 512 and the micro lens unit 510.

The antireflective layer 514 may function to allow light to be well absorbed by the color filter layer 512 without being reflected by the color filter layer 512. The antireflective layer 514 can suppress light from being reflected from the color filter layer 512 and reduce optical loss, thereby increasing an amount (efficiency) of light entering the light receiving unit 511.

The micro lens unit 510 may be disposed on the color filter layer 512. For example, the micro lens unit 510 may be disposed on the antireflective layer 514. The micro lens unit 510 may function as a light concentrator for allowing light to be well focused on the light receiving unit 511 (e.g., the photodiode 504).

The micro lens unit 510 may include a plurality of micro lenses 510-1 to 510-*n* (n is a natural number greater than 1 (n>1)). Each of the micro lenses 510-1 to 510-*n* may correspond to at least one color filter layer. For example, in FIG. 66, one micro lens may be disposed to correspond to four color filter layers. Alternatively, the one micro lens may be disposed to correspond to four photodiodes corresponding to four color filter layers. In another embodiment, the one micro lens may be disposed to correspond to one photodiode.

The micro lens of the micro lens unit 510 may be a lens having a convexly curved surface in a direction from the photodiode 504 to the color filter layer 512.

The cut-off filter layer 520 may be disposed on a surface of the micro lens unit 510. For example, the cut-off filter layer 520 may be disposed on a convex curved surface of the micro lens unit 510.

For example, the cut-off filter layer 520 may be disposed on a surface of each of the plurality of micro lenses. For example, the cut-off filter layer 520 may be disposed on the surface of each of the plurality of micro lenses. For example, the cut-off filter layer 520 may be disposed on the convex curved surface of each of the plurality of micro lenses.

For example, the cut-off filter layer 520 may have a curved surface having the same shape as the convex curved surface of the micro lens. For example, the cut-off filter layer 520 may have a curved surface having the same curvature as the convex curved surface of the micro lens. The cut-off filter layer 520 may be an infrared cut-off filter. The surface or the convex curved surface of the micro lens may be coated with the cut-off filter layer 520.

The phosphor layer 530 may be disposed on the surface of the cut-off filter layer 520. For example, the phosphor layer 530 may be disposed on the convex curved surface of the cut-off filter layer 520.

For example, the phosphor layer 530 may be disposed on the cut-off filter layer 520 disposed on the surface of each of the plurality of micro lenses. For example, the phosphor layer 530 may be disposed on the surface of the cut-off filter layer 520 disposed on the surface of each of the plurality of micro lenses. For example, the phosphor layer 530 may be disposed to cover the convex curved surface of the cut-off filter layer 520.

For example, the phosphor layer 530 may have a curved surface having the same shape as the convex curved surface of the cut-off filter layer 520 or the convex curved surface of the micro lens. For example, the phosphor layer 530 may have a curved surface having the same curvature as the convex curved surface of the cut-off filter layer 520. The surface or convex curved surface of the cut-off filter layer 520 may be coated with the phosphor layer 530.

The phosphor layer 530 may include at least one of green phosphor, red phosphor, yellow phosphor, or blue phosphor.

For example, the phosphor layer 530 may include an up-conversion phosphor to increase the luminous efficiency of visible light by absorbing unnecessary light in a wavelength band close to that of infrared rays. For example, the phosphor layer 530 may include an up-conversion nano phosphor. In another embodiment, the phosphor layer 530 may include a down-conversion phosphor.

The cut-off filter layer 520 may cut-off light having a wavelength in an infrared band, which may not be absorbed by the phosphor layer 530. Therefore, it is possible to improve the image performance of the image sensor and increase optical efficiency and color quality.

Figure 68:
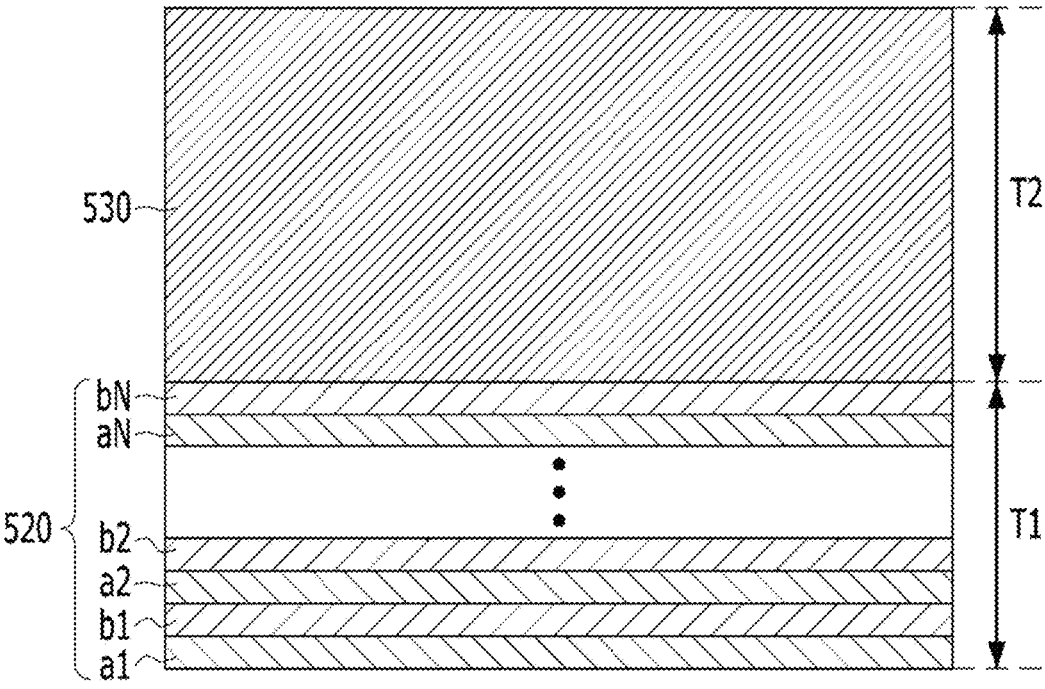
FIG. 68 is a view illustrating one embodiment of a cut-off filter layer and a phosphor layer in FIG. 67.

FIG. 68 is a view illustrating one embodiment of the cut-off filter layer 520 and the phosphor layer in FIG. 67.

Referring to FIG. 68, the cut-off filter layer 520 may have a multi-layer structure including a plurality of layers a1 to aN and b1 to bN (N is a natural number larger than 1 (N>1)).

For example, the cut-off filter layer 520 may include at least one first layer a1 to aN (N is a natural number larger than 1 (N>1)) and at least one second layer b1 to bN (N is a natural number larger than 1 (N>1)). For example, the first layer and the second layer may be laminated alternately with each other. For example, the numbers of first and second layers may be the same. In another embodiment, the number of first layers may be larger or smaller than the number of second layers.

For example, the cut-off filter layer 520 may include the first layers a1 to aN (N is a natural number larger than 1 (N>1)) and the second layer b1 to bN (N is a natural number larger than 1 (N>1)) disposed alternately two or more times. For example, the first layers a1 to aN (N is a natural number larger than 1 (N>1)) may be a first dielectric layer having a first refractive index, and the second layers b1 to bN (N is a natural number larger than 1 (N>1)) may be a second dielectric layer having a second refractive index. The first refractive index and the second refractive index may be different. For example, the first layers a1 to aN (N is a natural number larger than 1 (N>1)) may be titanium oxide, for example, $TiO_2$, and the second layers b1 to bN (N is a natural number larger than 1 (N>1)) may be silicon (Si) oxide, for example, SiO2.

A thickness T1 of the cut-off filter layer 520 may be in a range of 0.02 to 0.1 micrometers. Alternatively, T1 may be in a range of 0.05 to 0.1 micrometers. When the thickness T1 of the cut-off filter layer 520 exceeds 0.1 micrometers, light may be reflected by the cut-off filter layer 520 or absorbed by the cut-off filter layer 520, resulting in decreasing light transmittance, and thus the performance of the image sensor 540 may be degraded. In addition, when the thickness T1 of the cut-off filter layer 520 is smaller than 0.05 micrometers, the infrared cut-off function may be degraded, resulting in the occurrence of warpage in the image of the image sensor 540.

A thickness T2 of the phosphor layer 530 may be in a range of 0.02 to 0.5 micrometers. Alternatively, the thickness T2 of the phosphor layer 530 may be in a range of 0.05 to 0.2 micrometers.

When the thickness T2 of the phosphor layer 530 is smaller than 0.02 micrometers, it is difficult to absorb light in the infrared wavelength band or a wavelength band close to that of infrared rays, and thus optical efficiency may be decreased.

In addition, when the thickness T2 of the phosphor layer 530 exceeds 0.5 micrometers, the phosphor efficiency is increased, but since the thickness of the phosphor layer 53 is large, an amount of the visible light transmitting the phosphor layer 530 and transferred to the light receiving unit 511 may be decreased.

For example, the thickness T2 of the phosphor layer 530 may be larger than or equal to the thickness T1 of the cut-off filter layer 520 (T2≥T1). In another embodiment, T2<T1 is possible.

Referring to FIG. 68, a diameter R1 of each of the micro lenses (e.g., 510-1 to 510-3) of the micro lens unit 510 may be in a range of 0.2 to 2 micrometers. Alternatively, for example, the diameter R1 of each of the micro lenses (e.g., 510-1 to 510-3) may be in a range of 0.5 to 1 micrometers.

A distance FD1 from the cut-off filter layer 520 to the antireflective layer 514 (or the color filter layer 512) may be in a range of 1 to 10 micrometers.

For example, FD1 may be a distance from a lower surface of the cut-off filter layer 520 positioned at the highest point of the micro lenses 510-1 to 510-3 to the antireflective layer 514 (or the color filter layer 512). Alternatively, for example, the distance FD1 from the cut-off filter layer 520 to the antireflective layer 514 (or the color filter layer 512)) may be in a range of 2 to 3 micrometers.

For example, the thickness T11 of the cut-off filter layer 520 may be in a range of 1 to 50% of the diameter R1 of each of the micro lenses 510-1 to 510-3. Alternatively, for example, the thickness T11 of the cut-off filter layer 520 may be in a range of 10 to 30% of the diameter R1 of each of the micro lenses 510-1 to 510-3.

A basic structure of a general camera device may be largely formed of a reflective surface (or without the reflective surface), a lens, an infrared cut-off filter, and an image sensor. Light passes through a lens and is transferred to an image sensor, and an infrared cut-off filter disposed between the lens and the image sensor is disposed. The infrared cut-off filter cuts off light in an infrared band other than a visible ray band from the light transferred to the image sensor in order to reduce noise or efficiency and obtain clear images.

However, when light passes through the infrared cut-off filter, primary optical loss of the light may be caused by the infrared cut-off filter. The infrared cut-off filter may include an infrared cut-off material with which a transparent glass is coated in order for removing light in the infrared band.

The transmission, reflection, and absorption of light may occur at an interface between the infrared cut-off material and the glass, and the light at this time may be affected by a refractive index, transmittance, and the like of the glass, which is a medium, and thus light transmission efficiency may be decreased. In order to resolve this phenomenon, a medium is not used, or when the medium is inevitably used, a medium with high transmittance and a low refractive index may be used.

In general, an infrared cut-off filter (hereinafter referred to as "first infrared cut-off filter") in which a medium such as a glass is coated with an infrared cut-off material may be spaced apart from an image sensor and a lens array and disposed between the image sensor and the lens array. For example, describing the above with reference to the cross-sectional view illustrated, the first infrared cut-off filter may be disposed between the lens 42D positioned on the lower-most end of the lens array 401 and the image sensor 540 and disposed to be spaced apart from the image sensor 540. For example, the first infrared cut-off filter may be disposed on the sensor base 550. In the camera device to which the first infrared cut-off filter is applied as described above, light transmission efficiency may be decreased and thus image performance may be decreased as described above.

In the embodiment, by forming the cut-off filter layer 520 directly on the surface of the micro lens unit 510 without using the medium such as a glass, it is possible to decrease optical loss, thereby minimizing a decrease in optical efficiency and obtaining high-quality image performance.

In addition, in the embodiment, by forming the up-conversion phosphor layer 530 on the surface of the cut-off filter layer 520, it is possible to increase the light-emitting efficiency of visible light by absorbing unnecessary light having the wavelength band close to that of infrared rays.

In addition, in the embodiment, by absorbing the unnecessary light, having the wavelength band close to that of infrared rays and remaining in the light passing through the phosphor layer 53, by the cut-off filter layer 520, it is possible to remove noise, thereby securing clear images.

In addition, in the embodiment, it is possible to increase optical efficiency by concentrating light on the light receiving unit 511 using the micro lens unit 510.

In addition, in the embodiment, by forming the antireflective film on the color filter layer 512 so that light may be easily absorbed by the color filter layer 512, it is possible to reduce the loss of the amount of light flowing into the light receiving unit 511.

In addition, in the embodiment, by including the phosphor having the narrow full width at half maximum in the color filter layer 512, it is possible to improve color purity or color quality, thereby implementing high-quality images.

In addition, as described with reference to FIG. 67, since the cut-off filter layer 520 is formed on the surface of the micro lens unit 510, a separation distance between the color filter layer 512 and the cut-off filter layer 520 may be 10 micrometers or less. The separation distance between the cut-off filter layer 520 and the color filter layer 512 (or the light receiving unit 511) in the embodiment is much smaller than a distance between a first infrared cut-off filter and a color filter layer (or a light receiving unit) of an image sensor in a general camera device. Therefore, since the separation distance between the cut-off filter layer 520 and the color filter layer is small, in the embodiment, it is possible to decrease optical loss and increase optical efficiency.

Figure 69:
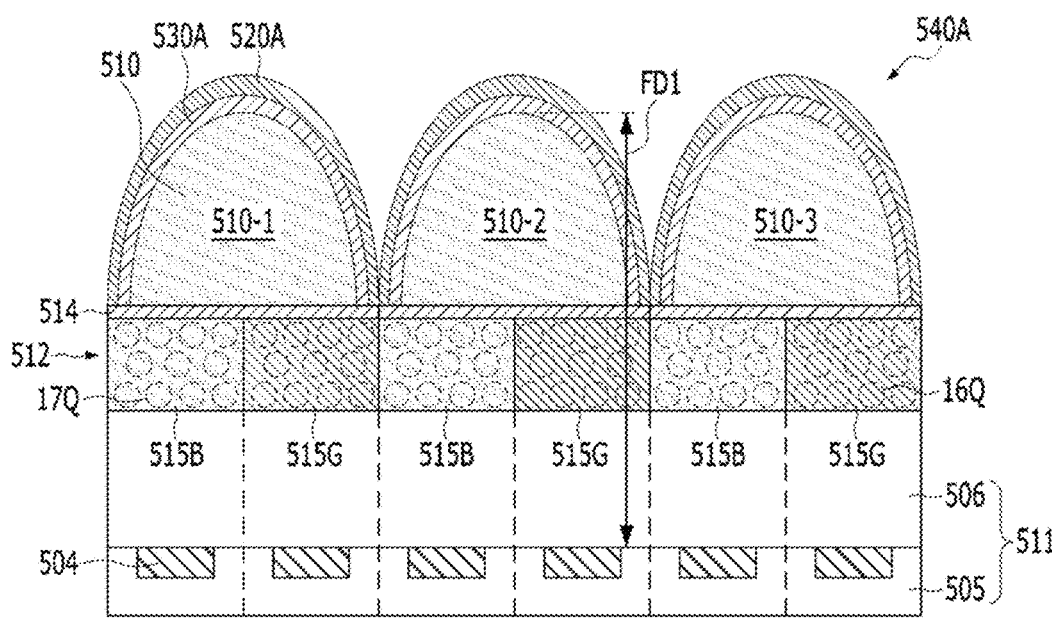
FIG. 69 is a partial cross-sectional view of an image sensor according to another embodiment.

FIG. 69 is a partial cross-sectional view of an image sensor 540A according to another embodiment.

In the image sensor 540A in FIG. 69, positions or arrangements of the cut-off filter layer 520 and the phosphor layer 530 of the image sensor 540 in FIG. 67 are changed. In other words, the image sensor 540A may include a phosphor layer 530 disposed on the surface (e.g., the convex curved surface) of the micro lens unit 510 and a cut-off filter layer 520A disposed on the surface (e.g., the convex curved surface) of the phosphor layer 530.

The description of the cut-off filter layer 520 and the phosphor layer 530 described with reference to FIG. 67 may be applied or analogously applied to the cut-off filter layer 520A and the phosphor layer 530 in FIG. 69.

Figure 70:
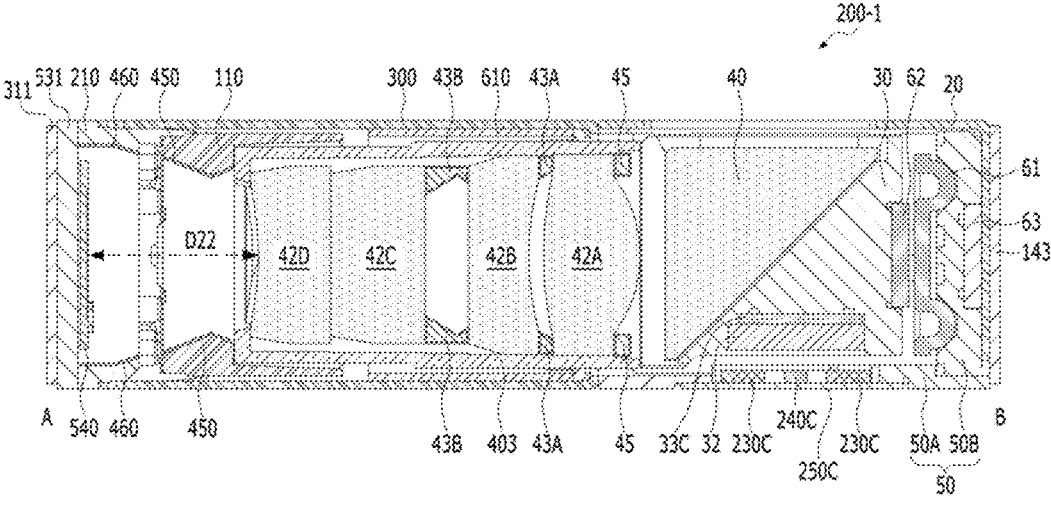
FIG. 70 is a cross-sectional view of a camera device according to another embodiment.
Figure 71:
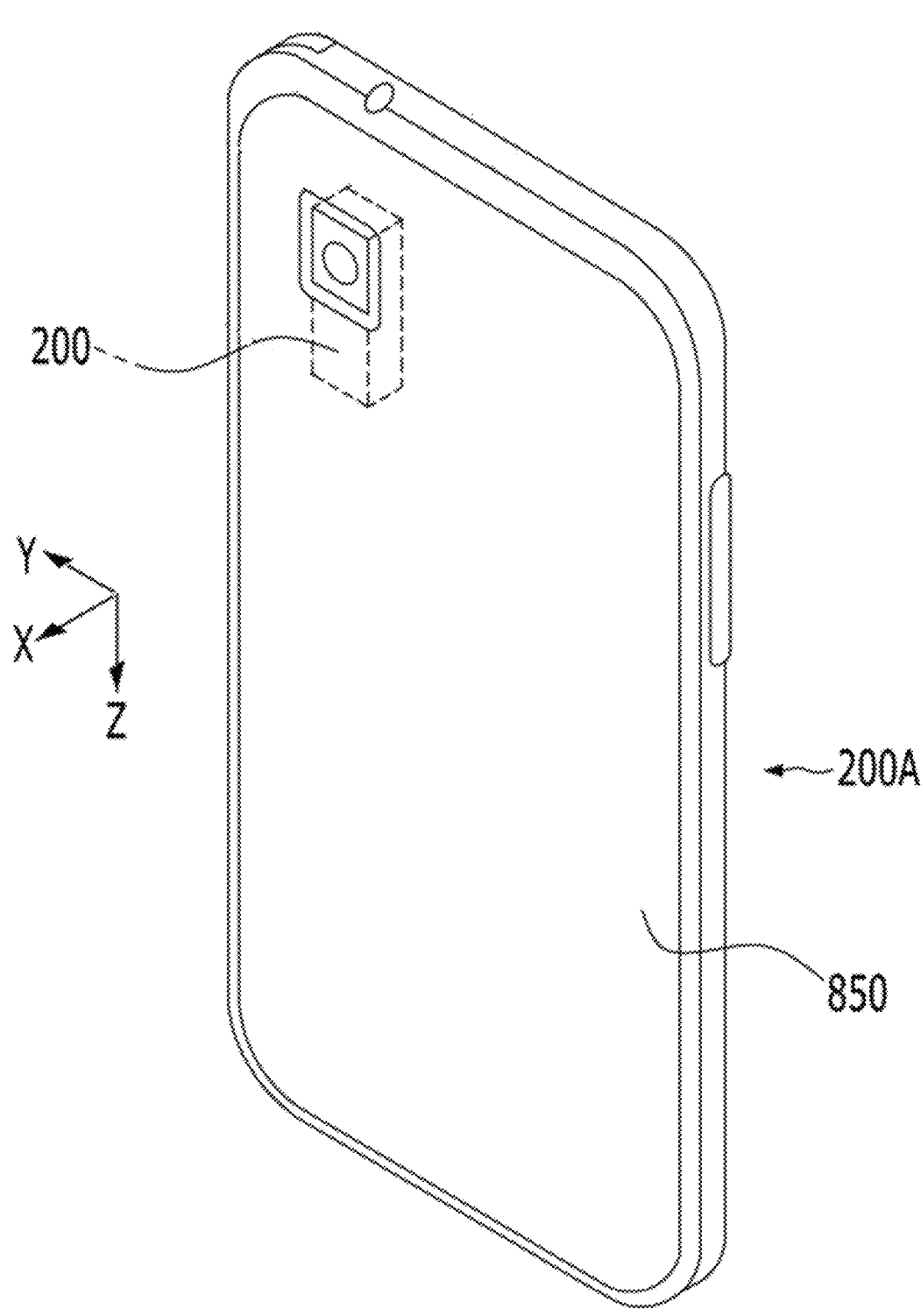
FIG. 71 is a perspective view of an optical device according to the embodiment.
Figure 72:
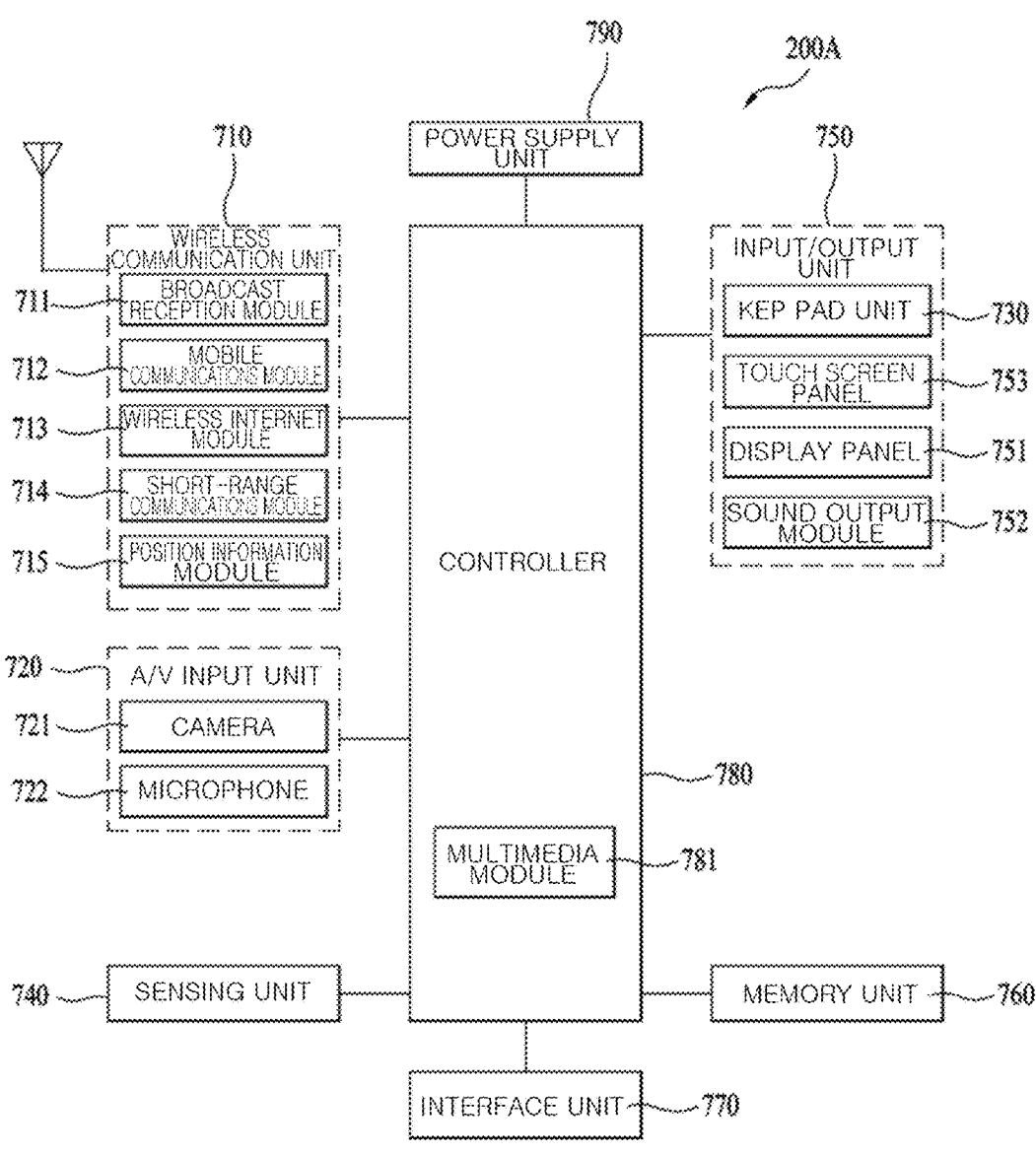
FIG. 72 is a configuration diagram illustrating the optical device illustrated in FIG. 71.

FIG. 70 is a cross-sectional view of a camera device 200-1 according to another embodiment. The same reference numerals as in FIG. 45 denote the same components in FIG. 70, and descriptions of the same components will be omitted or simplified.

In the embodiment of FIG. 70, the sensor base 550 is omitted from the camera device 200 according to the embodiment of FIG. 45. Therefore, the base 210 may be disposed on the third board unit 530. For example, the base 210 may be disposed on the first board 531 on which the image sensor 540 is disposed or mounted and attached or fixed to the first board 531 using an adhesive. The opening 201 of the base 210 may correspond to the image sensor 540 and may be exposed or opened by the opening 201.

When the camera device 200-1 in the embodiment of FIG. 70 is compared to the embodiment 200 of FIG. 45, a distance D22 from the lens array 401 (e.g., the lens 42D positioned on the lowest end) to the photodiode 504 of the light receiving unit 511 of the image sensor 540 in the camera device 200-1 in the embodiment of FIG. 70 may be decreased. In other words, D22 may be smaller than D21 in the embodiment of FIG. 45 (D22<D21).

For example, D21 may be in a range of 4000 to 5000 micrometers, and D22 may be in a range of 3000 to 3800 micrometers.

In the embodiment of FIG. 70, by decreasing the separation distance D22 between the lens array 401 and the image sensor 540, it is possible to reduce optical loss, thereby increasing optical efficiency.

In addition, the camera device 200 according to the embodiment may be included in an optical device for forming an image of an object in a space using the characteristics of light, such as reflection, refraction, absorption, interference, and diffraction and increasing the visual power of the eyes, or recording and reproducing images formed by the lens, performing optical measurement, propagating or transmitting the image, etc. For example, the optical device according to the embodiment may be a cell phone, a portable phone, a smart phone, a portable smart device, a digital camera, a laptop computer, a digital broadcasting terminal, a personal digital assistant (PDA), and a portable multimedia player (PMP), a navigation device, or the like, but is not limited thereto and may be any device for capturing videos or photos.

FIG. 66 is a perspective view of the optical device 200A according to the embodiment, and FIG. 67 is a configuration diagram of the optical device 200A illustrated in FIG. 66.

Referring to FIGS. 66 and 67, the optical device 200A (hereinafter referred to as a portable "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 66 may have a bar shape, but is not limited thereto and may have various structures such as a slide type, a folder type, a swing type, or a swivel type in which two or more sub-bodies are coupled to enable a relative movement.

The wireless communication unit 710 may include one or more modules for enable wireless communication between the terminal 200A and a wireless communication system or between the terminal 200A and a network in which the terminal 200A is positioned. For example, the wireless communication unit 710 may include a broadcast reception module 711, a mobile communication module 712, a wireless Internet module 713, a short-range communication module 714, and a position information module 715.

The A/V input unit 720 is for inputting an audio signal or a video signal and may include a camera 721, a microphone 722, etc.

The camera 721 may include the camera device 200 according to the embodiment.

The sensing unit 740 may detect a current state of the terminal 200A, such as opened/closed states of the terminal 200A, a position of the terminal 200A, the presence of a user's touch, an orientation of the terminal 200A, or the acceleration/deceleration of the terminal 200A and generate a sensing signal for controlling an operation of the terminal 200A. For example, when the terminal 200A is in the form of a slide phone, the sensing unit 740 may detect whether the slide phone is opened or closed. In addition, the sensing unit 740 is in charge of detecting functions related to whether the power supply unit 790 supplies power, whether the interface unit 770 is connected to an external device, etc.

The input/output unit 750 is for generating an input or output related to vision, hearing, touch, etc. The input/output unit 750 may generate input data for controlling the operation of the terminal 200A and also display information processed by the terminal 200A.

The input/output unit 750 may include a key pad unit 730, a display panel 751, a sound output module 752, and a touch screen panel 753. The key pad unit 730 may generate input data through a key pad input.

The display panel 751 may include a plurality of pixels of which colors vary depending on electrical signals. For example, the display panel 751 may include at least one of a liquid crystal display, a thin film transistor-liquid crystal display, an organic light-emitting diode, a flexible display, and a three-dimensional (3D) display.

The sound output module 752 may output audio data received from the wireless communication unit 710 in a call signal reception mode, a call mode, a recording mode, a voice recognition mode, a broadcast reception mode, or the like or output audio data stored in the memory unit 760.

The touch screen panel 753 may convert a change in capacitance generated by a user's touch to a specific area of a touch screen into an electrical input signal.

The memory unit 760 may store a program for processing and controlling the controller 780 and temporarily store input/output data (e.g., a phone book, a message, an audio, a still image, a photo, or a video). For example, the memory unit 760 may store images captured by the camera 721, such as a photo or a video.

The interface unit 770 functions as a passage for connection with an external device connected to the terminal 200A. The interface unit 770 receives data from the external device, receives power and transmits the power to each of the components inside the terminal 200A, or transmits data inside the terminal 200A to the external device. For example, the interface unit 770 may include a wired/wireless headset port, an external charger port, a wired/wireless data port, a memory card port, a port connecting a device in which an identification module is provided, an audio input/output (I/O) port, a video I/O port, an earphone port, etc.

The controller 780 may control the overall operation of the terminal 200A. For example, the controller 780 may perform related control and processing for a voice call, data communication, a video call, etc.

The controller 780 may include a multimedia module 781 for playing multimedia. The multimedia module 781 may be implemented in the controller 780 or implemented separately from the controller 780.

The controller 780 may perform pattern recognition processing for recognizing a handwriting input or a drawing input on the touch screen as a text and an image, respectively.

The power supply unit 790 may receive external power or internal power under the control of the controller 780 and supply power necessary for the operation of each of the components.

The camera device 200 may be disposed on the body 850 of the portable terminal 200A so that the incident surface 8A of the optical member 40 is disposed parallel to one surface (e.g., the rear surface or front surface) of the body 850. For example, the first actuator 310, the second actuator 320, and the image sensing unit 330 may be arranged in a direction from an upper end to a lower end of the body 850 of the portable terminal 200A. In another embodiment, the camera device may be in the form of being rotated 90 degrees from that in the arrangement of FIG. 71. In other words, the first actuator 310, the second actuator 320, and the image sensing unit 330 may be arranged in a direction from a first long side surface to a second long side surface of the body 850 of the portable terminal 200A. Through the arrangement, in the embodiment, it is possible to resolve spatial limits when the camera device 200 is mounted on the portable device 200A and increase a degree of freedom in design of the portable device.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator configured to move an optical member within a camera, comprising:
   a housing;
   a mover including a holder disposed in the housing and the optical member disposed in the holder;
   a driving unit including at least one driving magnet and at least one driving coil, the driving unit being disposed in the housing and configured to move the mover; and
   a bonding member disposed between the holder and the optical member, wherein the optical member includes a reflective surface and a coating layer made of reflective materials disposed on the reflective surface, wherein the coating layer includes a first area in contact with the bonding member and a second area other than the first area, and wherein a thickness in the first area is larger than a thickness in the second area.

2. The camera actuator of claim 1, wherein the holder includes a seating surface corresponding to the reflective surface of the optical member, and wherein the seating surface includes an edge area and an internal area disposed inside the edge area.

3. The camera actuator of claim 2, wherein the seating surface includes a seating protrusion disposed in the edge area.

4. The camera actuator of claim 3, wherein the bonding member is disposed on the seating protrusion.

5. The camera actuator of claim 2, wherein the first area is positioned on the edge area, and wherein the second area is positioned on the internal area.

6. The camera actuator of claim 5, wherein the coating layer is disposed to be spaced apart from the seating surface in the second area.

7. The camera actuator of claim 5, wherein at least a portion of the bonding member is in contact with the first area.

8. The camera actuator of claim 5, wherein the bonding member is misaligned with the second area.

9. The camera actuator of claim 5, wherein the coating layer is provided as a plurality of layers, and wherein the number of the plurality of layers in the first area is larger than the number of the plurality of layers in the second area.

10. The camera actuator of claim 2, wherein the bonding member is in contact with any one of the second area or the seating surface.

11. The camera actuator of claim 2, wherein the bonding member is positioned on the seating surface and disposed to be spaced apart from the second area.

12. The camera actuator of claim 1, wherein the optical member is a prism or a mirror.

13. The camera actuator of claim 1, wherein the holder include a first holder outer surface and a second holder outer surface facing each other, a third holder outer surface disposed under the first holder outer surface and the second holder outer surface, and a fourth holder outer surface disposed on the third holder outer surface between the first holder outer surface and the second holder outer surface, and wherein the optical member is surrounded by the first holder outer surface, the second holder outer surface, the third holder outer surface, and the fourth holder outer surface.

14. The camera actuator of claim 1, wherein at least a portion of the bonding member is positioned under the second area.

15. A camera device, comprising:
   a camera actuator configured to move an optical member within the camera device; and
   a processor connected to the camera actuator, wherein the camera actuator includes:
      a housing;
      a mover including a holder disposed in the housing and the optical member disposed in the holder;
      a driving unit including at least one driving magnet and at least one driving coil, the driving unit being disposed in the housing and configured to move the mover; and
      a bonding member disposed between the holder and the optical member, wherein the optical member includes a reflective surface and a coating layer made of reflective materials disposed on the reflective surface, wherein the coating layer includes a first area in contact with the bonding member and a second area other than the first area, and wherein a thickness of the first area is larger than a thickness of the second area.

16. A camera actuator configured to move an optical member within a camera, comprising:
   a housing;
   a mover including a holder disposed in the housing and the optical member disposed in the holder; and
   a driving unit including at least one driving magnet and at least one driving coil, the driving unit being disposed in the housing and configured to move the mover, wherein the optical member includes a reflective surface and a coating layer made of reflective materials disposed on the reflective surface, wherein the coating layer includes a first area and a second area other than the first area, and wherein a thickness of the coating layer in the first area is larger than a thickness of the coating layer in the second area.

17. The camera actuator of claim 16, wherein the holder includes a seating surface corresponding to the reflective surface of the optical member, and wherein the seating surface includes an edge area and an internal area disposed inside the edge area.

18. The camera actuator of claim 16, wherein the seating surface includes a seating protrusion disposed in the edge area.

19. The camera actuator of claim 16, wherein the first area is positioned on the edge area, and wherein the second area is positioned on the internal area.

\* \* \* \* \*